(12) United States Patent
Mamou et al.

(10) Patent No.: US 8,041,760 B2
(45) Date of Patent: Oct. 18, 2011

(54) SERVICE ORIENTED ARCHITECTURE FOR A LOADING FUNCTION IN A DATA INTEGRATION PLATFORM

(75) Inventors: Jean-Claude Mamou, Millbury, MA (US); Lee Scheffler, West Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1606 days.

(21) Appl. No.: 11/065,187

(22) Filed: Feb. 24, 2005

(65) Prior Publication Data

US 2005/0262191 A1 Nov. 24, 2005

Related U.S. Application Data

(63) Continuation-in-part of application No. 10/925,897, filed on Aug. 24, 2004.

(60) Provisional application No. 60/498,531, filed on Aug. 27, 2003, provisional application No. 60/553,729, filed on Mar. 16, 2004, provisional application No. 60/606,371, filed on Aug. 31, 2004, provisional application No. 60/606,237, filed on Aug. 31, 2004, provisional application No. 60/606,370, filed on Aug. 31, 2004, provisional application No. 60/606,372, filed on Aug. 31, 2004, provisional application No. 60/606,301, filed on Aug. 31, 2004, provisional application No. 60/606,238, filed on Aug. 31, 2004, provisional application No. 60/606,407, filed on Aug. 31, 2004.

(51) Int. Cl.
*G06F 15/16* (2006.01)

(52) U.S. Cl. .......... 709/200; 709/223; 707/602
(58) Field of Classification Search .......... 709/217, 709/223, 200, 203; 707/10, 100, 600, 687, 707/602
See application file for complete search history.

(56) References Cited

U.S. PATENT DOCUMENTS

| 4,561,092 A | 12/1985 | Shaver |
| 5,191,326 A | 3/1993 | Montgomery |
| 5,291,492 A | 3/1994 | Andrews et al. |
| 5,524,253 A | 6/1996 | Pham et al. |
| 5,727,158 A | 3/1998 | Bouziane et al. |
| 5,842,213 A | 11/1998 | Odom et al. |
| 5,909,681 A | 6/1999 | Passera et al. |

(Continued)

FOREIGN PATENT DOCUMENTS

EP 0520459 A2 12/1992

(Continued)

OTHER PUBLICATIONS

Ascential Software: "DataStage Product Family Architectural Overview" Online! Jan. 2, 2002, pp. 1-34.

(Continued)

*Primary Examiner* — Faruk Hamza
(74) *Attorney, Agent, or Firm* — Yee & Associates, P.C.; Doug H. Lefeve

(57) ABSTRACT

A loading function of an extract-transform-load data integration process is deployed as a service in a services oriented architecture by providing a module, the module being a data loading module for loading data into a target database that is associated with a data integration platform; by providing a registry of services; and by providing an interface for the data loading module; and identifying the data loading module in the registry; wherein the data loading module can be accessed as a service in a services oriented architecture.

20 Claims, 141 Drawing Sheets

U.S. PATENT DOCUMENTS

| | | | |
|---|---|---|---|
| 5,995,980 | A | 11/1999 | Olson et al. |
| 6,029,178 | A | 2/2000 | Martin et al. |
| 6,052,691 | A | 4/2000 | Ardoin et al. |
| 6,094,688 | A | 7/2000 | Mellen-Garnett et al. |
| 6,108,635 | A | 8/2000 | Herren et al. |
| 6,192,390 | B1 | 2/2001 | Berger et al. |
| 6,208,345 | B1 | 3/2001 | Sheard et al. |
| 6,230,117 | B1 | 5/2001 | Lymer et al. |
| 6,272,449 | B1 | 8/2001 | Passera |
| 6,289,474 | B1 | 9/2001 | Beckerle |
| 6,292,932 | B1 | 9/2001 | Baisley et al. |
| 6,308,178 | B1 * | 10/2001 | Chang et al. .................. 707/100 |
| 6,311,265 | B1 | 10/2001 | Beckerle et al. |
| 6,321,240 | B1 | 11/2001 | Chilimbi et al. |
| 6,330,008 | B1 | 12/2001 | Razdow et al. |
| 6,330,556 | B1 | 12/2001 | Chilimbi et al. |
| 6,347,310 | B1 | 2/2002 | Passera |
| 6,370,573 | B1 | 4/2002 | Bowman-Amuah |
| 6,415,286 | B1 | 7/2002 | Passera et al. |
| 6,453,464 | B1 | 9/2002 | Sullivan |
| 6,536,037 | B1 | 3/2003 | Guheen et al. |
| 6,542,908 | B1 | 4/2003 | Ims |
| 6,553,563 | B2 | 4/2003 | Ambrose et al. |
| 6,564,251 | B2 | 5/2003 | Katariya et al. |
| 6,604,110 | B1 | 8/2003 | Savage et al. |
| 6,625,651 | B1 | 9/2003 | Swartz et al. |
| 6,684,207 | B1 | 1/2004 | Greenfield et al. |
| 6,715,075 | B1 | 3/2004 | Loukianov |
| 6,721,713 | B1 | 4/2004 | Guheen et al. |
| 6,738,975 | B1 | 5/2004 | Yee et al. |
| 6,757,689 | B2 | 6/2004 | Battas et al. |
| 6,763,353 | B2 | 7/2004 | Li et al. |
| 6,782,403 | B1 | 8/2004 | Kino et al. |
| 6,789,096 | B2 | 9/2004 | Sankaran et al. |
| 6,865,582 | B2 * | 3/2005 | Obradovic et al. .................. 1/1 |
| 6,920,474 | B2 | 7/2005 | Walsh et al. |
| 6,922,685 | B2 | 7/2005 | Greene et al. |
| 6,937,983 | B2 | 8/2005 | Romero |
| 6,938,053 | B2 | 8/2005 | Jaro |
| 6,985,762 | B2 | 1/2006 | Brashears et al. |
| 6,985,939 | B2 | 1/2006 | Fletcher et al. |
| 7,003,526 | B1 * | 2/2006 | Lee et al. ..................... 707/687 |
| 7,003,560 | B1 | 2/2006 | Mullen et al. |
| 7,080,092 | B2 | 7/2006 | Upton |
| 7,117,208 | B2 | 10/2006 | Tamayo et al. |
| 7,117,215 | B1 * | 10/2006 | Kanchwalla et al. ......... 707/100 |
| 7,120,896 | B2 | 10/2006 | Budhiraja et al. |
| 7,124,413 | B1 | 10/2006 | Klemm et al. |
| 7,131,110 | B2 | 10/2006 | Brewin |
| 7,139,199 | B2 | 11/2006 | Srinivasan et al. |
| 7,139,999 | B2 | 11/2006 | Bowman-Amuah |
| 7,143,112 | B2 * | 11/2006 | Yagawa ................. 1/1 |
| 7,146,606 | B2 | 12/2006 | Mitchell et al. |
| 7,174,534 | B2 | 2/2007 | Chong et al. |
| 7,181,731 | B2 | 2/2007 | Pace et al. |
| 7,200,569 | B2 | 4/2007 | Gallagher et al. |
| 7,206,789 | B2 | 4/2007 | Hurmiz et al. |
| 7,212,233 | B2 | 5/2007 | Nakamura |
| 7,213,037 | B2 | 5/2007 | Rangadass |
| 7,224,545 | B2 | 5/2007 | Saliba et al. |
| 7,257,820 | B2 | 8/2007 | Fischer et al. |
| 7,260,623 | B2 | 8/2007 | Wookey et al. |
| 7,343,428 | B2 | 3/2008 | Fletcher et al. |
| 7,366,990 | B2 | 4/2008 | Pitroda |
| 7,382,479 | B2 | 6/2008 | Hirose et al. |
| 7,392,255 | B1 | 6/2008 | Sholtis et al. |
| 7,392,320 | B2 | 6/2008 | Bookman et al. |
| 7,395,540 | B2 | 7/2008 | Rogers |
| 7,424,702 | B1 | 9/2008 | Vinodkrishnan et al. |
| 7,552,333 | B2 | 6/2009 | Wheeler et al. |
| 2001/0047326 | A1 | 11/2001 | Broadbent et al. |
| 2002/0026630 | A1 | 2/2002 | Schmidt et al. |
| 2002/0059172 | A1 | 5/2002 | Muhlestein |
| 2002/0062269 | A1 | 5/2002 | Kirmani et al. |
| 2002/0073059 | A1 | 6/2002 | Foster et al. |
| 2002/0097277 | A1 | 7/2002 | Pitroda |
| 2002/0103731 | A1 | 8/2002 | Barnard et al. |
| 2002/0111819 | A1 | 8/2002 | Li et al. |
| 2002/0116362 | A1 | 8/2002 | Li et al. |
| 2002/0120535 | A1 | 8/2002 | Yu |
| 2002/0133387 | A1 | 9/2002 | Wilson et al. |
| 2002/0138316 | A1 | 9/2002 | Katz et al. |
| 2002/0141446 | A1 | 10/2002 | Koga |
| 2002/0169842 | A1 | 11/2002 | Christensen et al. |
| 2002/0174000 | A1 | 11/2002 | Katz et al. |
| 2002/0178077 | A1 | 11/2002 | Katz et al. |
| 2002/0194181 | A1 | 12/2002 | Wachtel |
| 2002/0198902 | A1 | 12/2002 | Sankaran et al. |
| 2003/0003872 | A1 * | 1/2003 | Brinkley et al. ................. 455/66 |
| 2003/0014372 | A1 | 1/2003 | Wheeler et al. |
| 2003/0014483 | A1 | 1/2003 | Stevenson et al. |
| 2003/0020807 | A1 | 1/2003 | Khoshnevis et al. |
| 2003/0033155 | A1 | 2/2003 | Peerson et al. |
| 2003/0033179 | A1 | 2/2003 | Katz et al. |
| 2003/0046307 | A1 | 3/2003 | Rivette et al. |
| 2003/0055624 | A1 | 3/2003 | Fletcher et al. |
| 2003/0065549 | A1 | 4/2003 | Hoffman et al. |
| 2003/0069902 | A1 | 4/2003 | Narang et al. |
| 2003/0093582 | A1 | 5/2003 | Cruz et al. |
| 2003/0097286 | A1 | 5/2003 | Skeen |
| 2003/0101111 | A1 | 5/2003 | Dang et al. |
| 2003/0101112 | A1 | 5/2003 | Gallagher et al. |
| 2003/0132854 | A1 | 7/2003 | Swan et al. |
| 2003/0145096 | A1 | 7/2003 | Breiter et al. |
| 2003/0188039 | A1 | 10/2003 | Liu et al. |
| 2003/0212738 | A1 | 11/2003 | Wookey et al. |
| 2003/0220807 | A1 | 11/2003 | Hoffman et al. |
| 2003/0227392 | A1 | 12/2003 | Ebert et al. |
| 2003/0233341 | A1 | 12/2003 | Taylor et al. |
| 2004/0011276 | A1 | 1/2004 | Jackson et al. |
| 2004/0015564 | A1 | 1/2004 | Williams |
| 2004/0030740 | A1 | 2/2004 | Stelting |
| 2004/0034651 | A1 | 2/2004 | Gupta et al. |
| 2004/0064428 | A1 | 4/2004 | Larkin et al. |
| 2004/0102687 | A1 | 5/2004 | Brashears et al. |
| 2004/0103051 | A1 | 5/2004 | Reed et al. |
| 2004/0111276 | A1 | 6/2004 | Inge |
| 2004/0117759 | A1 | 6/2004 | Rippert, Jr. et al. |
| 2004/0128394 | A1 | 7/2004 | Knauerhase et al. |
| 2004/0133876 | A1 | 7/2004 | Sproule |
| 2004/0177012 | A1 | 9/2004 | Flanagan |
| 2004/0177335 | A1 | 9/2004 | Beisiegel et al. |
| 2004/0205129 | A1 | 10/2004 | Bongiorni et al. |
| 2004/0205206 | A1 | 10/2004 | Naik et al. |
| 2004/0225660 | A1 | 11/2004 | Carey et al. |
| 2004/0243453 | A1 | 12/2004 | Call et al. |
| 2004/0243458 | A1 | 12/2004 | Barkan |
| 2005/0015439 | A1 | 1/2005 | Balaji et al. |
| 2005/0021502 | A1 | 1/2005 | Chen et al. |
| 2005/0027871 | A1 | 2/2005 | Bradley et al. |
| 2005/0028158 | A1 | 2/2005 | Ferguson et al. |
| 2005/0033588 | A1 | 2/2005 | Ruiz et al. |
| 2005/0033603 | A1 | 2/2005 | Suzuki et al. |
| 2005/0050058 | A1 * | 3/2005 | Jain et al. ..................... 707/100 |
| 2005/0080821 | A1 * | 4/2005 | Breil et al. ................. 707/104.1 |
| 2005/0086178 | A1 | 4/2005 | Xie et al. |
| 2005/0086197 | A1 | 4/2005 | Boubez et al. |
| 2005/0086360 | A1 | 4/2005 | Mamou et al. |
| 2005/0091174 | A1 | 4/2005 | Akkiraju et al. |
| 2005/0103051 | A1 | 5/2005 | Jacquin |
| 2005/0108658 | A1 | 5/2005 | Lortie |
| 2005/0114152 | A1 | 5/2005 | Lopez et al. |
| 2005/0114829 | A1 | 5/2005 | Robin et al. |
| 2005/0144114 | A1 | 6/2005 | Ruggieri et al. |
| 2005/0144557 | A1 | 6/2005 | Li et al. |
| 2005/0149484 | A1 | 7/2005 | Fox et al. |
| 2005/0154627 | A1 | 7/2005 | Zuzek et al. |
| 2005/0160104 | A1 | 7/2005 | Meera et al. |
| 2005/0222931 | A1 | 10/2005 | Mamou et al. |
| 2005/0223109 | A1 | 10/2005 | Mamou et al. |
| 2005/0223392 | A1 | 10/2005 | Cox et al. |
| 2005/0228808 | A1 | 10/2005 | Mamou et al. |
| 2005/0232046 | A1 | 10/2005 | Mamou et al. |
| 2005/0234969 | A1 | 10/2005 | Mamou et al. |
| 2005/0235103 | A1 | 10/2005 | Saliba et al. |
| 2005/0235274 | A1 | 10/2005 | Mamou et al. |
| 2005/0240354 | A1 | 10/2005 | Mamou et al. |

| | | |
|---|---|---|
| 2005/0240592 A1 | 10/2005 | Mamou et al. |
| 2005/0243604 A1 | 11/2005 | Harken et al. |
| 2005/0251501 A1 | 11/2005 | Phillips et al. |
| 2005/0251533 A1 | 11/2005 | Harken et al. |
| 2005/0256892 A1 | 11/2005 | Harken |
| 2005/0257196 A1 | 11/2005 | Hollander et al. |
| 2005/0262188 A1 | 11/2005 | Mamou et al. |
| 2005/0262189 A1 | 11/2005 | Mamou et al. |
| 2005/0262190 A1 | 11/2005 | Mamou et al. |
| 2005/0262192 A1 | 11/2005 | Mamou et al. |
| 2005/0262193 A1 | 11/2005 | Mamou et al. |
| 2005/0262194 A1 | 11/2005 | Mamou et al. |
| 2005/0273462 A1 | 12/2005 | Reed et al. |
| 2005/0286306 A1 | 12/2005 | Srinivasan et al. |
| 2006/0010195 A1 | 1/2006 | Mamou et al. |
| 2006/0020641 A1 | 1/2006 | Walsh et al. |
| 2006/0069717 A1 | 3/2006 | Mamou et al. |
| 2006/0112367 A1 | 5/2006 | Harris |
| 2006/0259542 A1 | 11/2006 | Wu et al. |
| 2007/0094256 A1 | 4/2007 | Hite et al. |
| 2007/0156859 A1 | 7/2007 | Savchenko et al. |
| 2008/0005713 A1* | 1/2008 | Singh et al. ............ 716/11 |
| 2008/0046506 A1 | 2/2008 | Broda |
| 2008/0077656 A1 | 3/2008 | Broda |
| 2008/0307392 A1 | 12/2008 | Racca et al. |
| 2009/0172024 A1* | 7/2009 | Hsu et al. ............ 707/104.1 |

FOREIGN PATENT DOCUMENTS

| | | |
|---|---|---|
| JP | 2002259643 A | 9/2002 |
| JP | 2004102886 A | 4/2004 |
| WO | 2004054295 A1 | 6/2004 |

OTHER PUBLICATIONS

Blor Research: "Enterprise Integration Suite from Ascential Software", Online! 2002, pp. 1-28 www.ascentialsoftware.pdf/Bloor-Review_AscEnterpriseIntegrationSuite.pdf.

Ascential Software: "Ascential Real-Time Integration Services (RTI) Delivering on the Promise of the Right-Time Enterprise", Online!, Jun. 2000, pp. 1-12 www.infotechlive.com/whitepapers/RTI%20Services.pdf.

Rubinstein, "Integration Suite Drops "e" and "L"", SDTimes, Online!, Jul. 1, 2003, pp. 1-2 www.sdtimes.com/download/images/SDTImes.081.pdf Ascential Software: "DataStage: All built on the most scalable and robust architecture available", Online! Jun. 1, 2003, pp. 1-4.

Chappel et al., "Java Web Services", Chapter 6, Section 4, O'Reilley, Mar. 2002, pp. 1-4.

Zeigler et al., "Distributed Supply Chain Simulation in a DEVS/COBRA Executive Environment", ACM, 1999, pp. 1333-1340.

David Marco, "Managed Meta Data Environment (MME): A Complete Walkthrough", The Data Administration Newsletter, TDAN.com, Apr. 1, 2004, pp. 1-9, <http://www.tdan.com/view-articles/5185>.

Haas et al., "Data Integration Through Database Federation", IBM Systems Journal, IBM Corporation, Armonk, New York, vol. 41, No. 4, Jan. 1, 2002, pp. 578-596.

Gallagher et al., "A General Purpose Registry//Repository Information Model", Oct. 16, 2000, pp. 1-32, <http://lists.oasis-open.org/archives/regrep/200010/pdf00000.pdfpages>.

"Working Draft 1.1 Dec. 30, 2000", OASIS Registry/Repository Technical Specification, Dec. 12, 2000, <http://xml.Coverpages.org/OasisRegrepSpec11-20001215.pdf>.

Tan et al., "Domain-Specific Metamodels for Heterogeneous Information Systems", Proceedings of the 36th Hawaii International Conference on System Sciences (HICSS'03), retrieved Dec. 23, 2005, pp. 1-10, <http://csd12.computer.org/comp/proceedings/hicss/2003/187490321apdf>.

EP Search report for application PCT/US2005030953 dated Apr. 11, 2011.

USPTO Final Office Action for U.S. Appl. No. 10/925,897 dated Aug. 4, 2011.

* cited by examiner

DATABASES

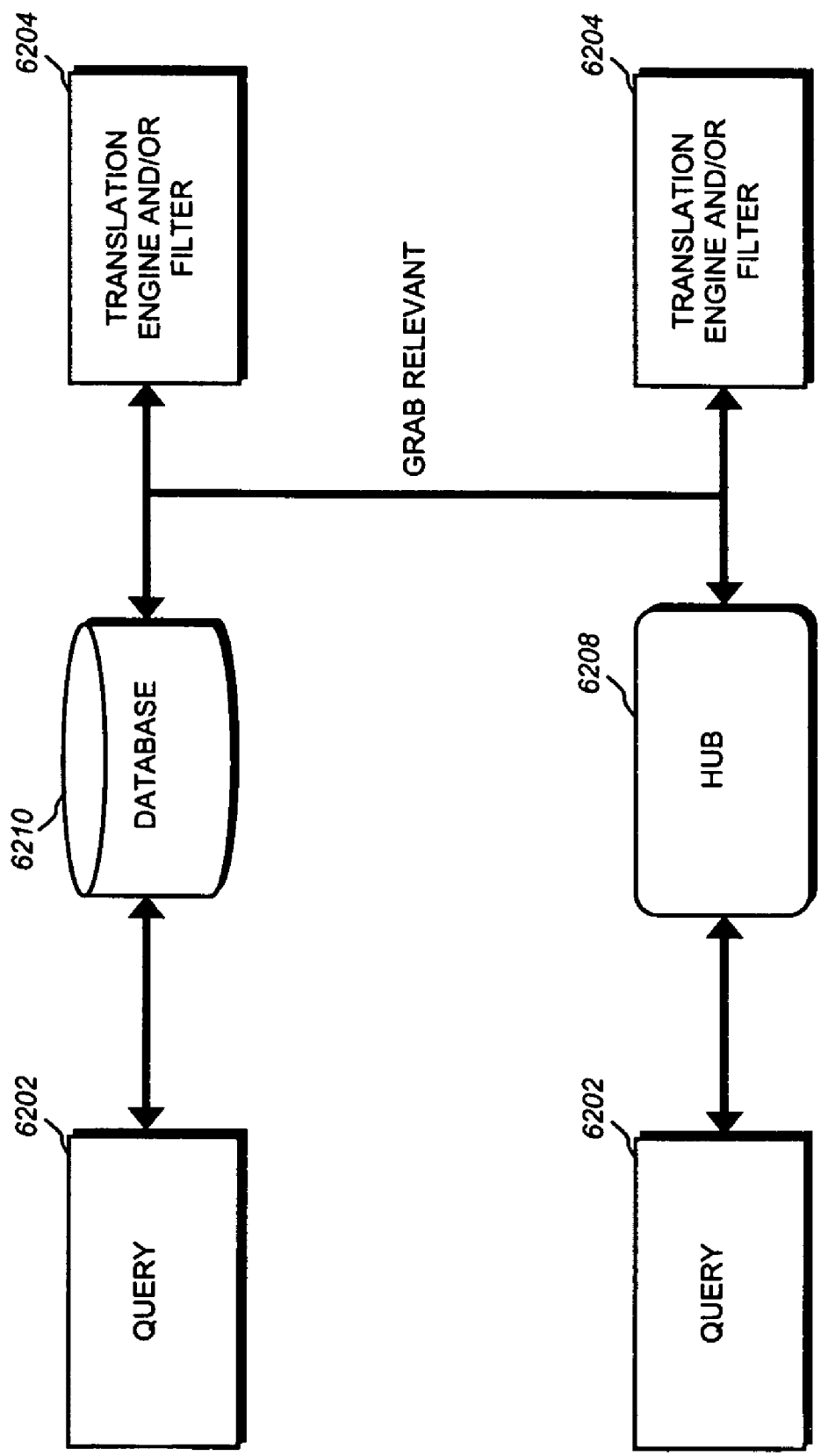

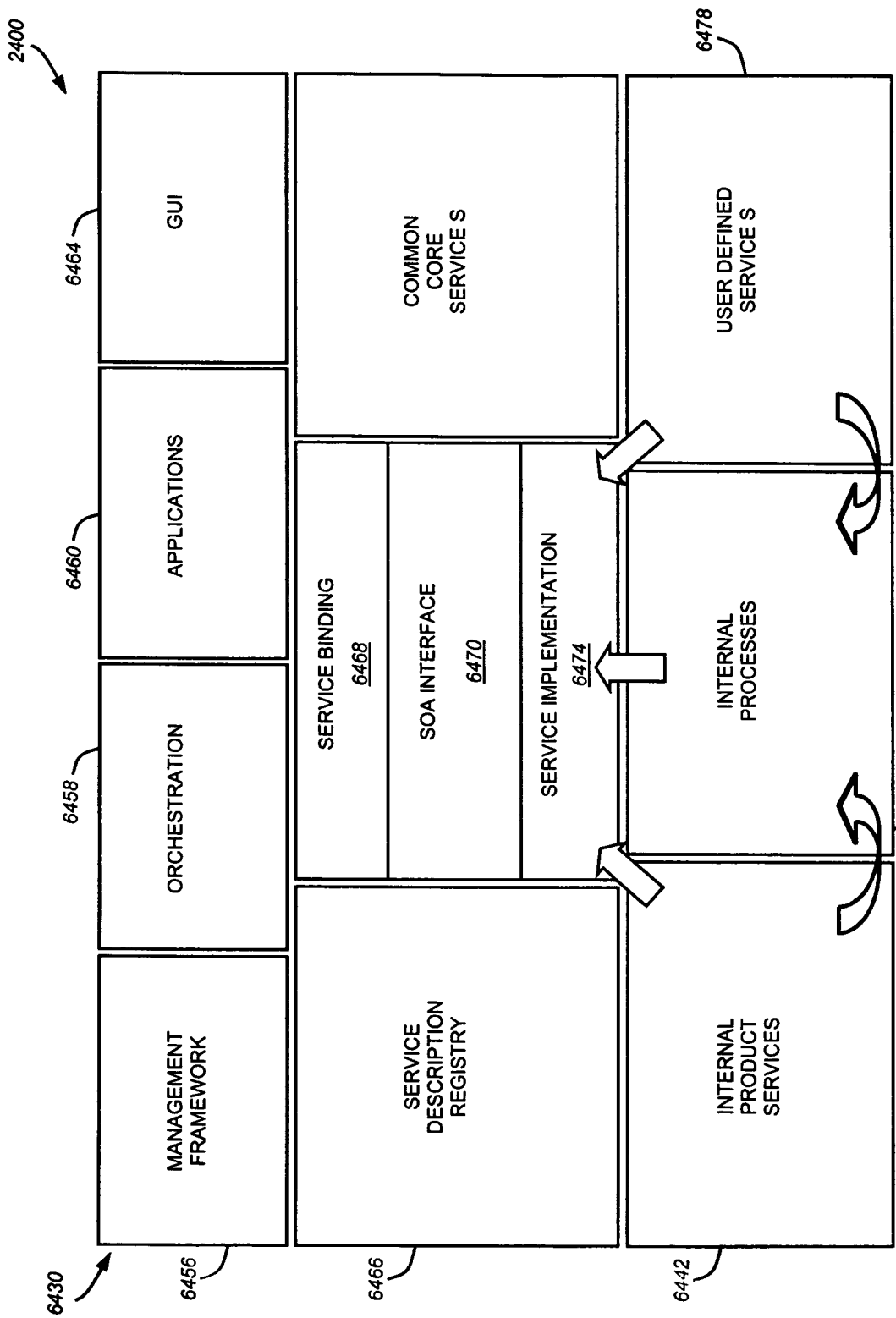

SERVICE ORIENTED ARCHITECTURE FOR A LOADING FUNCTION IN A DATA INTEGRATION PLATFORM

RELATED APPLICATIONS

This application is a continuation-in-part of U.S. patent application Ser. No. 10/925,897, filed Aug. 24, 2004 and entitled "Methods and Systems for Real Time Data Integration Services", which claims the benefit of U.S. Prov. App. No. 60/498,531, filed Aug. 27, 2003 and entitled "Methods and Systems for Real Time Data Integration Services."

This application also claims the benefit of the following U.S. provisional patent applications:

Prov. App. No. 60/606,407, filed Aug. 31, 2004 and entitled "Methods and Systems for Semantic Identification in Data Systems."

Prov. App. No. 60/606,372, filed Aug. 31, 2004 and entitled "User Interfaces for Data Integration Systems."

Prov. App. No. 60/606,371, filed Aug. 31, 2004 and entitled "Architecture, Interfaces, Methods and Systems for Data Integration Services."

Prov. App. No. 60/606,370, filed Aug. 31, 2004 and entitled "Services Oriented Architecture for Data Integration Services."

Prov. App. No. 60/606,301, filed Aug. 31, 2004 and entitled "Metadata Management."

Prov. App. No. 60/606,238, filed Aug. 31, 2004 and entitled "RFID Systems and Data Integration."

Prov. App. No. 60/606,237, filed Aug. 31, 2004 and entitled "Architecture for Enterprise Data Integration Systems."

Prov. App. No. 60/553,729, filed Mar. 16, 2004 and entitled "Methods and Systems for Migrating Data Integration Jobs Between Extract, Transform and Load Facilities."

Each of the foregoing applications is incorporated by reference in its entirety. This application also incorporates by reference the entire disclosure of each of the following commonly owned U.S. patents:

U.S. Pat. No. 6,415,286, filed Mar. 29, 1999 and entitled "Computer System and Computerized Method for Partitioning Data.

U.S. Pat. No. 6,347,310, filed May 11, 1998 and entitled "Computer System and Process for Training of Analytical Models."

U.S. Pat. No. 6,330,008, filed Feb. 24, 1997 and entitled "Apparatuses and Methods for Monitoring Performance of Parallel Computing."

U.S. Pat. No. 6,311,265, filed Mar. 25, 1996 and entitled "Apparatuses and Methods for Programming Parallel Computers."

U.S. Pat. No. 6,289,474, filed Jun. 24, 1998 and entitled "Computer System and Process for Checkpointing Operations."

U.S. Pat. No. 6,272,449, filed Jun. 22, 1998 and entitled "Computing System and Process for Explaining Behavior of a Model."

U.S. Pat. No. 5,995,980, filed Jul. 23, 1996 and entitled "System and Method for Database Update Replication."

U.S. Pat. No. 5,909,681, filed Mar. 25, 1996 and entitled "Computer System and Computerized Method for Partitioning Data for Parallel Processing."

U.S. Pat. No. 5,727,158, filed Sep. 22, 1995 and entitled "Information Repository for Storing Information for Enterprise Computing System."

This application also incorporates by reference the entire disclosure of the following commonly owned non-provisional U.S. patent applications:

U.S. patent application Ser. No. 09/798,268, filed Mar. 2, 2001 and entitled "Categorization Based on Record Linkage Theory."

U.S. patent application Ser. No. 09/703,161, filed Oct. 31, 2000 and entitled "Automated Software Code Generation from a Metadata-Based Repository."

U.S. patent application Ser. No. 09/596,482, filed Jun. 19, 2000 and entitled "Segmentation and Processing of Continuous Data Streams Using Transactional Semantics."

This application is also related to the following commonly owned U.S. patent applications filed on even date herewith, all of which are incorporated herein by reference in their entirety: Ser. No. 11/104,402, entitled REAL TIME DATA INTEGRATION SERVICES FOR HEALTH CARE INFORMATION DATA INTEGRATION; Ser. No. 11/104,403, entitled REAL TIME DATA INTEGRATION SERVICES FOR FINANCIAL INFORMATION DATA INTEGRATION; Ser. No. 11/066,327, entitled LOCATION-BASED REAL TIME DATA INTEGRATION SERVICES; Ser. No. 11/066,326, entitled REAL TIME DATA INTEGRATION FOR INVENTORY MANAGEMENT; Ser. No. 11/064,786, entitled REAL TIME DATA INTEGRATION FOR SUPPLY CHAIN MANAGEMENT; Ser. No. 11/065,186, entitled CLIENT SIDE INTERFACE FOR REAL TIME DATA INTEGRATION JOBS; Ser. No. 11/065,081, entitled SERVER-SIDE APPLICATION PROGRAMMING INTERFACE FOR A REAL TIME DATA INTEGRATION SERVICE; Ser. No. 11/064,773, entitled MULTIPLE SERVICE BINDINGS FOR A REAL TIME DATA INTEGRATION SERVICE; Ser. No. 11/066,321, entitled SERVICE ORIENTED ARCHITECTURE FOR HANDLING METADATA IN A DATA INTEGRATION PLATFORM; Ser. No. 11/065,436, entitled SERVICE ORIENTED ARCHITECTURE FOR A TRANSFORMATION FUNCTION IN A DATA INTEGRATION PLATFORM; Ser. No. 11/064,772, entitled SERVICE ORIENTED ARCHITECTURE FOR AN EXTRACTION FUNCTION IN A DATA INTEGRATION PLATFORM; Ser. No. 11/065,693, entitled SERVICE ORIENTED ARCHITECTURE FOR A MESSAGE BROKER IN A DATA INTEGRATION PLATFORM; Ser. No. 11/064,788, entitled USER INTERFACE SERVICE FOR A SERVICES ORIENTED ARCHITECTURE IN A DATA INTEGRATION PLATFORM; Ser. No. 11/065,693, entitled SECURITY SERVICE FOR A SERVICES ORIENTED ARCHITECTURE IN A DATA INTEGRATION PLATFORM; Ser. No. 11/065,437, entitled LOGGING SERVICE FOR A SERVICES ORIENTED ARCHITECTURE IN A DATA INTEGRATION PLATFORM; and Ser. No. 11/104,402, entitled DATA INTEGRATION THROUGH A SERVICES ORIENTED ARCHITECTURE.

BACKGROUND

1. Field

This invention relates to the field of information technology, and more particularly to the field of data integration systems.

2. Description of the Related Art

The advent of computer applications made many business processes much faster and more efficient; however, the proliferation of different computer applications that use different data structures, communication protocols, languages and platforms has led to great complexity in the information technology infrastructure of the typical business enterprise. Different business processes within the typical enterprise may use completely different computer applications, each computer application being developed and optimized for the particular business process, rather than for the enterprise as a whole. For example, a business may have a particular computer application for tracking accounts payable and a completely different one for keeping track of customer contacts. In fact, even the same business process may use more than one computer application, such as when an enterprise keeps a centralized customer contact database, but employees keep their own contact information, such as in a personal information manager.

While specialized computer applications offer the advantages of custom-tailored solutions, the proliferation leads to inefficiencies, such as repetitive entry and handling of the same data many times throughout the enterprise, or the failure of the enterprise to capitalize on data that is associated with one process when the enterprise executes another process that could benefit from that data. For example, if the accounts payable process is separated from the supply chain and ordering process, the enterprise may accept and fill orders from a customer whose credit history would have caused the enterprise to decline the order. Many other examples can be provided where an enterprise would benefit from consistent access to all of its data across varied computer applications.

A number of companies have recognized and addressed the need for sharing of data across different applications in the business enterprise. Thus, enterprise application integration, or EAI, has emerged as a message-based strategy for addressing data from disparate sources. As computer applications increase in complexity and number, EAI efforts encounter many challenges, ranging from the need to handle different protocols, the need to address ever-increasing volumes of data and numbers of transactions, and an ever-increasing appetite for faster integration of data. Various approaches to EAI have been taken, including least-common-denominator approaches, atomic approaches, and bridge-type approaches. However, EAI is based upon communication between individual applications. As a significant disadvantage, the complexity of these EAI solutions grows geometrically in response to linear additions of platforms and applications.

While existing data integration systems provide useful tools for addressing the needs of an enterprise, such systems are typically deployed as custom solutions. They have a lengthy development cycle, and may require sophisticated technical training to accommodate changes in business structure and information requirements. There remains a need for data integration methods and systems that permit use, reuse, and modification of functionality in a changing business environment. To facilitate such methods and systems, a need also exists for improved methods and systems for deploying data integration functions.

SUMMARY

A loading function of an extract-transform-load data integration process is deployed as a service in a services oriented architecture.

In one aspect, a method disclosed herein includes providing a module, the module being a data loading module for loading data into a target database that is associated with a data integration platform; providing a registry of services; providing an interface for the data loading module; and identifying the data loading module in the registry; wherein the data loading module can be accessed as a service in a services oriented architecture.

The method may further include providing an identified data extraction module in the registry. The method may further include providing an identified data transformation module in the registry. The method may further include providing an identified target mapping module in the registry. The method may further include providing an identified metadata management module in the registry. The method may further include providing an identified data profiling module in the registry. The method may further include providing an identified mapping module in the registry. The method may further include providing an identified data quality module in the registry. The method may further include providing an identified data cleansing module in the registry. The method may further include providing an identified atomic data repository module in the registry.

In another aspect, a system disclosed herein includes a module, the module being a data loading module for loading data into a target database that is associated with a data integration platform; a registry of services; and an interface for the data loading module; wherein the data loading module is identified in the registry; and wherein the data loading module can be accessed as a service in a services oriented architecture.

The system may include an identified data extraction module in the registry. The system may include an identified data transformation module in the registry. The system may include an identified target mapping module in the registry. The system may include an identified metadata management module in the registry. The system may include an identified data profiling module in the registry. The system may include an identified mapping module in the registry. The system may include an identified data quality module in the registry. The system may include an identified data cleansing module in the registry. The system may include an identified atomic data repository module in the registry.

In the method or system above, the data integration function may include one or more of a data auditing function, a matching function, a probabilistic matching function, a metabroker function, a data migration function, a semantic identification function, a filtering function, a refinement and selection function, a design interface function, an analysis function, a targeting function, a primary key provision function, a foreign key provision function, a table normalization function, a source to target mapping function, an automatic generation of data integration job functionality, a defect detection function, a performance measurement function, a data deduplication function, a statistical analysis function, a data reconciliation function, a library function, a version management function, a parallel execution function, a partitioning function, a partitioning and repartitioning function, an interface function, a synchronization function, a metadata directory function, a graphical impact depiction function, a hub repository function, a packaged application connectivity kit functionality, an industry-specific data model storage function, a template function, a business rule function, a validation table function, a business metric function, a target database definition function, a mainframe data profiling function, a batch processing function, a cross-table analysis function, a relationship analysis function, a data definition language code generation function, a data integration job design function, a data integration job deployment function, and a data integration job development function.

The matching function may be a probabilistic matching function. The metabroker function may maintain the semantics of a data integration function across multiple data integration platforms. The filtering function may be based on a differentiating characteristic. The differentiating characteristic may be a level of abstraction. The refinement and selection function may allow a method to distinguish items based on differentiating characteristics. The deduplication function may match data items based on a probability.

The module may discard duplicate items. The module may allow a user to share a version with another user. The module may allow a user to check in and check out a version of a data integration job in order to use the data integration job. The module may facilitate an interface to a plurality of databases of a plurality of database vendors. The module may facilitate synchronization of data across a plurality of hierarchical data formats. The module may facilitate synchronization of data across a plurality of transactional formats. The module may facilitate synchronization of data across a plurality of operating environments. The module may facilitate synchronization of Electronic Data Interchange format data. The module may facilitate synchronization of HIPAA data. The module may facilitate synchronization of SWIFT format data.

The hub may store semantic models for a plurality of data integration platforms. The industry-specific data model may include one or more of a manufacturing industry model, a retail industry model, a telecommunications industry model, a healthcare industry model, and a financial services industry model.

"Ascential" as used herein shall refer to Ascential Software Corporation of Westborough, Mass.

As used herein, "data source" or "data target" are intended to have the broadest possible meaning consistent with these terms, and shall include a database, a plurality of databases, a repository information manager, a queue, a message service, a repository, a data facility, a data storage facility, a data provider, a website, a server, a computer, a computer storage facility, a CD, a DVD, a mobile storage facility, a central storage facility, a hard disk, a multiple coordinating data storage facilities, RAM, ROM, flash memory, a memory card, a temporary memory facility, a permanent memory facility, magnetic tape, a locally connected computing facility, a remotely connected computing facility, a wireless facility, a wired facility, a mobile facility, a central facility, a web browser, a client, a laptop, a personal digital assistant ("PDA"), a telephone, a cellular phone, a mobile phone, an information platform, an analysis facility, a processing facility, a business enterprise system or other facility where data is handled or other facility provided to store data or other information, as well as any files or file types for maintaining structured or unstructured data used in any of the above systems, or any streaming, messaged, event driven, or otherwise sourced data, and any combinations of the foregoing, unless a specific meaning is otherwise indicated or the context of the phrase requires otherwise. A storage mechanism is any logical or physical device, resource, or facility capable of acting as a data source or data target.

"Enterprise Java Bean (EJB)" shall include the server-side component architecture for the J2EE platform. EJBs support rapid and simplified development of distributed, transactional, secure and portable Java applications. EJBs support a container architecture that allows concurrent consumption of messages and provide support for distributed transactions, so that database updates, message processing, and connections to enterprise systems using the J2EE architecture can participate in the same transaction context.

"JMS" shall mean the Java Message Service, which is an enterprise message service for the Java-based J2EE enterprise architecture. "JCA" shall mean the J2EE Connector Architecture of the J2EE platform described more particularly below. It should be appreciated that, while EJB, JMS, and JCA are commonly used software tools in contemporary distributed transaction environments, any platform, system, or architecture providing similar functionality may be employed with the data integration systems described herein.

"Real time" as used herein, shall include periods of time that approximate the duration of a business transaction or business and shall include processes or services that occur during a business operation or business process, as opposed to occurring off-line, such as in a nightly batch processing operation. Depending on the duration of the business process, real time might include seconds, fractions of seconds, minutes, hours, or even days.

"Business process," "business logic" and "business transaction" as used herein, shall include any methods, service, operations, processes or transactions that can be performed by a business, including, without limitation, sales, marketing, fulfillment, inventory management, pricing, product design, professional services, financial services, administration, finance, underwriting, analysis, contracting, information technology services, data storage, data mining, delivery of information, routing of goods, scheduling, communications, investments, transactions, offerings, promotions, advertisements, offers, engineering, manufacturing, supply chain management, human resources management, data processing, data integration, work flow administration, software production, hardware production, development of new products, research, development, strategy functions, quality control and assurance, packaging, logistics, customer relationship management, handling rebates and returns, customer support, product maintenance, telemarketing, corporate communications, investor relations, and many others.

"Service oriented architecture (SOA)", as used herein, shall include services that form part of the infrastructure of a business enterprise. In the SOA, services can become building blocks for application development and deployment, allowing rapid application development and avoiding redundant code. Each service may embody a set of business logic or business rules that can be bound to the surrounding environment, such as the source of the data inputs for the service or the targets for the data outputs of the service. Various instances of SOA are provided in the following description.

"Metadata," as used herein, shall include data that brings context to the data being processed, data about the data, information pertaining to the context of related information, information pertaining to the origin of data, information pertaining to the location of data, information pertaining to the meaning of data, information pertaining to the age of data, information pertaining to the heading of data, information pertaining to the units of data, information pertaining to the field of data and/or information pertaining to any other information relating to the context of the data.

"WSDL" or "Web Services Description Language" as used herein, includes an XML format for describing network services (often web services) as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

"Metabroker" as used herein, shall include systems or methods that may involve a translation engine or other means for performing translation operations or other operations on data or metadata. The translation operations or other operations may involve the translation of data or metadata from one or more formats, languages and/or data models to one or more formats, languages and/or data models.

BRIEF DESCRIPTION OF THE FIGURES

FIG. 63A shows a translation process in which items are filtered at the database or hub.

FIG. 64C shows modules for enabling services in a services oriented architecture.

FIG. 115 shows the development and deployment of a target database definition module as a service in a services oriented architecture.

FIG. 116 shows the development and deployment of a mainframe data profiling module as a service in a services oriented architecture.

FIG. 117 shows the development and deployment of a batch processing module as a service in a services oriented architecture.

FIG. 118 shows the development and deployment of a cross-table analysis module as a service in a services oriented architecture.

FIG. 119 shows the development and deployment of a relationship analysis module as a service in a services oriented architecture.

FIG. 120 shows the development and deployment of a data definition language code generation module as a service in a services oriented architecture.

FIG. 121 shows the development and deployment of a design interface module as a service in a services oriented architecture.

FIG. 122 shows the development and deployment of a data integration job development module as a service in a services oriented architecture.

FIG. 123 shows the development and deployment of a data integration job deployment module as a service in a services oriented architecture.

FIG. 124 shows the development and deployment of a logging service module as a service in a services oriented architecture.

FIG. 125 shows the development and deployment of a monitoring service module as a service in a services oriented architecture.

FIG. 126 shows the development and deployment of a security module as a service in a services oriented architecture.

Figure 127:
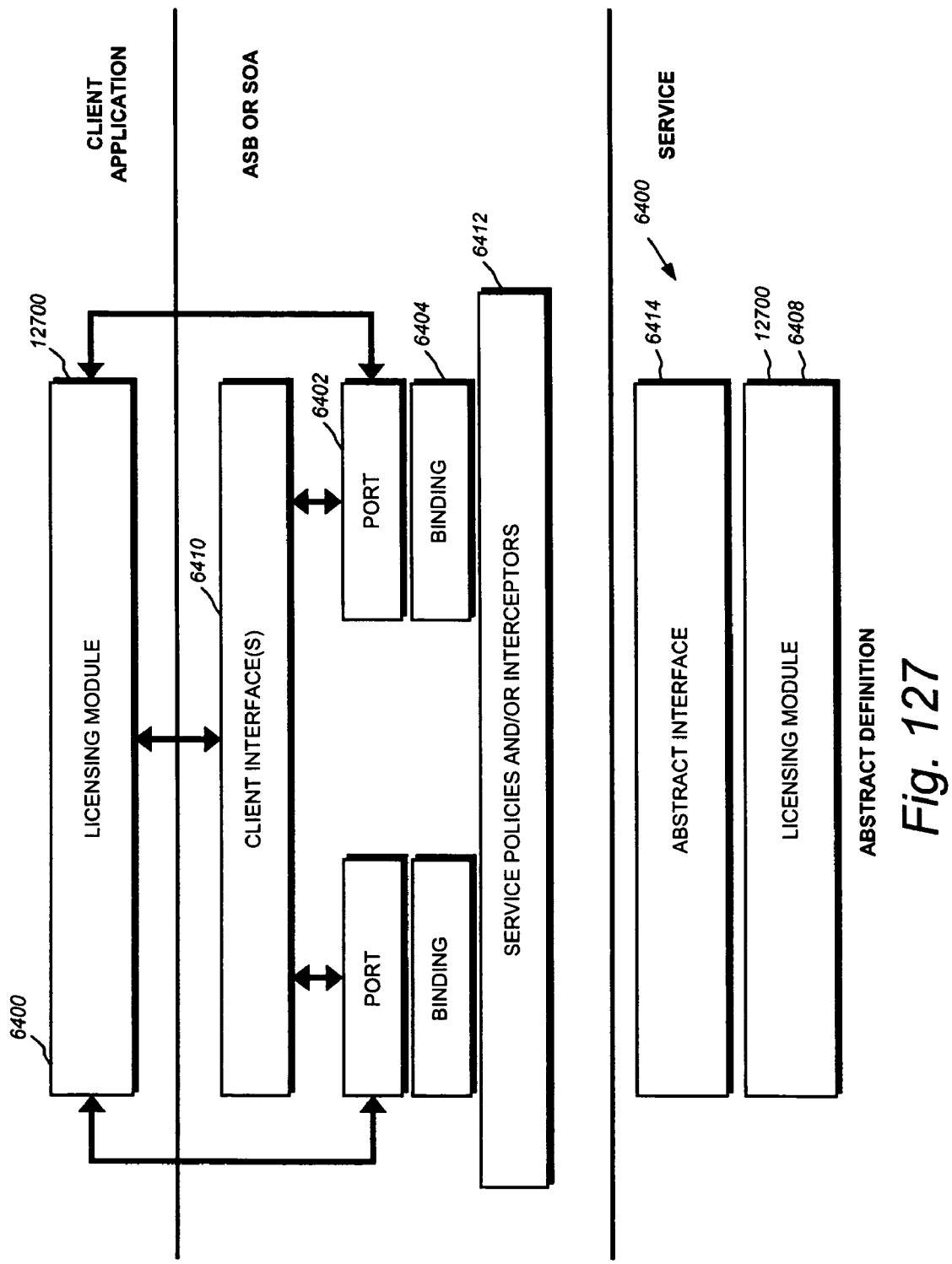

FIG. 127 shows the development and deployment of a licensing module as a service in a services oriented architecture.

Figure 128:
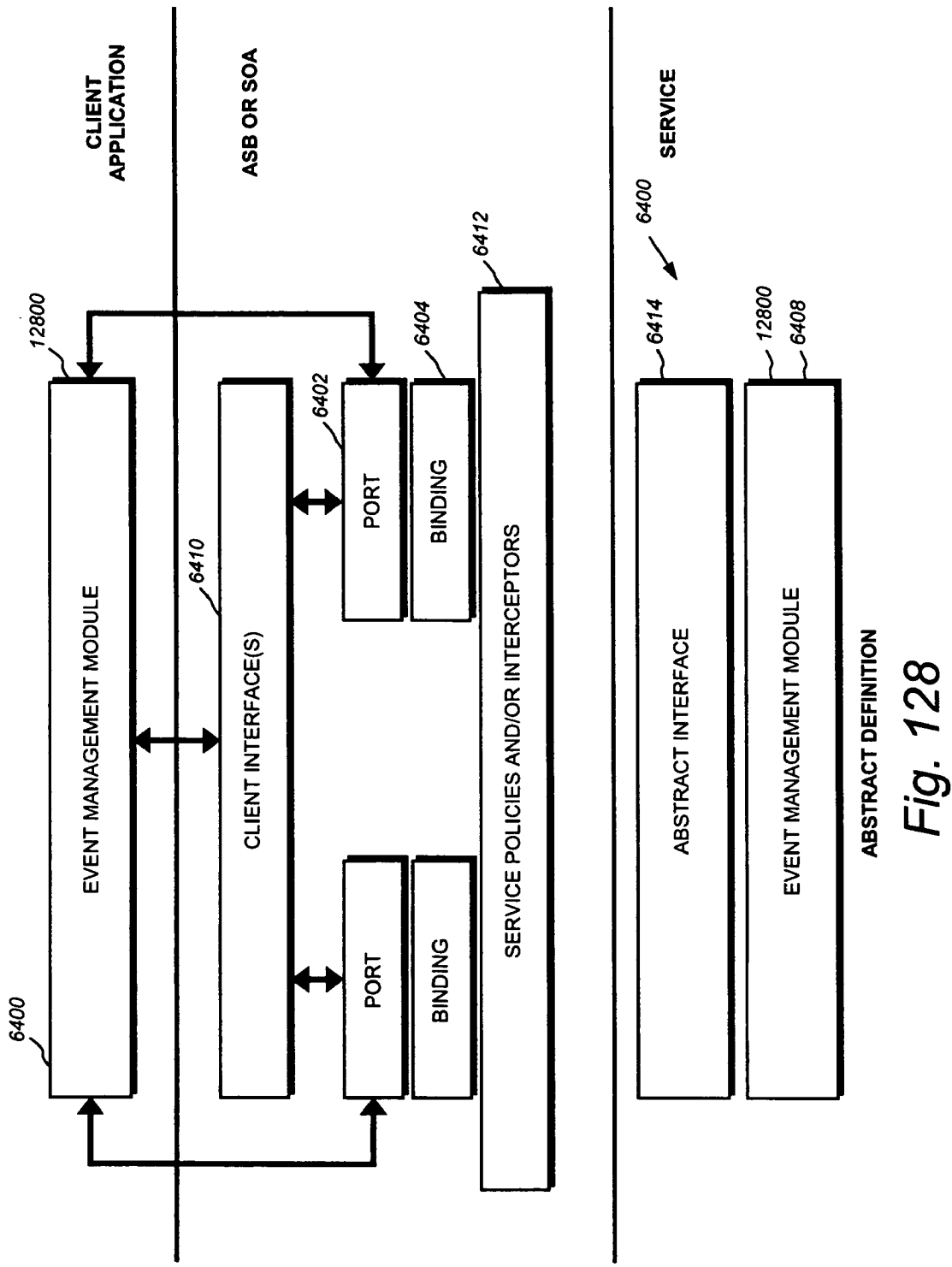

FIG. 128 shows the development and deployment of an event management module as a service in a services oriented architecture.

Figure 129:
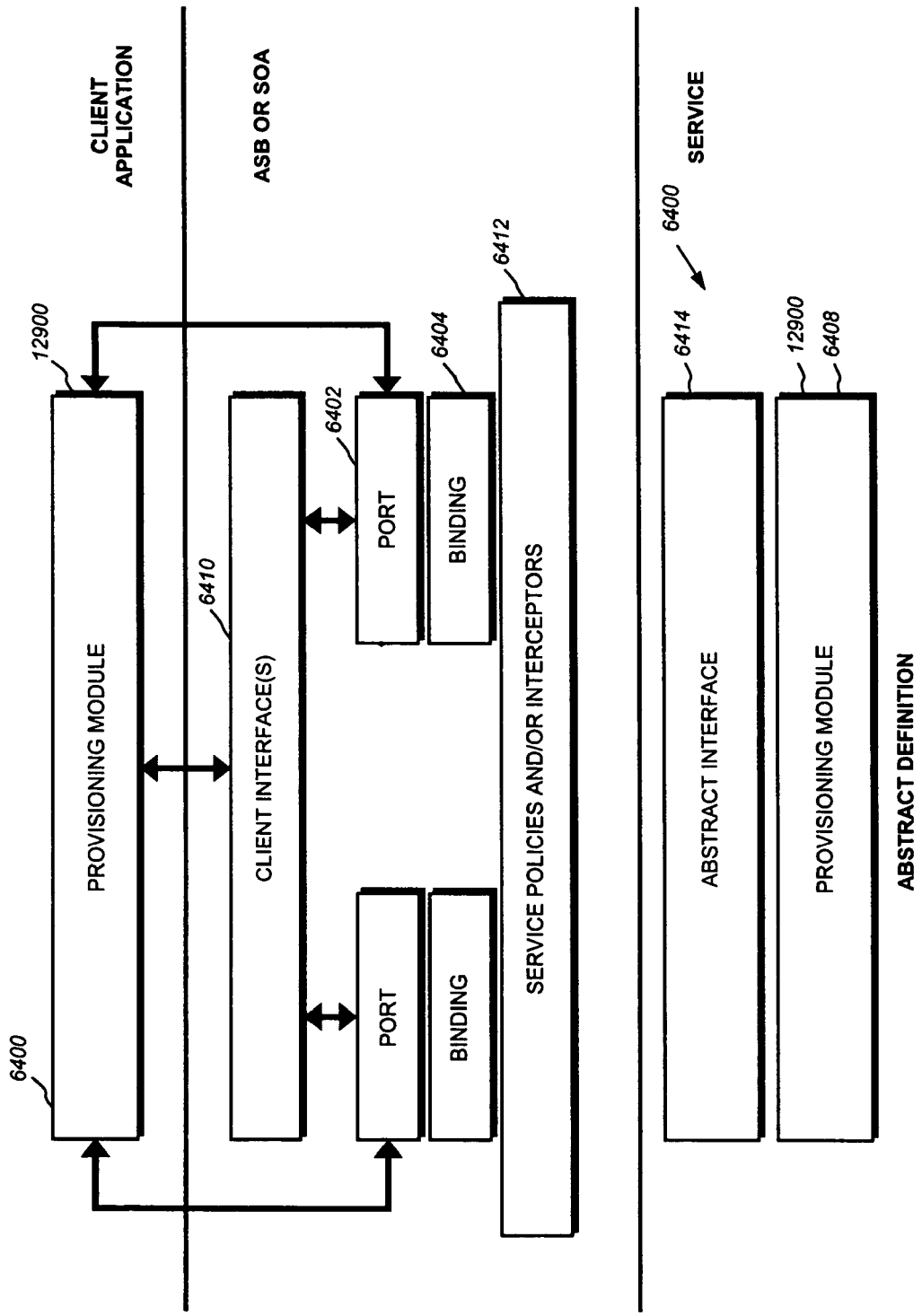

FIG. 129 shows the development and deployment of a provisioning module as a service in a services oriented architecture.

Figure 130:
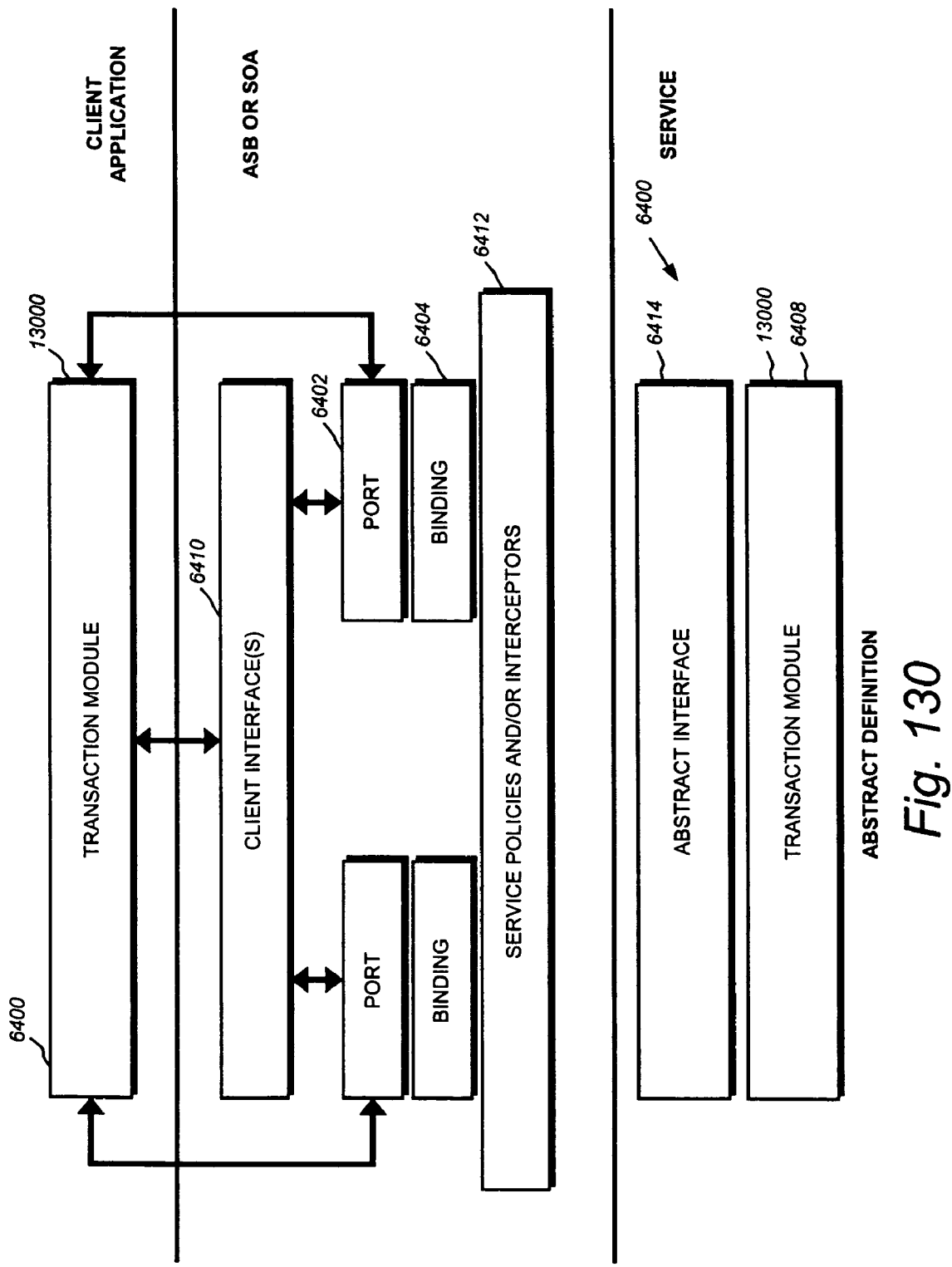

FIG. 130 shows the development and deployment of a transaction module as a service in a services oriented architecture.

Figure 131:
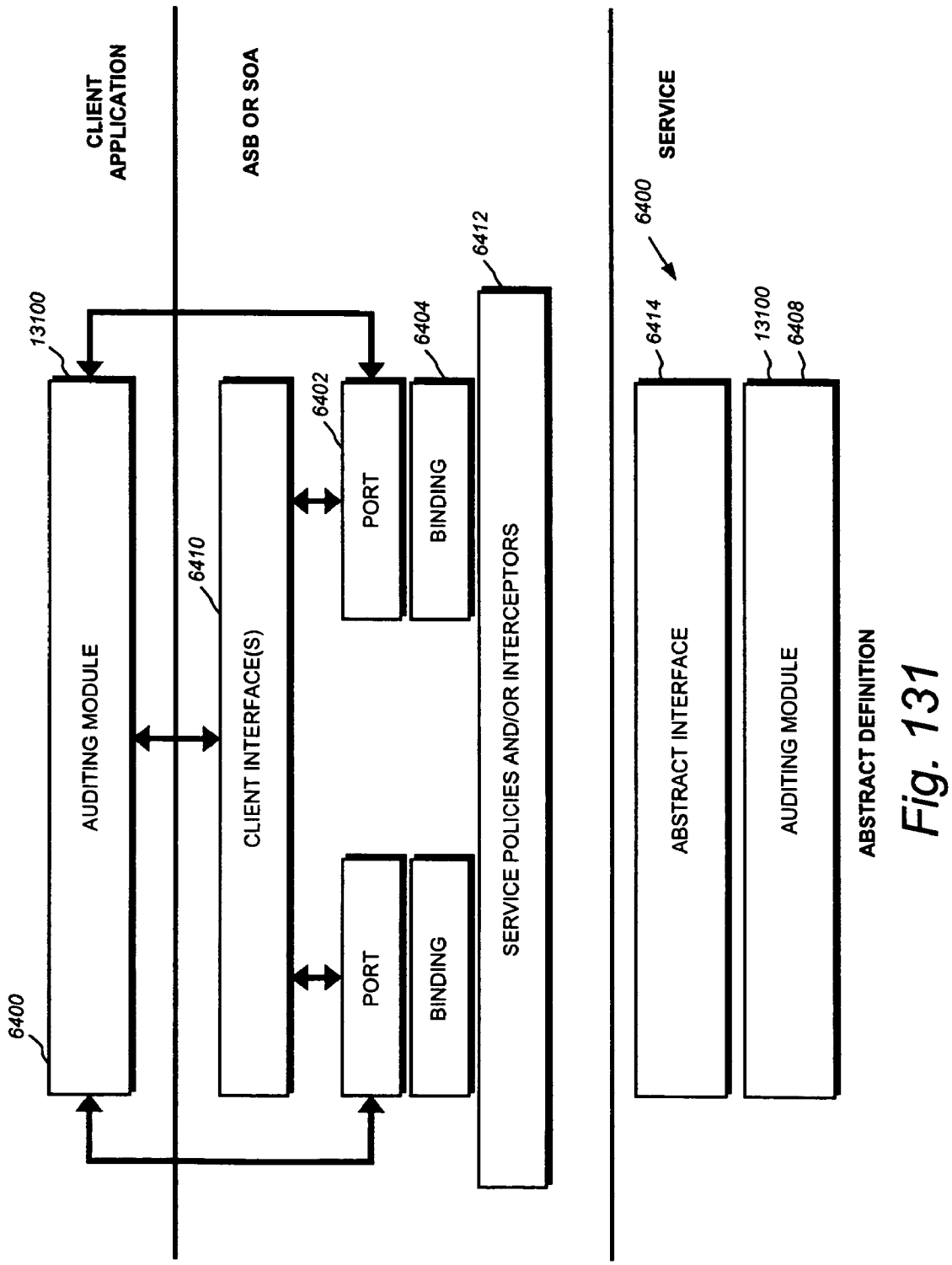

FIG. 131 shows the development and deployment of an auditing module as a service in a services oriented architecture.

Figure 132:
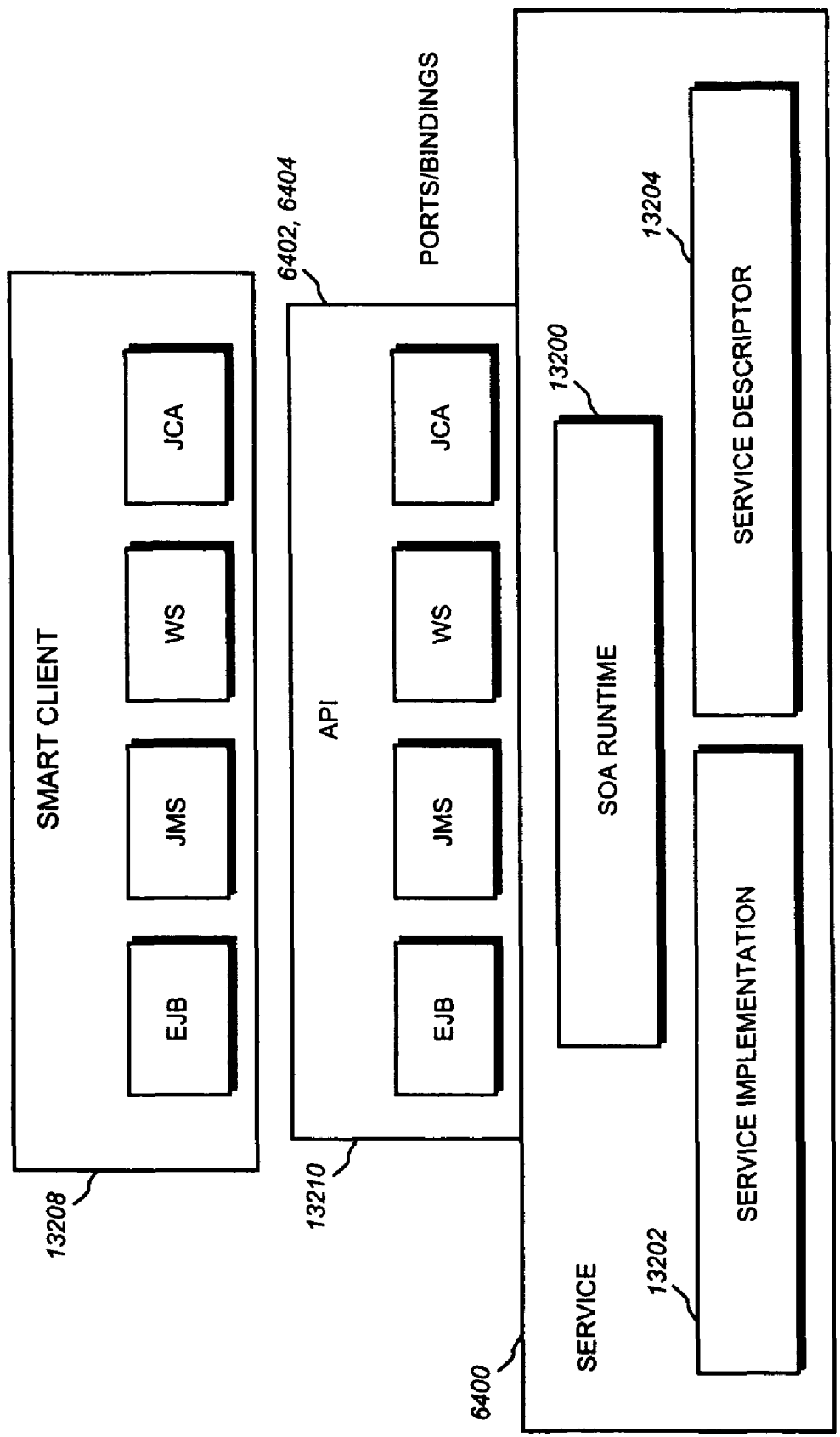

FIG. 132 shows a service, API and smart client.

DETAILED DESCRIPTION

Throughout the following discussion, like element numerals are intended to refer to like elements, unless specifically indicated otherwise.

Figure 1:
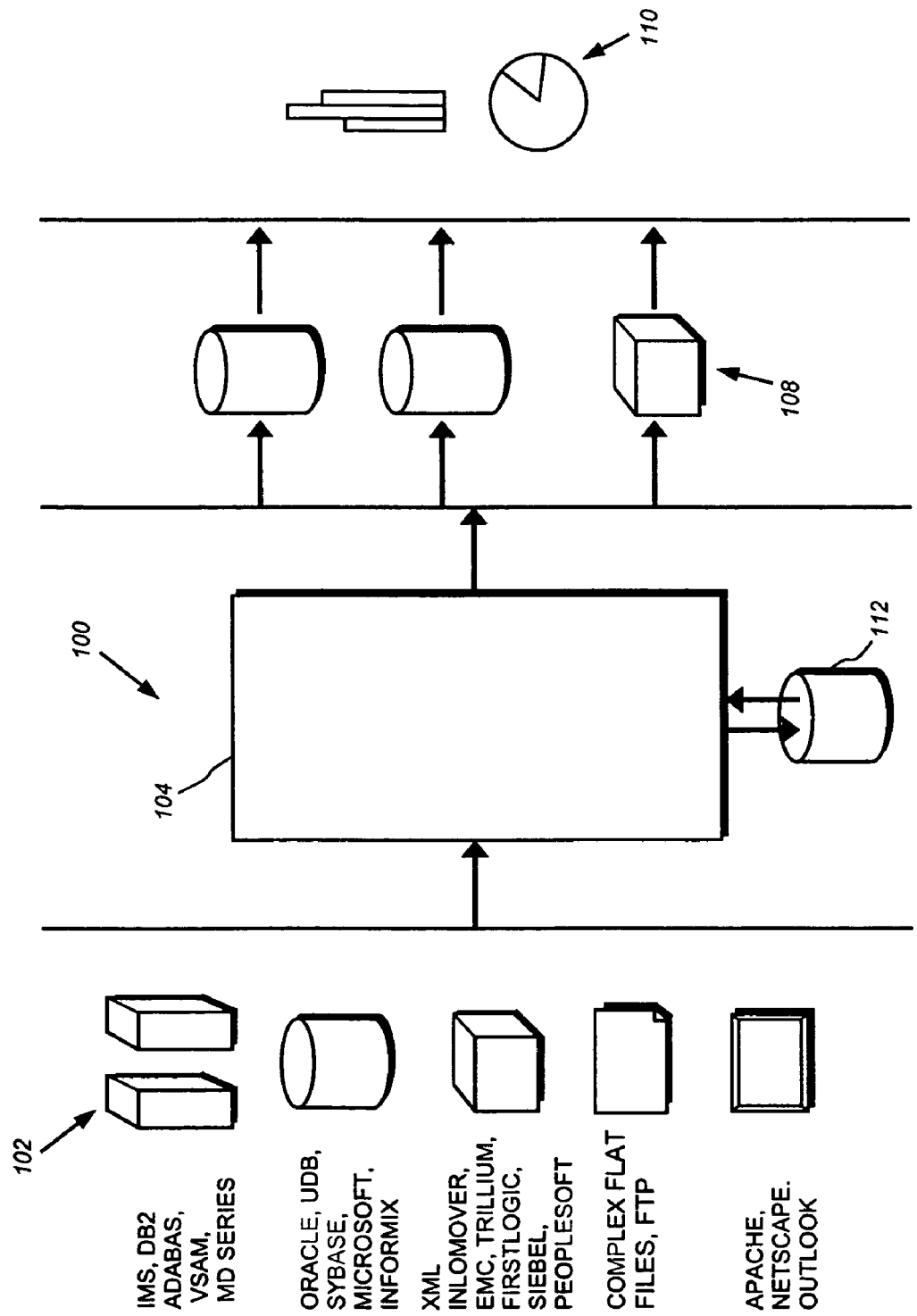
FIG. 1 is a schematic diagram of a business enterprise with a plurality of business processes, each of which may include a plurality of different computer applications and data sources.

FIG. 1 represents a platform 100 for facilitating integration of various data of a business enterprise. The platform includes a plurality of business processes, each of which may include a plurality of different computer applications and data sources. The platform may include several data sources 102, which may be data sources such as those described above. These data sources may include a wide variety of data types from a wide variety of physical locations. For example, the data source may include systems from providers such as such as Sybase, Microsoft, Informix, Oracle, Inlomover, EMC, Trillium, First Logic, Siebel, PeopleSoft, IBM, Apache, or Netscape. The data sources 102 may include systems using database products or standards such as IMS, DB2, ADABAS, VSAM, MD Series, UDB, XML, complex flat files, or FTP files. The data sources 102 may include files created or used by applications such as Microsoft Outlook, Microsoft Word, Microsoft Excel, Microsoft Access, as well as files in standard formats such as ASCII, CSV, GIF, TIF, PNG, PDF, and so forth. The data sources 102 may come from various locations or they may be centrally located. The data supplied from the data sources 102 may come in various forms and have different formats that may or may not be compatible with one another.

Data targets are discussed later in this description. In general, these data targets may be any of the data sources 102 noted above. This difference in nomenclature typically denotes whether a data system provides data or receives data in a data integration process. However, it should be appreciated that this distinction is not intended to convey any difference in capability between data sources and data targets (unless specifically stated otherwise), since in a conventional data integration system, data sources may receive data and data targets may provide data.

The platform illustrated in FIG. 1 may include a data integration system 104. The data integration system 104 may, for example, facilitate the collection of data from the data sources 102 as the result of a query or retrieval command the data integration system 104 receives. The data integration system 104 may send commands to one or more of the data sources 102 such that the data source(s) provides data to the data integration system 104. Since the data received may be in multiple formats including varying metadata, the data integration system may reconfigure the received data such that it can be later combined for integrated processing. The functions that may be performed by the data integration system 104 are described in more detail below.

The platform 100 may also include several retrieval systems 108. The retrieval systems 108 may include databases or processing platforms used to further manipulate the data communicated from the data integration system 104. For example, the data integration system 104 may cleanse, combine, transform or otherwise manipulate the data it receives from the data sources 102 such that a retrieval system 108 can use the processed data to produce reports 110 useful to the business. The reports 110 may be used to report data associations, answer complex queries, answer simple queries, or form other reports useful to the business or user, and may include raw data, tables, charts, graphs, and any other representations of data from the retrieval systems 108.

The platform 100 may also include a database or data base management system 112. The database 112 may be used to store information temporally, temporarily, or for permanent or long-term storage. For example, the data integration system 104 may collect data from one or more data sources 102 and transform the data into forms that are compatible with one another or compatible to be combined with one another. Once the data is transformed, the data integration system 104 may store the data in the database 112 in a decomposed form, combined form or other form for later retrieval.

Figure 2:
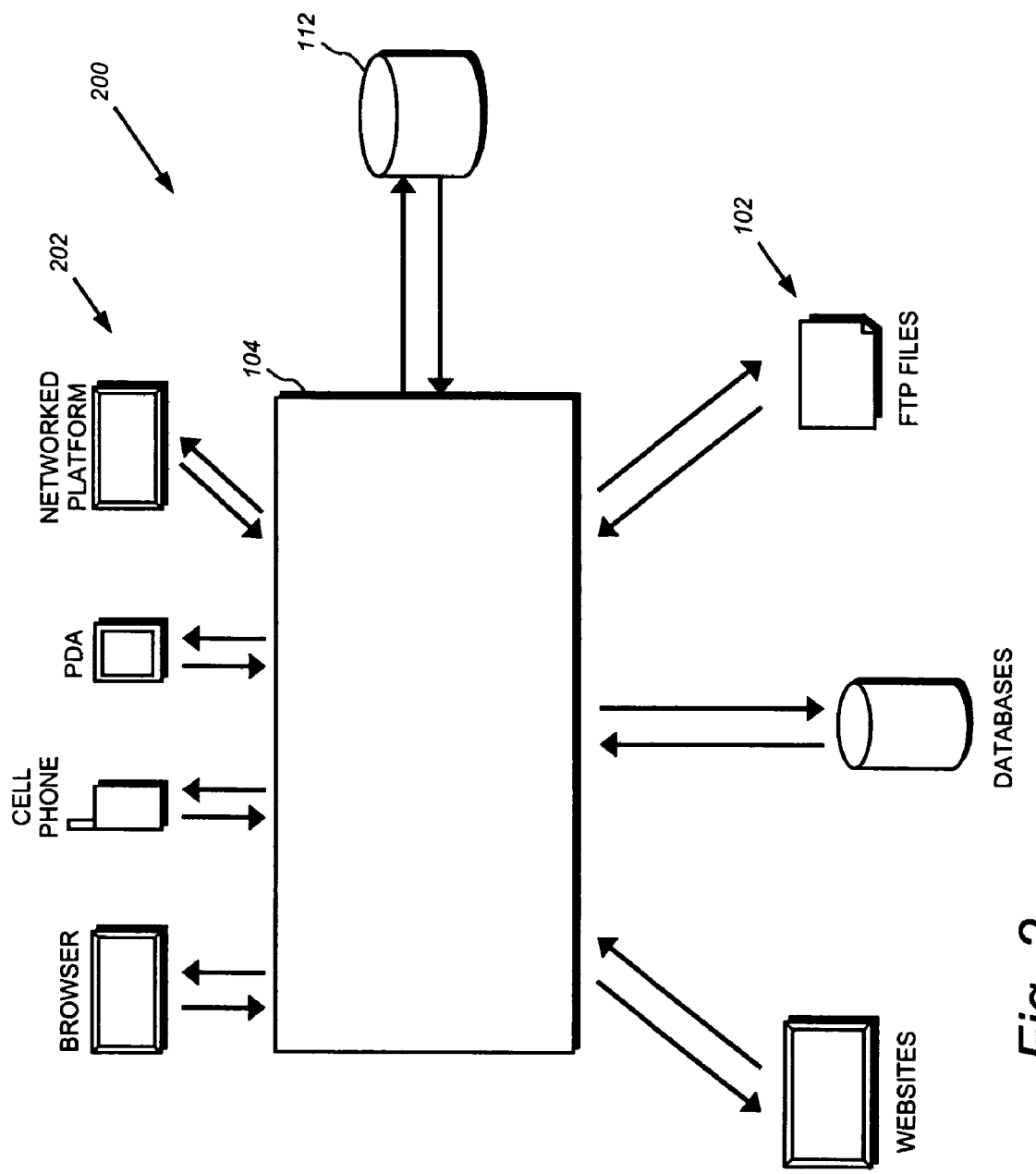
FIG. 2 is a schematic diagram showing data integration across a plurality of business processes of a business enterprise.

FIG. 2 is a schematic diagram showing data integration across a plurality of entities and business processes of a business enterprise. In the illustrated embodiment, the data integration system 104 facilitates the information flowing between user interface systems 202 and data sources 102. The data integration system 104 may receive queries from the interface systems 202, where the queries necessitate the extraction and possibly transformation of data residing in one or more of the data sources 102. The interface systems 202 may include any device or program for communicating with the data integration system 104, such as a web browser operating on a laptop or desktop computer, a cell phone, a personal digital assistant ("PDA"), a networked platform and devices attached thereto, or any other device or system that might interface with the data integration system 104.

For example, a user may be operating a PDA and make a request for information to the data integration system 104 over a WiFi or Wireless Access Protocol/Wireless Markup Language ("WAP/WML") interface. The data integration system 104 may receive the request and generate any required queries to access information from a website or other data source 102 such as an FTP file site. The data from the data sources 102 may be extracted and transformed into a format compatible with the requesting interface system 202 (a PDA in this example) and then communicated to the interface system 202 for user viewing and manipulation. In another embodiment, the data may have previously been extracted from the data sources and stored in a separate database 112, which may be a data warehouse or other data facility used by the data integration system 104. The data may have been stored in the database 112 in a transformed condition or in its original state. For example, the data may be stored in a transformed condition such that the data from a number of data sources 102 can be combined in another transformation process. For example, a query from the PDA may be transmitted to the data integration system 104 and the data integration system 104 may extract the information from the database 112. Following the extraction, the data integration system 104 may transform the data into a combined format compatible with the PDA before transmission to the PDA.

Figure 3:
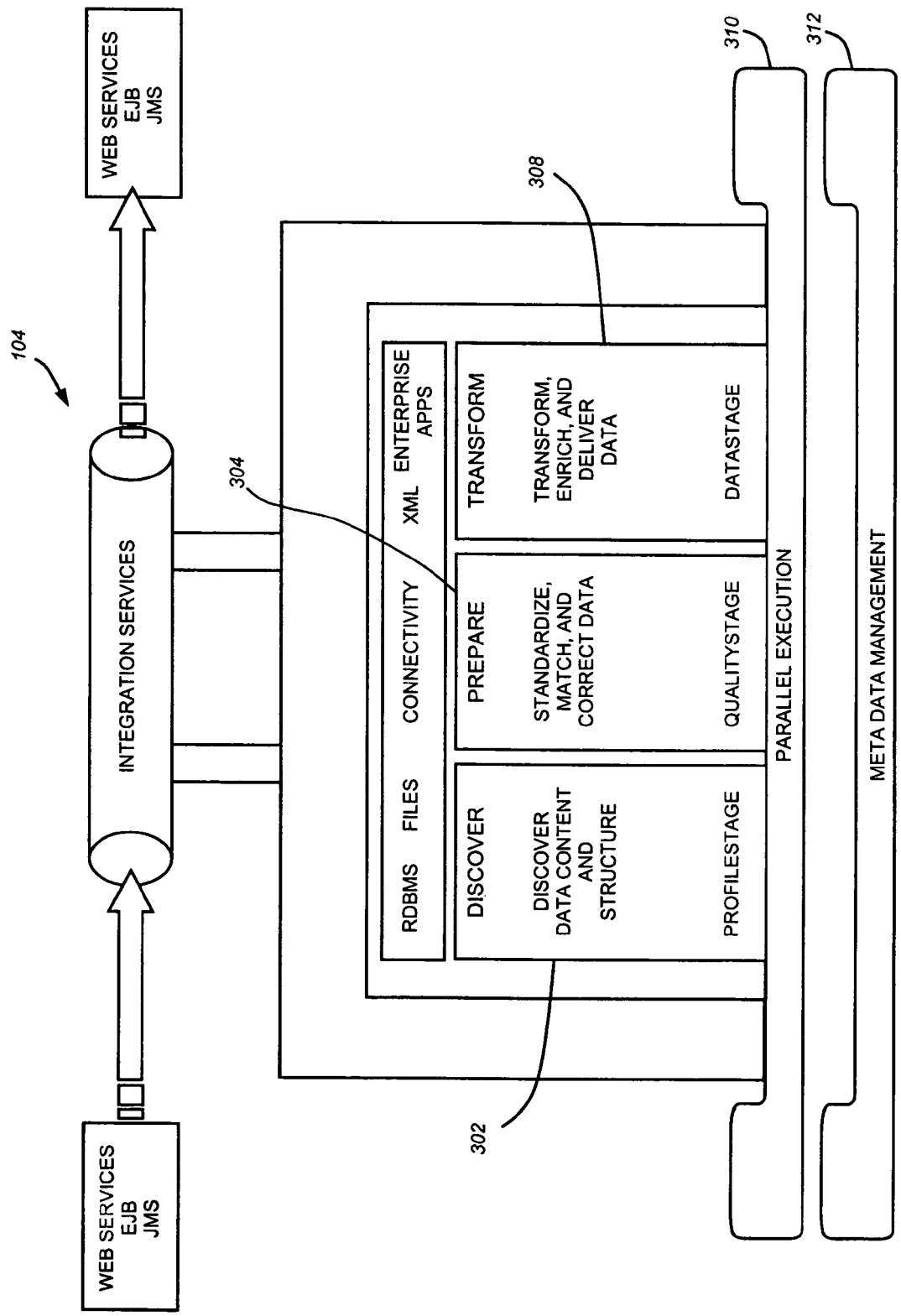
FIG. 3 is a schematic diagram showing an architecture for providing data integration for a plurality of data sources for a business enterprise.

FIG. 3 is a schematic diagram showing an architecture for providing data integration for a plurality of data sources 102 for a business enterprise. An embodiment of a data integration system 104 may include a discover data stage 302 to perform, possibly among other processes, extraction of data from a data source and analysis of column values and table structures for source data. A discover data stage 302 may also generate recommendations about table structure, relationships, and keys for a data target. More sophisticated profiling and auditing functions may include date range validation, accuracy of computations, accuracy of if-then evaluations, and so forth. The discover data stage 302 may normalize data, such as by eliminating redundant dependencies and other anomalies in the source data. The discover data stage 302 may provide additional functions, such as drill down to exceptions within a data source 102 for further analysis, or enabling direct profiling of mainframe data. A non-limiting example of a commercial embodiment of a discover data stage 302 may be found in Ascential's ProfileStage product.

The data integration system 104 may also include a data preparation stage 304 where the data is prepared, standardized, matched, or otherwise manipulated to produce quality data to be later transformed. The data preparation stage 304 may perform generic data quality functions, such as reconciling inconsistencies or checking for correct matches (including one-to-one matches, one-to-many matches, and deduplication) within data. The data preparation stage 304 may also provide specific data enhancement functions. For example, the data preparation stage 304 may ensure that addresses conform to multinational postal references for improved international communication. The data preparation stage 304 may conform location data to multinational geocoding standards for spatial information management. The data preparation stage may modify or add to addresses to ensure that address information qualifies for U.S. Postal Service mail rate discounts under Government Certified U.S. Address Correction. Similar analysis and data revision may be provided for Canadian and Australian postal systems, which provide discount rates for properly addressed mail. A non-limiting example of a commercial embodiment of a data preparation stage 304 may be found in Ascential's QualityStage product.

The data integration system may also include a data transformation stage 308 to transform, enrich and deliver transformed data. The data transformation stage 308 may perform transitional services such as reorganization and reformatting of data, and perform calculations based on business rules and algorithms of the system user. The data transformation stage 308 may also organize target data into subsets known as datamarts or cubes for more highly tuned processing of data in certain analytical contexts. The data transformation stage 308 may employ bridges, translators, or other interfaces (as discussed generally below) to span various software and hardware architectures of various data sources and data targets used by the data integration system 104. The data transformation stage 308 may include a graphical user interface, a command line interface, or some combination of these, to design data integration jobs across the platform 100. A non-limiting example of a commercial embodiment of a data transformation stage 308 may be found in Ascential's DataStage product.

The stages 302, 304, 308 of the data integration system 104 may be executed using a parallel execution system 310 or in a serial or combination manner to optimize the performance of the system 104.

The data integration system 104 may also include a metadata management system 312 for managing metadata associated with data sources 102. In general, the metadata management system 312 may provide for interchange, integration, management, and analysis of metadata across all of the tools in a data integration environment. For example, a metadata management system 312 may provide common, universally accessible views of data in disparate sources, such as Ascential's ODBC MetaBroker, CA ERwin, Ascential ProfileStage, Ascential DataStage, Ascential QualityStage, IBM DB2 Cube Views, and Cognos Impromptu. The metadata management system 312 may also provide analysis tools for data lineage and impact analysis for changes to data structures. The metadata management system 312 may further be used to prepare a business data glossary of data definitions, algorithms, and business contexts for data within the data integration system 104, which glossary may be published for use throughout an enterprise. A non-limiting example of a commercial embodiment of a metadata management system 312 may be found in Ascential's MetaStage product.

Figure 4:
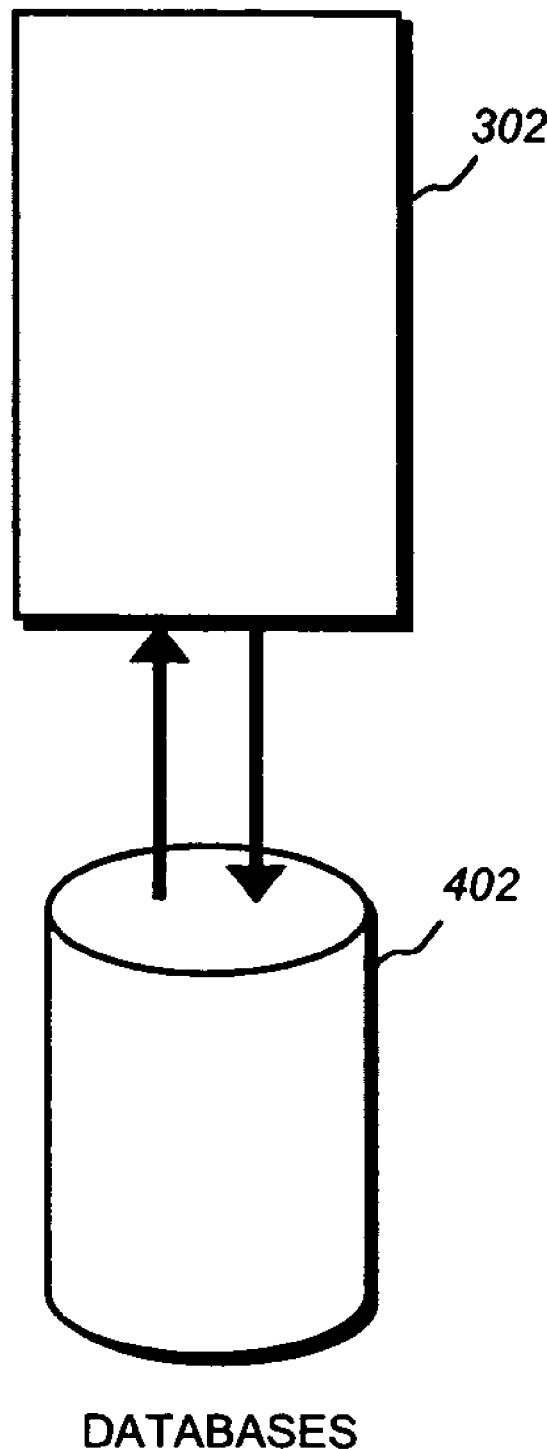
FIG. 4 is schematic diagram showing details of a discovery facility for a data integration job.

FIG. 4 is schematic diagram showing details of a facility implementing the discovery data stage 302 for a data integration job. In this embodiment, the discovery data stage 302 queries a database 402, which may be any of the data sources 102 described above, to determine the content and structure of data in the database 402. The database 402 provides the results to the discovery data stage 302 and the discovery data stage 302 facilitates the subsequent communication of extracted data to the other portions of the data integration system 104. In an embodiment, the discovery data stage 302 may query many data sources 102 so that the data integration system 104 can cleanse and consolidate the data into a central database or repository information manager.

Figure 5:
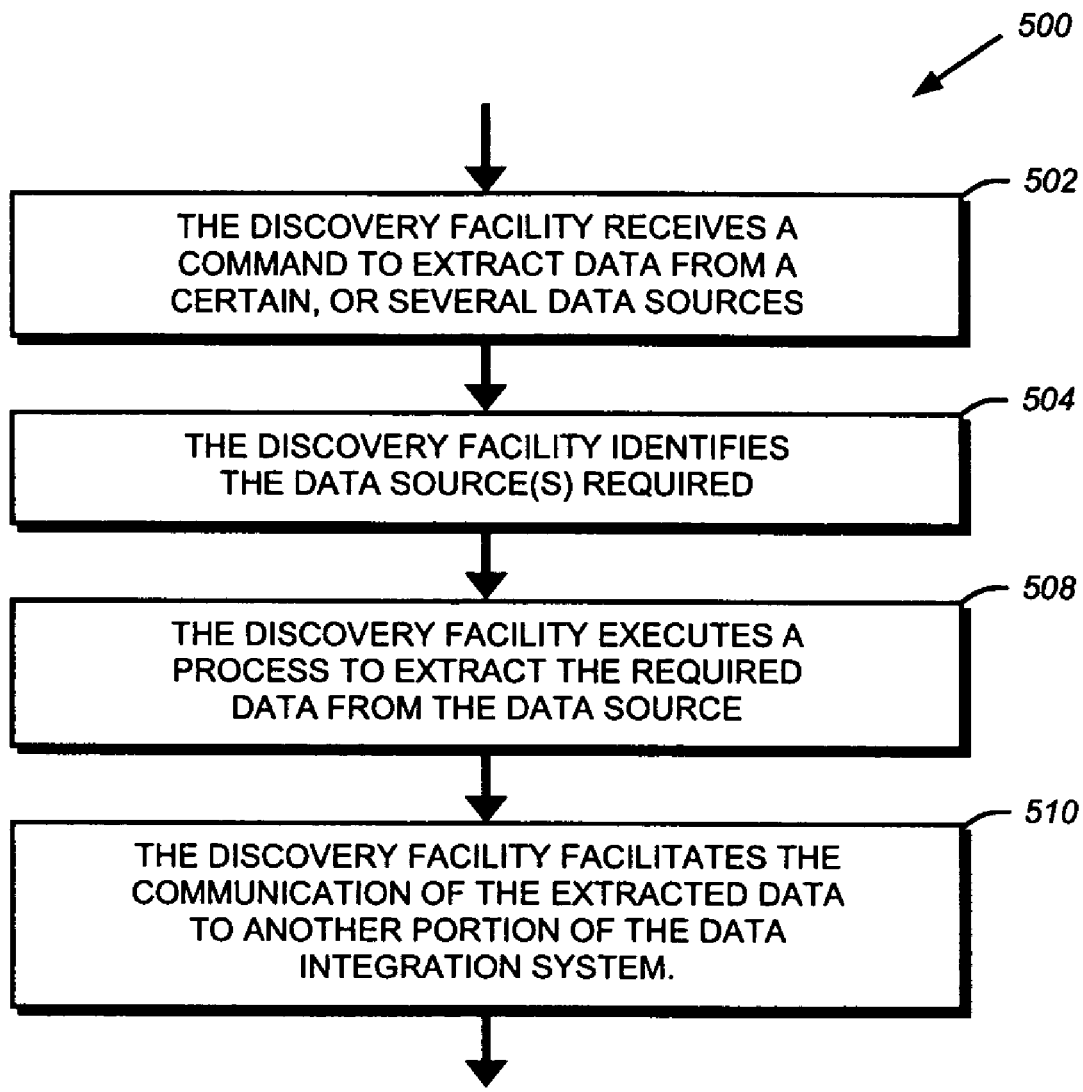
FIG. 5 is a flow diagram showing steps for accomplishing a discover step for a data integration process.

FIG. 5 is a flow diagram showing steps for accomplishing a discover step for a data integration process 500. It will be appreciated that, while a specific data integration process 500 is described below, a data integration process 500 as used herein may refer to any process using the data sources 102 and data targets, databases 112, data integration systems 104, and other components described herein. In an embodiment the process steps for an example discover step may include a first step 502 where the discovery facility, such as the discover data stage 302 described above, receives a command to extract data from one or more data sources 102. Following the receipt of an extraction command, the discovery facility may identify the appropriate data sources(s) 102 where the data to be extracted resides, as shown in step 504. The data source(s) 102 may or may not be identified in the command. If the data source(s) 102 is identified, the discover facility may query the identified data source(s) 102. In the event a data source(s) 102 is not identified in the command, the discovery facility may determine the data source 102 from the type of data requested from the data extraction command or from another piece of information in the command or after determining the association to other data that is required. For example, the query may be for a customer address and a first portion of the customer address data may reside in a first data source 102 while a second portion resides in a second data source 102. The discovery facility may process the extraction command and direct its extraction activities to the two data sources 102 without further instructions in the command. Once the data source(s) 102 is identified, the data facility may execute a process to extract the data, as shown in step 508. Once the data has been extracted, the discovery facility may facilitate the communication of the data to another portion of the data integration system in step 510.

Figure 6:
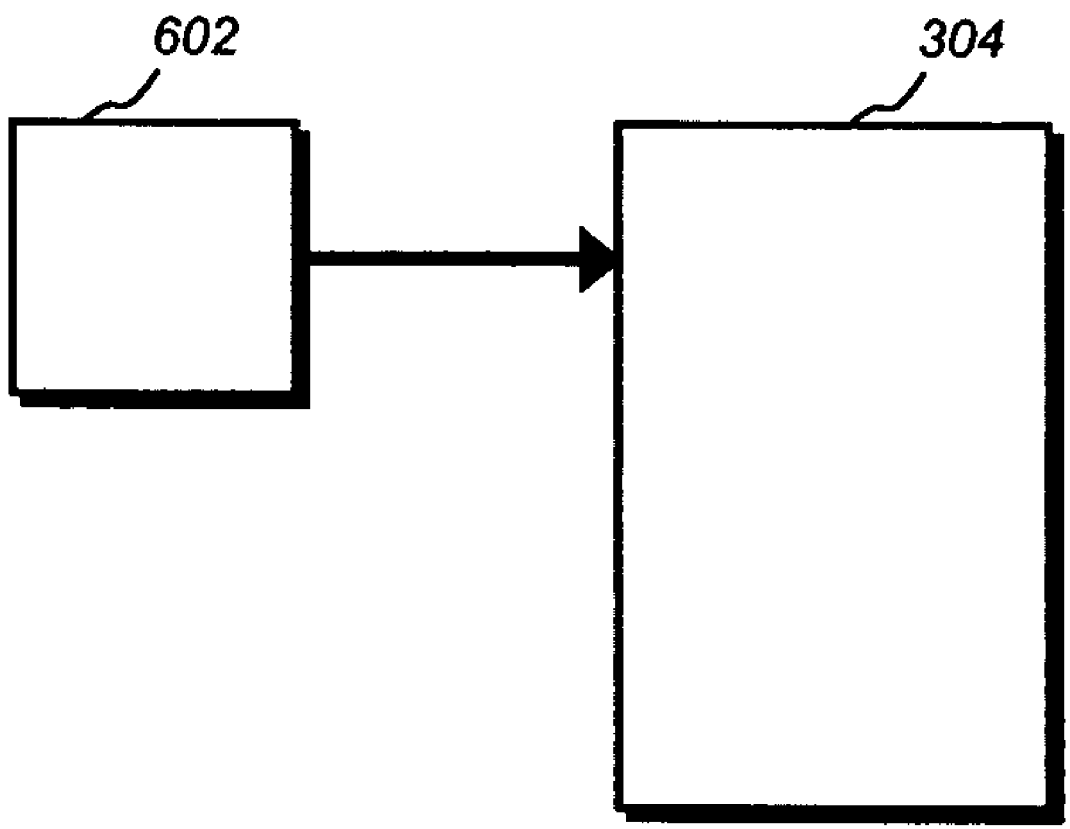
FIG. 6 is a schematic diagram showing a cleansing facility for a data integration process.

FIG. 6 is a schematic diagram showing a cleansing facility, which may be the data preparation stage 304 described above, for a data integration process 500. Generally, data coming from several data sources 102 may have inaccuracies and these inaccuracies, if left uncheck and uncorrected, could cause errors in the interpretation of the data ultimately produced by the data integration system 104. Company mergers, acquisitions, reorganizations, or other consolidation of data sources 102 can further compound the data quality issue by bringing new data labels, acronyms, metrics, methods for the calculations and so forth. As depicted in FIG. 6, a cleansing facility may receive data 602 from a data source 102. The data 602 may have come from one or more data sources 102 and may have inconsistencies or inaccuracies. The cleansing facility may provide automated, semi-automated, or manual facilities for screening, correcting, cleaning or otherwise enhancing quality of the data 602. Once the data 602 passes through the cleansing facility it may be communicated to another portion of the data integration system 104.

Figure 7:
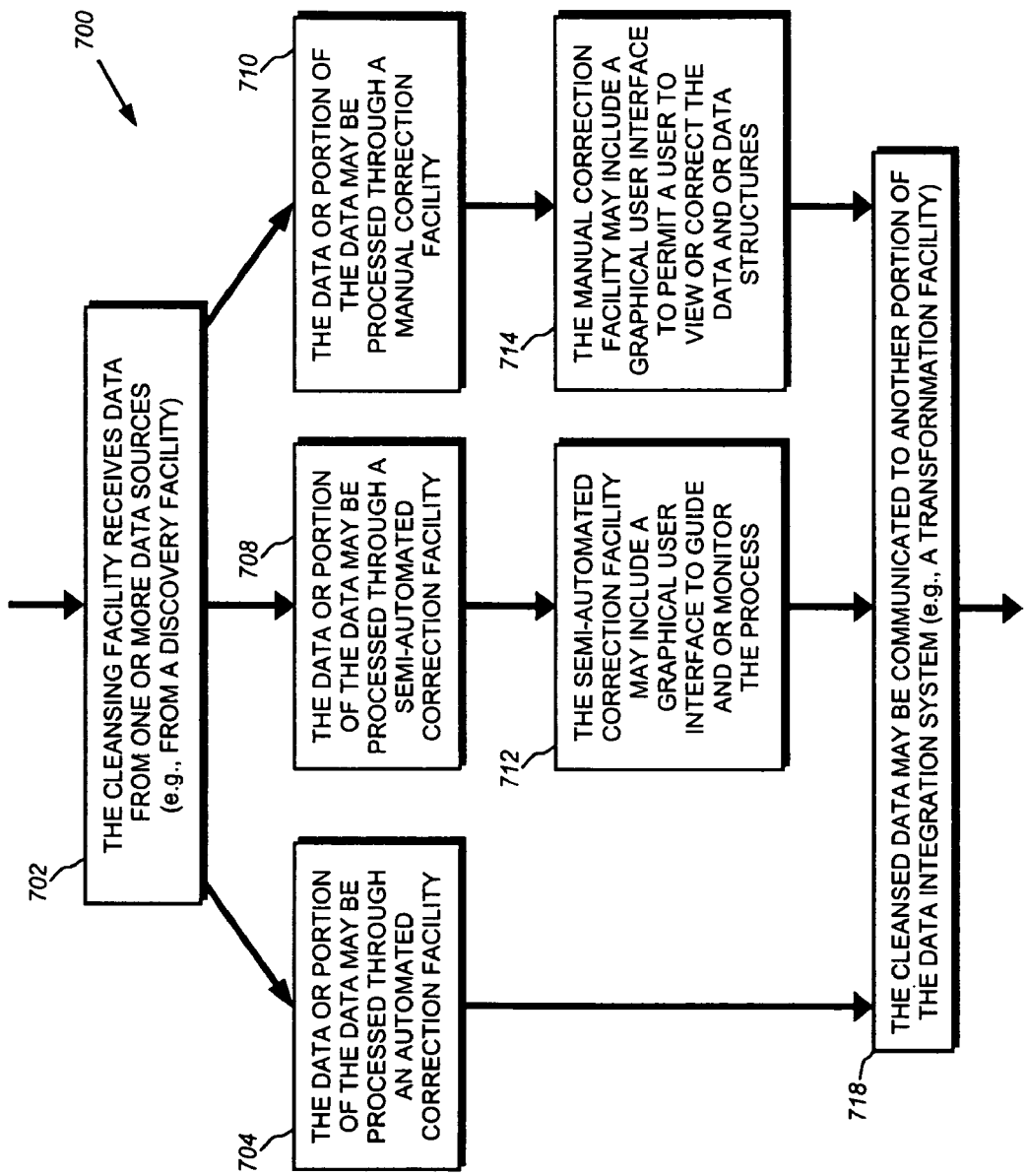
FIG. 7 is a flow diagram showing steps for a cleansing process for a data integration process.

FIG. 7 is a flow diagram showing steps for a cleansing process 700 in a data integration process 500. In an embodiment, the cleaning process may include a step 702 of receiving data from one or more data sources 102 (e.g. through a discovery facility). The cleansing process 700 may include one or more methods of cleaning the data. For example, the process may include a step 704 of automatically cleaning the data. The process may include a step 708 of semi-automatically cleaning the data. The process may include a step 710 of manually cleaning the data. The step 704 of automatically correcting or cleaning the data or a portion of the data may include the application of several techniques, such as automatic spell checking and correction, comparing data, comparing timeliness of the data, condition of the data, or other techniques for enhancing data quality and consistency. The step 708 for semi-automatically cleansing data may include a facility where a user interacts with some of the process steps and the system automatically performs cleaning tasks assigned. The semi-automated system may include a graphical user interface process step 712, in which a user interacts with the graphical user interface to facilitate the process 700 for cleansing the data. The process 700 may also include a step 710 for manually correcting the data. This step may also include use of a user interface to facilitate the manual correction, consolidation and/or cleaning of the data (step 714). The cleansed data from the cleansing processes 700 may be transmitted to another facility in the data integration system 104, such as the data transformation stage 308 (step 718).

Figure 8:
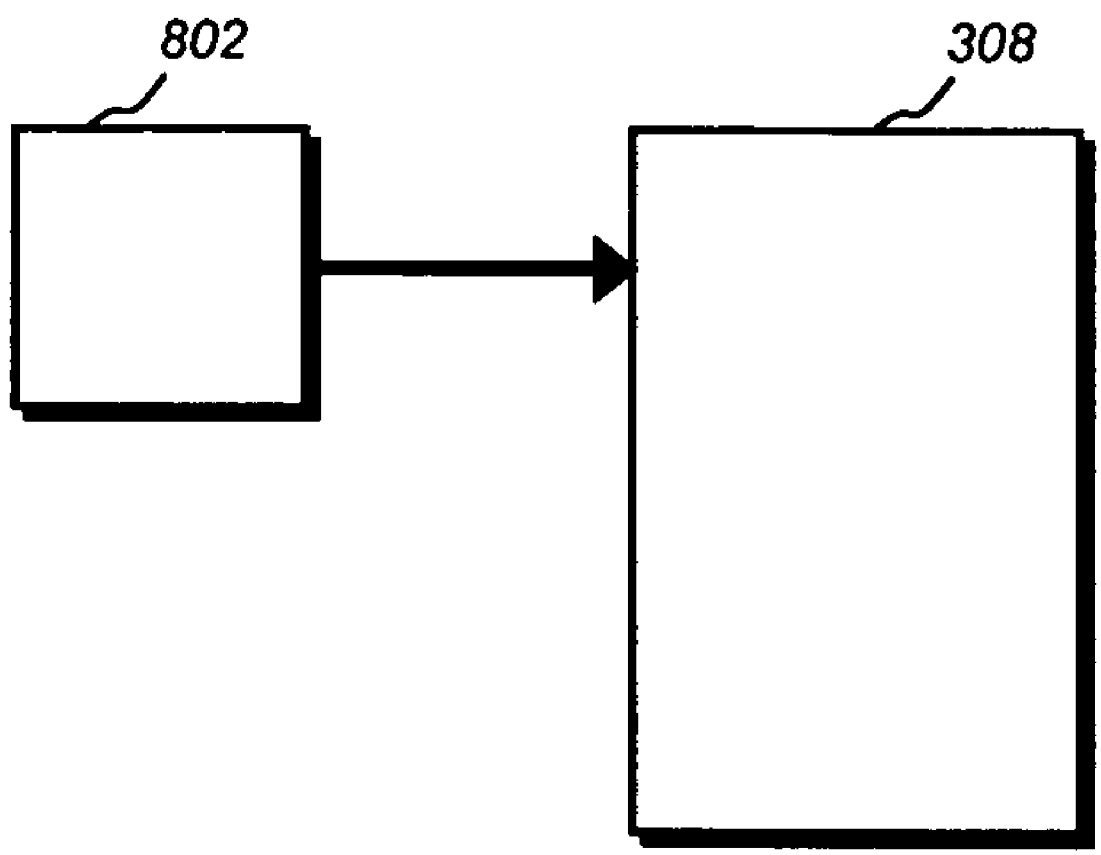
FIG. 8 is a schematic diagram showing a transformation facility for a data integration process.

FIG. 8 is a schematic diagram showing a transformation facility, which may be the data transformation stage 308 described above, for a data integration process 500. The transformation facility may receive cleansed data 802 from a cleansing facility and perform transformation processes, enrich the data and deliver the data to another process within the data integration system 104 or outside of the data integration system 104 where the integrated data may be viewed, used, further transformed or otherwise manipulated. For example, a user may investigate the data through data mining, or generate reports useful to the user or business.

Figure 9:
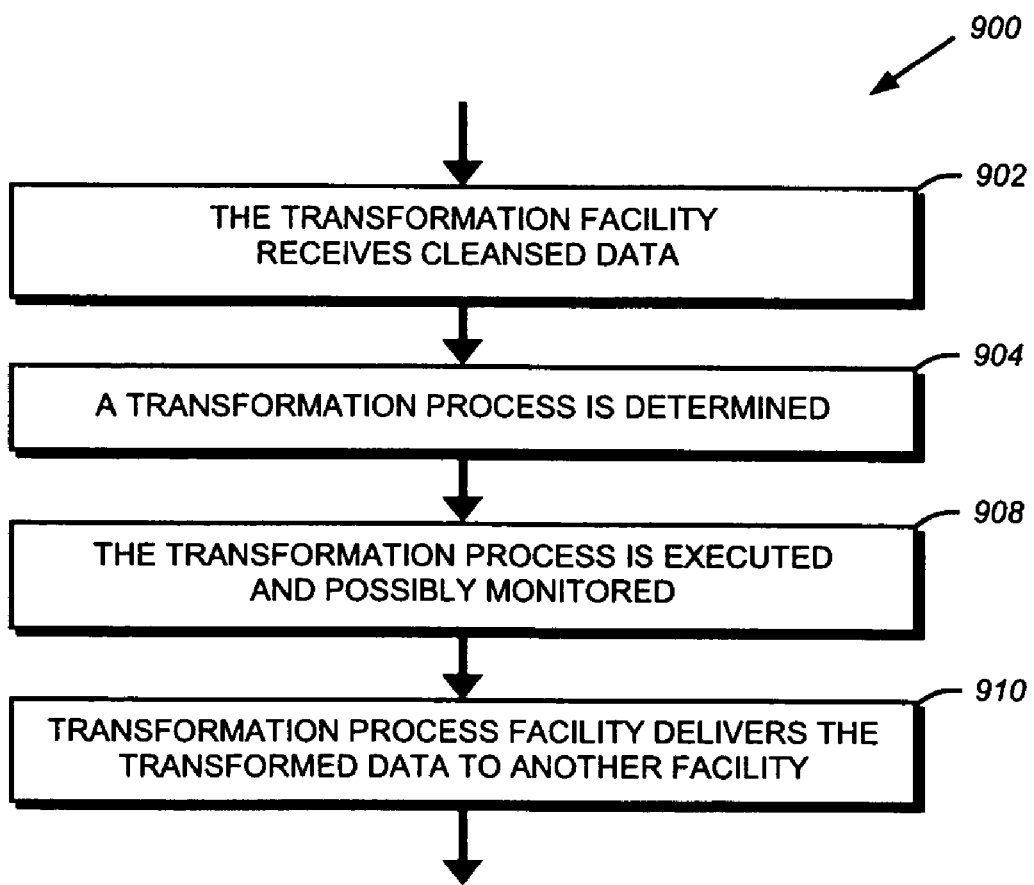
FIG. 9 is a flow diagram showing steps for transforming data as part of a data integration process.

FIG. 9 is a flow diagram showing steps for transforming data as part of a data integration process 500. The transformation process 900 may include receiving cleansed data (e.g. from the data preparation stage 308 described above), as shown in step 902. As shown in step 904, the process 900 may make a determination of the type of desired transformation. Following the step 904 of determining the transformation process, the transformation process may be executed, as shown in step 908. The transformed data may then be transmitted to another facility as shown in step 910.

In general, the data integration system 104 may be controlled and applied to specific enterprise data using a graphical user interface. The interface may include visual tools for modeling data sources, data targets, and stages or processes for acting upon data, as well as tools for establishing relationships among these data entities to model a desired data integration task. Graphical user interfaces are described in greater detail below. The following provides a general example to depict how a user interface might be used in this context.

Figure 10:
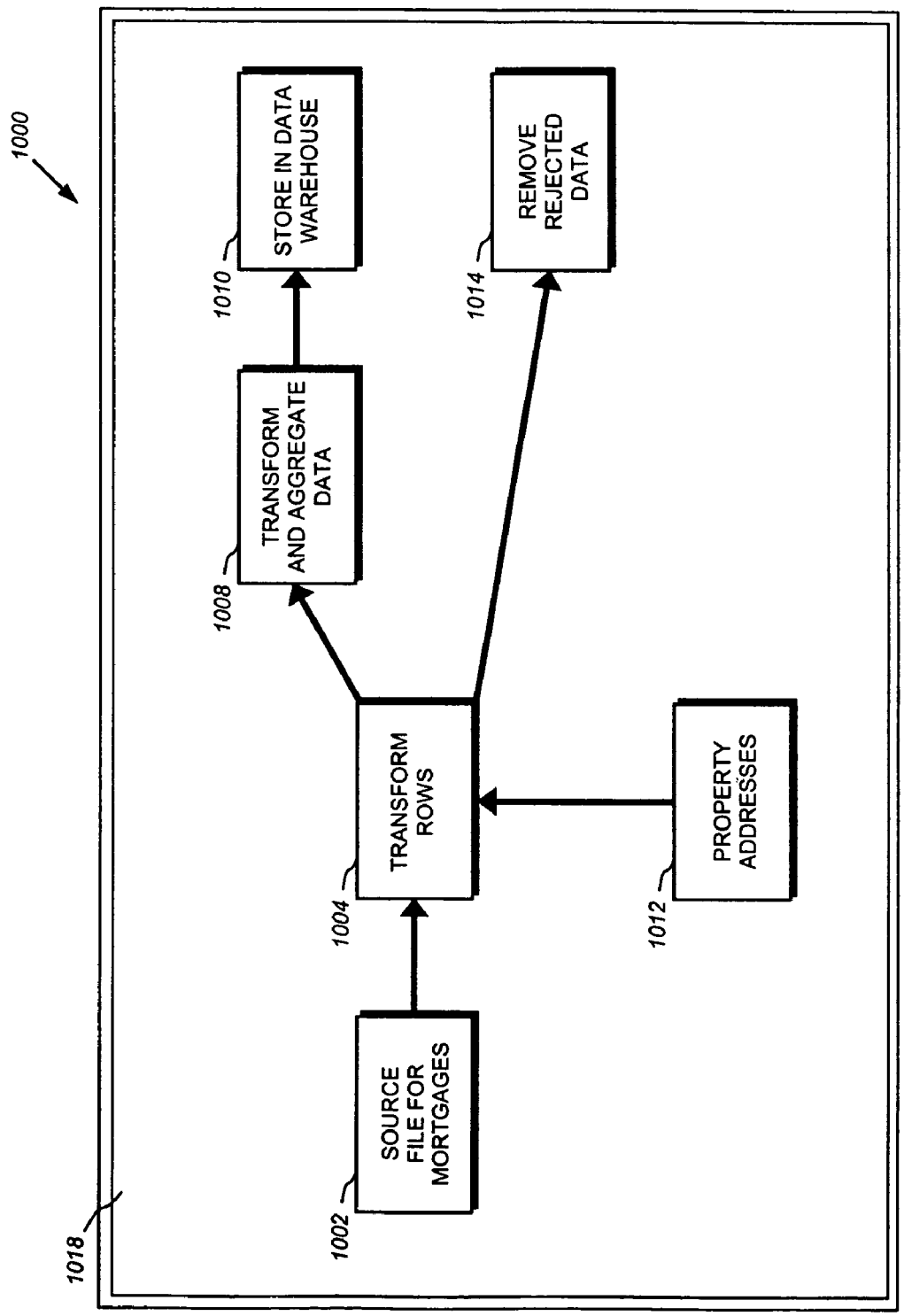
FIG. 10 depicts an example of a transformation process for mortgage data modeled using a graphical user interface.

FIG. 10 depicts an example of a transformation process 1000 for mortgage data modeled using a graphical user interface 1018. For this example, a business enterprise wishes to generate a report concerning certain mortgages. The mortgage balance information may reside in a mortgage database, which may be one of the data sources 102 described above, and the personal information such as address of the property information may reside in a property database, which may also be one of the data sources 102 described above. A graphical user interface 1018 may be provided to set the transformation process up. For example, the user may select a graphical representation of the mortgage database 1002 and a graphical representation of the property database 1012, and manipulate these representations 1002, 1012 into position within the interface 1018 using, e.g., conventional drag and drop operations. Then the user may select a graphical representation of a row transformation process 1004 to prepare the rows for combination. The user may drag and drop process flow directions, indicated generally within FIG. 10 as arrows, such that the data from the databases flows into the row transformation process. In this model, the user may elect to remove any unmatched files and send them to a storage facility. To accomplish this, the user may place a graphical representation of a storage facility 1014 within the interface 1018. If the user wishes to further process the remaining matching files, the user may, for example, add a graphical representation of another transformation and aggregation process 1008 which combines data from the two databases. Finally, the user may decide to send the aggregate data to a storage facility by adding a graphical representation of a data warehouse 1010. Once the user sets this process up using the graphical user interface, the user may run the transformation process.

FIG. 11 is a schematic diagram showing a plurality of connection facilities for connecting a data integration process 500 to other processes of a business enterprise. In an embodiment, the data integration system 104 may be associated with an integrated storage facility 1102, which may be one of the data sources 102 described above. The integrated storage facility 1102 may contain data that has been extracted from several other data sources 102 and processed through the data integration system 104. The integrated data may be stored in a form that permits one or more computer platforms 1108A and 1108B to retrieve data from the integrated data storage facility 1102. The computing platforms 1108A and 1108B may request data from the integrated data facility 1102 through a translation engine 1104A and 1104B. For example, each of the computing platforms 1108A and 1108B may be associated with a separate translation engine 1104A and 1104B. The translation engine 1104A and 1104B may be adapted to translate the integrated data from the storage facility 1102 into a form compatible with the associated computing platform 1108A and 1108B. In an embodiment, the translation engines 1104A and 1104B may also be associated with the data integration system 104. This association may be used to update the translation engines 1104A and 1104B with required information. This process may also involve the handling of metadata which will be further defined below.

Figure 11A:
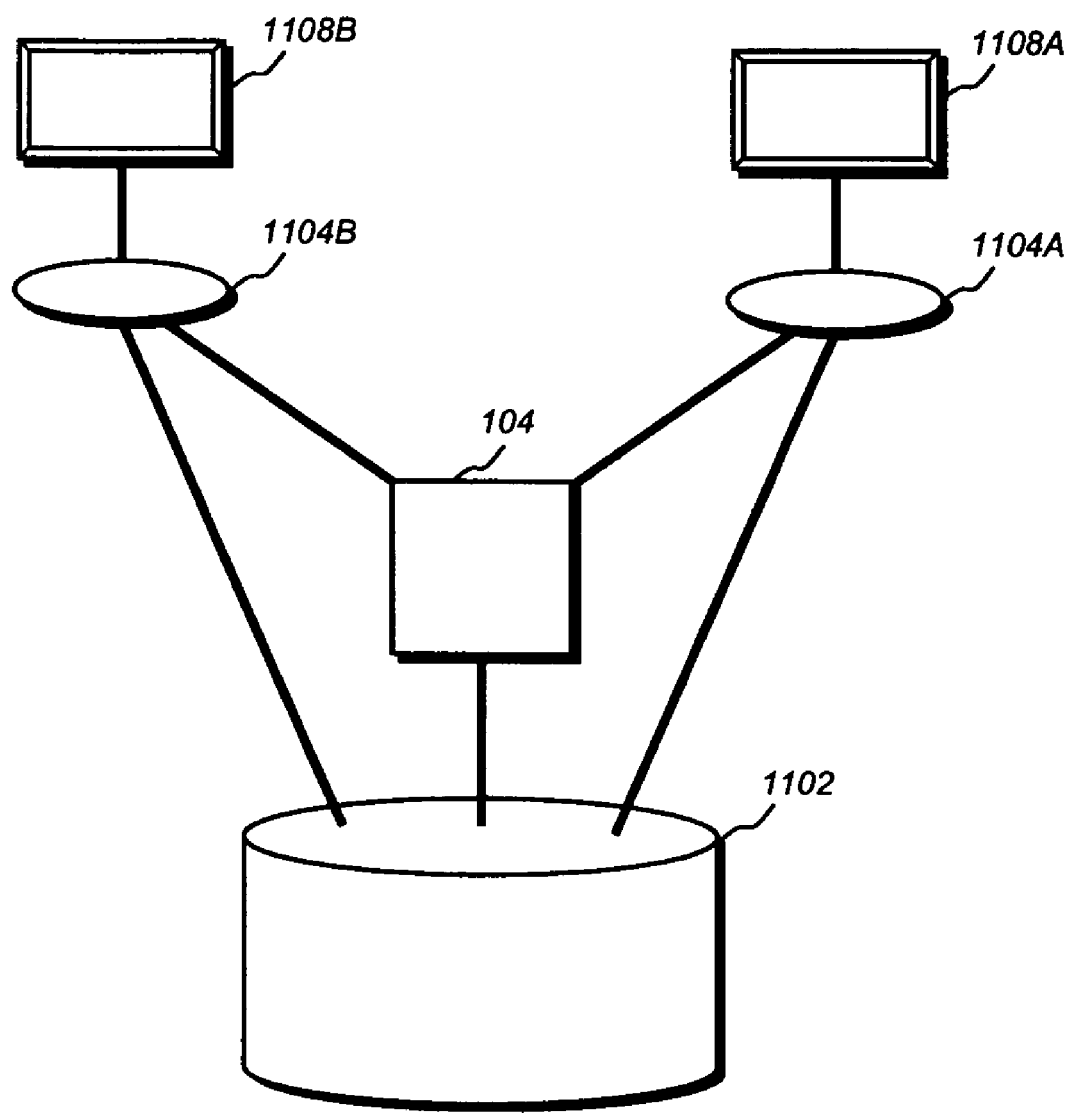
FIG. 11A is a schematic diagram showing a plurality of connection facilities for connecting a data integration process to other processes of a business enterprise.
Figure 11B:
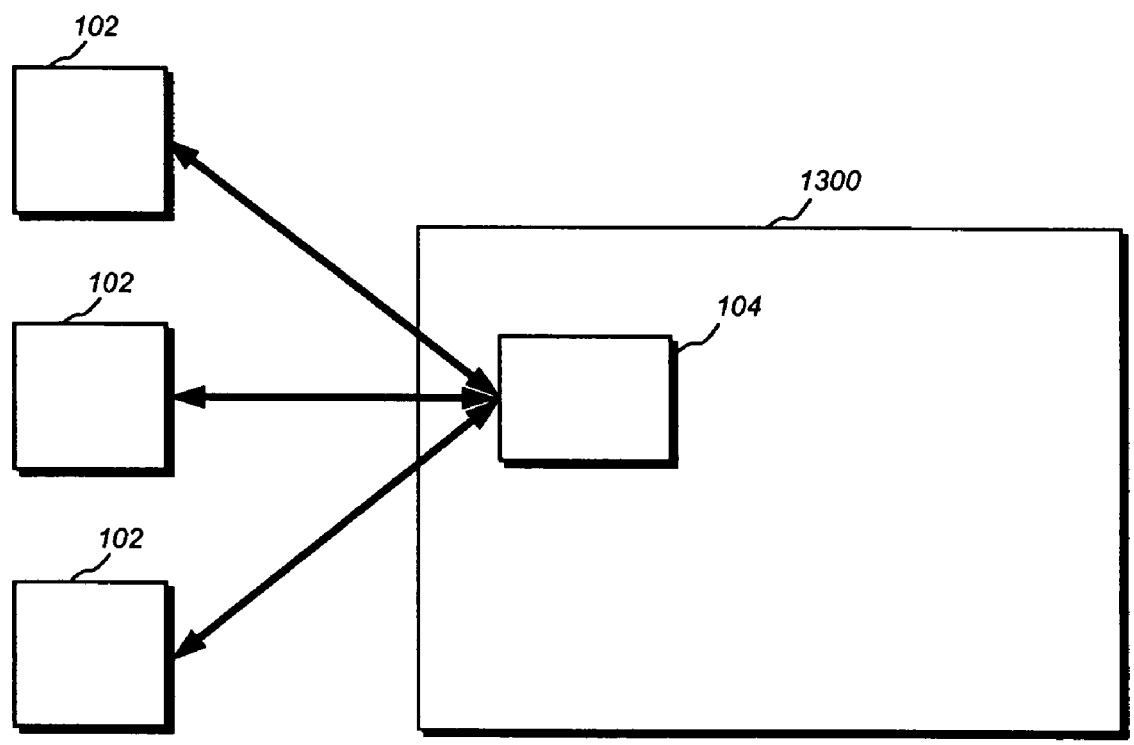
FIG. 11B shows a plurality of connection facilities using a bridge model.

While the hub model for data integration, as generally depicted in FIG. 11A, is one model for connecting to different computing platforms 1108A, 1108B and other data sources 102, other models may be employed, such as the bridge model described in reference to FIG. 11B. It should be appreciated that, where connections to data sources 102 are described herein, either of these models, or other models, may be used, unless specified or otherwise indicated by the context.

FIG. 11B shows a plurality of connection facilities using a bridge model. In this system, a plurality of data sources 102, such as an inventory system, a customer relations system, and an accounting system, may be connected to a data integration system 104 of an enterprise computing system 1300 through a plurality of bridges 1120 or connection facilities. Each bridge 1120 may be a vendor-specific transformation engine that provides metadata models for the external data sources 102, and enables bi-directional transfers of information between the data integration system 104 and the data sources 102. Enterprise integration vendors may have a proprietary format for their data sources 102 and therefore a different bridge 1120 may be required for each different external model. Each bridge 1120 may provide a connection facility to all or some of the data within a data source 102, and separate maps or models may be maintained for connections to and from each data source 102. Further, each bridge 1120 may provide error checking, reconciliation, or other services to maintain data integrity among the data sources 102. With the data sources 102 interconnected in this manner, data may be shared or reconcile among systems, and various data integration tasks may be performed on data within the data sources 102 as though the data sources 102 formed as single data source 102 or warehouse.

Figure 12:
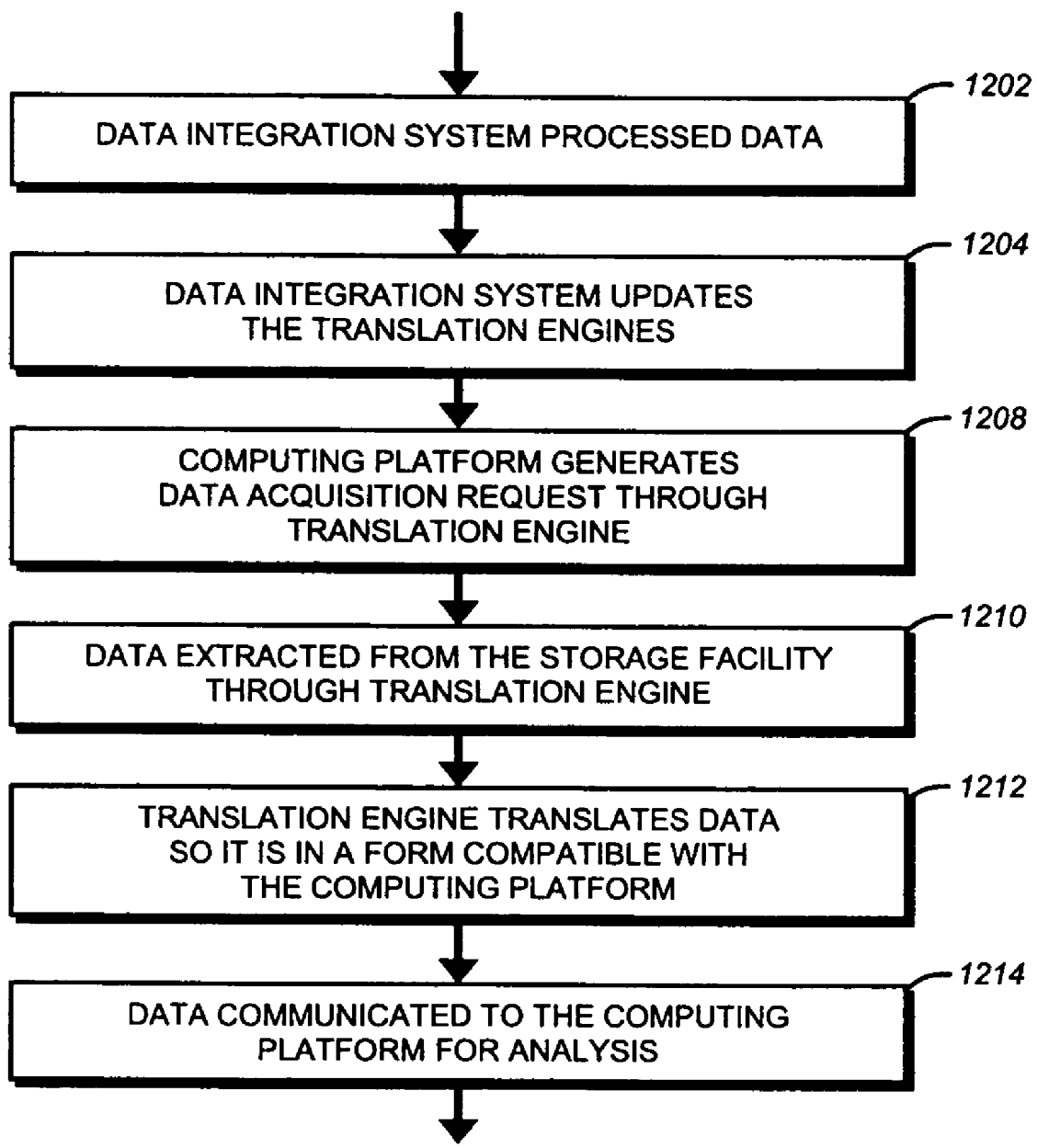
FIG. 12 is a flow diagram showing steps for connecting a data integration process to other processes of a business enterprise.

FIG. 12 is a flow diagram showing steps for connecting a data integration process 500 to other processes of a business enterprise. In an embodiment, the connection process may include step 1202 where the data integration system 104 stores data it has processed in a central storage facility. The data integration system 104 may also update one or more translation engines in step 1204. The illustration in FIG. 12 shows these processes occurring in series, but they may also occur in parallel, or some combination of these. The process may involve a step 1208 where a computing platform generates a data request and the data request is sent to an associated translation engine. Step 1210 may involve the translation engine extracting the data from the storage facility. The translation engine may also translate the data into a form compatible with the computing platform in step 1212 and the data may then be communicated to the computing platform in step 1214.

Figure 13:
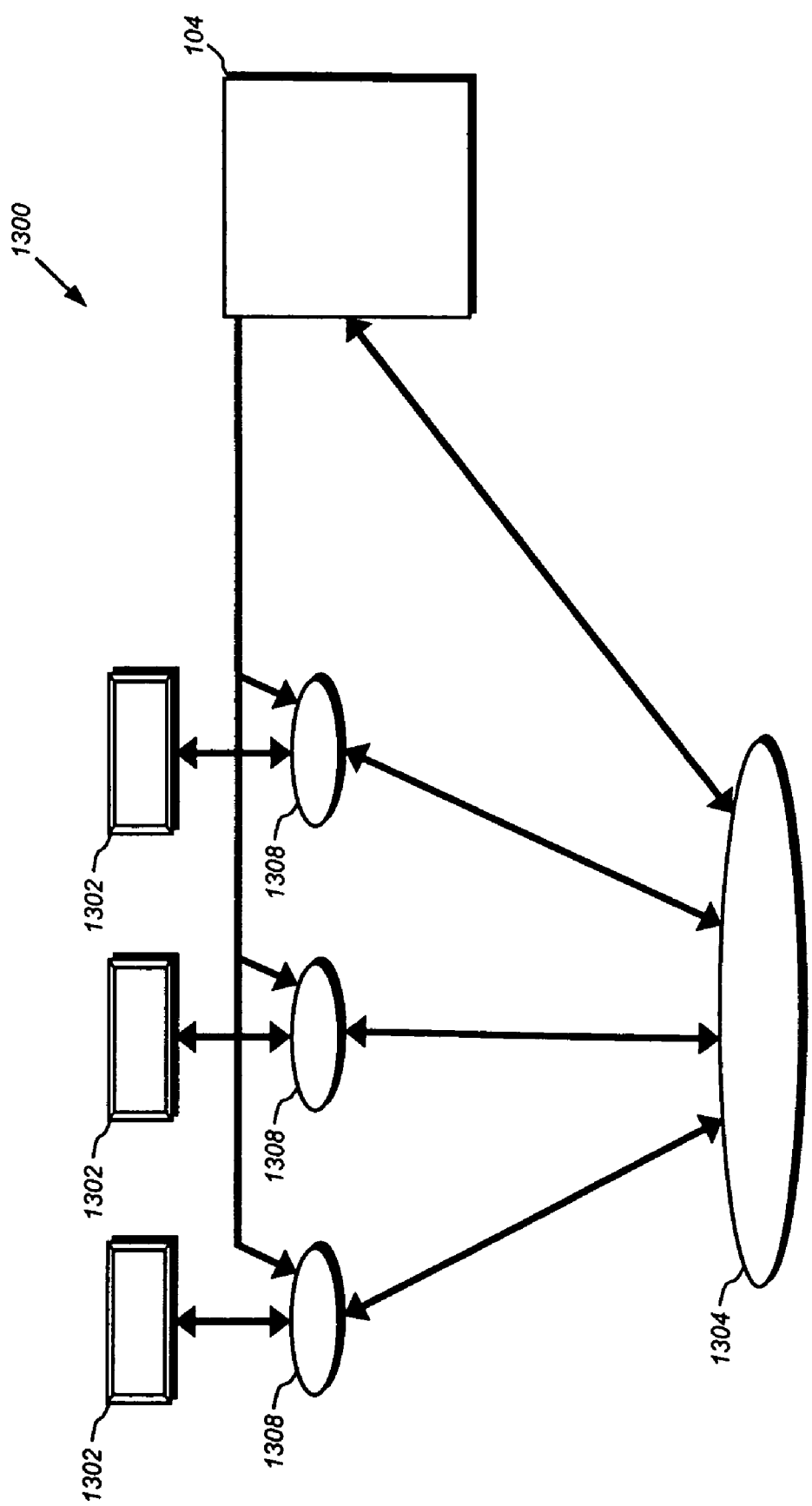
FIG. 13 shows an enterprise computing system that includes a data integration system.

FIG. 13 shows an enterprise computing system 1300 that includes a data integration system 104. The enterprise computing system 1300 may include any combination of computers, mainframes, portable devices, data sources, and other devices, connected locally through one or more local area networks and/or connected remotely through one or more wide area or public networks using, for example, a virtual private network over the Internet. Devices within the enterprise computing system 1300 may be interconnected into a single enterprise to share data, resources, communications, and information technology management. Typically, resources within the enterprise computing system 1300 are used by a common entity, such as a business, association, or governmental body, or university. However, in certain business models, resources of the enterprise computing system 1300 may be owned (or leased) and used by a number of different entities, such as where application service provider offers on-demand access to remotely executing applications.

The enterprise computing system 1300 may include a plurality of tools 1302, which access a common data structure, termed herein a repository information manager ("RIM") 1304 through respective translation engines 1308 (which, in a bridge-based system, may be the bridges 1120 described above). The RIM 1304 may include any of the data sources 102 described above. It will be appreciated that, while three translation engines 1308 and three tools 1302 are depicted, any number of translation engines 1308 and tools 1302 may be employed within an enterprise computing system 1300, including a number less than three and a number significantly greater than three. The tools 1302 generally comprise, for example, diverse types of database management systems and other applications programs that access shared data stored in the RIM 1304. The tools 1302, RIM 1304, and translation engines 1308 may be processed and maintained on a single computer system, or they may be processed and maintained on a number of computer systems which may be interconnected by, for example, a network (not shown), which transfers data access requests, translated data access requests, and responses between the different components 1302, 1304, 1308.

While they are executing, the tools 1302 may generate data access requests to initiate a data access operation, that is, a retrieval of data from or storage of data in the RIM 1304. Data may be stored in the RIM 1304 in an atomic data model and format that will be described below. Typically, the tools 1302 will view the data stored in the RIM 1304 in a variety of diverse characteristic data models and formats, as will be described below, and each translation engine 1308, upon receiving a data access request, will translate the data between respective tool's characteristic model and format and the atomic model format of RIM 1304 as necessary. For example, during an access operation of the retrieval type, in which data items are to be retrieved from the RIM 1304, the translation engine 1308 will identify one or more atomic data items in the RIM 1304 that jointly comprise the data item to be retrieved in response to the access request, and will enable the RIM 1304 to provide the atomic data items to one of the translation engines 1308. The translation engine 1308, in turn, will aggregate the atomic data items that it receives from the RIM 1304 into one or more data items as required by the tool's characteristic model and format, or "view" of the data, and provide the aggregated data items to the tool 1302 that issued the access request. During data storage, in which data in the RIM 1304 is to be updated, the translation engine 1308 may receive the data to be stored in a characteristic model and format for one of the tools 1302. The translation engine 1308 may translate the data into the atomic model and format for the RIM 1304, and provide the translated data to the RIM 1304 for storage. If the data storage access request enables data to be updated, the RIM 1304 may substitute the newly-supplied data from the translation engine 1308 for the current data. On the other hand, if the data storage access request represents new data, the RIM 1304 may add the data, in the atomic format as provided by the translation engine 1308, to the current data in the RIM 1304.

The enterprise computing system 1300 further includes a data integration system 104, which maintains and updates the atomic format of the RIM 1304 and the translation engines 1308 as new tools 1302 are added to the system 1300. It will be appreciated that certain operations performed by the data integration system 104 may be performed automatically or manually controlled. Briefly, when the system 1300 is initially established or when one or more tools 1302 are added to the system 1300 whose data models and formats differ from the current data models and formats, the data integration system 104 may determine any differences and modify the data model and format of the data in the RIM 1304 to accommodate the data model and format of the new tool 1302. In that operation, the data integration system 104 may determine an atomic data model which is common to the data models of any tools 1302 that are currently in the system 1300 and the new tool 1302 to be added, and enable the data model of the RIM 1304 to be updated to the new atomic data model. In addition, the data integration system 104 may update the translation engines 1308 associated with any tools 1302 currently in the system 1300 based on the updated atomic data model of the RIM 1304, and may also generate a translation engine 1308 for the new tool 1302. Accordingly, the data integration system 104 ensures that the translation engines 1308 of all tools 1302, including any tools 1302 currently in the system as well as a tool 1302 to be added conform to the atomic data models and formats of the RIM 1304.

Before proceeding further, it may be helpful to provide a specific example illustrating characteristic data models and formats that may be useful for various tools 1302 and an atomic data model and format useful for the RIM 1304. It will be appreciated that the specific characteristic data models and formats for the tools 1302 will depend on the particular tools 1302 that are present in a specific enterprise computing system 1300. In addition, it will be appreciated that the specific atomic data models and formats for the RIM 1304 may depend on the atomic data models and formats which are used for tools 1302, and may represent the aggregate or union of the finest-grained elements of the data models and format for all of the tools 1302 in the system 1300.

Figure 14A:
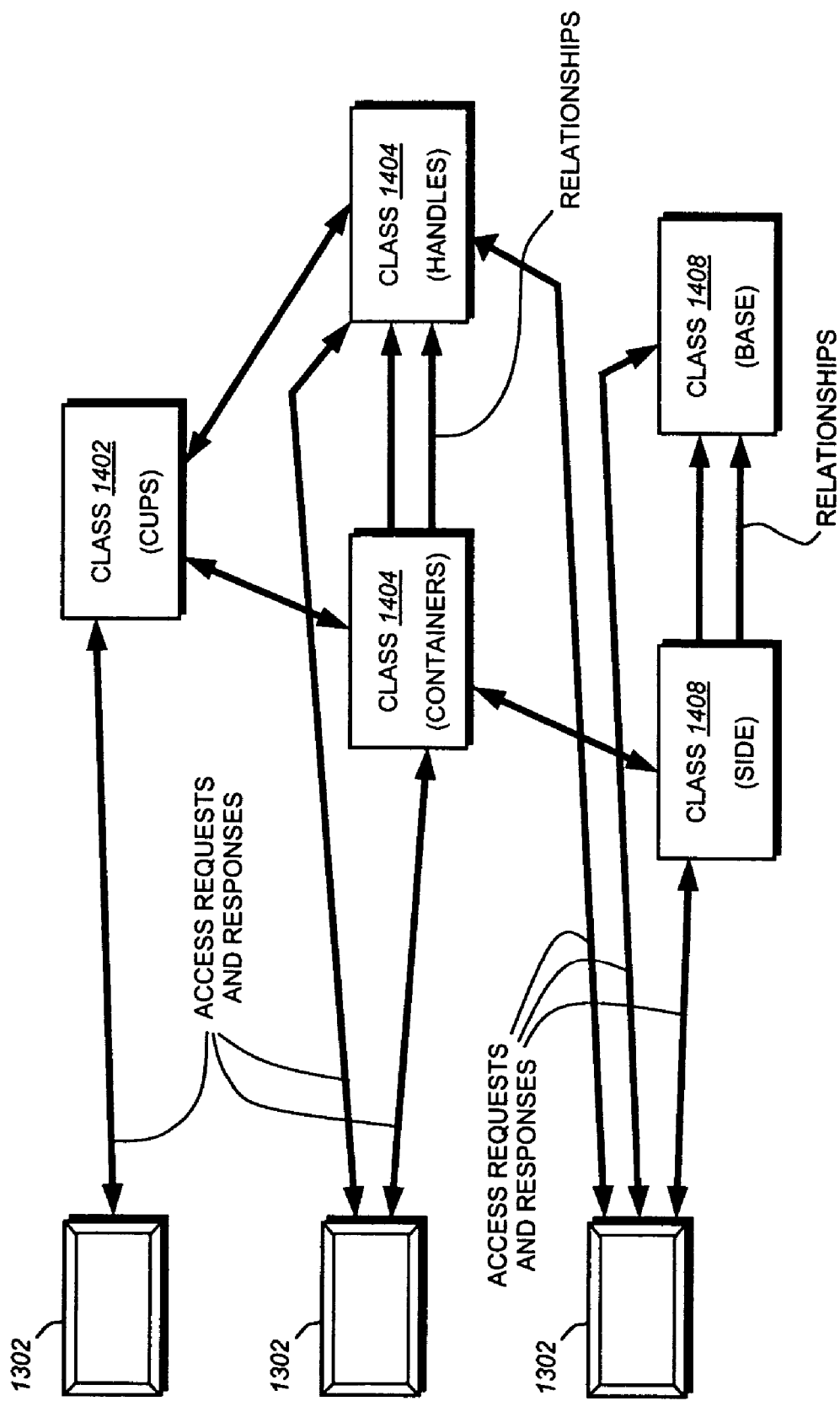
FIG. 14A illustrates management of metadata in a data integration job.

FIG. 14A provides an example relating to a database of designs for a cup, such as a drinking cup or other vessel for holding liquids. The database may be used for designing and manufacturing the cups. In this application, the tools 1302 may be used to add cup design elements to the RIM 1304, such as design drawings, dimensions, exterior surface treatments, color, materials, handles (or lack thereof), cost data, and so on. The tools 1302 may also be used to modify cup design elements stored in the RIM 1304, and re-use and associate particular cup design elements in the RIM 1304 with a number of different cup designs. The RIM 1304 and translation engines 1308 may provide a mechanism by which a number of different tools 1302 can share the elements stored in the RIM 1304 without having to agree on a common schema or model and format arrangement for the elements.

In this example, the RIM 1304 may store data items in an entity-relationship format, with each entity being a data item and relationships reflecting relationships among data items, as will be illustrated below. The entities are in the form of objects which may, in turn, be members or instances of classes and subclasses in an object-oriented environment. It will be appreciated that other models and formats may be used for the RIM 1304.

FIG. 14A depicts an illustrative metadata structure for a cup design database. The class structure may include a main class 1402, two subclasses 1404 for containers and handles that depend from the main class 1402, and two lower-level subclasses 1408 for sides and bases, both of which depend from the container subclass 1404. Each data item in class 1402, which is termed an "entity" in the entity-relationship format, may represent a specific cup or specific type of cup in an inventory, and will have associated attributes which define various characteristics of the cup, with each attribute being identified by a particular attribute identifier and data value for the attribute.

Each data item in the handle and container subclasses 1404, which are also "entities" in the entity-relationship format, may represent container and handle characteristics of the specific cups or types of cups in the inventory. More specifically, each data item in container subclass 1404 may represent the container characteristic of a cup represented by a data item in the cup class 1402, such as color, sidewall characteristics, base characteristics and the like. In addition, each data item in the handle subclass 1404 may represent the handle characteristics of a cup that is represented by a data item in the cup class 1402, such as curvature, texture, color, position and the like. In addition, it will be appreciated that there may be one or more relationships between the data items in the handle subclass 1404 and the container subclass 1404 that serve to link the data items between the subclasses 1404.

For example, there may be a relationship signifying whether a container has a handle. In addition, or instead, there may be a relationship signifying how many handles a container has. Further, there may be a position relationship, which specifies the position of a handle on the container. The number and position relationships may be viewed as properties of the first relationship (container has a handle), or as separate relationships. The two lower-level subclasses 1408 may be associated with the container subclass 1404 and represent various elements of the container. In the illustration depicted in FIG. 14A, the subclasses 1408 may, include a sidewall type subclass 1408 and a base type subclass 1408, each characterizing an element of the cup class 1402. It will be appreciated that the cup and the properties of the cup, such as the container and the handle, may be defined in an object oriented manner using any desired level of detail.

Although not explicitly depicted in FIG. 14A, it should be appreciated that one or more translation engines 1308 may coordinate communication between the tools 1302, which require one view of data, and the RIM 1304, which may store data in a different format. More generally, each one of the tools 1302 depicted in FIG. 14A may have a somewhat different or completely different characteristic data model and format to view the cup data stored in the RIM 1304. That is, where a data item is a cup, characteristics of the cup may be stored in the RIM 1304 as attributes and attribute values for the cup design associated with the data item.

In a retrieval access request, the tools 1302 may provide their associated translation engines 1308 with the identification of a cup data item in cup class 1402 to be retrieved, and will expect to receive at least some of the data item's attribute data, which may be identified in the request, in response. Similarly, in response to an access request of the storage type, such tools will provide their associated translation engines 1308 with the identification of the cup data item to be updated or created and the associated attribute information to be updated or to be used in creating a new data item.

Other tools 1302 may have characteristic data models and formats that view the cups separately as the container and handle entities in the subclasses 1404, rather than the main cup class 1402 having attributes for the container and the handle. In that view, there may be two data items, namely "container" and "handle" associated with each cup, each of which has attributes that describe the respective container and handle. In that case, each data item each may be independently retrievable and updateable and new data items may be separately created for each of the two classes. For such a view, the tools 1302 will, in an access request of the retrieval type, provide their associated translation engines 1308 with the identification of a container or a handle to be retrieved, and will expect to receive the data item's attribute data in response. Similarly, in response to an access request of the storage type, such tools 1302 will provide their associated translation engines 1308 with the identification of the "container" or "handle" data item to be updated or created and the associated attribute data. Accordingly, these tools 1302 view the container and handle data separately, and can retrieve, update and store container and handle attribute data separately.

As another example using the same atomic data structure in the RIM 1304, tools 1302 may have characteristic formats which view the cups separately as sidewall, base and handle entities in classes 1402-1408. In such a view, there may be three data items, namely, a sidewall, a base, and a handle associated with each cup, each of which has attributes which describe the respective sidewall, base and handle of the cup. In that case, each data item may be independently created, retrieved, or updated. For such a view, the tools 1302 may provide their associated translation engines 1308 with the identification of a sidewall, base or a handle whose data item is to be operated on, and may perform operations (such as create, retrieve, store) separately for each.

As described above, the RIM 1304 may store cup data in an "atomic" data model and format. That is, with the class structure as depicted in FIG. 14A, the RIM 1304 may store the data as data items corresponding to each class and subclass in a consistent data structure, such as a data structure reflecting the most detailed format for the class structure employed by the collective tools 1302.

Translation engines 1308 may translate between the views maintained by each tool 1302 and the atomic data structures maintained by the RIM 1304, based upon relationships between the atomic data structures in the RIM 1304 and the view of the data used by the tool 1302. The translation engines 1308 may perform a number of functions when translating between tool 1302 views and RIM 1304 data structures. Such as combining or separating classes or subclasses, translating attribute names or identifiers, generating or removing attribute values, and so on. The required translations may arise in a number of contexts, such as creating data items, retrieving data items, deleting data items, or modifying data items. As new tools 1302 are added to the data integration system 104, the system 104 may update data structures in the RIM 1304, as well as translation engines 1308 that may be required for new tools 1302. Existing translation engines 1308 may also need to be updated where the underlying data structure used within the RIM 1304 has been changed to accommodate the new tools 1302, or where the data structure has been reorganized for other reasons.

More generally, as the data integration system 104 is adapted to new demands, or new thinking about existing demands, the system 104 may update and regenerate the underlying class structure for the RIM 1304 to create new atomic models for data. At the same time, translation engines 1308 may be revised to re-map tools 1302 to the new data structure of the RIM 1304. This latter function may involve only those translation engines 1308 that are specifically related to newly composed data structures, while others may continue to be used without modification. An operator, using the data integration system 104, may determine and specify the mapping relationships between the data models and formats used by the respective tools 1308 and the data model and format used by the RIM 1304, and may maintain a rules database from the mapping relationships which may be used to generate and update the respective translation engines 1308.

In order to ensure accurate propagation of updates through the RIM 1304, the data integration system 104 may associate each tool 1302 with a class whose associated data item(s) will be deemed "master physical items," and a specific relationship, if any, to other data items. For example, the data integration system 104 may select as the master physical item the particular class that appears most semantically equivalent to the object of the tool's data model. Other data items, if any, which are related to the master physical item, may deemed secondary physical items in a graph. For example, the cup class may contain master physical items for tools 1302 that operate on an entire cup design. The arrows designated as "RELATIONSHIPS" in FIG. 14A show possible relationships between master physical items and secondary physical items. In performing an update operation, a directed graph that is associated with the data items to be updated may be traversed from a master physical item with the appropriate attributes and values updated. In traversing the directed graph, conventional graph-traversal algorithms can be used to ensure that each data item in the graph, can, as a graph node, be appropriately visited and updated, thereby ensuring that the data items are updated.

Figure 14B:
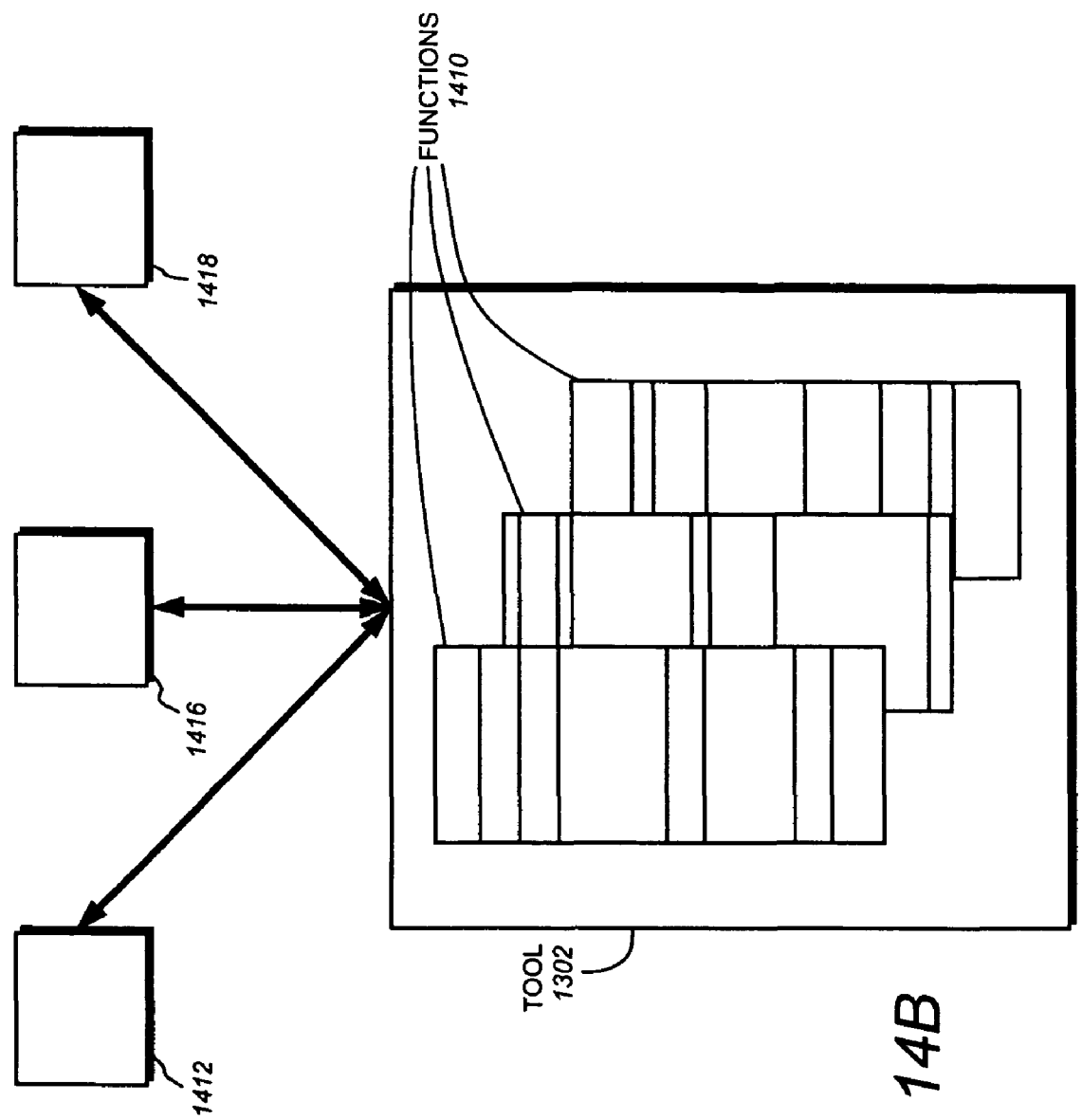
FIG. 14B illustrates an aspect oriented programming environment that may be used in a data integration job.

The above example generally describes metadata management in an object oriented programming environment. However, it will be appreciated that a variety of software paradigms may be usefully employed with data in an enterprise computing system 1300. For example, an aspect-oriented programming system is described with reference to FIG. 14B, and may be usefully employed with the enterprise computing system 1300 described above. An example of a tool 1302 with functions 1410 is shown in the figure. Each function 1410 may be written to interact with several external services such as ID logging 1412 and metadata updating. In a typical object oriented environment, the external services 1412-1418 must often be "crosscut" to respond to functions 1410 that call them, i.e., recoded to correspond to the calls of an updated function 1410 of the tool 1302.

As an example, in skeleton code, object oriented programming ("OOP") code for functions 1410 that perform login and validation may look like:

DataValidation( . . .)
//Login user code
//Validate access code
//Lock data objects against another functions use code
//===== Data Validation Code =====
//Log out user code
//Unlock data object code
//Update metadata with latest access code
//More operations the same as above In the above example, the code of the functions 1410 invokes actions with outside services 1410-1414. So-called crosscutting occurs wherever the application writer must recode outside services 1410-1414, and may be required for proper interaction of code. This may significantly increase the complexity of a redesign, and compound the time and potential for error.

In Aspect Oriented Programming (AOP), the resulting code for the functions 1410 may be similar to the OOP code (in fact, AOP may be deployed using OOP platforms, such as C++). But in an AOP environment, the application writer will code only the function specific logic for the functions 1410, and use a set of weaver rules to define how the logic accesses the external services 1412-1418. The weaver rules describe when and how the functions 1402 should interact with the other services, therefore weaving the core code of the tools 1302 and external services 1412-1418 together. When the code for the functions 1410 is compiled, the weaver will combine the core code with support code to call the proper independent service creating the final function 1410. In skeleton code the typical AOP code for a function 1410 may look like:

DataValidation( . . .)
//Data Validation Logic

The crosscutting code is removed from the code for the function 1410. The application writer may then create weaver rules to apply to the AOP code. In skeleton code, the weaver rules for the functions 1410 may include:

ID log at each operation start
ID log out at each operation end
Update metadata after final operation The resulting AOP skeleton code for the function 1410 may look like:

DataValidation( . . .)
-ID Logger.in
//Data Validation Logic
-ID Logger.out
-Metadata.update The simplified code created by the application writer may allow for full concentration to be place on creating the tool 1302 without concerns about the required crosscutting code. Similarly, a change to one of the services 1412-1418, may not require any changes to the functions 1410 of the tool 1302. Structuring code in this manner may significantly reduce the possibility of coding errors when creating or modifying a tool 1302, and simplify service updates for external services 1412-1418.

It will also be appreciated that translation engines 1308 are only one possible method of handling the data and metadata in an enterprise computing system 1300. The translation engines 1308 may include, or consist of, bridges 1120, as described above, or may employ a least common factor method where the data that is passed through a translation engine 1308 is compatible with both computing systems connected by the translation engine 1308. In yet a further embodiment, the translation may be performed on a standardized facility such that all computing platforms that conform to the standards can communicate and extract data through the standardized facility. There are many other methods of handling data and its associated metadata that are contemplated, and may be usefully employed with the enterprise computing system 1300 described herein.

With this background, specific operations performed by the data integration system 104 and tools 1302 and translation engines 1304 will now be described in greater detail.

Figure 15:
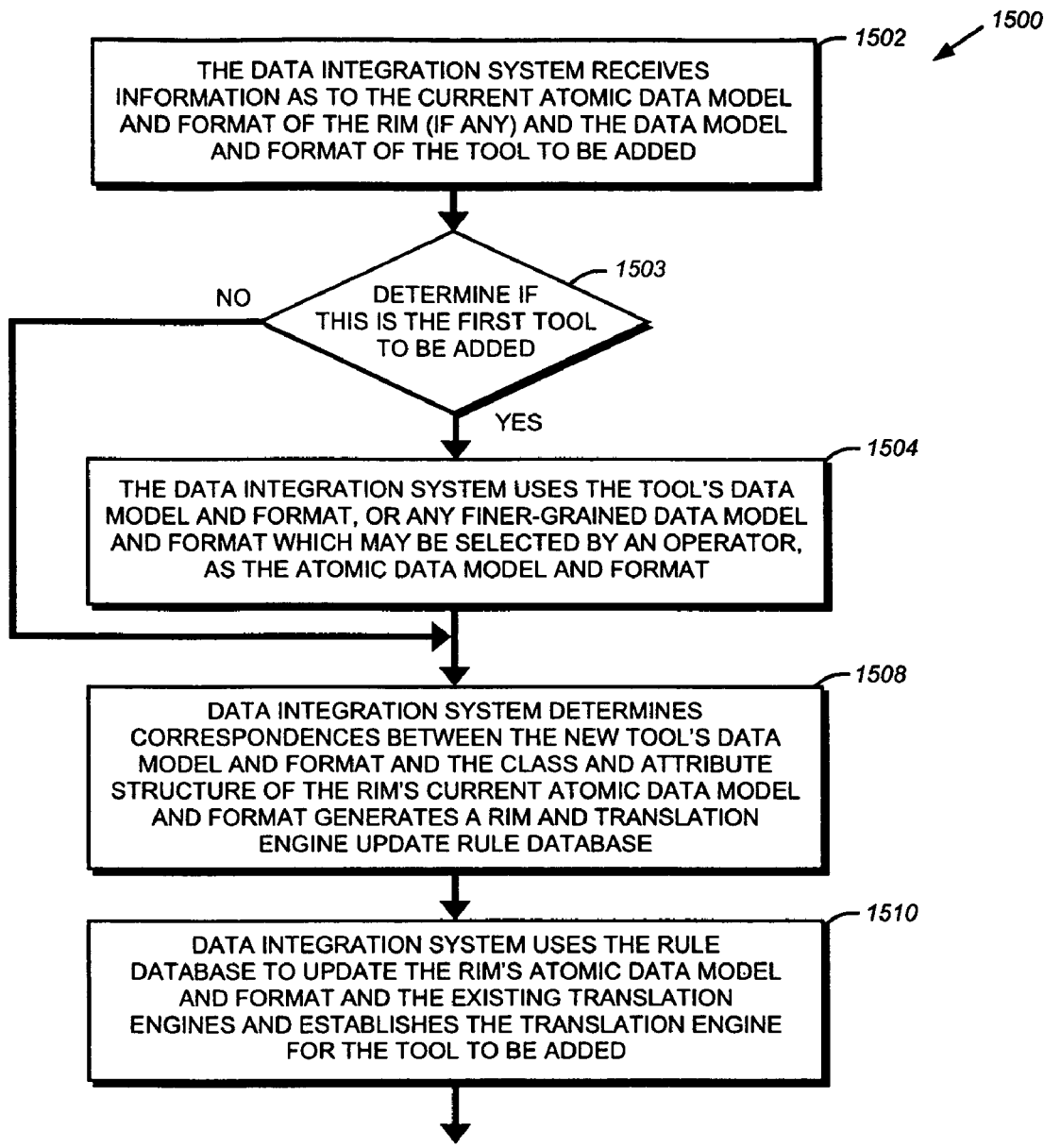
FIG. 15 is a flow diagram showing additional steps for using a metadata facility in connection with a data integration job.

FIG. 15 is a flow diagram showing a process 1500 for using a metadata management system 312, or metadata facility, in connection with a data integration system 104. Initially, a new tool 1302 may be added to the data integration system, as depicted in step 1502. As shown, the data integration system 104 may initially receive information as to the current atomic data model and format of the RIM 1304 (if any) and the data model and format of the tool 1302 to be added. As shown in step 1503, a determination may then be made whether the new tool 1302 is the first tool 1302 to be added to the data integration system 104. If the new tool 1302 is the first tool 1302, then the process 1500 may proceed to step 1504 where atomic data models are selected, using either the views required by the tool 1302, or any other finer-grained data model and format selected by a user.

If the new tool 1302 is not the first tool 1302, then the process 1500 may proceed to step 1508 where correspondences between the new tool's data model and format, including the new tool's class and attribute structure and associations between that class and attribute structure and the class and attribute structure of the RIM's current atomic data model and format will be determined. A RIM 1304 and translation engine 1308 update rules database may be generated therefrom. As shown in step 1510, the data integration system 104 may use the rule database to update the RIM's atomic data model and format and the existing translation engines 1308 as described above. The data integration system 104 may also establish a translation engine 1308 for the tool 1302 that is being added.

Figure 16:
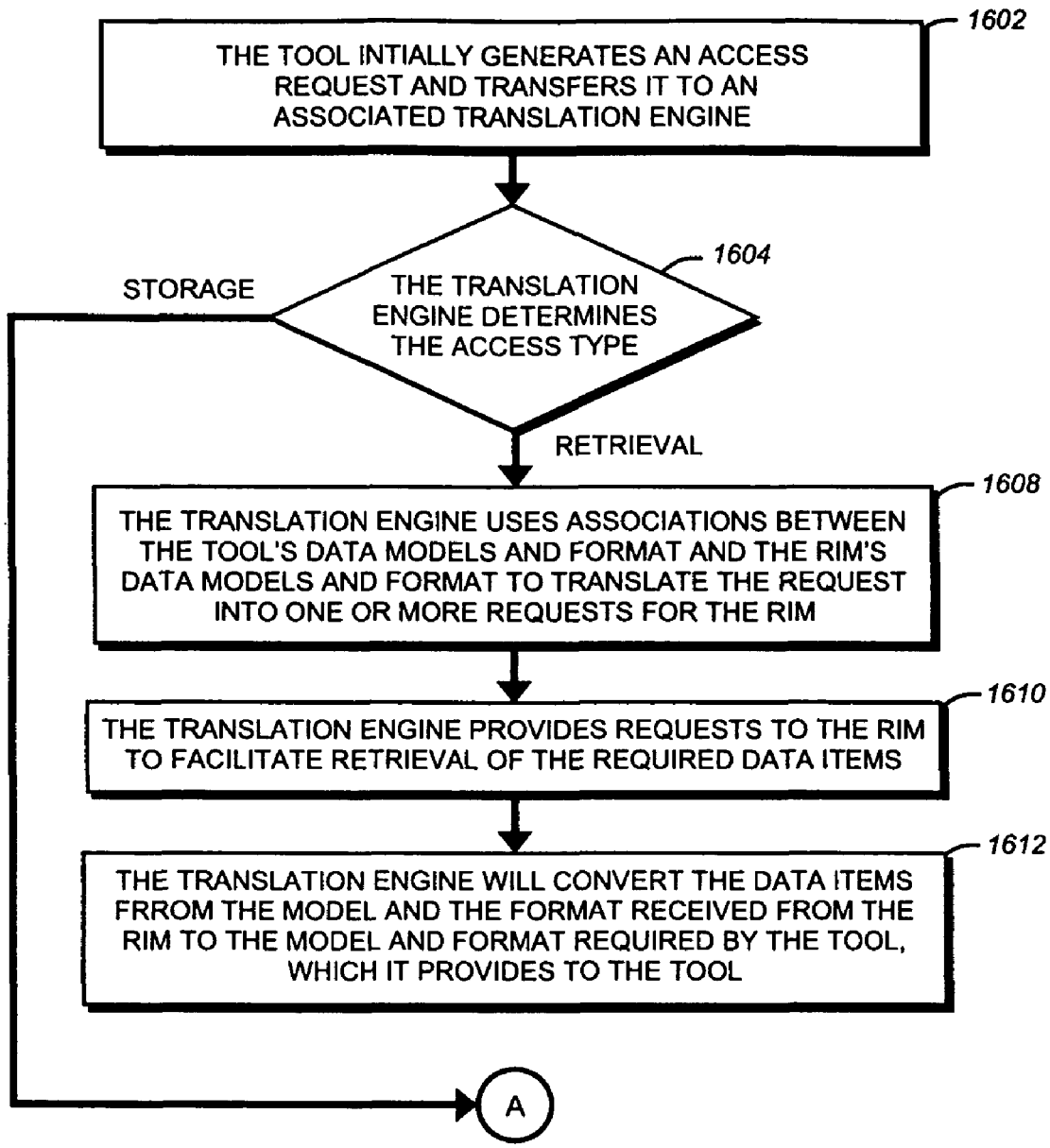
FIG. 16 is a flow diagram showing additional steps for using a metadata facility in connection with a data integration job.
Figure 16A:
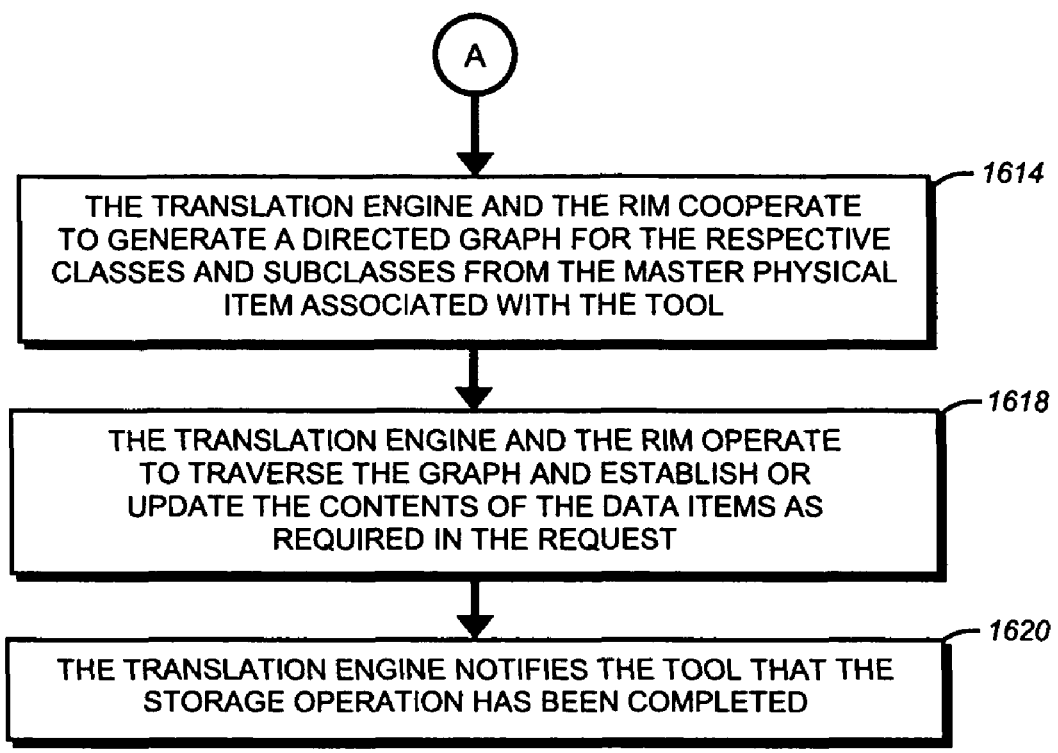
FIG. 16A is a flow diagram showing additional steps for using a metadata facility in connection with a data integration job.

As depicted generally in FIG. 16, once a translation engine 1308 has been generated or updated for a tool 1302, the translation engine 1308 can be used in connection with various operations of the tool 1302.

As shown in step 1602, a tool 1302 may generate an access request, which may be transfer to an associated translation engine 1308. After receiving the access request, the translation engine 1308 may determine the request type, such as whether the request is a retrieval request or a storage request, as shown in step 1604. As shown in step 1608, if the request is a retrieval request, the translation engine 1308 may use its associations between the tool's data models and format and the RIM's data models and format to translate the request into one or more requests for the RIM 1304. Upon receiving responsive data items from the RIM 1304 (step 1610), the translation engine 1308 may convert the data items from the model and format received from the RIM 1304 to the model and format required by the tool 1302, and may provide the data items to the tool 1302 in the appropriate format (step 1612).

As shown in step 1614, if the translation engine 1308 determines that the request is a storage request, including a request to update a previously-stored data item, the translation engine 1308 may, with the RIM 1304, generate a directed graph for the respective classes and subclasses from the master physical item associated with the tool 1302. If the operation is an update operation, the directed graph will comprise, as graph nodes, existing data items in the respective classes and subclasses, and if the operation is to store new data the directed graph will comprise, as graph nodes, empty data items which can be used to store new data included in the request. After the directed graph has been established, the translation engine 1308 and RIM 1304 operate to traverse the graph and establish or update the contents of the data items as required in the request, as shown in step 1618. After the graph traversal operation has been completed, the translation engine 1308 may notify the tool 1302 that the storage operation has been completed, as shown in step 1620.

A data integration system 104 as described above may provide significant advantages. For example, the system 104 may provide for the efficient sharing and updating of information by a number of tools 1302 in an enterprise computing system 1300, without constraining the tools 1302 to specific data models, and without requiring information exchange programs that exchange information between different tools 1302. The data integration system 104 may provide a RIM 1304 that maintains data in an atomic data model and format which may be used for any of the tools 1302 in the system 104, and the format may be readily updated and evolved in a convenient manner when a new tool 1302 is added to the system 104. Further, by explicitly associating each tool 1302 with a master physical item class, directed graphs may be directed among data items in the RIM 1304. As a result, updating of information in the RIM 1304 can be efficiently accomplished using conventional directed graph traversal procedures.

Figure 17:
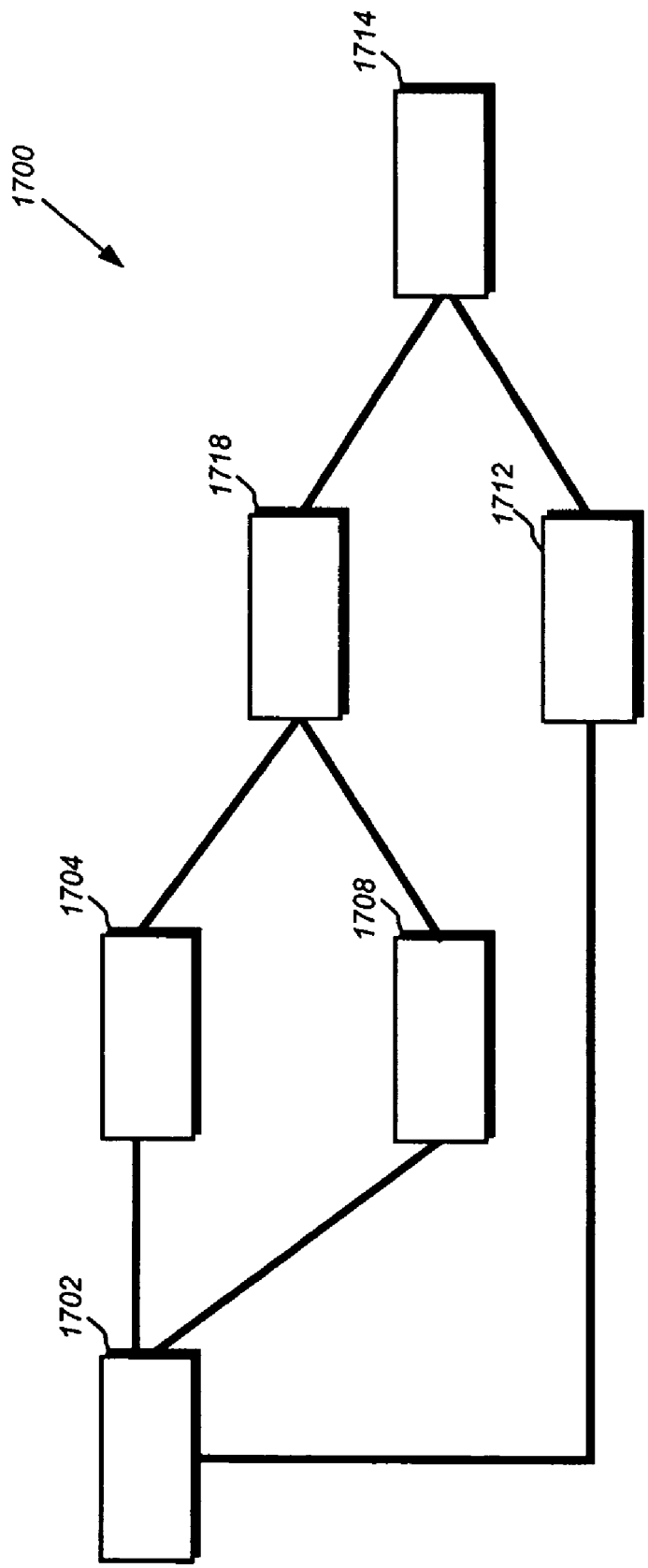
FIG. 17 is a schematic diagram showing a facility for parallel execution of a plurality of processes of a data integration process.

FIG. 17 is a schematic diagram showing a parallel execution facility 1700 for parallel execution of a plurality of processes of a data integration process. In an embodiment, the process 1700 may involve a process initiation facility 1702. The process initiation facility 1702 may determine the scope of the job that needs to be run and determine that a first and second process may be run simultaneously (e.g. because they are not dependant). Once the determination is made, the two processing facilities 1704 and 1708 may run the first process and the second process respectively. Following the execution of these two jobs, a third process may be undertaken on another processing facility. Once the third process is complete, the corresponding process facility may communicate information to a transformation facility 1714. In an embodiment, the transformation facility 1714 may not begin the transformation process until it has received information 1718 from one or more other parallel processes, such as the first and second processing facilities 1704, 1708. Once all of the information is presented, the transformation facility 1714 may perform the transformation. This parallel process flow minimizes run time by running several processes at one time (e.g. processes that are not dependant on one another) and then presenting the information from the two or more parallel executions to a common facility (e.g. where the common facility is dependant on the results of the two parallel facilities). In this embodiment, the several process facilities are depicted as separate facilities for ease of explanation. However, it should be understood that two or more of these facilities may be the same physical facilities. It should also be understood that two or more of the processing facilities may be different physical facilities and may reside in various physical locations (e.g. facility 1704 may reside in one physical location and facility 1708 may reside in another physical location).

Figure 18:
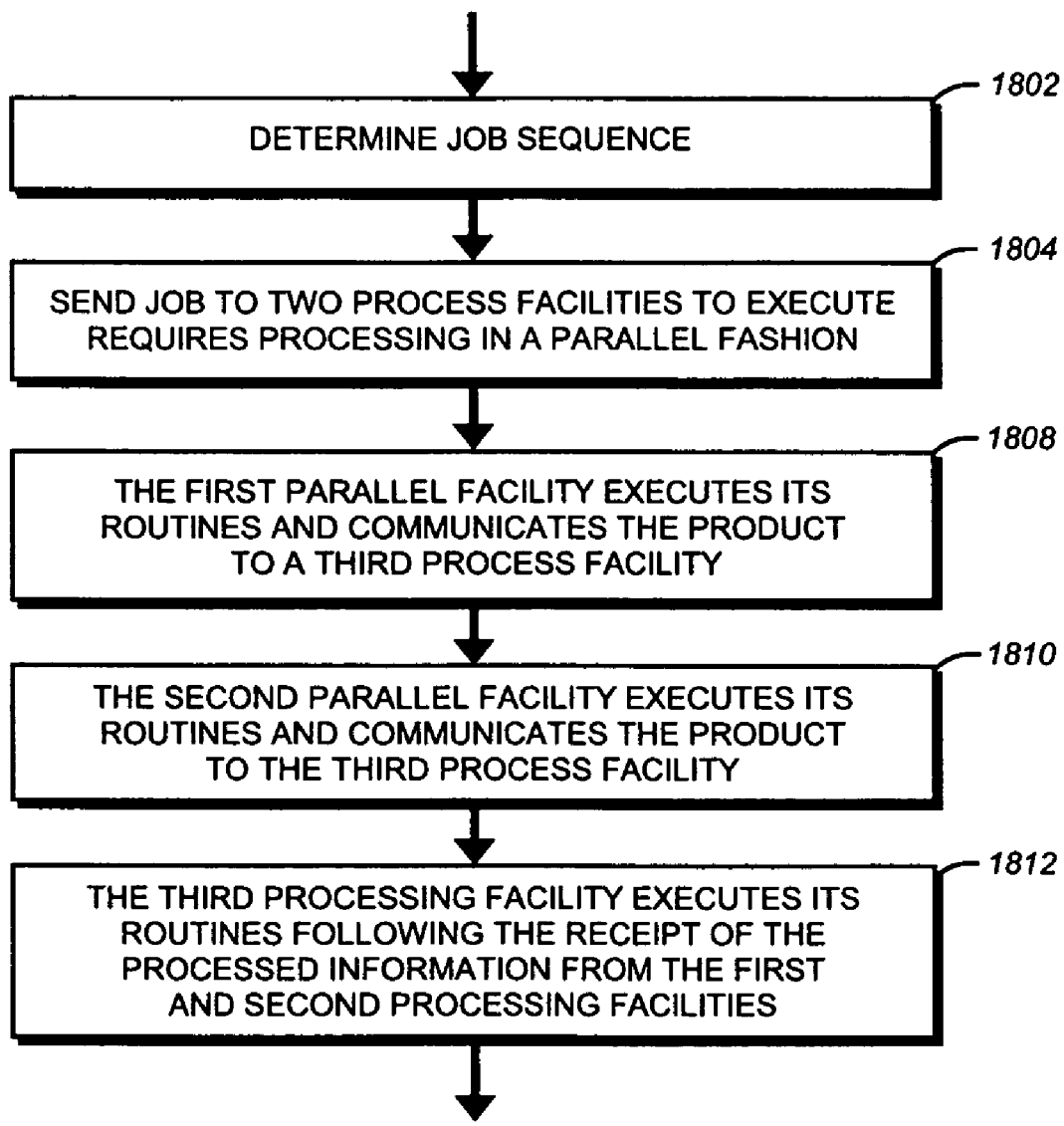
FIG. 18 is a flow diagram showing steps for parallel execution of a plurality of processes of a data integration process.

FIG. 18 is a flow diagram showing steps for parallel execution of a plurality of processes of a data integration process. In an embodiment, a parallel process flow may involve step 1802 wherein the job sequence is determined. Once the job sequence is determined, the job may be sent to two or more process facilitates as shown in step 1804. In step 1808 a first process facility may receive and execute certain routines and programs and communicate the processed information to a third process facility. In step 18 10 a second process facility may receive and execute certain routines and programs and once complete communicate the processed information to the third process facility. The third process facility may wait to receive the processed information from the first to process facilities before running its own routines on the two sources of information (step 1812). Again, it should be understood the process facilities might be the same facilities or reside in the same location, or the process facilities may be different and/or reside in different locations.

More generally, scaleable architectures using parallel processing may include SMP, clustering, and MPP platforms, and grid computing solutions. These may be deployed in a manner that does not require modification of underlying data integration processes. Current commercially available parallel databases that may be used with the systems described herein include IBM DB2 UDB, Oracle, and Teradata databases. A concept related to parallelism is the concept of pipelining, in which records are moved directly through a series of processing functions defined by the data flow of a job. Pipelining provides numerous processing advantages, such as removing requirements for interim data storage and removing input/output management between processing steps. Pipelining may be employed within a data integration system to improve processing efficiency.

Figure 19:
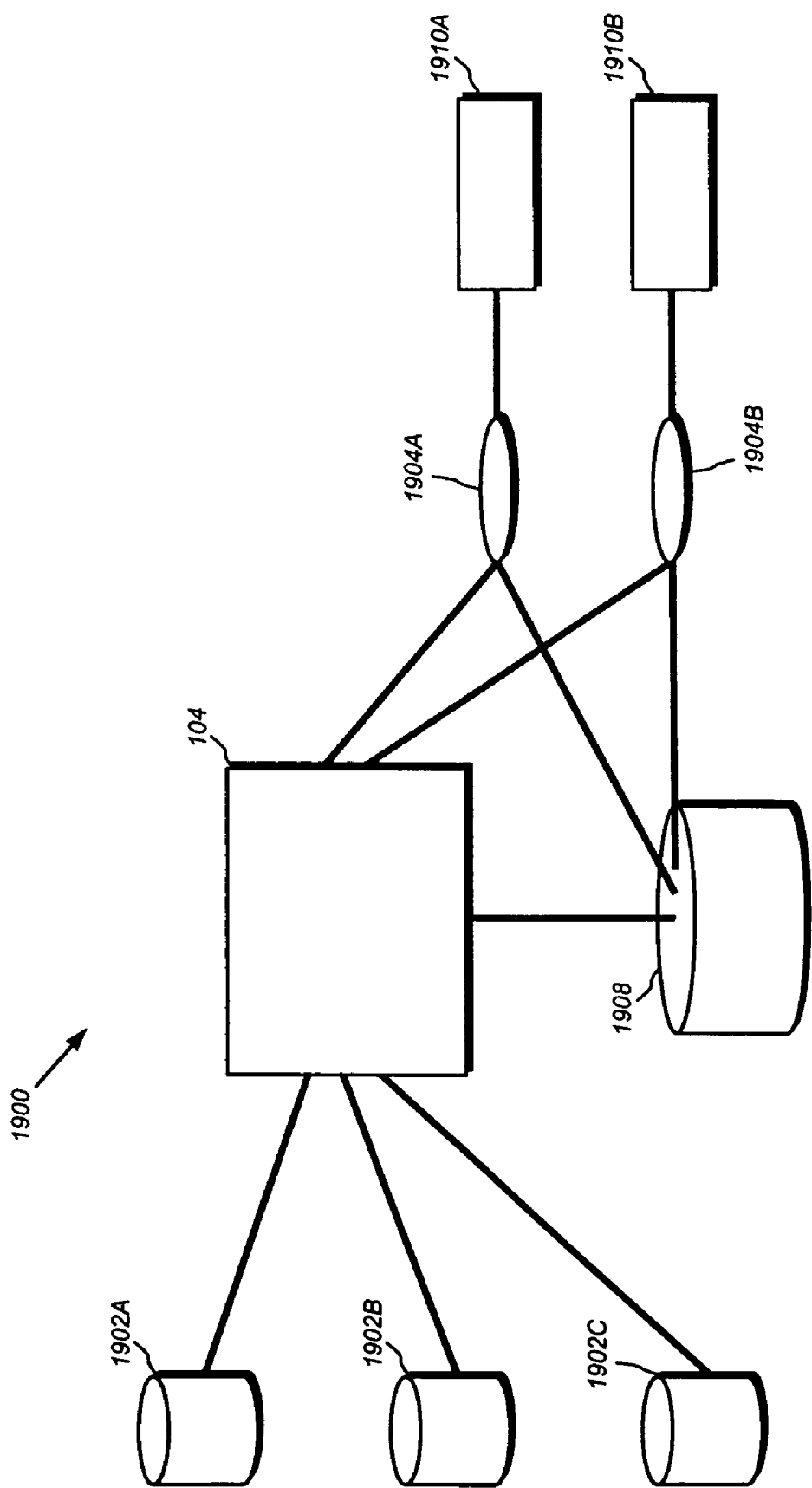
FIG. 19 is a schematic diagram showing a data integration job, comprising inputs from a plurality of data sources and outputs to a plurality of data targets.

FIG. 19 is a schematic diagram showing a data integration job 1900, comprising inputs from a plurality of data sources and outputs to a plurality of data targets. It may be desirable to collect data from several data sources 1902A, 1902B and 1902C, which may be any of the data sources 102 described above, and use the combination of the data in a business enterprise. In an embodiment, a data integration system 104 may be used to collect, cleanse, transform or otherwise manipulate the data from the several data sources 1902A, 1902B and 1902C and to store the data in a common data warehouse or database 1908, which may be any of the databases 112 described above, such that it can be accessed from various tools, targets, or other computing systems. This may include, for example, the data integration process 500 described above. The data integration system 104 may store the collected data in the storage facility 1908 such that it can be directly accessed from the various tools 1910A and 1910B, which may be the tools 1302 described above, or the tools may access the data through data translators 1904A and 1904B, which may be the translation engines 1308 described above, whether automatically, manually or semi-automatically generated as described herein. The data translators 1904A, 1904B are illustrated as separate facilities; however, it should be understood that they may be incorporated into the data integration system 104, a tool 1302, or otherwise located to accomplish the desired tasks.

Figure 20:
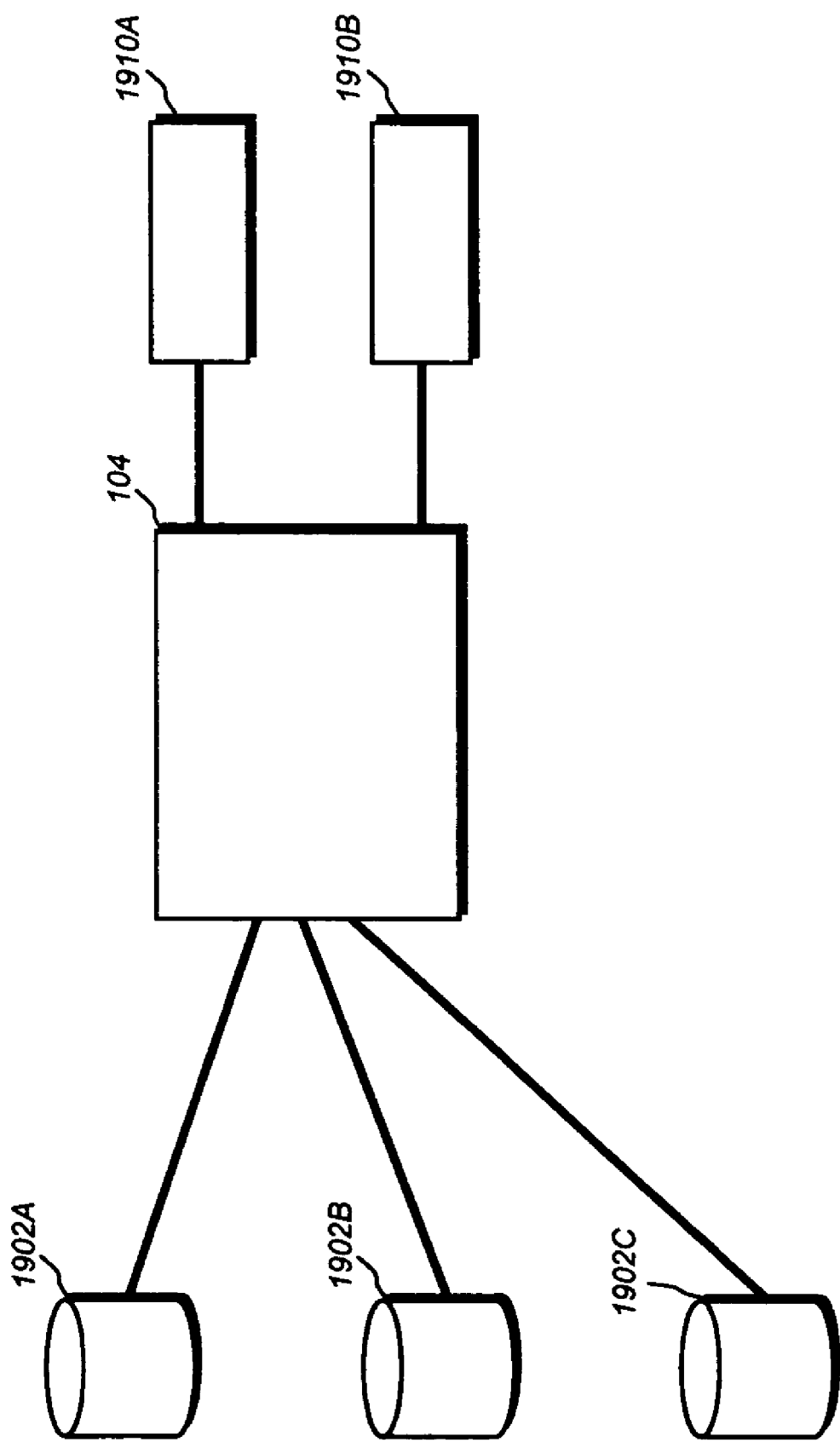
FIG. 20 is a schematic diagram showing a data integration job, comprising inputs from a plurality of data sources and outputs to a plurality of data targets.

FIG. 20 is a schematic diagram showing another data integration job 1900, comprising inputs from a plurality of data sources and outputs to a plurality of data targets. It may be desirable to collect data from several data sources 1902A, 1902B and 1902C, which may be any of the data sources 102 described above, and use the combination of the data in a business enterprise. In an embodiment, a data integration system 104 may collect, cleanse, transform or otherwise manipulate the data from the several data sources 1902A, 1902B and 1902C and pass on the collected information in a combined manner to several targets 1910A and 1910B, which may also be any of the data sources 102 described above. This may be accomplished in real-time or in a batch mode for example. Rather than storing all of the collected information in a central database to be accessed at some point in the future, the data integration system 104 may collect and process the data from the data sources 1902A, 1902B and 1902C at or near the time the request for data is made by the targets 1910A and 19101B. It should be understood that the data integration system 104 might still include memory in an embodiment such as this. In an embodiment, the memory may be used for temporarily storing data to be passed to the targets when the processing is completed.

The embodiments of a data integration job 1900 described in reference to FIG. 19 and FIG. 20 are generic. It will be appreciated that such a data integration job 1900 may be applied in numerous commercial, educational, governmental, and other environments, and may involve many different types of data sources 102, data integration systems 104, data targets, and/or databases 112.

Figure 21:
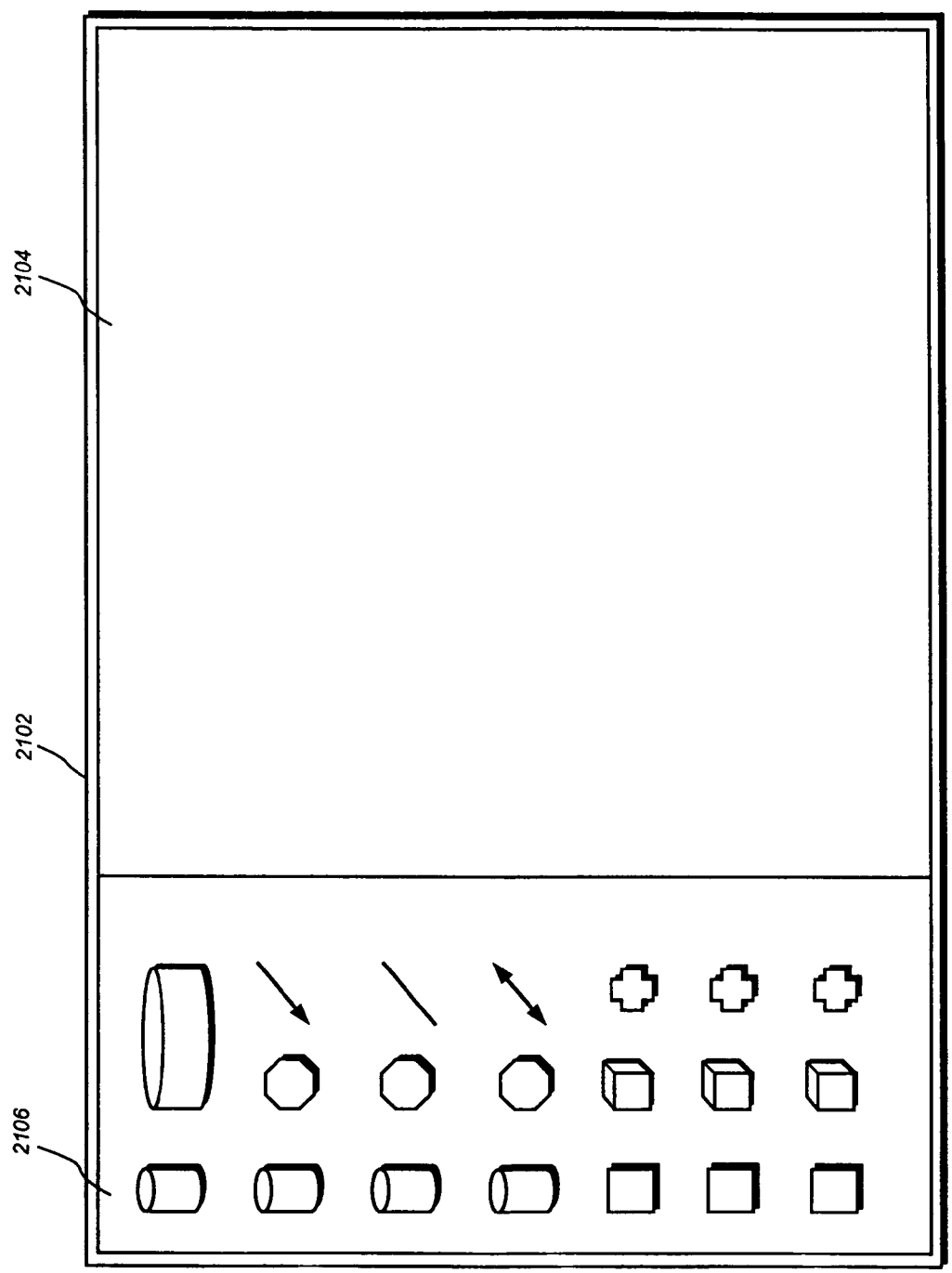
FIG. 21 shows a graphical user interface whereby a data manager for a business enterprise can design a data integration job.

FIG. 21 shows a graphical user interface 2102 whereby a data manager for a business enterprise may design a data integration job 1900. In an embodiment, a graphical user interface 2102 may be presented to the user to facilitate setting up a data integration job. The user interface may include a palate of tools 2106 including databases, transformation tools, targets, path identifiers, and other tools to be used by a user. The user may graphically manipulate tools from the palate of tools 2106 into a workspace 2104, using, e.g., drag and drop operations, drop down menus, command lines, and any other controls, tools, toolboxes, or other user interface components. The workspace 2104 may be used to layout the databases, path of data flow, transformation steps and the like to configure a data integration job, such as the data integration jobs 1900 described above. In an embodiment, once the job is configured it may be run from this or another user interface. The user interface 2102 may be generated by an application or other programming environment, or as a web page that a user may access using a web browser.

Figure 22:
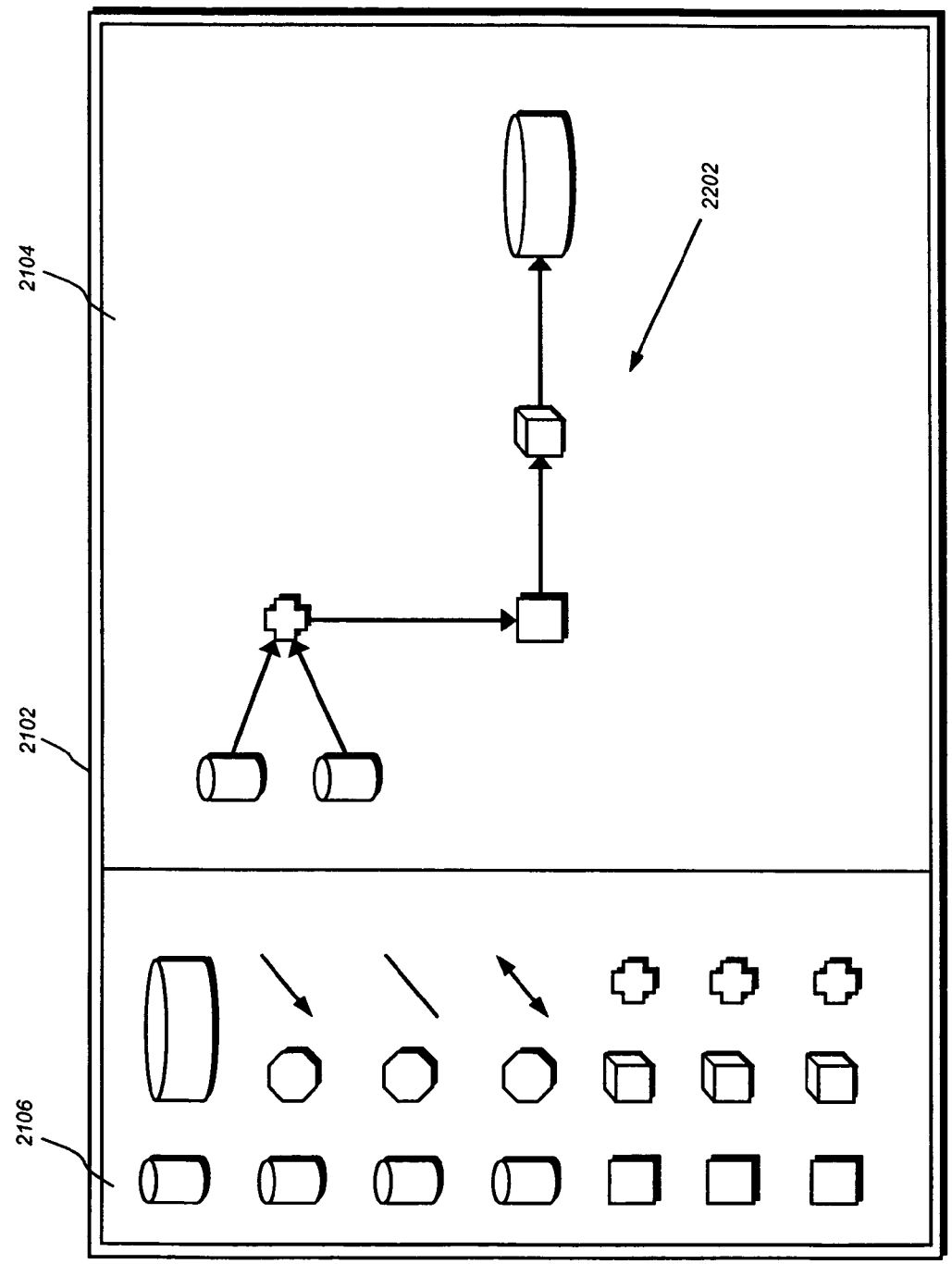
FIG. 22 shows another embodiment of a graphical user interface whereby a data manager can design a data integration job.

FIG. 22 shows another embodiment of a graphical user interface 2102 with which a data manager can design a data integration job 1900. In an embodiment, a user may use the graphical user interface 2102 to select icons that represent data targets/sources, and to associate these icons with functions or other relationships. In this environment, the user may create associations or command structures between the several icons to create a data integration job 2202, which my be any of the data integration jobs 1900 described above.

The user interface 2102 may provide access to numerous resources and design tools within the platform 100 and the data integration system 104. For example, the user interface 2102 may include a type designer data object modeling. The type designer may be used to create and manage type trees that define properties for data structures, define containment of data, create data validation rules, and so on. The type designer may include importers for automatically generating type trees (i.e., data object definitions) for data that is described in formats such as XML, COBOL Copybooks, and structures specific to applications such as SAP R/3, BEA Tuxedo, and PeopleSoft EnterpriseOne.

The user interface 2102 may include a map designer used to formulate transformation and business rules. The map designer may use definitions of data objects created with the type designer as inputs and outputs, and may be used to specify rules for transforming and routing data, as well as the environment for analyzing, compiling and testing the maps that are developed.

A database design interface may be provided as a modeling component to import metadata about queries, tables and stored procedures for data stored in relational databases. The database design interface may identify characteristics, such as update keys and database triggers, of various objects to meet mapping and execution requirements. An integration flow designer may be used to define and manage data integration processes. The integration flow designer may more specifically be used to define interactions among maps and systems of maps, to validate the logical consistency of workflows, and to prepare systems of maps to run. A command server component may be provided for command-driven execution within the graphical user interface. This may be employed, for example, for testing of maps within the map designer environment. A resource registry may provide a resource alias repository, used to abstract parameter settings using aliases that resolve at execution time to specific resources within an enterprise.

The user interface 2102 may also provide access to various administration and management tools. For example, an event server administration tool may be provided from which a user can specify deployment directories, configure users and user access rights, specify listening ports, and define properties for Java Remote Method Invocation ("RMI"). A management console may provide management and monitoring for the event server, from which a user can start, stop, pause, and resume the system, and view information about the status of the even server and maps being run. An event server monitor may provide dynamic detailed views of single maps as they run, and create snapshots of activity at a specific time.

Figure 23:
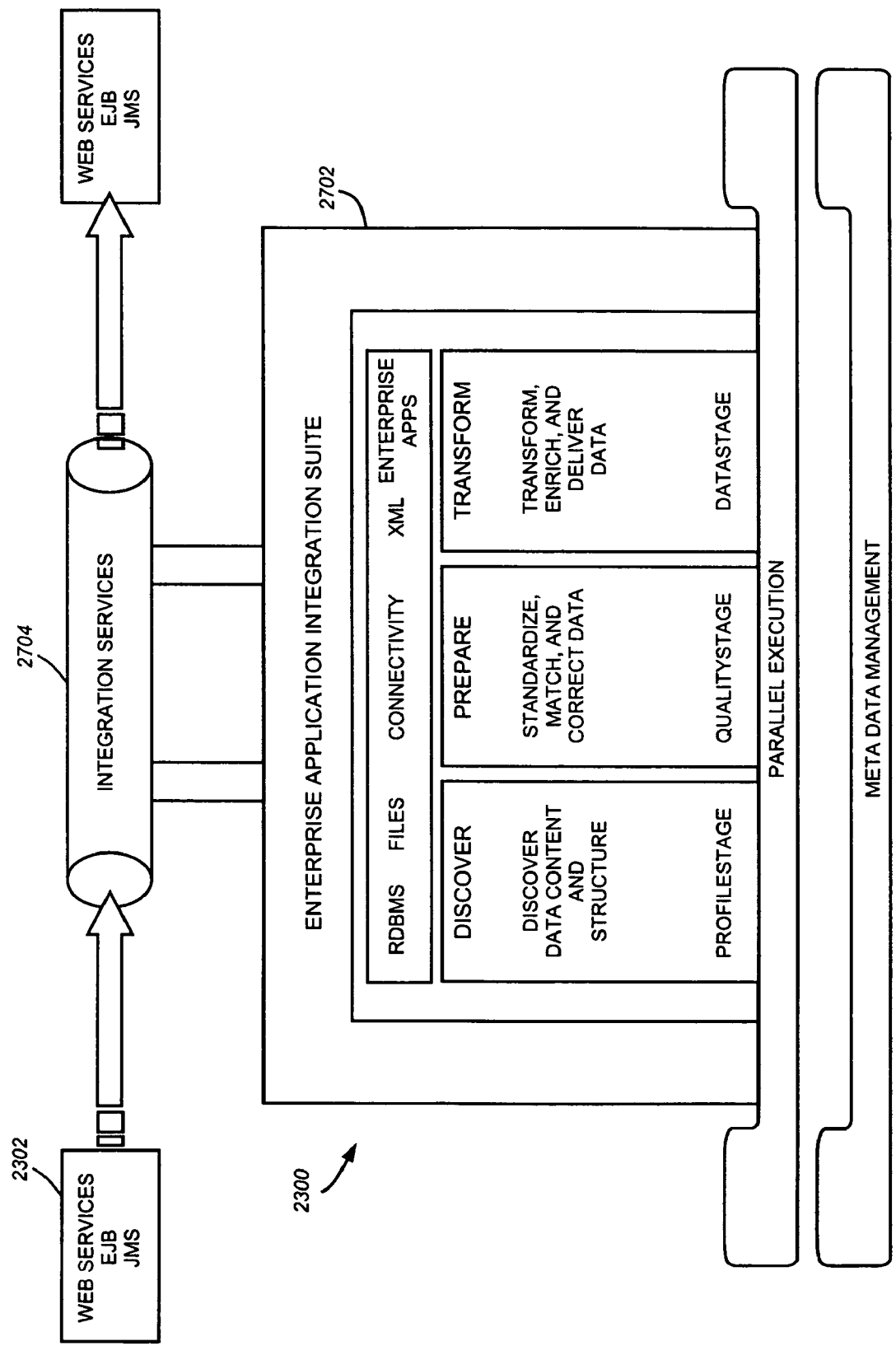
FIG. 23 is a schematic diagram of an architecture for integrating a real time data integration service facility with a data integration process.

FIG. 23 represents a platform 2300 for facilitating integration of various data of a business enterprise. The platform may be, for example, the platform 100 described above, and may include an integration suite that is capable of providing known enterprise application integration (EAI) services, such as extraction of data from various sources, transformation of the data into desired formats and loading of data into various targets, sometimes referred to as ETL (Extract, Transform, Load). The platform 2300 may include a real-time integration ("RTI") service 2704 that facilitates exposing a conventional data integration platform 2702 as a service that can be accessed by computer applications of the enterprise, including through web service protocols 2302 such as Enterprise Java Beans ("EJB") and the Java Messaging Service ("JMS").

Figure 24:
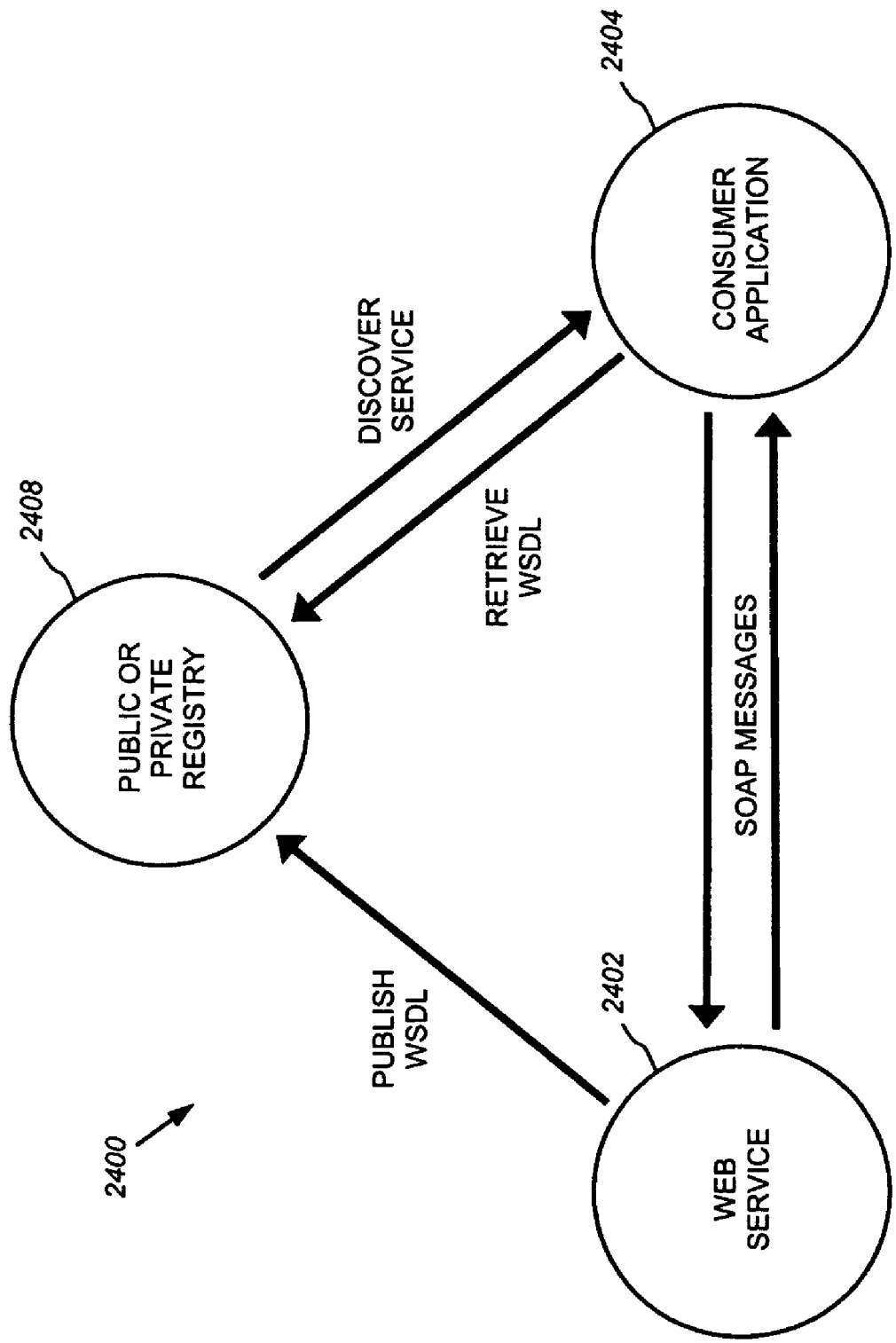
FIG. 24 is a schematic diagram showing a services oriented architecture for a business enterprise.

FIG. 24 shows a schematic diagram of a service-oriented architecture ("SOA") 2400. The SOA can be part of the infrastructure of an enterprise computing system 1300 of a business enterprise. In the SOA 2400, services become building blocks for application development and deployment, allowing rapid application development and avoiding redundant code. Each service embodies a set of business logic or business rules that can be blind to the surrounding environment, such as the source of the data inputs for the service or the targets for the data outputs of the service. As a result, services can be reused in connection with a variety of applications, provided that appropriate inputs and outputs are established between the service and the applications. The service-oriented architecture 2400 allows the service to be protected against environmental changes, so that the architecture functions even if the surrounding computer environment is changed. As a result, services may not need to be recoded as a result of infrastructure changes, which may result in savings of time and effort. The embodiment of FIG. 24 is an embodiment of an SOA 2400 for a web service.

In the SOA 2400 of FIG. 24, there are three entities, a service provider (web service 2402 in this example), a service requester (consumer application 2404 in this example), and a service registry (public or private registry 2408 in this example). The service registry 2408 may be public or private. The service requester 2404 may search a service registry 2408 for an appropriate service. Once an appropriate service is discovered, the service requester 2404 may receive code, such as Web Services Description Language ("WSDL") code, that is necessary to invoke the service. WSDL is a programming language conventionally used to describe web services. The service requester 2404 may then interface with the service provider 2402, such as through messages in appropriate formats (such as the Simple Object Access Protocol ("SOAP") format for web service messages), to invoke the service. The SOAP protocol is a preferred protocol for transferring data in web services. The SOAP protocol defines the exchange format for messages between a web services client and a web services server. The SOAP protocol uses an eXtensible Markup Language ("XML") schema, XML being a generic language specification commonly used in web services for tagging data, although other markup languages may be used.

Figure 25:
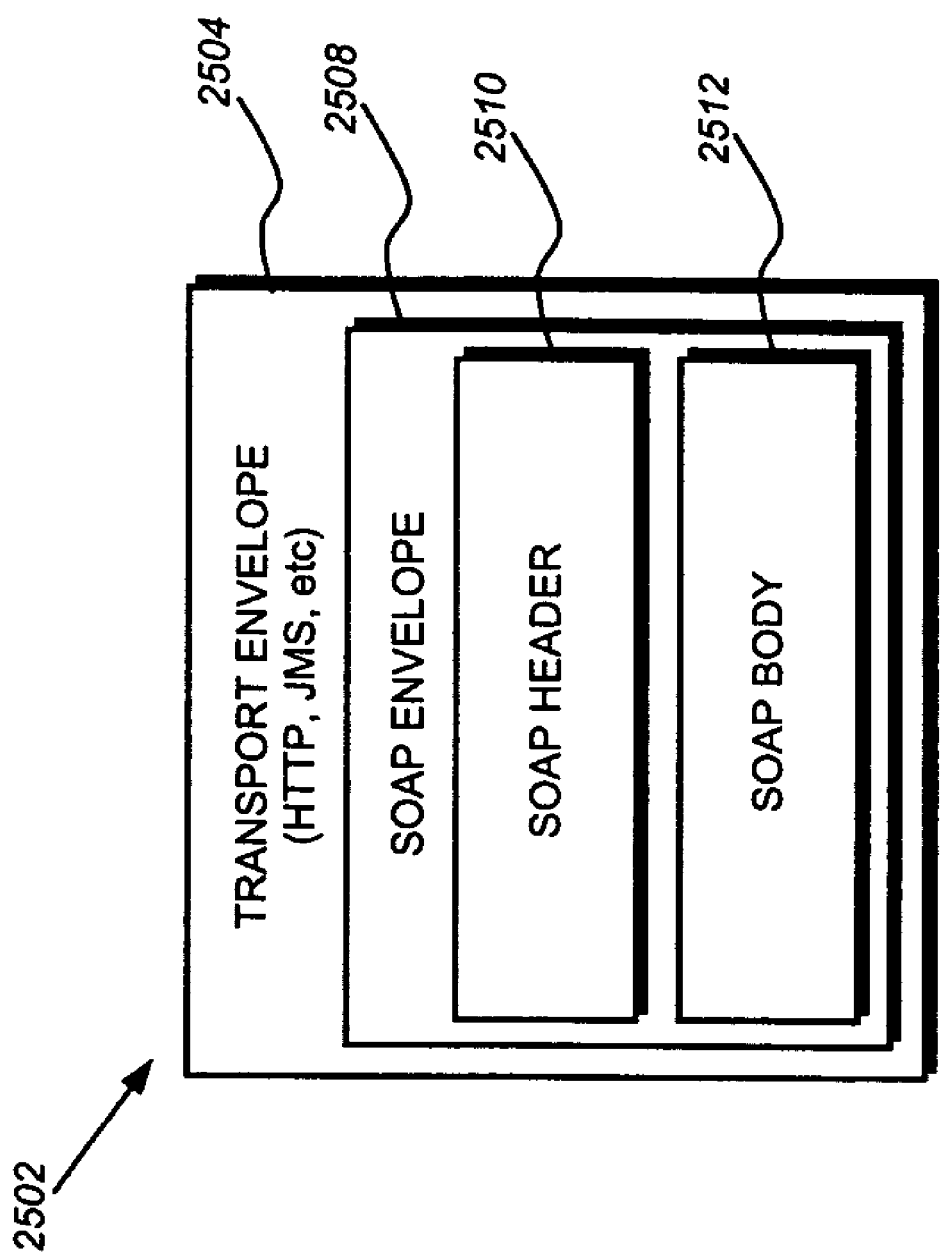
FIG. 25 is a schematic diagram showing a SOAP message format.

FIG. 25 shows an example of a SOAP message. The SOAP message 2502 may include a transport envelope 2504 (such as an HTTP or JMS envelope, or the like), a SOAP envelope 2508, a SOAP header 2510 and a SOAP body 2512. The following is an example of a SOAP-format request message and a SOAP-format response message:

```
request   <SOAP-ENV:Envelope
          xmlns:SOAP-ENV="http://schemas.xmlsoap.org/
          soap/envelope/"
          xmlns:xsi="http://www.w3.org/2001/XMLSchema-instance"
          xmlns:xsd="http://www.w3.org/2001/XMLSchema"
          SOAP-ENV:encodingStyle="http://schemas.xmlsoap.org/
          soap/encoding/">
          <SOAP-ENV:Header></SOAP-ENV:Header>
          <SOAP-ENV:Body>
          <ns:getAddress xmlns:ns="PhoneNumber">
          <name xsi:type="xsd:string">Ascential Software </name>
          </ns:getAddress>
          </SOAP-ENV:Body>
          </SOAP-ENV:Envelope>
response  <SOAP-ENV:Envelope
          xmlns:SOAP-ENV="http://schemas.xmlsoap.org/
          soap/envelope/"
          xmlns:xsi="http://www.w3.org/2001/XMLSchema-instance"
          xmlns:xsd="http://www.w3.org/2001/XMLSchema"
          SOAP-ENV:encodingStyle="http://schemas.xmlsoap.org/soap/
          encoding/">
          <SOAP-ENV:Header></SOAP-ENV:Header>
          <SOAP-ENV:Body>
          <getAddressResponse xmlns="http://schemas.company.com/
          address">
          <number> 50 </number>
          <street> Washington </street>
          <city> Westborough </city>
          <zip> 01581 </zip>
          <state> MA </state>
          </getAddressResponse>
          </SOAP-ENV:Body>
          </SOAP-ENV:Envelope>
```

Web services can be modular, self-describing, self-contained applications that can be published, located and invoked across the web. For example, in the embodiment of the web service of FIG. 24, the service provider 2402 publishes the web service to the registry 2408, which may be, for example, a Universal Description, Discovery and Integration (UDDI) registry, which provides a listing of what web services are available, or a private registry or other public registry. The web service can be published, for example, in WSDL format. To discover the service, the service requester 2404 may browse the service registry and retrieve the WSDL document. The registry 2408 may include a browsing facility and a search facility. The registry 2408 may store the WSDL documents and their metadata.

To invoke the web service, the service requester 2404 sends the service provider 2402 a SOAP message 2502 as described in the WSDL, receives a SOAP message 2502 in response, and decodes the response message as described in the WSDL. Depending on their complexity, web services can provide a wide array of functions, ranging from simple operations, such as requests for data, to complicated business process operations. Once a web service is deployed, other applications (including other web services) can discover and invoke the web service. Other web services standards are being defined by the Web Services Interoperability Organization (WS-I), an open industry organization chartered to promote interoperability of web services across platforms. Examples include WS-Coordination, WS-Security, WS-Transaction, WSIF, BPEL and the like, and the web services described herein should be understood to encompass services contemplated by any such standards.

Figure 26:
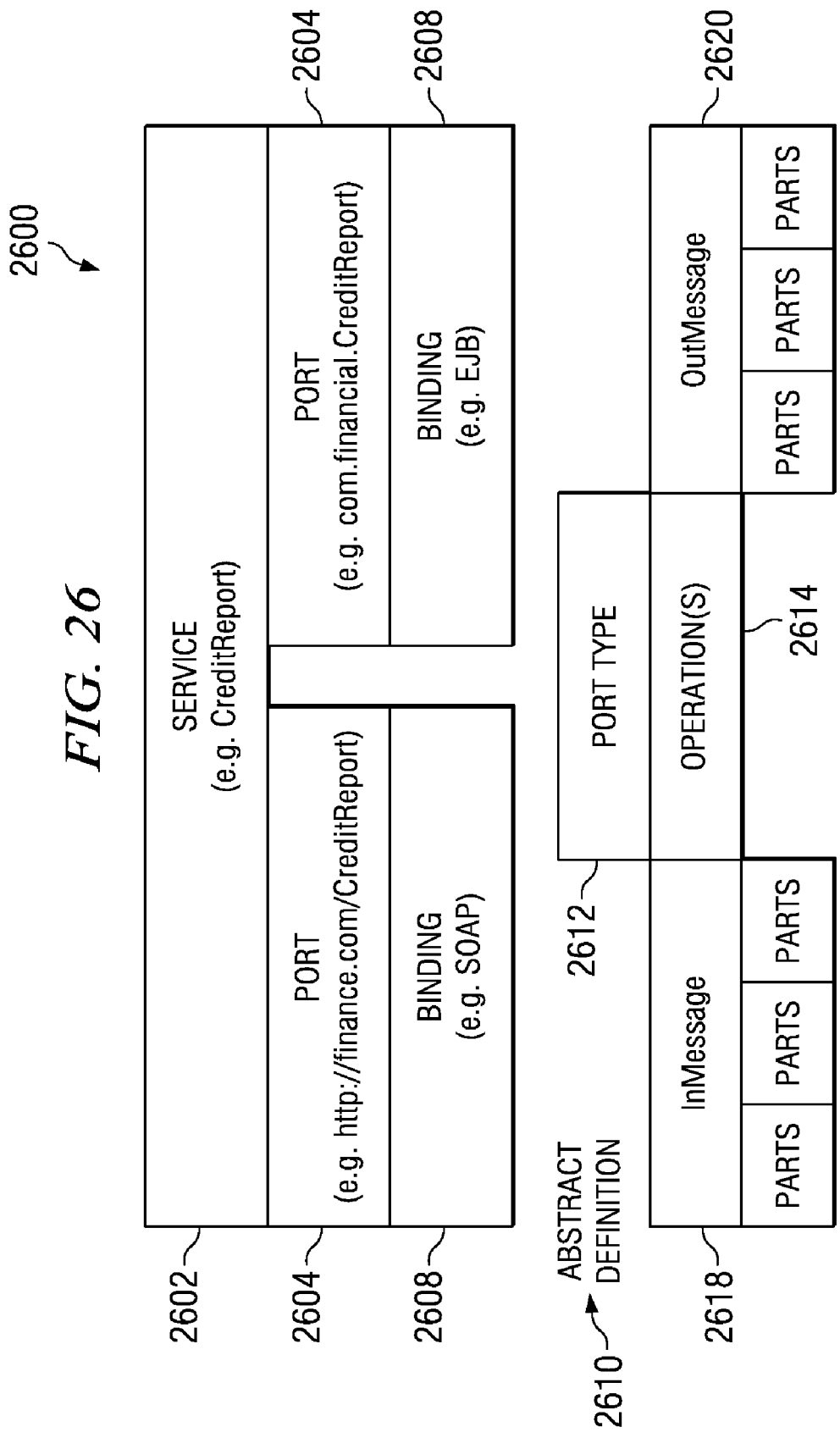
FIG. 26 is a schematic diagram showing elements of a WSDL description for a web service.

Referring to FIG. 26, a WSDL definition 2600 is an XML schema that defines the interface, location and encoding scheme for a web service. The definition 2600 defines the service 2602, identifies the port 2604 through which the service 2602 can be accessed (such as an Internet address), and defines the bindings 2608 (such as Enterprise Java Bean or SOAP bindings) that are used to invoke the web service and communicate with it. The WSDL definition 2600 may include an abstract definition 2610, which may define the port type 2612, incoming message parts 2618 and outgoing message parts 2620 for the web service, as well as the operations 2614 performed by the service.

There are a variety of web services clients from various providers that can invoke web services. Web services clients include .Net applications, Java applications (e.g., JAX-RPC), applications in the Microsoft SOAP toolkit (Microsoft Office, Microsoft SQL Server, and others), applications from SeeBeyond, WebMethods, Tibco and BizTalk, as well as Ascential's DataStage (WS PACK). It should be understood that other web services clients may also be used in the enterprise data integration methods and systems described herein. Similarly, there are various web services providers, including .Net applications, Java applications, applications from Siebel and SAP, I2 applications, DB2 and SQL Server applications, enterprise application integration (EAI) applications, business process management (BPM) applications, and Ascential Software's Real Time Integration (RTI) application, all of which may be used with web services clients as described herein.

The RTI services 2704 described herein may use an open standard specification such as WSDL to describe a data integration process service interface. When a data integration service definition is complete, it can use the WSDL web service definition language (a language that is not necessarily specific to web services), which is an abstract definition that gives what the name of the service, what the operations of the service are, what the signature of each operation is, and the bindings for the service, as described generally above. Within the WSDL definition 2600 (an XML document) there are various tags, with the structure described in connection with FIG. 26. For each service, there can be multiple ports, each of which has a binding. The abstract definition is the RTI service definition for the data integration service in question. The port type is an entry point for a set of operations, each of which has a set of input arguments and output arguments.

WSDL was defined for web services, but with only one binding defined (SOAP over HTTP). WSDL has since been extended through industry bodies to include WSDL extensions for various other bindings, such as EJB, JMS, and the like. An RTI service 2704 may use WSDL extensions to create bindings for various other protocols. Thus, a single RTI data integration service can support multiple bindings at the same time to the single service. As a result, a business can take a data integration process 500, expose it as a set of abstract processes (completely agnostic to protocols), and then add the bindings. A service can support any number of bindings.

A user may take a preexisting data integration job 1900, add appropriate RTI input and output phases, and expose the job as a service that can be invoked by various applications that use different native protocols.

Figure 27:
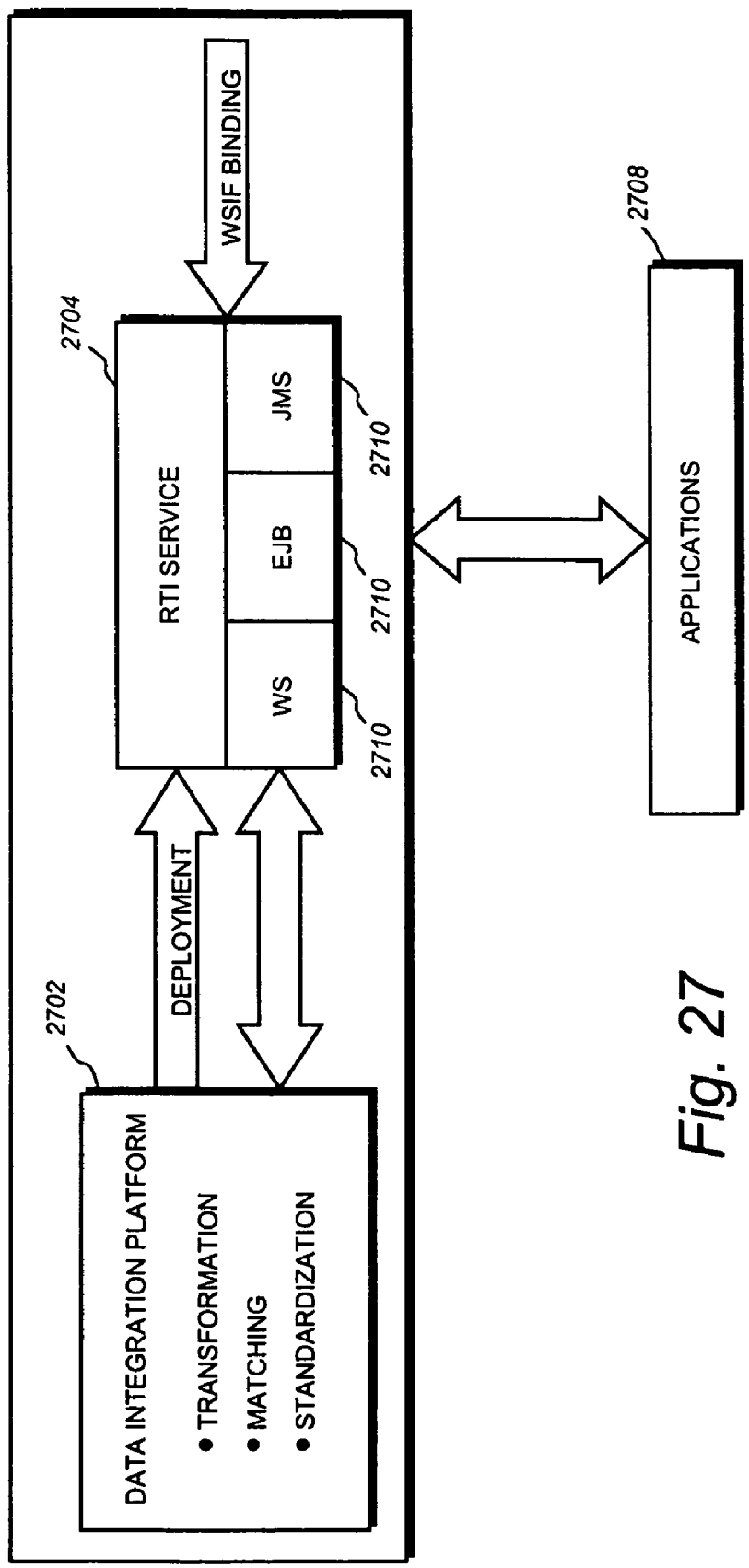
FIG. 27 is a schematic diagram showing elements for enabling a real time data integration process for an enterprise.

Referring to FIG. 27 a high-level architecture is represented for a data integration platform 2700, which may be deployed, for example, across the platform 100 described above and adapted for real time data integration. A conventional data integration facility 2702, which may be, for example, the data integration system 104 described above, may provide methods and systems for processing data integration job. The data integration facility 2702 may connect to one or more applications through a real time integration facility, or RTI service 2704, which comprises a service in a service-oriented architecture. The RTI service 2704 can invoke or be invoked by various applications 2708 of the enterprise. The data integration facility 2702 can provide matching, standardization, transformation, cleansing, discovery, metadata, parallel execution, and similar facilities that are required to perform data integration jobs. In embodiments, the RTI service 2704 exposes the data integration jobs of the data integration facility 2702 as services that can be invoked in real time by applications 2708 of the enterprise. The RTI service 2704 exposes the data integration facility 2702, so that data integration jobs can be used as services, synchronously or asynchronously. The jobs can be called, for example, from enterprise application integration platforms, application server platforms, as well as Java and Net applications. The RTI service 2704 allows the same logic to be reused and applied across batch and real-time services. The RTI service 2704 may be invoked using various bindings 2710, such as Enterprise Java Bean (EJB), Java Message Service (JMS), or web service bindings.

Figure 28:
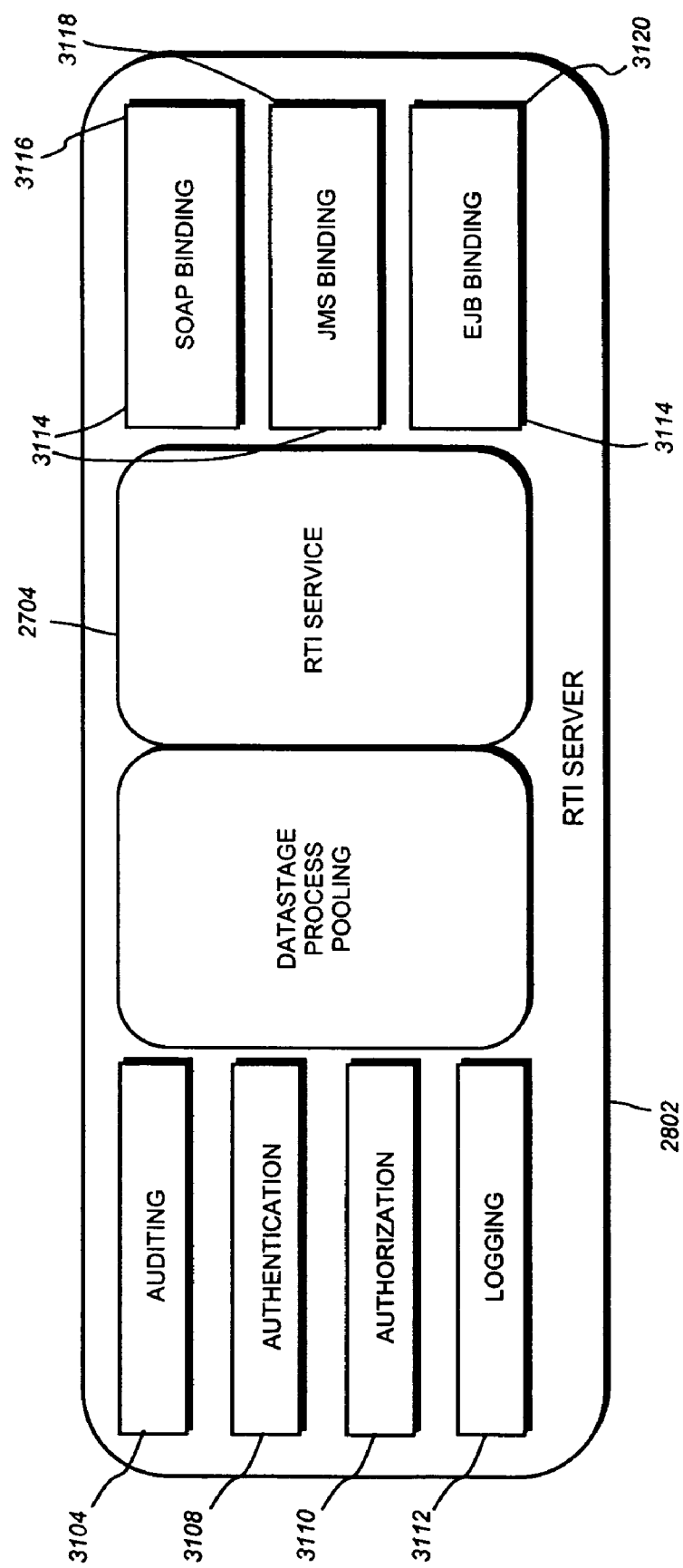
FIG. 28 is an embodiment of a server for enabling a real time integration service.

Referring to FIG. 28, in embodiments, the RTI service 2704 runs on an RTI server 2802, which acts as a connection facility for various elements of the real time data integration process. For example, the RTI server 2802 can connect a plurality of enterprise application integration servers, such as DataStage servers from Ascential Software of Westborough, Mass., so that the RTI server 2802 can provide pooling and load balancing among the other servers. The RTI server 2802 may comprise a separate J2EE application running on a J2EE application server. More than one RTI server 2802 may be included in a data integration process.

J2EE provides a component-based approach to design, development, assembly and deployment of enterprise applications. Among other things, J2EE offers a multi-tiered, distributed application model, the ability to reuse components, a unified security model, and transaction control mechanisms. J2EE applications are made up of components. A J2EE component is a self-contained functional software unit that is assembled into a J2EE application with its related classes and files and that communicates with other components.

The J2EE specification defines various J2EE components, including: application clients and applets, which are components that run on the client side; Java Servlet and JavaServer Pages (JSP) technology components, which are Web components that run on the server; and Enterprise JavaBean (EJB) components (enterprise beans), which are business components that run on the server. J2EE components are written in Java and are compiled in the same way as any program. The difference between J2EE components and "standard" Java classes is that J2EE components are assembled into a J2EE application, verified to be well-formed and in compliance with the J2EE specification, and deployed to production, where they are run and managed by a J2EE server. There are three kinds of EJBs: session beans, entity beans, and message-driven beans. A session bean represents a transient conversation with a client. When the client finishes executing, the session bean and its data are gone. In contrast, an entity bean represents persistent data stored in one row of a database table. If the client terminates or if the server shuts down, the underlying services ensure that the entity bean data is saved. A message-driven bean combines features of a session bean and a Java Message Service ("JMS") message listener, allowing a business component to receive JMS messages asynchronously.

The J2EE specification also defines containers, which are the interface between a component and the low-level platform-specific functionality that supports the component. Before a Web, enterprise bean, or application client component can be executed, it must be assembled into a J2EE application and deployed into its container. The assembly process involves specifying container settings for each component in the J2EE application and for the J2EE application itself. Container settings customize the underlying support provided by the J2EE server, which includes services such as security, transaction management, Java Naming and Directory Interface (JNDI) lookups, and remote connectivity.

Figure 29:
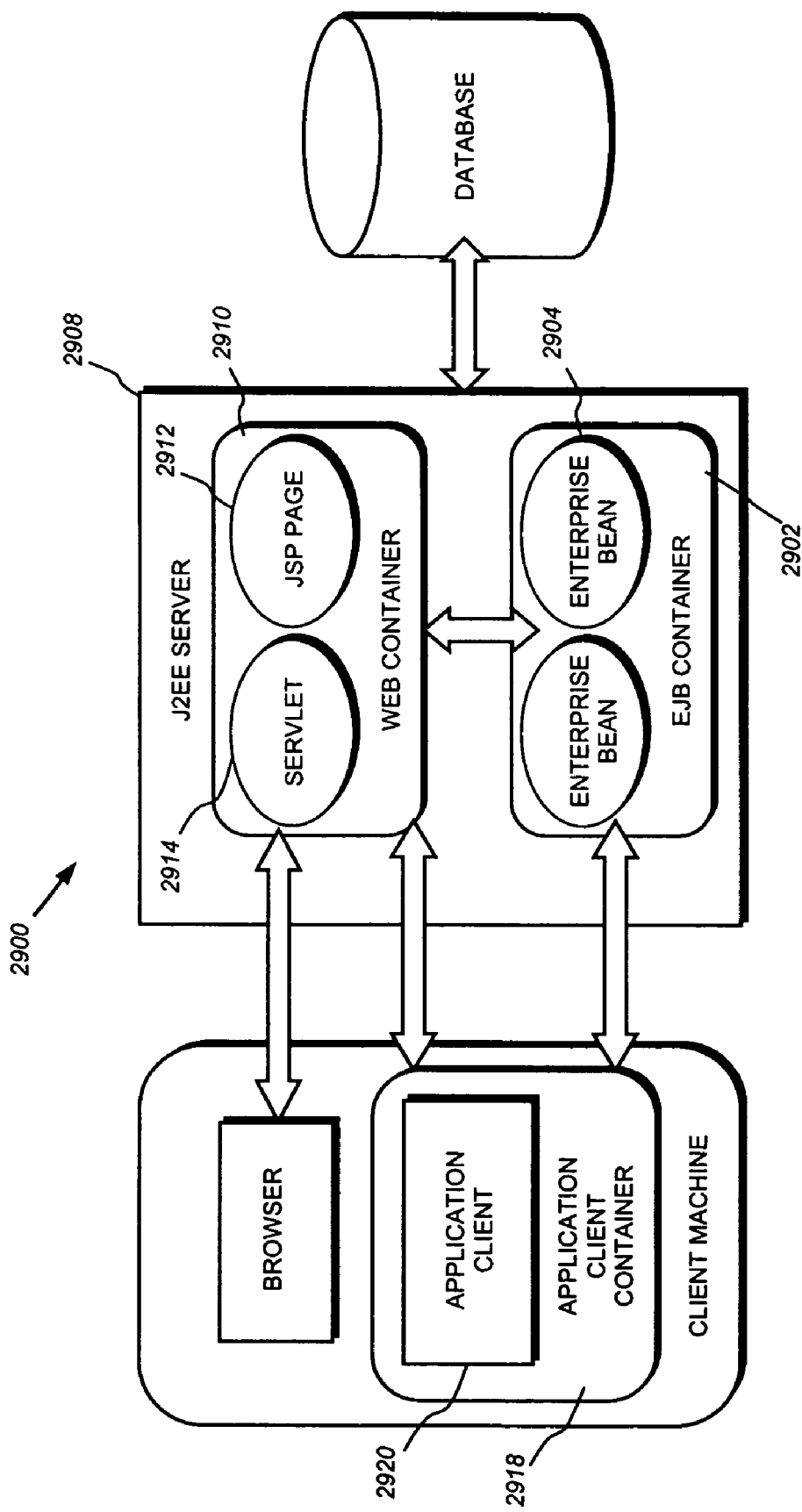
FIG. 29 shows an architecture and functions of a typical J2EE server.

FIG. 29 depicts an architecture 2900 for a typical J2EE server 2908 and related applications. The J2EE server 2908 comprises the runtime aspect of a J2EE architecture. A J2EE server 2908 provides EJB and web containers. The EJB container 2902 manages the execution of enterprise beans 2904 for J2EE applications. Enterprise beans 2904 and their container 2902 run on the J2EE server 2908. The web container 2910 manages the execution of JSP pages 2912 and servlet components 2914 for J2EE applications. Web components and their container 2910 also run on the J2EE server 2908. Meanwhile, an application client container 2918 manages the execution of application client components. Application clients 2920 and their containers 2918 run on the client side. The applet container manages the execution of applets. The applet container may consist of a web browser and a Java plug-in running together on the client.

J2EE components are typically packaged separately and bundled into a J2EE application for deployment. Each component, its related files such as GIF and HTML files or server-side utility classes, and a deployment descriptor are assembled into a module and added to the J2EE application. A J2EE application and each of its modules has its own deployment descriptor. A deployment descriptor is an XML document with an .xml extension that describes a component's deployment settings. A J2EE application with all of its modules is delivered in an Enterprise Archive (EAR) file. An EAR file is a standard Java Archive (JAR) file with an .ear extension. Each EJB JAR file contains a deployment descriptor, the enterprise bean files, and related files. Each application client JAR file contains a deployment descriptor, the class files for the application client, and related files. Each file contains a deployment descriptor, the Web component files, and related resources.

The RTI server 2802 may act as a hosting service for a real time enterprise application integration environment. The RTI server 2802 may be a J2EE server capable of performing the functions described herein. The RTI server 2802 may provide a secure, scaleable platform for enterprise application integration services. The RTI server 2802 may provide a variety of conventional server functions, including session management, logging (such as Apache Log4J logging), configuration and monitoring (such as J2EE JMX), security (such as J2EE JAAS, SSL encryption via J2EE administrator). The RTI server 2802 may serve as a local or private web services registry, and it can be used to publish web services to a public web service registry, such as the UDDI registry used for many conventional web services. The RTI server 2802 may perform resource pooling and load balancing functions among other servers, such as those used to run data integration jobs. The RTI server 2802 can also serve as an administration console for establishing and administering RTI services. The RTI server 2802 may operate in connection with various environments, such as JBOSS 3.0, IBM Websphere 5.0, BEA WebLogic 7.0 and BEA WebLogic 8.1.

Once established, the RTI server 2802 may allow data integration jobs (such as DataStage and QualityStage jobs performed by the Ascential Software platform) to be invoked by web services, enterprise Java beans, Java message service messages, or the like. The approach of using a service-oriented architecture with the RTI server 2802 allows binding decisions to be separated from data integration job design. Also, multiple bindings can be established for the same data integration job. Because the data integration jobs are indifferent to the environment and can work with multiple bindings, it may be easier to reuse processing logic across multiple applications and across batch and real-time modes.

Figure 30:
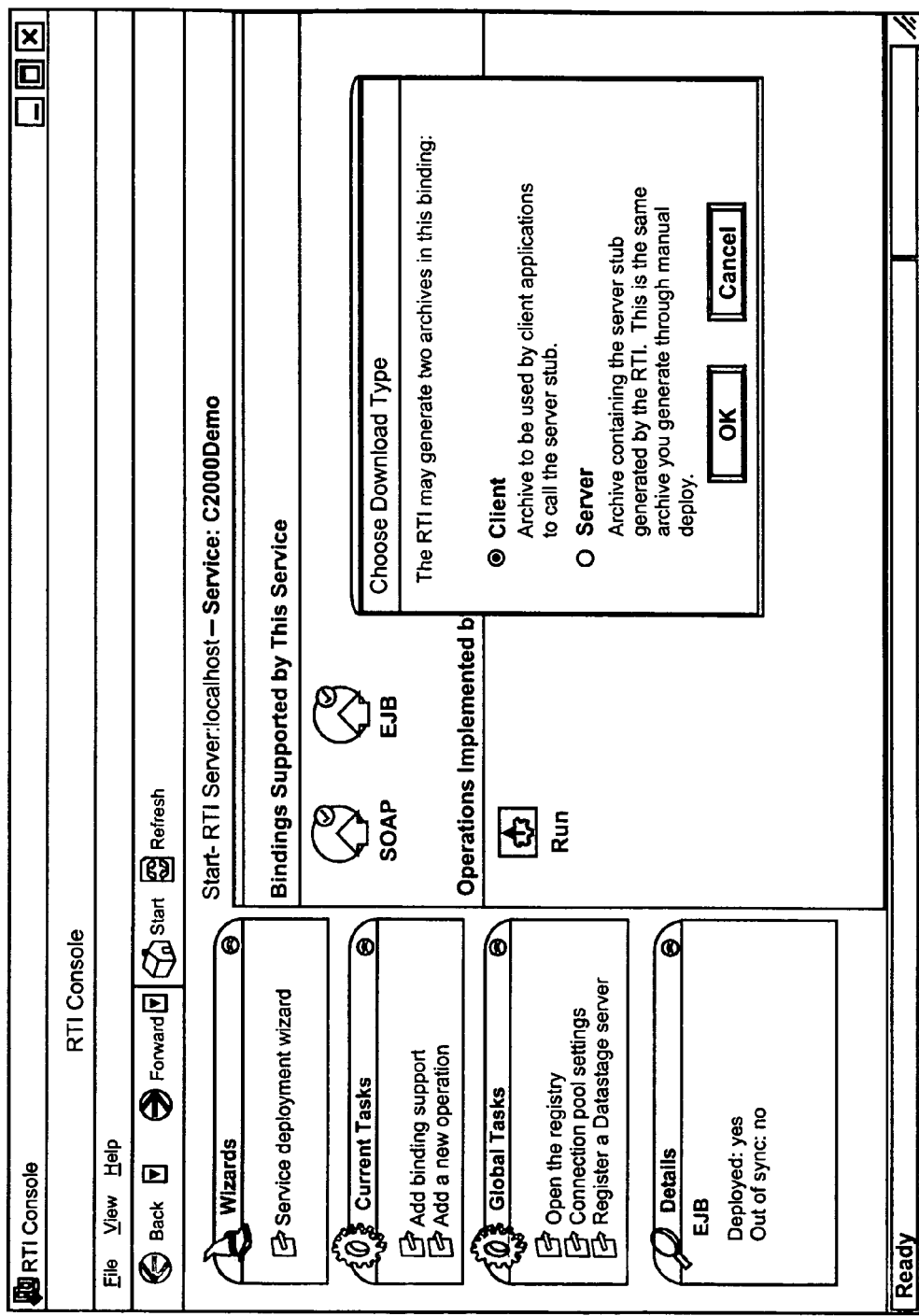
FIG. 30 represents an RTI console for administering an RTI service.

FIG. 30 shows an RTI console 3002 that may be provided for administering an RTI service. The RTI console 3002 may enable the creation and deployment of RTI services. Among other things, the RTI console allows the user to establish what bindings will be used to provide an interface to a given RTI service and to establish parameters for runtime usage of the RTI service. The RTI console may be provided with a graphical user interface and run in any suitable environment for supporting such an interface, such as a Microsoft Windows-based environment, or a web browser interface. Further detail on uses of the RTI console is provided below. The RTI console 3002 may be used by a designer to create a service, create operations of the service, attach a job to the operation of the service and create bindings desired by the user for implementing the service with various protocols.

Referring again to FIG. 27, the RTI service 2704 may sit between the data integration platform 2702 and various applications 2708. The RTI service 2704 may allow the applications 2708 to access the data integration platform 2702 in real time or in batch mode, synchronously or asynchronously. Data integration rules established in the data integration platform 2702 can be shared across an enterprise computing system 1300. The data integration rules may be written in any language, without requiring knowledge of the platform 2702. The RTI service 2704 may leverage web service definitions to facilitate real time data integration. The flow of the data integration job can, in accordance with the methods and systems described herein, be connected to a batch environment or the real time environment. The methods and systems disclosed herein include the concept of a container, a piece of business logic contained between a defined entry point and a defined exit point in a process. By configuring a data integration process as the business logic in a container, the data integration can be used in batch and real time modes. Once business logic is in a container, moving between batch and real time modes may be simple. A data integration job can be accessed as a real time service, and the same data integration job can be accessed in batch mode, such as to process a large batch of files, performing the same transformations as in the real time mode.

Figure 31:
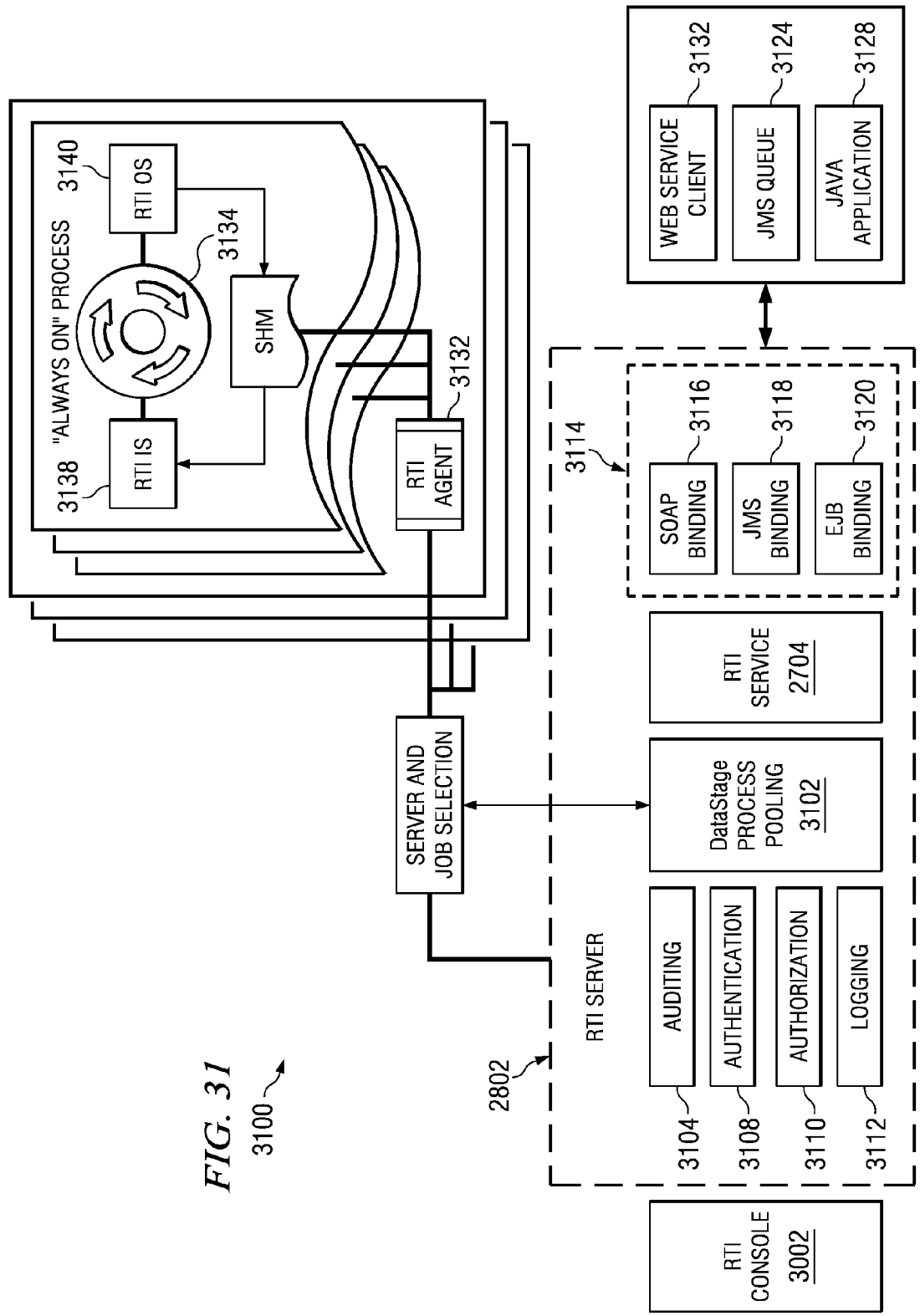
FIG. 31 shows further detail of an architecture for enabling an RTI service.

Referring to FIG. 31, further detail is provided of an architecture 3100 for enabling an embodiment of an RTI service 2704. The RTI server 2802 may include various components, including facilities for auditing 3104, authentication 3108, authorization 3110 and logging 3112, such as those provided by a typical J2EE-compliant server. The RTI server 2802 may also include a process pooling facility 3102, which can operate to pool and allocate resources, such as resources associated with data integration jobs running on data integration platforms 2702. The process pooling facility 3102 may provide server and job selection across various servers that are running data integration jobs. Selection may be based on balancing the load among machines, or based on which data integration jobs are capable of running (or running most effectively) on which machines. The RTI server 2802 may also include binding facilities 3114, such as a SOAP binding facility 3116, a JMS binding facility 3118, and an EJB binding facility 3120. The binding facilities 3114 allow the interface between the RTI server 2802 and various applications, such as the web service client 3122, the JMS queue 3124 or a Java application 3128.

Referring still to FIG. 31, the RTI console 3002 may be the administration console for the RTI server 2802. The RTI console 3002 may allow an administrator to create and deploy an RTI service, configure the runtime parameters of the service, and define the bindings or interfaces to the service.

The architecture 3100 may include one or more data integration platforms 2702, which may comprise servers, such as DataStage servers provided by Ascential Software of Westborough, Mass. The data integration platforms 2702 may include facilities for supporting interaction with the RTI server 2802, including an RTI agent 3132, which is a process running on the data integration platform 2702 that marshals requests to and from the RTI server 2802. Thus, once the process pooling facility 3102 selects a particular machine as the data integration platform 2702 for a real time data integration job, it may hand the request to the RTI agent 3132 for that data integration platform 2702. On the data integration platform 2702, one or more data integration jobs 3134, such as the data integration jobs 1900 described above, may be running. The data integration jobs 3134 may optionally always be on, rather than having to be initiated at the time of invocation. For example, the data integration jobs 3134 may have already-open connections with databases, web services, and the like, waiting for data to come and invoke the data integration job 3134, rather than having to open new connections at the time of processing. Thus, an instance of the already-on data integration job 3134 may be invoked by the RTI agent 3132 and can commence immediately with execution of the data integration job 3134, using the particular inputs from the RTI server 2802, which might be a file, a row of data, a batch of data, or the like.

Each data integration job 3134 may include an RTI input stage 3138 and an RTI output stage 3140. The RTI input stage 3138 is the entry point to the data integration job 3134 from the RTI agent 3132 and the RTI output stage 3140 is the output stage back to the RTI agent 3132. With the RTI input and output stages, the data integration job 3134 can be a piece of business logic that is platform independent. The RTI server 2802 knows what inputs are required for the RTI input stage 3138 of each RTI data integration job 3134. For example, if the business logic of a given data integration job 3134 takes a customer's last name and age as inputs, then the RTI server 2802 may pass inputs in the form of a string and an integer to the RTI input stage 3138 of that data integration job 3134. The RTI input stage takes the input and formats it appropriate for whatever native application code is used to execute the data integration job 3134.

In embodiments, the methods and systems described herein may enable a designer to define automatic, customizable mapping machinery from a data integration process to an RTI service interface. In particular, the RTI console 3002 may allow the designer to create an automated service interface for the data integration process. Among other things, it may allow a user (or a set of rules or a program) to customize the generic service interface to fit a specific purpose. When there is a data integration job, with a flow of transactions, such as transformations, and with the RTI input stage 3138 and RTI output stage 3140, metadata for the job may indicate, for example, the format of data exchanged between components or stages of the job. A table definition describes what the RTI input stage 3138 expects to receive; for example, the input stage of the data integration job might expect three calls: one string and two integers. Meanwhile, at the end of the data integration job flow the output stage may return calls that are in the form (string, integer). When the user creates an RTI service that is going to use this job, it is desirable for the operation that is defined to reflect what data is expected at the input and what data is going to be returned at the output. Compared to a conventional object-oriented programming method, a service corresponds to a class, and an operation to a method, where a job defines the signature of the operation based on metadata, such as an RTI input table associated with the RTI input stage 3138 and an RTI output table associated with the RTI output stage 3140.

By way of example, a user might define (string, int, int) as the input arguments for a particular RTI operation at the RTI input table. One could define the outputs in the RTI output table as a struct: (string; int). In embodiments the input and output might be single strings. If there are other fields (more calls), the user can customize the input mapping. Instead of having an operation with fifteen integers, the user can create a STRUCT (a complex type with multiple fields, each field corresponding to a complex operations), such as Opt (stuct (string, int, int)):struct (string, int). The user can group the input parameters so that they are grouped as one complex input type. As a result, it is possible to handle an array, so that the transaction is defined as: Opt1(array(struct(string, int, int). For example, the input structure could be (Name, SSN, age) and the output structure could be (Name, birthday). The array can be passed through the RTI service. At the end, the service outputs the corresponding reply for the array. Arrays allow grouping of multiple rows into a single transaction. In the RTI console 3002, a checkbox allows the user to "accept multiple rows" in order to enable arrays. To define the inputs, in the RTI console 3002, a particular row may be checked or unchecked to determine whether it will become part of the signature of the operation as an input. A user may not want to expose a particular input column to the operation (for example because it may always be the same for a particular operation), in which case the user can fix a static value for the input, so that the operation only sees the variables that are not static values.

A similar process may be used to map outputs for an operation, such as using the RTI console to ignore certain columns of output, an action that can be stored as part of the signature of a particular operation.

In embodiments, RTI service requests that pass through the data integration platform 2702 from the RTI server 2802 are delivered in a pipeline of individual requests, rather than in a batch or large set of files. The pipeline approach allows individual service requests to be picked up immediately by an already-running instance of a data integration job 3134, resulting in rapid, real-time data integration, rather than requiring the enterprise to wait for completion of a batch integration job. Service requests passing through the pipeline can be thought of as waves, and each service request can be marked by a start of wave marker and an end of wave marker, so that the RTI agent 3132 recognizes the initiation of a new service request and the completion of a data integration job 3134 for a particular service request.

The use of an end-of-wave marker may permit the system to do both batch and real time operations with the same service. In a batch environment a data integration user typically wants to optimize the flow of data, such as to do the maximum amount of processing at a given stage, then transmit to the next stage in bulk, to reduce the number of times data has to be moved, because data movement is resource-intensive. In contrast, in a real time process, the data integration user may want to move each transaction request as fast as possible through the flow. The end-of-wave marker sends a signal that informs the job instance to flush the particular request on through the data integration job, rather than waiting for more data to start the processing (as a system typically would do in batch mode). A benefit of end-of-wave markers is that a given job instance can process multiple transactions at the same time, each of which is separated from others by end-of-wave markers. Whatever is between two end-of-wave markers is a transaction. So the end-of-wave markers delineate a succession of units of work, each unit being separated by end-of-wave markers.

Pipelining allows multiple requests to be processed simultaneously by a service. The load balancing algorithm of the process pooling facility 3102 may fill a single instance to its maximum capacity (filling the pipeline) before starting a new instance of the data integration job. In a real time integration model, when you have a recall being processed in real time (unlike in a batch mode where the system typically fills a buffer before processing the batch) the end-of-wave markers may allow pipelining the multiple transactions into the flow of the data integration job. For load balancing, it may be desirable for the balance not to be based only on whether a job is busy, because a job may be busy, while still having unused throughput capacity.

On the other hand, it may be desirable to avoid starting new data integration job instances before the capacity of the pipeline has reached its maximum. This means that load balancing needs to be dynamic and based on additional properties. In the RTI agent process, the RTI agent 3132 knows about the instances running on each data integration platform 2702 accessed by the RTI server 2802. In the RTI agent 3132, the user can create a buffer for each of the job instances running on the data integration platform 2702. Various parameters can be set in the RTI console 3002 to help with dynamic load balancing. One parameter is the maximum size for the buffer (measured in number of requests) that can be placed in the buffer waiting for handling by the job instance. It may be preferable to have only a single request, resulting in constant throughput, but in practice there are usually variances in throughput, so that it is often desirable to have a buffer for each job instance. A second parameter is the pipeline threshold, which is a parameter that says at what point it may be desirable to initiate a new job instance. In embodiments, the threshold may generate a warning indicator, rather than automatically starting a new instance, because the delay may be the result of an anomalous increase in traffic. A third parameter may determine that if the threshold is exceeded for more than a specified period of time, then a new instance will be started. In sum, pipelining properties, such as the buffer size, threshold, and instance start delay, are parameters that the user may control.

In embodiments, all of the data integration platforms 2702 are machines using the DataStage server from Ascential Software. On each of them, there can be data integration jobs 3134, which may be DataStage jobs. The presence of the RTI input stage 3138 means that a job 3134 is always up and running and waiting for a request, unlike in a batch mode, where a job instance is initiated at the time of batch processing. In operation, the data integration job 3134 is up and running with all of its requisite connections with databases, web services, and the like, and the RTI input stage 3134 is listening, waiting for some data to come. For each transaction an end-of-wave marker may travel through the stages of the data integration job 3134. RTI input stage 3138 and RTI output stage 3140 are the communication points between the data integration job 3134 and the rest of the RTI service environment.

For example, a computer application of the business enterprise may send a request for a transaction. The RTI server 2802 may determine that RTI data integration jobs 3134 are running on various data integration platforms 2702, which in an embodiment are DataStage servers from Ascential Software. The RTI server 2802 may map the data in the request from the computer application into what the RTI input stage 3138 needs to see for the particular data integration job 3134. The RTI agent 3132 may track what is running on each of the data integration platforms 2702. The RTI agent 3132 may operate with shared memory with the RTI input stage 3138 and the RTI output stage 3140. The RTI agent 3132 may mark a transaction with end-of-wave markers, sends the transaction into the RTI input stage 3138, then, recognizing the end-of-wave marker as the data integration job 3134 is completed, take the result out of the RTI output stage 3140 and send the result back to the computer application that initiated the transaction.

The RTI methods and systems described herein may allow data integration processes to be exposed as a set of managed abstract services, accessible by late binding multiple access protocols. Using a data integration platform 2702, such as the Ascential platform, the user may create data integration processes (typically represented by a flow in a graphical user interface). The user may then expose the processes defined by the flow as a service that can be invoked in real time, synchronously or asynchronously, by various applications. To take greatest advantage of the RTI service, it may be desirable to support various protocols, such as JMS queues (where the process can post data to a queue and an application can retrieve data from the queue), Java classes, and web services. Binding multiple access protocols allows various applications to access the RTI service. Since the bindings handle application-specific protocol requirements, the RTI service can be defined as an abstract service. The abstract service is defined by what the service is doing, rather than by a specific protocol or environment. More generally, the RTI services may be published in a directory and shared with numerous users.

An RTI service can have multiple operations, and each operation may be implemented by a job. To create the service, the user doesn't need to know about the particular web service, java class, or the like. When designing the data integration job that will be exposed through the RTI service, the user doesn't need to know how the service is going to be called. The user may build the RTI service, and then for a given data integration request the system may execute the RTI service. At some point the user binds the RTI service to one or more protocols, which could be a web service, Enterprise Java Bean (EJB), JMS, JMX, C++ or any of a great number of protocols that can embody the service. For a particular RTI service, there may be several bindings, so that the service can be accessed by different applications with different protocols.

Once an RTI service is defined, the user can attach a binding, or multiple bindings, so that multiple applications using different protocols can invoke the RTI service at the same time. In a conventional WSDL document, the service definition includes a port type, but necessarily tells how the service is called. A user can define all the types that can be attached to the particular WSDL-defined jobs. Examples include SOAP over HTTP, EJB, Text Over JMS, and others. For example, to create an EJB binding the RTI server 2802 is going to generate Java source code of an Enterprise Java Bean. At service deployment the user uses the RTI console 3002 to define properties, compile code, create a Java archive file, and then give that to the user of an enterprise application to deploy in the users Java application server, so that each operation is one method of the Java class. As a result, there may be a one to one correspondence between an RTI service name and a Java class name, as well as a correspondence between an RTI operation name and a Java method name. As a result, Java application method calls will call the operation in the RTI service. As a result, a web service using SOAP over HTTP and a Java application using an EJB can go to the exact same data integration job via the RTI service. The entry point and exit points don't require a specific protocol, so the same job may be working on multiple protocols.

While SOAP and EJB bindings support synchronous processes, other bindings support asynchronous processes. For example, SOAP over JMS and Text over JMS are asynchronous. For example, in an embodiment a message can be attached to a queue. The RTI service can monitor asynchronous inputs to the input queue and asynchronously post the output to another queue.

Figure 32:
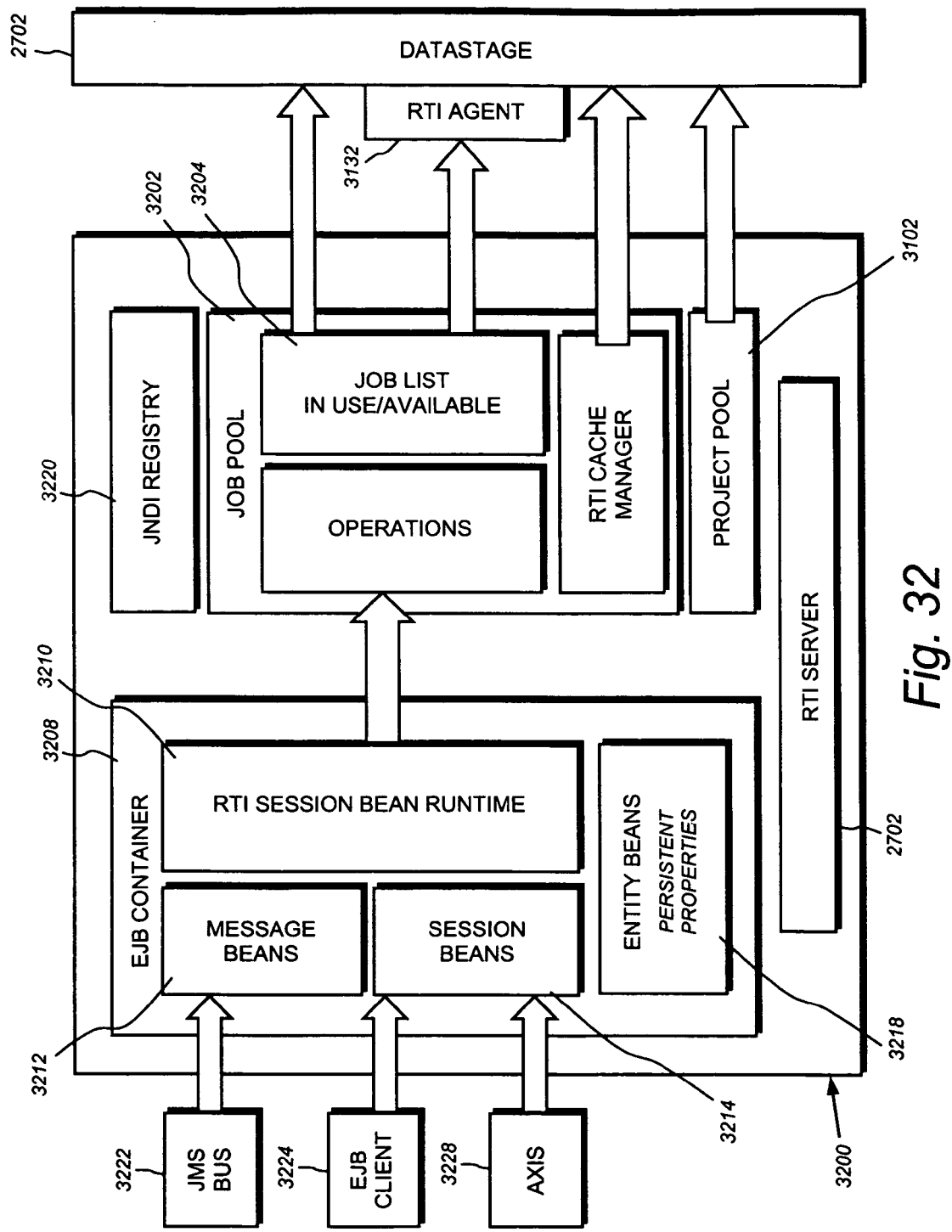
FIG. 32 is a schematic diagram of the internal architecture for an RTI service.

FIG. 32 is a schematic diagram 3200 of the internal architecture for an RTI service. The architecture includes the RTI server 2802, which is a J2EE-compliant server. The RTI server 2802 interacts with the RTI agent 3132 of the data integration platform 2702. The project pool facility 3102 manages projects by selecting the appropriate data integration platform machine 2702 to which a data integration job will be passed. The RTI server 2802 includes a job pool facility 3202 for handling data integration jobs. The job pool facility 3202 includes a job list 3204, which lists jobs and a status of whether each is available or not. The job pool facility may include a cache manager and operations facility for handling jobs that are passed to the RTI server 2802. The RTI server 2802 may also include a registry facility 3220 for managing interactions with an appropriate public or private registry, such as publishing WSDL descriptions to the registry for services that can be accessed through the RTI server 2802.

The RTI server 2802 may also include an EJB container 3208, which includes an RTI session bean runtime facility 3210 for the RTI services, in accordance with J2EE. The EJB container 3208 may include message beans 3212, session beans 3214, and entity beans 3218 for enabling the RTI service. The EJB container 3208 may facilitate various interfaces, including a JMS interface 3222, and EJB client interface 3224 and an Axis interface 3228.

Figure 33:
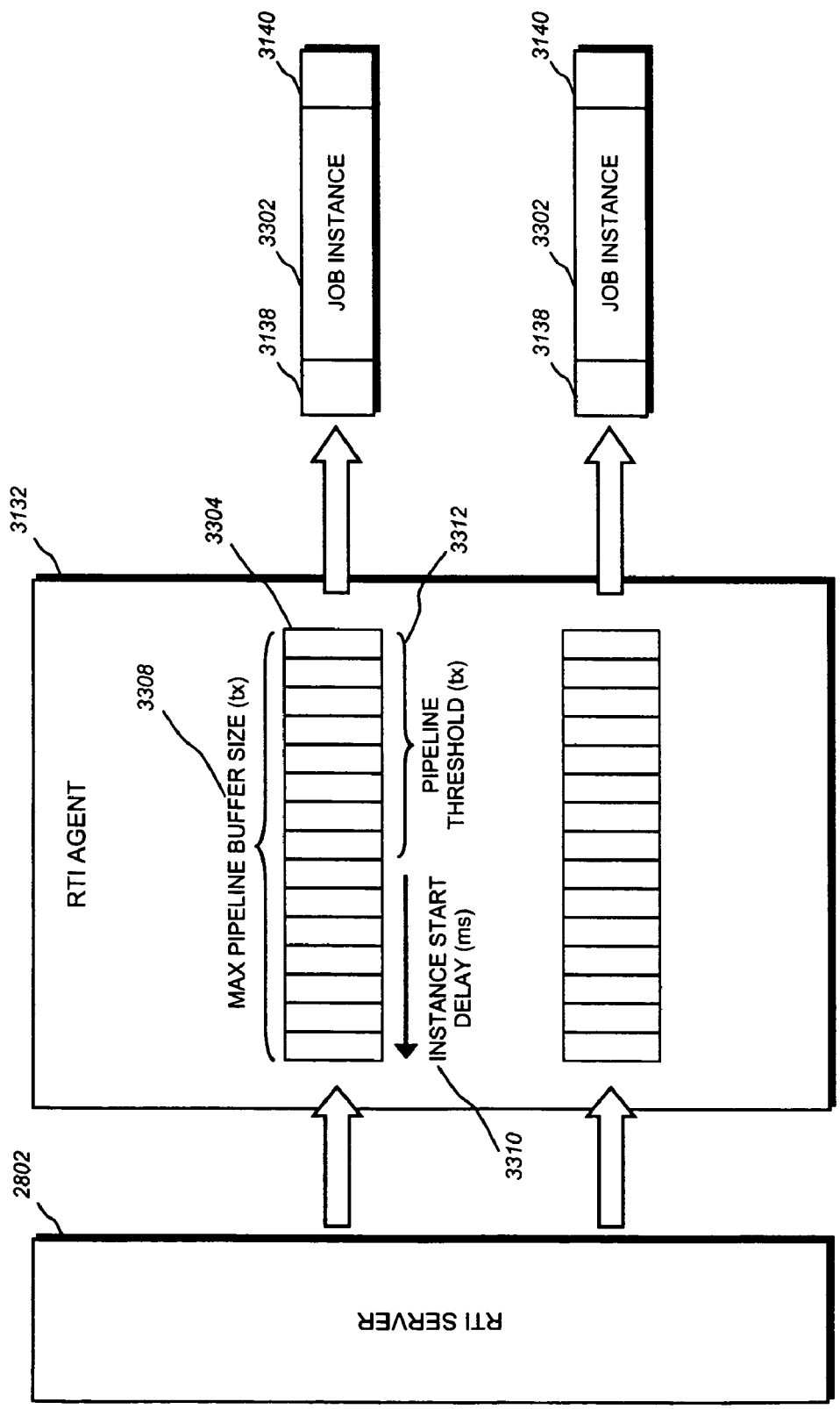
FIG. 33 illustrates an aspect of the interaction of the RTI server and an RTI agent.

Referring to FIG. 33, an aspect of the interaction of the RTI server 2802 and the RTI agent 3132 is that RTI agent 3132 manages a pipeline of service requests, which are then passed to a job instance 3302 for the data integration job. The job instance 3302 runs on the data integration platform 2702, and has an RTI input stage 3138 and RTI output stage 3140. Depending on need, more than one job instance 3302 may be running on a particular data integration platform 2702. The RTI agent 3132 manages the opening and closing of job instances as service requests are passed to it from the RTI server 2802. In contrast to traditional batch-type data integration, each request for an RTI service travels through the RTI server 2802, RTI agent 3132, and data integration platform 2702 in a pipeline 3304 of jobs. The pipeline 3304 can be managed in the RTI agent 3132, such as by setting various parameters of the pipeline 3304. For example, the pipeline 3304 can have a buffer, the size of which can be set by the user using a maximum buffer size parameter 3308. The administrator can also set other parameters, such as the period of delay that the RTI agent 3132 will accept before starting a new job instance 3302, namely, the instance start delay 3310. The administrator can also set a threshold 3312 for the pipeline, representing the number of service requests that the pipeline can accept for a given job instance 3302.

An RTI service can be managed in a registry that can be searched. The RTI service can have added to it an already-written application that is using the protocol that is attached to the service. For example, a customer management operation, such as adding a customer, removing a customer, or validating a customer address can use or be attached to a known web service protocol. The customer management applications may be attached to an RTI service, where the application is a client of the RTI service. In other words, a predefined application can be attached to the RTI service where the application calls or uses the RTI service. The result is that the user can download a service on demand to a particular device and run it from (or on) the device. For example, a mobile computing device such as a pocket PC may have a hosting environment. The mobile computing device may have an application, such as one for mobile data integration services, with a number of downloaded applications and available applications. The mobile device may browse applications. When it downloads the application that is attached to an RTI service, the application is downloaded over the air to the mobile device, but it invokes the RTI service attached to it at the same time. As a result, the user can have mobile application deployment, while simultaneously having access to real time, integrated data from the enterprise. Thus, RTI services may offer a highly effective model for mobile computing applications where an enterprise benefits from having the user have up-to-date data.

Having now described various aspects of a data integration system 104 for an enterprise computing system 1300 in its generic form, several examples of the data integration system 104 will now be provided encompassing various commercial and other applications.

Figure 34:
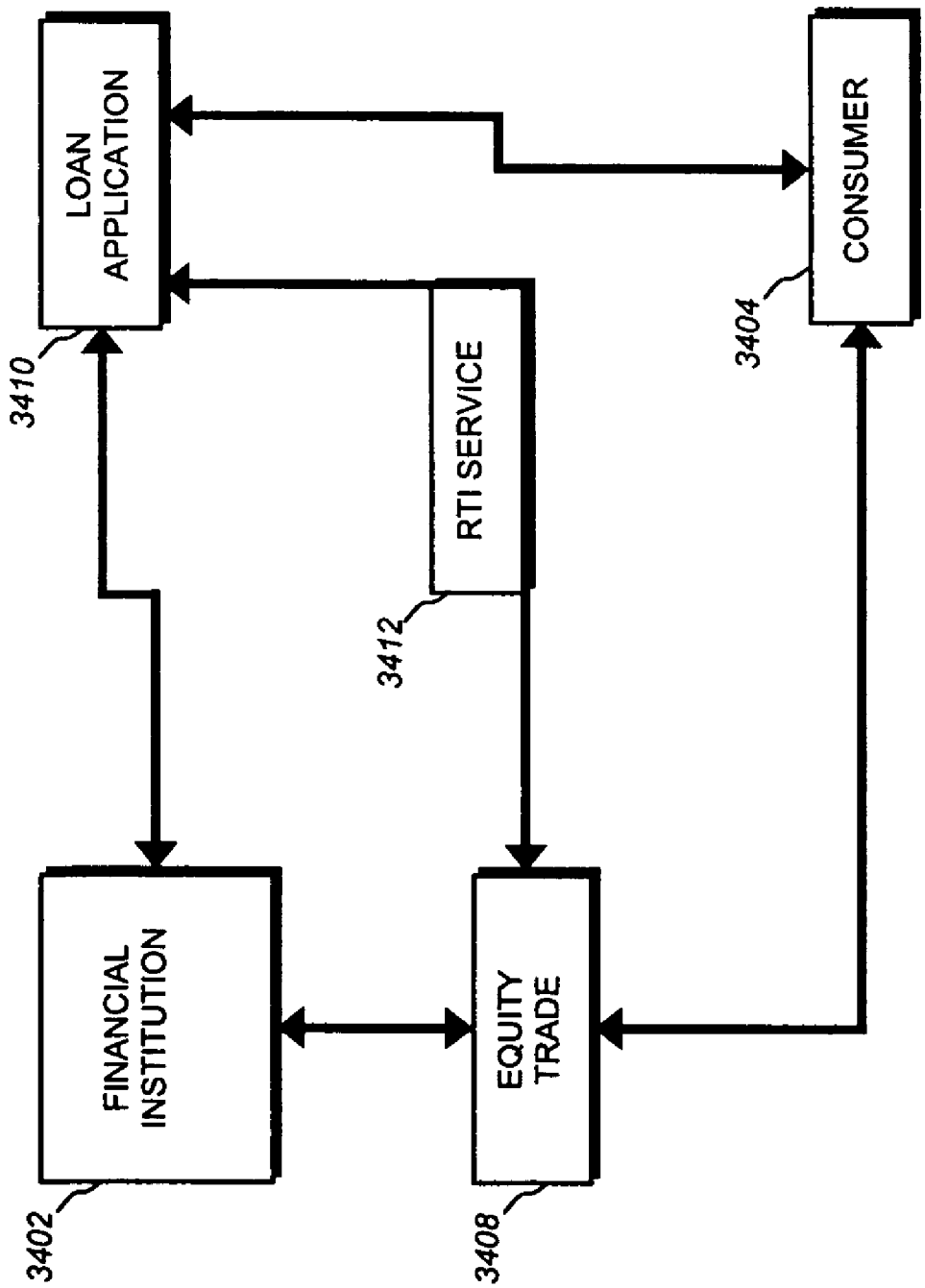
FIG. 34 illustrates an RTI service used in a financial services business.

As shown in FIG. 34, a data integration system 104 with RTI services 2704 may be used in connection with the financial services industry. Real time data integration may allow a business enterprise in the financial services industry to avoid risks that would otherwise be present. For example, if one branch of a financial institution 3402 handles a loan application 3410 of a consumer 3404, while another branch executes trades in equities 3408, the institution 3402 may be undertaking more risk in making the loan than it would otherwise be willing to take. Real time data integration allows the financial institution to have a more accurate profile of the consumer 3404 at the time a given transaction is executed. Thus, an RTI service 3412 may allow a computer application associated with the loan application to request up-to-the-minute data about the consumer's 3404 equity account, which can be retrieved through the RTI service 3412 from data associated with applications of the financial institution 3402 that handle equity trades 3408. Of course, not only financial institutions, but finance departments of many enterprises may make similar financial decisions that could benefit from real time data integration.

Figure 35:
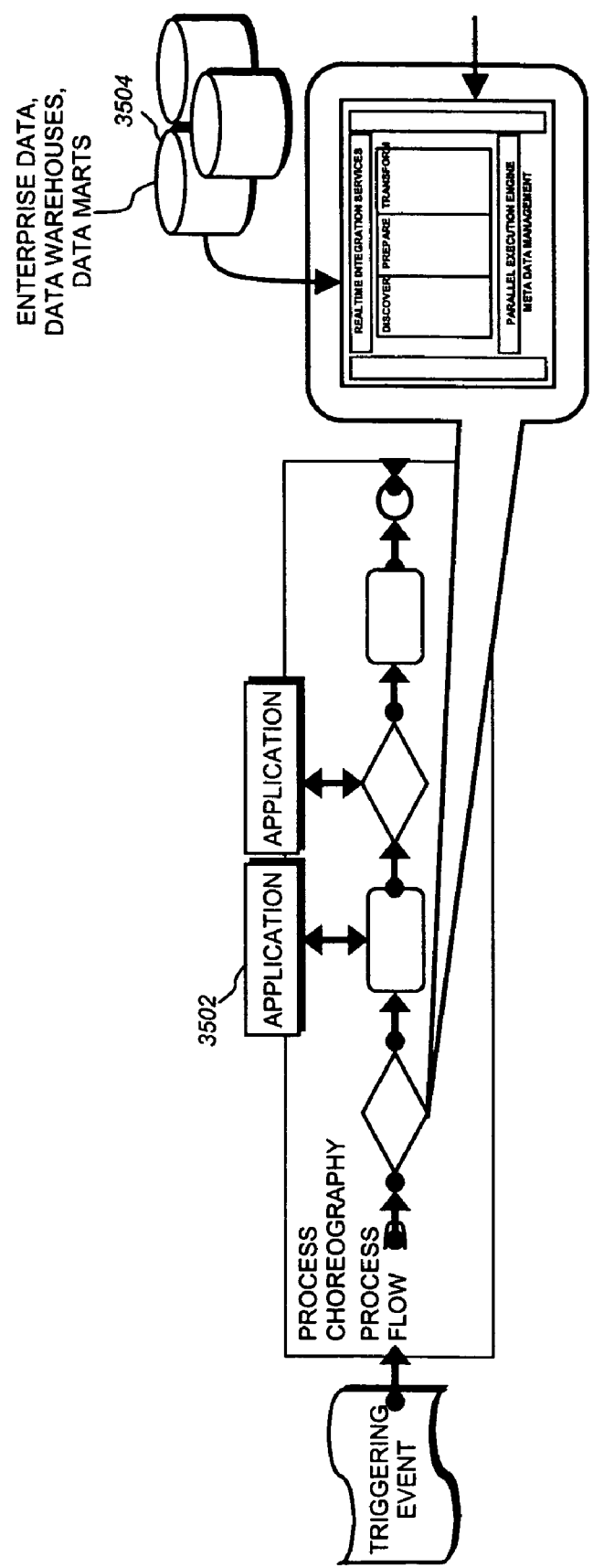
FIG. 35 shows how an enterprise may update customer records using RTI services.

Business enterprises can benefit from real time data integration services, such as the RTI services described herein, in a wide variety of environments and for many purposes. One example is in the area of operational reporting and analysis. Among other things, RTI services may provide a consolidated view of real time transactional analysis with large volume batch data. Referring to FIG. 35, an RTI service 3502 can be constructed that calls out in real time to all of a business enterprise's important data sources 3504, such as enterprise data warehouses, data marts, databases, and the like. The RTI service 3502 can then apply consistent data-level transforms on the data from the data sources 3504. Used in this way, the RTI service can also automate source system analysis and provide in-flight, real time data quality management. There are many operational reporting or analysis processes of business enterprises that can benefit from such an RTI service, such as fraud detection and risk analysis in the financial services area, inventory control, forecasting and market-basket analysis in the retail area, compliance activities in the financial area, and shrinkage analysis and staff scheduling in the retail area. Any analysis or reporting task that can benefit from data from more than one source can similarly benefit from an RTI service that retrieves and integrates the data on the fly in real time in accordance with a well-defined data integration job.

Figure 36:
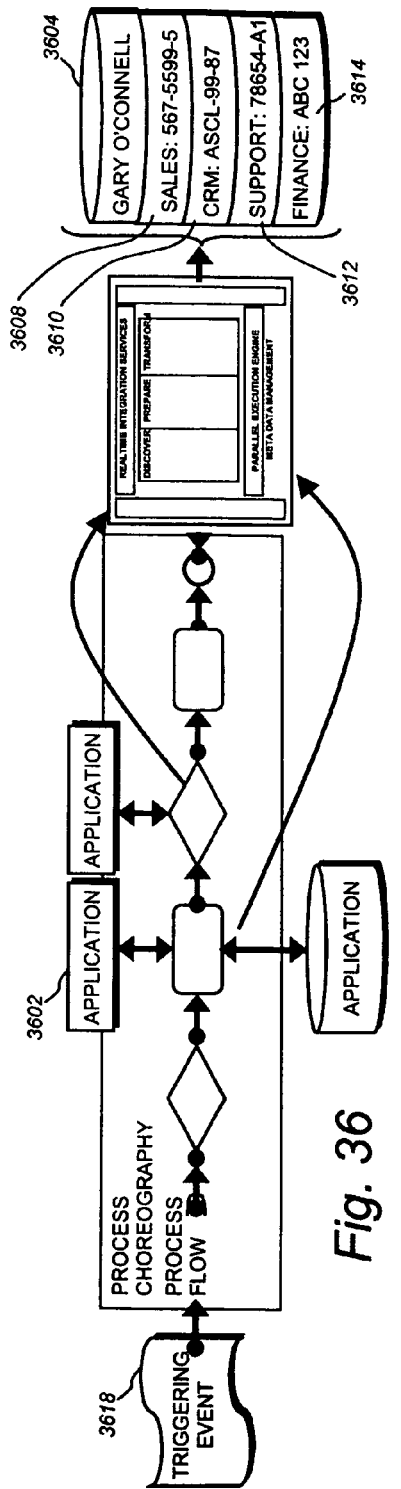
FIG. 36 illustrates a data integration system including a master customer database.

Another class of business processes that can benefit from RTI services such as those described herein is the set of business processes that involve creating a master system of record databases. Referring to FIG. 36, an enterprise can have many databases that include data about a particular topic, such as customer 3604. For example, the customer's information may appear in a sales database 3608, a CRM database 3610, a support database 3612 and a finance database 3614. In fact, in a real business enterprise it is not unusual for each of these departments to have multiple databases of their own. One of the desired benefits from data integration efforts is to establish data consistency across many databases. For example, for a triggering event 3618, such as a customer's address change, only one entity of the business may initially receive the information, but it would be preferable for all different departments to have access to the change. RTI services offer the possibility of creating master systems of records, without requiring changes in the native databases. Thus, an RTI process 3602 can be defined that links disparate silos of information, including those that use different protocols. By supporting multiple bindings, the RTI process can accept inputs and provide outputs to various applications of disparate formats. Meanwhile, the business logic in the RTI service can perform data integration tasks, such as performing data standardization for all incoming data, providing meta lineage information for all data, and maintaining linkage between the disparate data sources. The result is a real-time, up-to-the minute master record service, which can be accessed as an RTI service.

There are many examples of applications that may benefit from master records. In financial services, an institution may wish to have a customer master record, as well as a security master record across the whole enterprise. In telecommunications, insurance and other industries that deal with huge numbers of customers, master records services can support consisting billing, claims processing and the like. In retail enterprises, master records can support point of sale applications, web services, customer marketing databases, and inventory synchronization functions. In manufacturing and logistics operations, a business enterprise can establish a master record process for data about a product from different sources, such as information about design, manufacturing, inventory, sales, returns, service obligations, warranty information, and the like. In other cases, the business can use the RTI service to support ERP instance consolidation. RTI services that embody master records allow the benefits of data integration without requiring coding in the native applications to allow disparate data sources to talk to each other.

Figure 37:
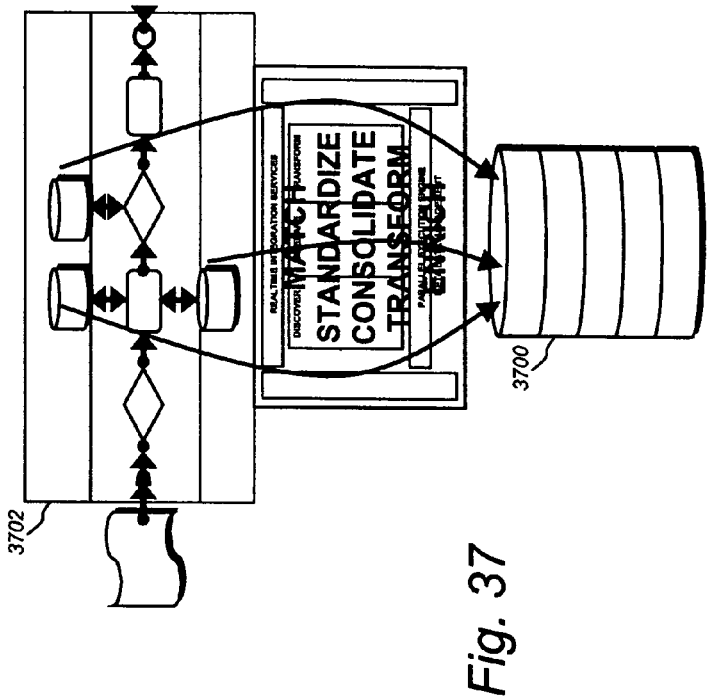
FIG. 37 shows an RTI service may embody a set of data transformation, validation and standardization routines.

The embodiment of FIG. 37 provides a master customer database 3700. The master customer database 3700 may include an integrated customer view across many different databases that include some data about the customer, including both internal and external systems. The master customer database would be a master system that would include the "best" data about the customer from all different sources. To establish the master customer database, data integration requires matching, standardization, consolidation, transformation and enrichment of data, all of which is performed by the RTI service 3702. While some data can be handled in batch mode, new data must be handled in real time to ensure that rapidly changing data is the most accurate data available. A master customer database could be used by a business entity in almost any field, including retail, financial services, manufacturing, logistics, professional services, medical and pharmaceutical, telecommunications, information technology, biotechnology, or many others. Similar data management may be desirable for associations, academic institutions, governmental institutions, or any other large organization or institution.

Figure 38:
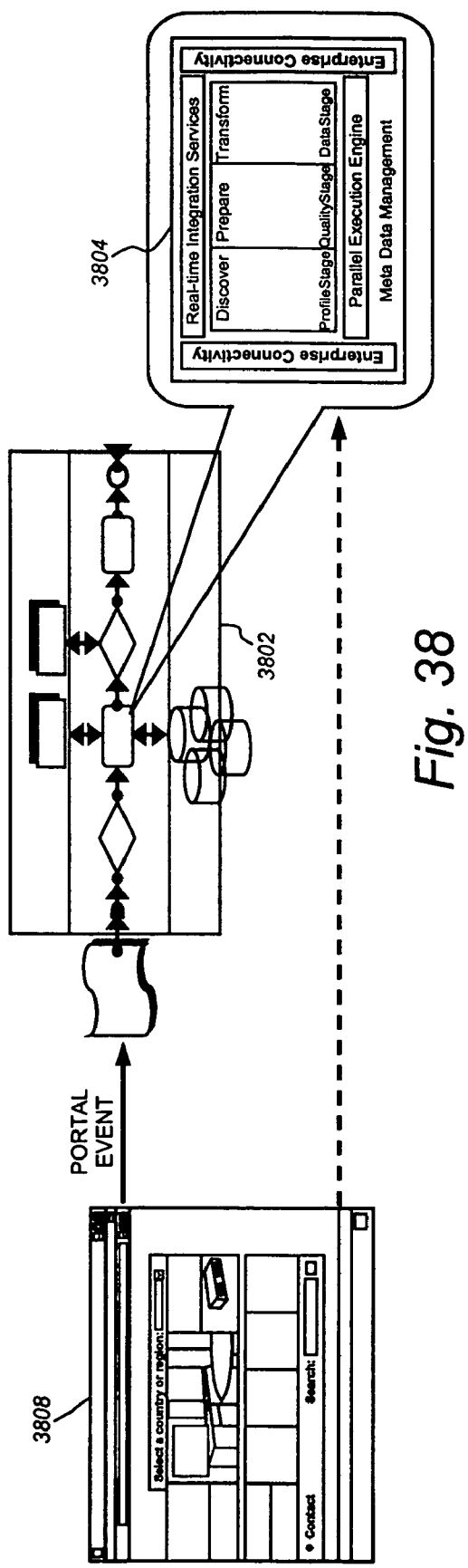
FIG. 38 illustrates an application accessing real time integration services.

RTI services as described herein can also support many services that expose data integration tasks, such as transformation, validation and standardization routines, to transactional business processes. Thus, the RTI services may provide on-the-fly data quality, enrichment and transformation. An application may access such services via a services oriented architecture, which promotes the reuse of standard business logic across the entire business enterprise. Referring to FIG. 38, an RTI service 3802, which may be the RTI service 2704 described above, embodies a set of data transformation, validation and standardization routines, such as those embodied by a data integration platform 3804, such as Ascential's DataStage platform. An application 3808 can trigger an event that calls the RTI service 3802 to accomplish the data integration task on the fly.

Many business processes can benefit from real-time transformation, validation and standardization routines. This may include call center up-selling and cross-selling in the telemarketing industry, reinsurance risk validation in the financial industry, point of sale account creation in retail businesses, and enhanced service quality in fields such as health care and information technology services.

Figure 39:
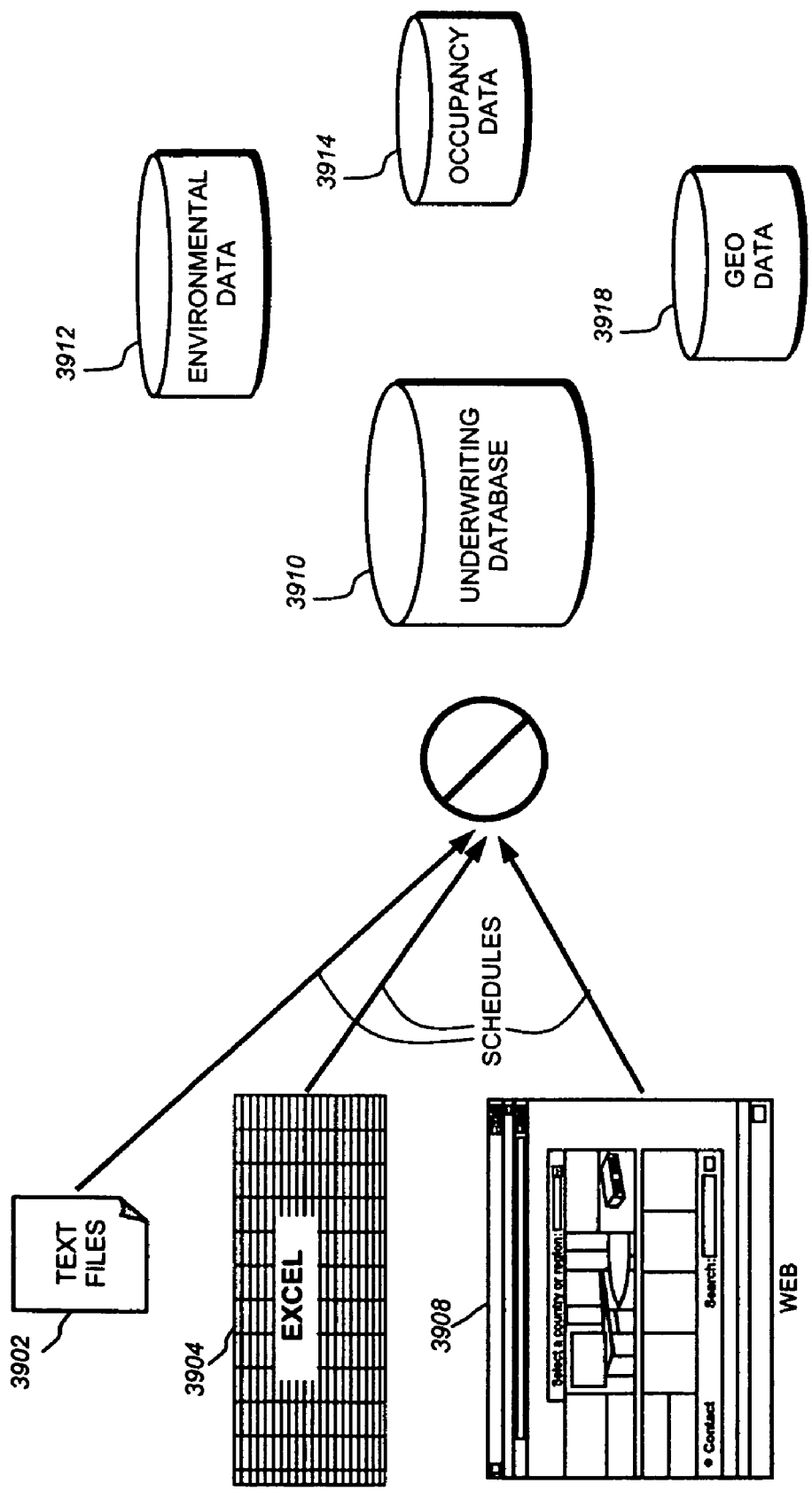
FIG. 39 shows an underwriting process without data integration services.

Referring to FIG. 39, an example of a business process that can benefit from real time integration services is an underwriting process 3900, such as underwriting for an insurance policy, such as property insurance. The process of underwriting property may require access to a variety of different data sources of different types, such as text files 3902, spreadsheets 3904, web data 3908, and the like. Data can be inconsistent and error-prone. The lead-time for obtaining supplemental data slow down underwriting decisions. The main underwriting database 3910 may contain some data, but other relevant data may be included in various other databases, such as an environmental database 3912, an occupancy database 3914, and a geographic database 3918. As a result, an underwriting decision may be made based on flawed assumptions, if the data from the different sources and databases is not integrated at the time of the decision.

Figure 40:
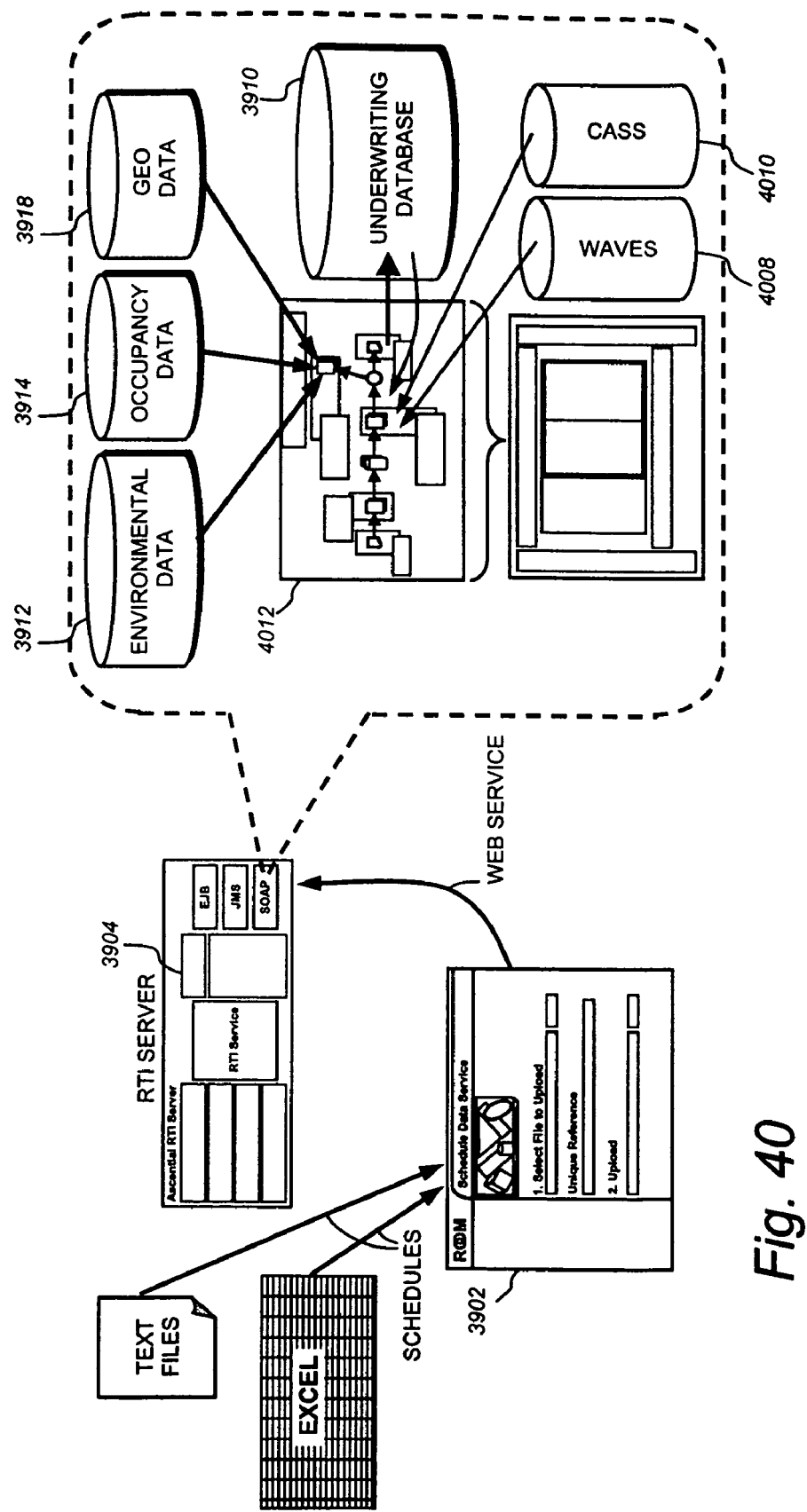
FIG. 40 shows an underwriting process employing RTI services.

By integrating access to various data sources 3902, 3904, 3908, 3912, 1914, 1918 using a real time integration service, speed and accuracy of underwriting decisions may be improved. Referring to FIG. 40, an RTI service can improve the quality of the underwriting decision. The text files, spreadsheets, and web files can each be inputted to the RTI service, which may be any of the RTI services 2704 described above, running on an RTI server 3904, such as through a web interface 3902. The environmental database 3912, occupancy database 3914, and geographic database 3918, as well as the underwriting database 3910, can all be called by a data integration job 4012, which can include a CASS process 4010 and a Waves process 4008, such as embodied by Ascential Software's QualityStage product. The RTI service can include bindings for the protocols for each of those databases. The result is an integrated underwriting decision process that benefits from current information from all of the schedules, as well as the disparate databases, all enabled by the RTI service. For example, an underwriting process needs current address information, and an RTI integration job such as described above can quickly integrate thousands of addresses from disparate sources.

Figure 41:
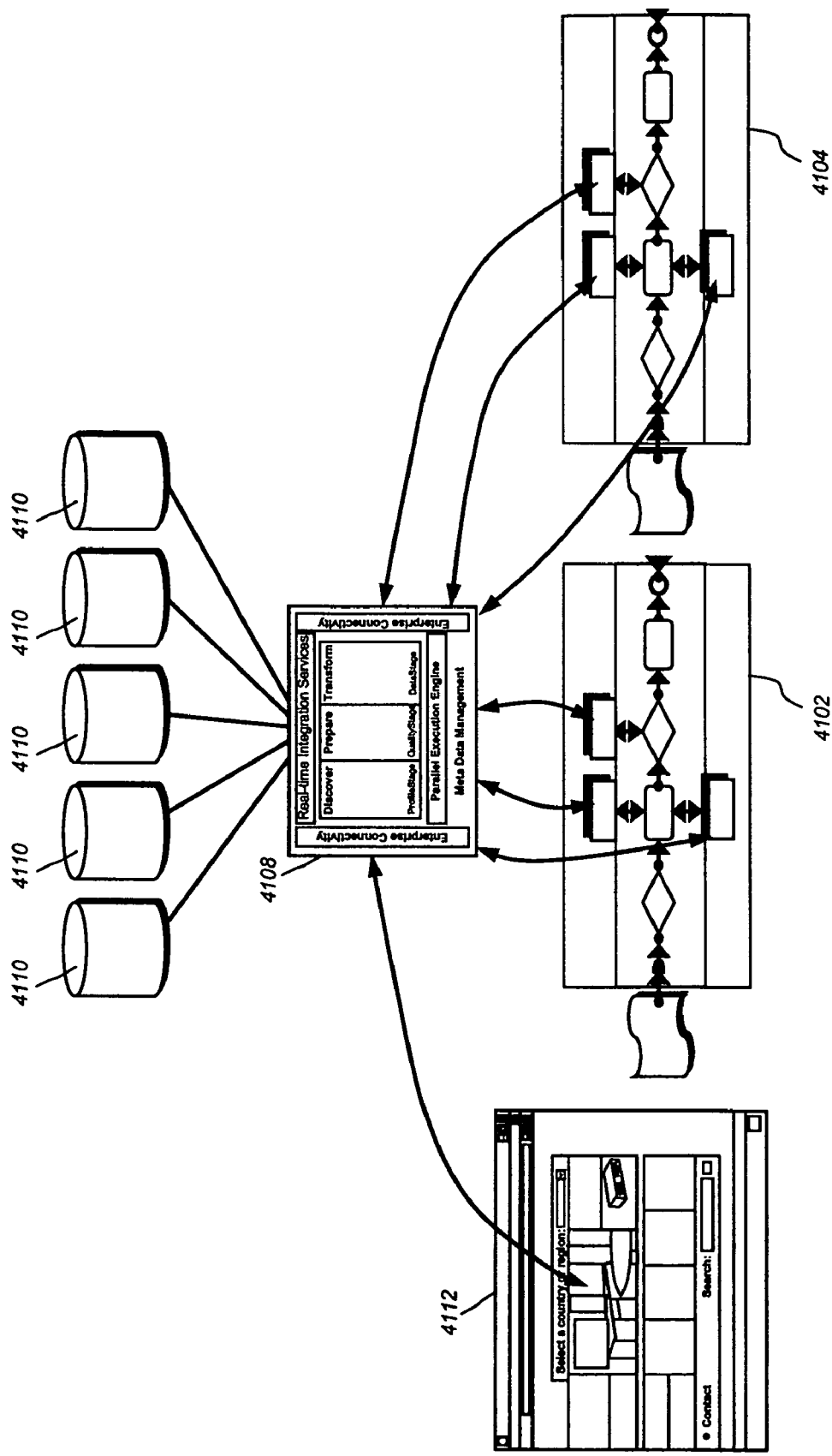
FIG. 41 shows an enterprise using multiple RTI services.

Enterprise data services may also benefit from data integration as described herein. In particular, an RTI integration process can provide standard, consolidated data access and transformation services. The RTI integration process can provide virtual access to disparate data sources, both internal and external. The RTI integration process can provide on-the-fly data quality enrichment and transformation. The RTI integration process can also track all metadata passing through the process. Referring to FIG. 41, one or more RTI services 4102, 4104 can operate within the enterprise to provide data services. Each of them can support data integration jobs 4108. The data integration jobs 4108 can access databases 4110, which may be disparate data sources, with different native languages and protocols, both internal and external to the enterprise. An enterprise application can access the data integration jobs 4108 through the RTI services 4102, 4104.

Figure 42:
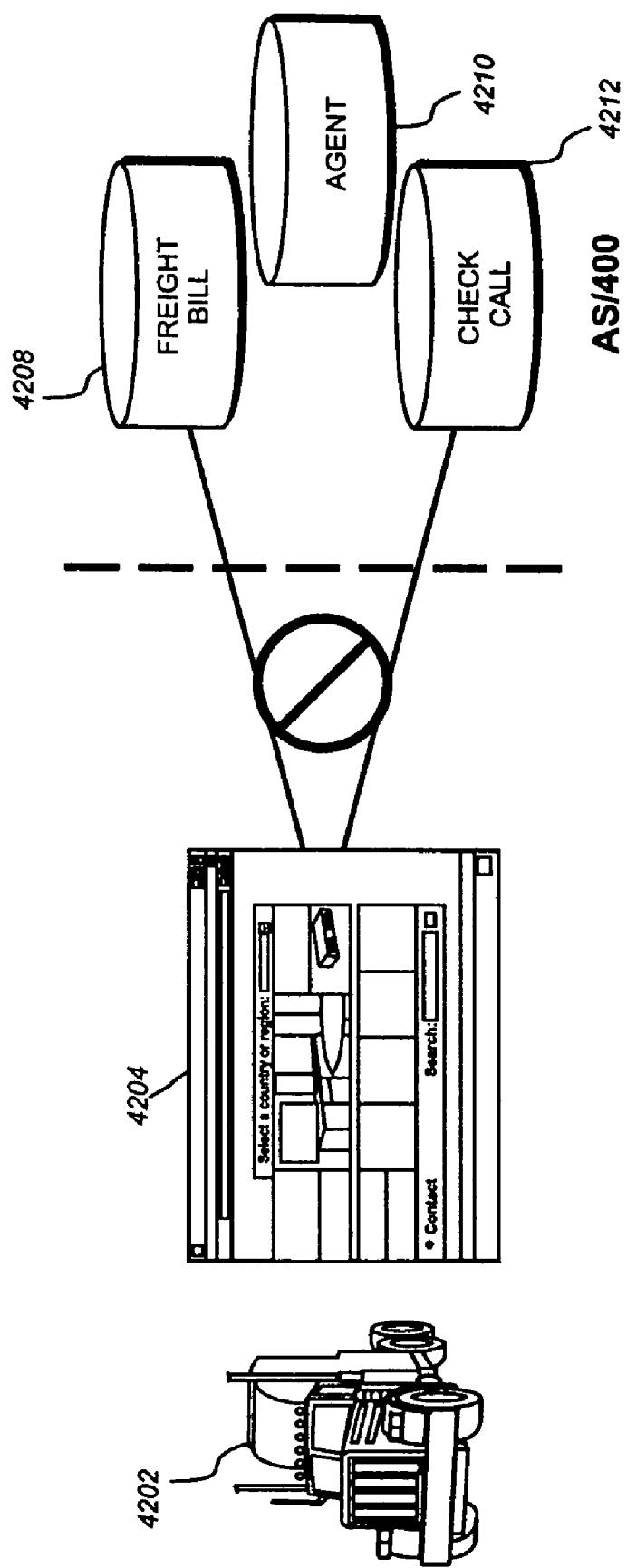
FIG. 42 shows a trucking broker business using real time integration services.

Referring to FIG. 42, another business enterprise that can benefit from real time integration services is a distribution enterprise, such as a trucking broker. The trucking broker may handle a plurality of trucks 4202, which carry goods from location to location. The trucks 4202 may have remote devices that run simple applications 4204, such as applications that allow the trucks 4202 to log in when the trucks 4202 arrives at a location. Drivers of trucks 4202 often have mobile computing devices, such as LandStar satellite system devices, which the drivers may use to enter data, such as arrival at a checkpoint. The enterprise itself may have several computer applications or databases, such as a freight bill application 4208, an agent process, and a check call application 4210. However, these native applications, while handling processes that may provide useful information to drivers, are not typically coded to run on the mobile devices of the trucks 4202. For example, drivers may wish to be able to schedule trips, but the trip scheduling application may require data (such as what other trips have been completed) that is not resident on the mobile device of the trucks 4202.

Figure 43:
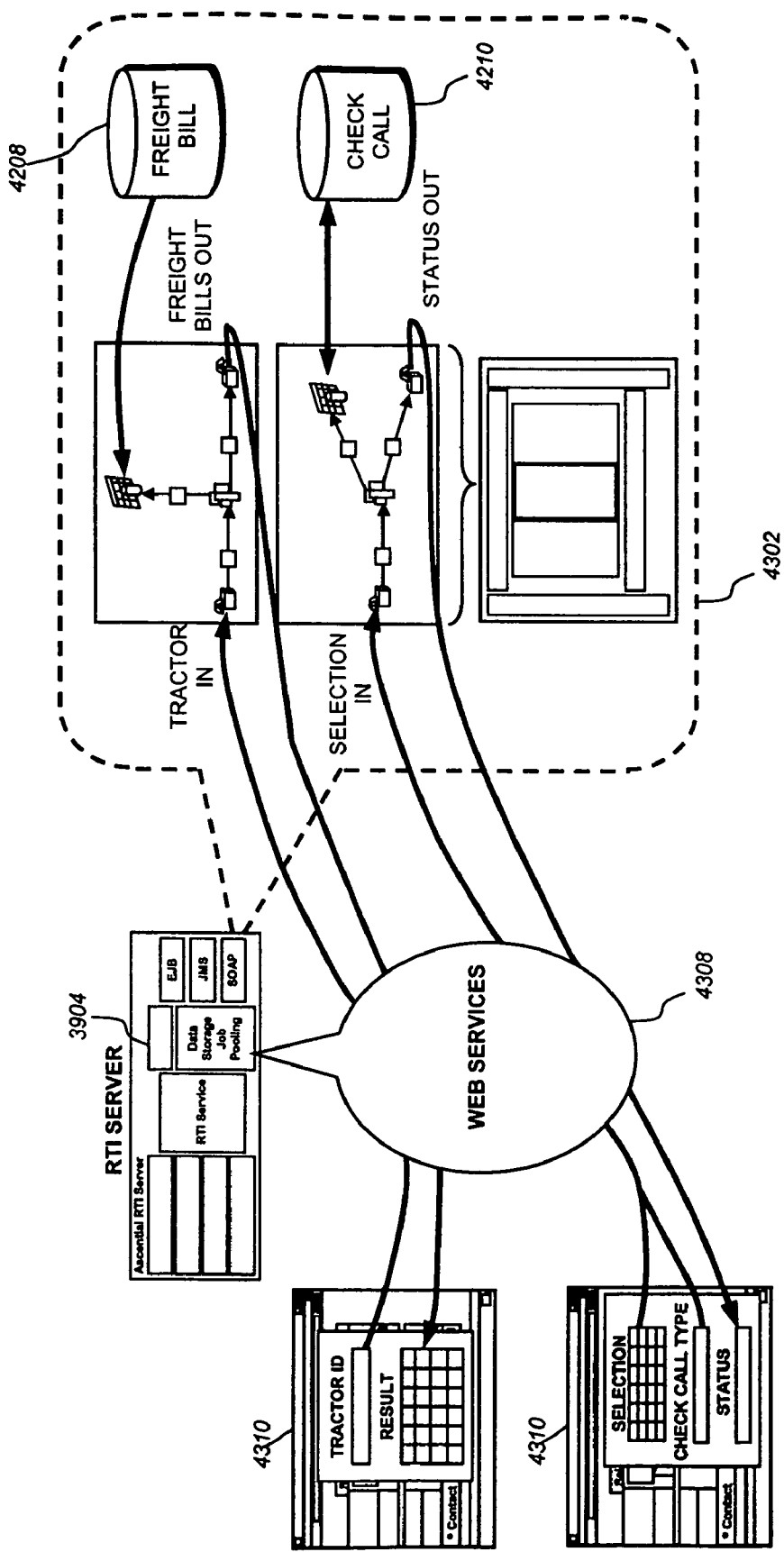
FIG. 43 illustrates a set of data integration services supporting applications that a driver can access as web services, such as using a mobile device.

Referring to FIG. 43, using an RTI service model, a set of data integration services 4302 can be defined to support applications 4310 that a driver can access as web services, such as using a mobile device. For example, an application 4310 can allow the driver to update his schedule with data from the truck broker enterprise. The RTI server 4304 publishes data integration jobs from the data integration services 4302, which the applications 4310 access as web services 4308. The data integration services 4302 can integrate data from the enterprise, such as about what other jobs have already been completed, including data from the freight bill application 4208 and agent process 4210. The RTI service, which may be any of the RTI services 2704 described above, may act as a smart graphical user interface for the driver's applications, such as to provide a scheduling application. The driver can download the application to the mobile device to invoke the service. As a result, using the RTI service model, it is convenient to provide the infrastructure for applications that use RTI services on mobile devices.

As another example (without illustrating figures), data integration may be used to improve supply chain management, such as in inventory management and perishable goods distribution. For example, if a supply chain manager has a current picture of the current inventory levels in various retail store locations, the manager can direct further deliveries or partial shipments to the stores that have low inventory levels or high demand, resulting in a more efficient distribution of goods. Similarly, if a marketing manager has current information about the inventory levels in retail stores or warehouses and current information about demand (such as in different parts of the country) the manager can structure pricing, advertisements or promotions to account for that information, such as to lower prices on items for which demand is weak or for which inventory levels are unexpectedly high. Of course, these are simple examples, but in preferred embodiments managers can have access to a wide range of data sources that enable highly complex business decisions to be made in real time.

Possible applications of such a system are literally endless. A weight loss company may use data integration to prepare a customer database for new marketing opportunities that may be used to enhance revenue to the company from existing customers. A financial services firm may use data integration to prepare a single, valid source for reporting and analysis of customer profitability for bankers, managers, and analysts. A pharmaceutical company may use data integration to create a data warehouse from diverse legacy data sources using different standards and formats, including free form data within various text data fields. A web-based marketplace provider may employ data integration to manage millions of daily transactions between shoppers and on-line merchants. A bank may employ data integration services to learn more about current customers and improve offerings on products such as savings accounts, checking accounts, credit cards, certificates of deposit, and ATM services. A telecommunications company may employ a high-throughput, parallel processing data integration system to increase the number of calling campaigns undertaking. A transportation company may use a high-throughput, parallel processing data integration system to re-price services inter-daily, such as four times a day. An investment company may employ a high-throughput, parallel processing data integration system to comply with SEC transaction settlement time requirements, and to generally reduce the time, cost, and effort required for settling financial transactions. A health care provider may use a data integration system to meet the requirements of the U.S. Health Insurance Portability and Accountability Act. A web-based education provider may employ data integration systems to monitor the student lifecycle and improve recruiting efforts, as well as student progress and retention.

A number of additional examples of specific commercial applications of a data integration system are now provided.

Figure 44:
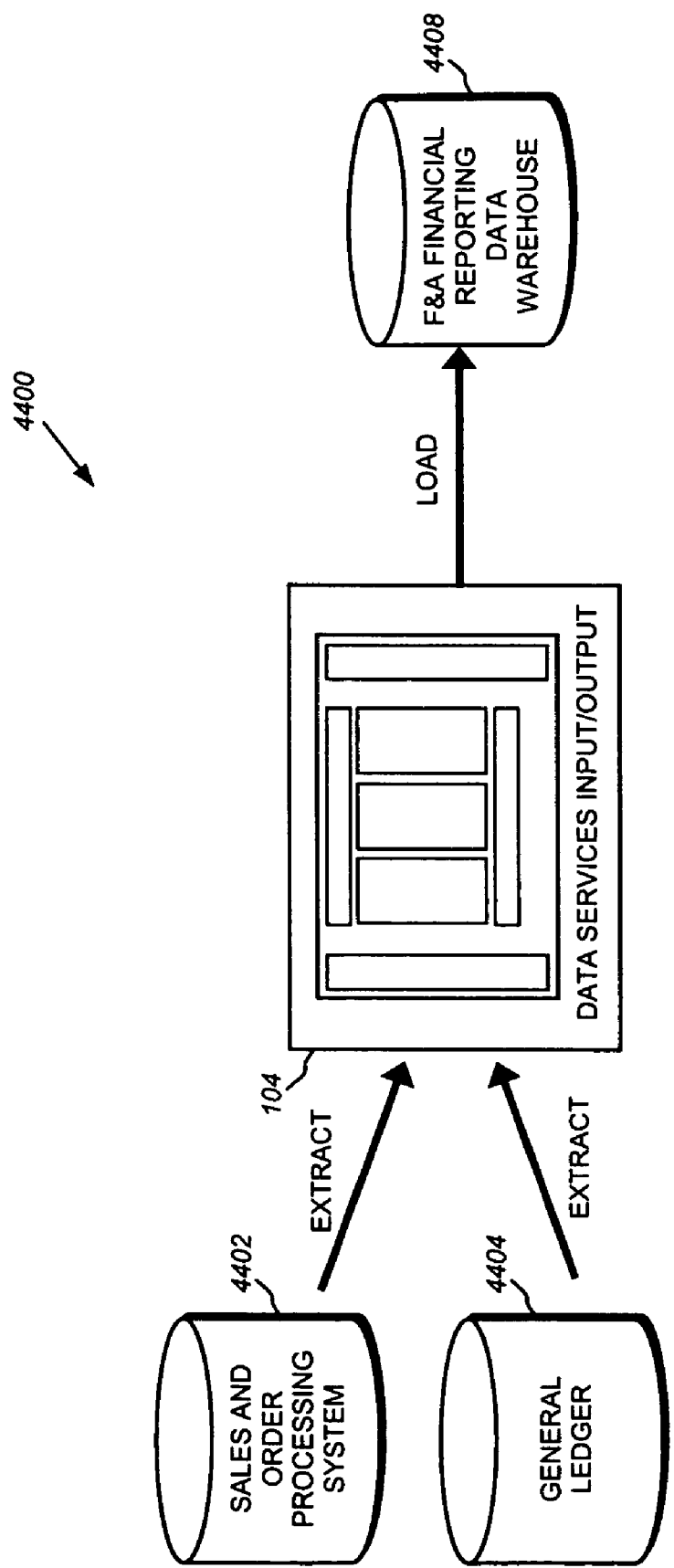
FIG. 44 shows a data integration system used for financial reporting.

FIG. 44 depicts a data integration system 104 which may be used for financial reporting. In this example the system 4400 may include a sales and order processing system 4402, a general ledger 4404, a data integration system 104 and a finance and accounting financial reporting data warehouse 4408. The sales and order processing system 4402, general ledger 4404 and finance and accounting financial reporting data warehouse 4408 may each include a data source 102, such as any of the data sources 102 described above. The sales and order processing system 4402 may store data gathered during sales and order processing such as price, quantity, date, time, order number and purchase order terms and conditions and other data and any other data characterizing any transaction which may be processed and/or recorded by the system 4400. The general ledger 4404 may store data that may be related to a business tracking its finances such as balance sheet, cash flow, income statement and financial covenant data. The finance and accounting financial reporting data warehouse 4408 may store data related to the financial and accounting departments and functions of a business such as data from the disparate financial and accounting systems.

The system 4400 may include one or more data integration systems 104, which may be any of the data integration systems 104 described above, which may extract data from the sales and order processing system 4402 and the general ledger 4404 and which may transfer, analyze, process, transform or manipulate such data, as described above. Any such data integration system 104 may load such data into the finance and accounting reporting data warehouse 4408, a data repository or other data target which may be any of the data sources 102 described above. Any of the data integration systems 104 may be configured to receive real-time updates or inputs from any data source 102 and/or be configured to generate corresponding real-time outputs to the corresponding finance and accounting reporting data warehouse 4408 or other data target. Optionally, the data integration system 104 may extract, transfer, analyze, process, transform, manipulate and/or load data on a periodic basis, such as at the close of the business day or the end of a reporting cycle, or in response to any external event, such as a user request.

In this manner a data warehouse 4408 may be created and maintained which can provide the company with current financial and accounting information. This system 4400 may enable the company to compare its financial performance to its financial goals in real-time allowing it to rapidly respond to deviations. This system 4400 may also enable the company to assess its compliance with any legal or regulatory requirements, or private debt or other covenants of its loans, thus allowing it to calculate any additional costs or penalties associated with its actions.

Figure 45:
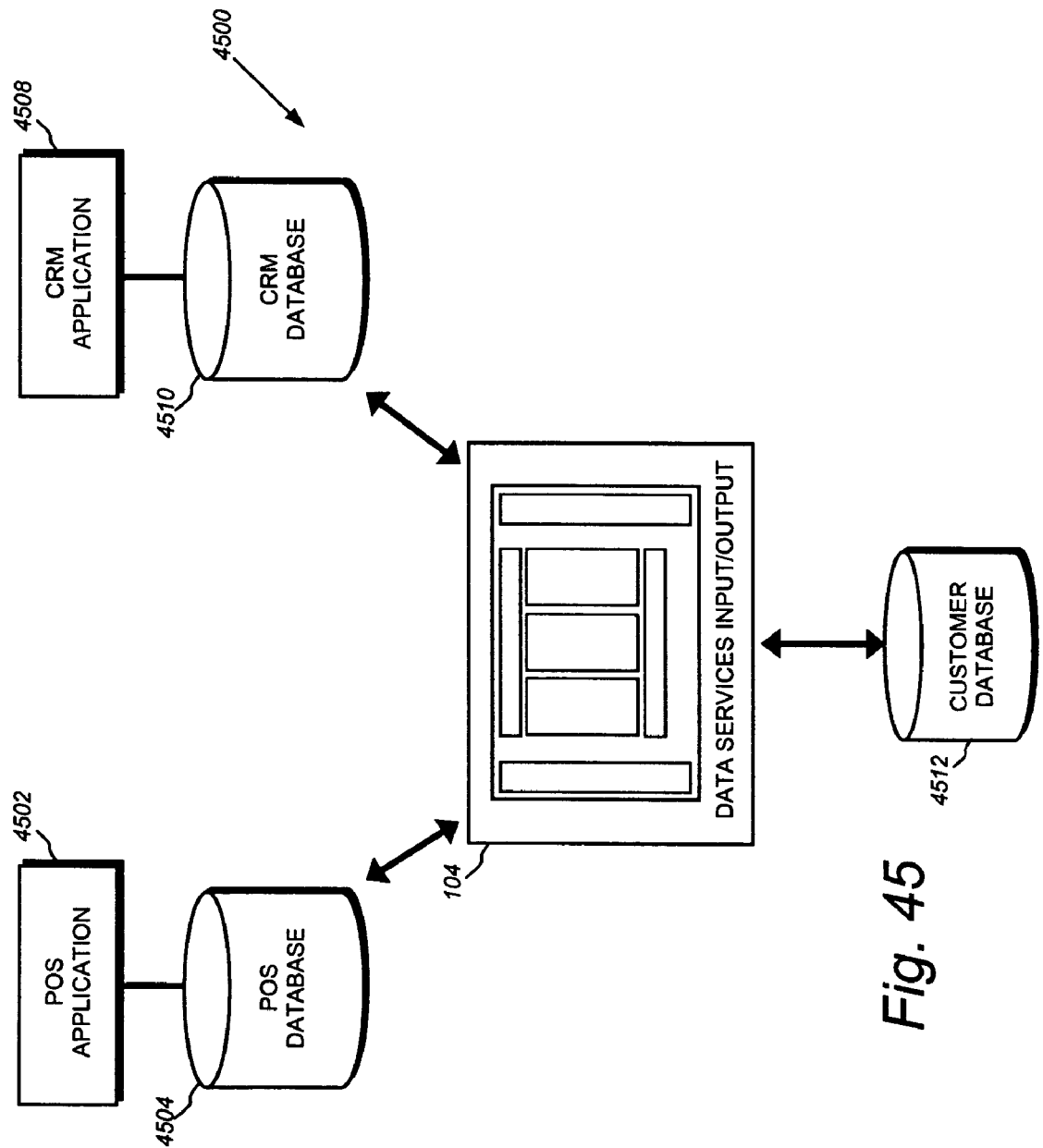
FIG. 45 shows a data integration system used to maintain an authoritative customer database in a retail business.

FIG. 45 depicts a data integration system 104 used to create and maintain an authoritative, current and accurate list of customers to be used with point of sale, customer relationship management and other applications and/or databases at a retail or other store or company. In this example the system 4500 may include a point of sale application 4502, point of sale database 4504, customer relationship management application 4508, customer relationship management database 4510, data integration system 104 and customer database 4512.

The point of sale application 4502 may be a computer program, software or firmware running or stored on a, networked or standalone computer, handheld device, palm device, cell phone, barcode reader or any combination of the forgoing or any other device or combination of devices for the processing or recording of a sale, exchange, return or other transaction. The point of sale application may be linked to a point of sale database 4504 which may include any of the data sources 102 described above. The point of sale database 4504 may contain data gathered during sales, exchanges, returns and/or other transactions such as price, quantity, date, time and order number data and any other data characterizing any transaction which may be processed or recorded by the point of sale application 4502. The customer relationship management application 4508 may be a computer program, software or firmware running or stored on a networked or standalone computer, handheld device, palm device, cell phone, barcode reader or any combination of the forgoing or any other device or combination of devices for the input, storage, analysis, manipulation, viewing and/or retrieval of information about customers, other individuals and/or entities such as name, address, corporate structure, birth date, order history, credit rating and any other data characterizing or related to any customer, other individual or entity. The customer relationship management application 4508 may be linked to a customer relationship management database 4510 which may include any of the data sources 102 described above, and may contain information about customers, other individuals and/or entities.

The data integration system 104, which may be any of the data integration systems 104 described above, may independently extract data from or load data to any of the point of sale application 4502 or database 4504, the customer relationship management application 4508 or database 4510 or the customer database 4512. The data integration system 104 may also analyze, process, transform or manipulate such data, as described above. For example, a customer service representative or other employee may update a customer's address using the customer relationship management application 4508 during a courtesy call following the purchase of a household durable item, such as a freezer or washing machine. The customer relationship management application 4508 may then transfer the updated address data to the customer relationship management database 4510. The data integration system 104 may then extract the updated address data from the customer relationship management database 4510, transform it to a common format and load it into the customer database 4512. The next time the customer makes a purchase, the cashier or other employee may complete the transaction using the point of sale application 4502, which may, via the data integration system 104, access the updated address data in the customer database 4512 so that the cashier or other employee need only confirm the address information as opposed to entering it in the point of sale application 4502. In addition, the point of sale application 4502 may transfer the new transaction data to the point of sale database 4504. The data integration system 104 may then extract the transaction data from the point of sale database 4504, transform it to a common format and load it into the customer database 4512. As a result the new transaction data is accessible to the point of sale and customer relationship management applications and databases as well as any other applications or databases maintained by the business enterprise.

In this manner a customer database 4512 may be created and maintained which can provide the retail or other store or company with current, accurate and complete data concerning each of its customers. With this information, the store or company may better serve its customers. For example, if customer service granted a customer a discount on his next purchase, the cashier or other employee using the point of sale application 4502 will be able to verify the discount and record a notice that the discount has been used. The system 4500 may also enable the store or company to prevent customer fraud. For example, customer service representatives or other employees receiving customer complaints over the telephone can, using the customer relationship management application 4508, access point of sale information to determine the date of a purchase of a particular product allowing them to determine if a product is still covered by the store or manufacturer's warranty.

Figure 46:
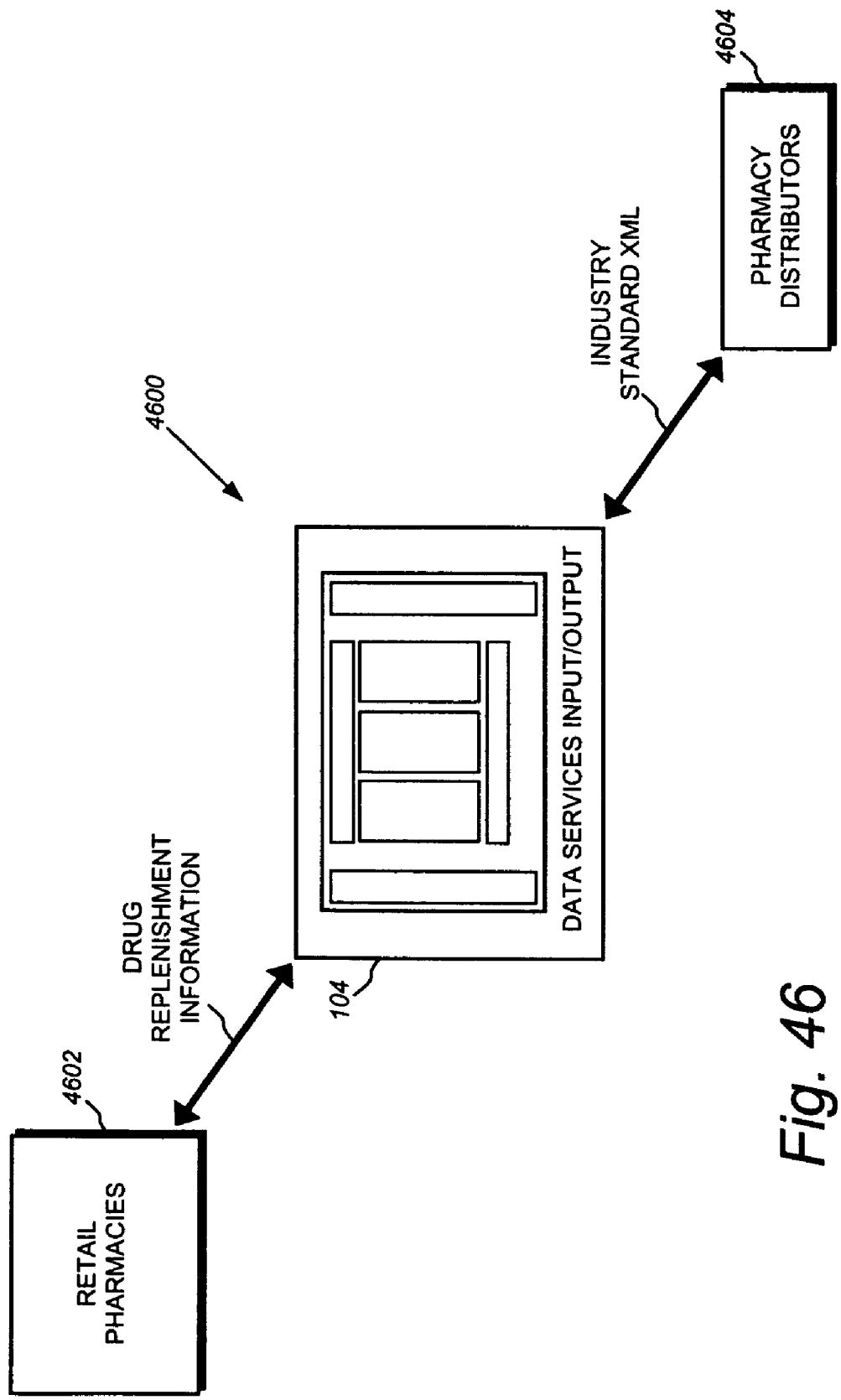
FIG. 46 shows a data integration system used in the pharmaceutical industry.

FIG. 46 depicts a data integration system 104 which may be used to convert drug replenishment or other information generated or stored at retail pharmacies into industry standard XML or other languages for use with pharmacy distributors or other parties. In this example the system 4600 may include retail pharmacies 4602, drug replenishment information, a data integration system 104, and pharmacy distributors 4604.

The retail pharmacies 4602 may use applications, computer programs, software or firmware running or stored on a networked or standalone computer, handheld device, palm device, cell phone, barcode reader or any combination of the forgoing or any other device or combination of devices for collecting, generating or storing the drug replenishment or other information. Such applications, computer programs, software or firmware may be linked to one or more databases which may include at least one data source 102, such as any of the data sources 102 described above, which contains drug replenishment information such as inventory level, days-on-hand and orders to be filled. Such applications, computer programs, software or firmware may also be linked to one or more data integration systems 104, which may be any of the data integration systems 104 described above. The pharmacy distributors 4604 may use applications, computer programs, software or firmware running or stored on a networked or standalone computer, handheld device, palm device, cell phone, barcode reader or any combination of the forgoing or any other device or combination of devices for receiving, analyzing, processing or storing the drug replenishment information, in industry standard XML or another language or format. Such applications, computer programs, software or firmware may be linked to a database, which may include any of the data sources 102 described above, that contains the drug replenishment information.

The system 4600 may include one or more data integration systems 104, which may be any of the data integration systems 104 described above. The data integration system 104 may extract the drug replenishment information from the retail pharmacies 4602, convert the drug replenishment information to industry standard XML or otherwise analyze, process, transform or manipulate such information and then load or transfer, automatically or upon request, such information to the pharmacy distributors 4604. For example, a customer may purchase the penultimate bottle of cold medicine X at a given retail pharmacy 4602. Immediately after the sale, that retail pharmacy's systems may determine that the pharmacy 4602 needs to increase its stock of cold medicine X by a certain number of bottles before a certain date and then send the drug replenishment information to the data integration system 104. The data integration system 104 may then convert the drug replenishment information to industry standard XML and uploads it to the pharmacy distributors' system. The pharmacy distributors 4604 can then automatically ensure that the given pharmacy 4602 receives the requested number of bottles before the specified date.

Thus a system 4600 may be created allowing retail pharmacies 4602 to communicate with pharmacy distributors 4604 in a manner that enables minimal supply chain interruptions and expenses. This system 4600 may allow retail pharmacies 4602 to automatically communicate their inventory needs to pharmacy distributors 4604 reducing surplus inventory holding costs, waste due to expired products and the transaction and other costs associated with returns to the pharmacy distributors. This system 4600 may be supplemented with additional data integration systems 104 to support credit history review, payment, and other financial services to ensure good credit risks and timely payment for the pharmacy distributors.

Figure 47:
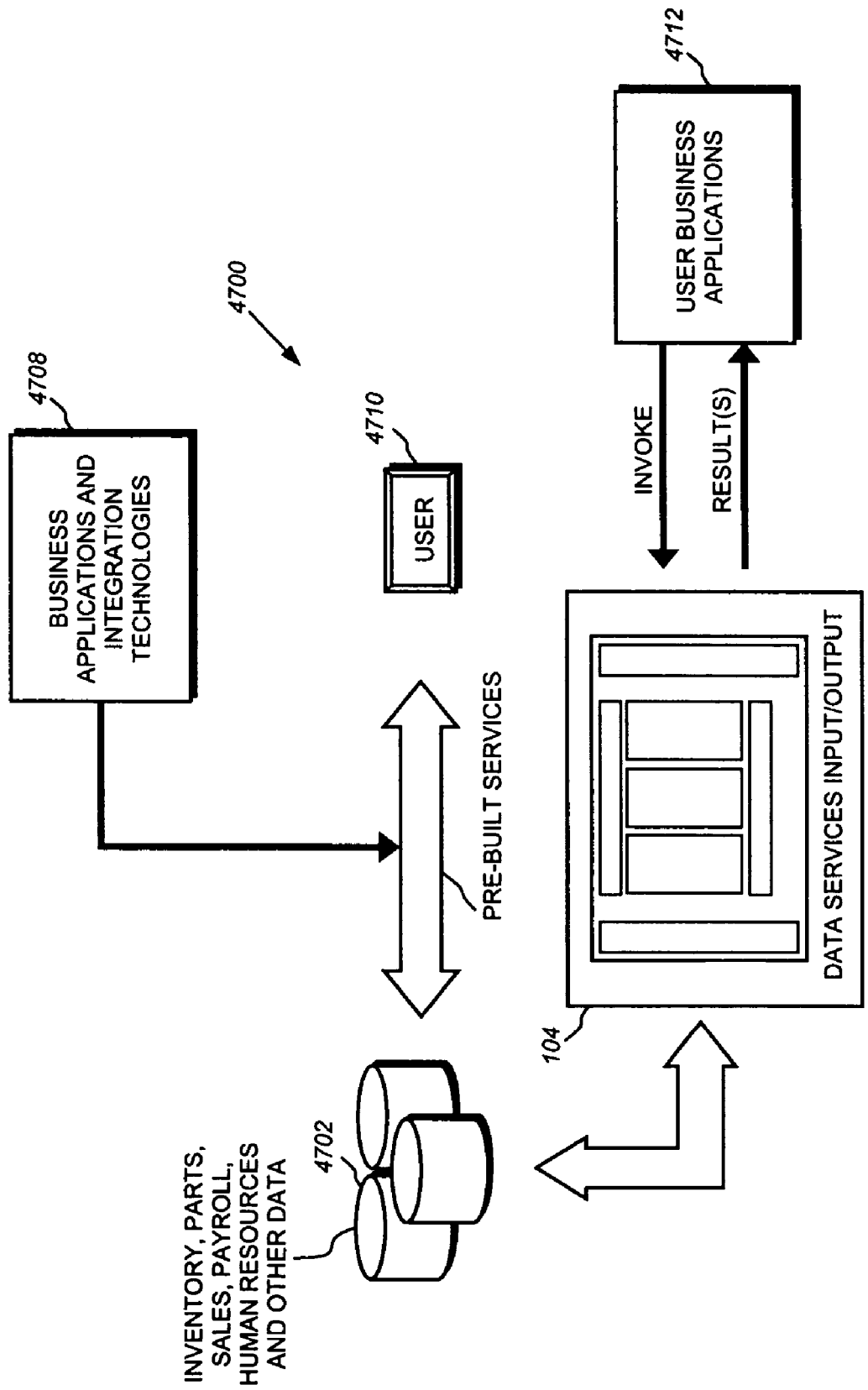
FIG. 47 shows a data integration system used in a manufacturing business.

FIG. 47 depicts a data integration system 104 which may be used to provide access to manufacturing analytical data 4702 via pre-built services 4704 that are invoked from business applications and integration technologies 4708, such as enterprise application integration, message oriented middleware and web services, to allow the data to be used in operational optimization, decision-making and other functions. In this example the system 4700 may include manufacturing analytical data 4702, such as inventory, parts, sales, payroll, human resources and other data, pre-built services 4704, business applications and integration technologies 4708, a user or users 4710, a data integration system 104, and user business applications 4712.

The user 4710 may, using business applications and integration technologies 4708 running or stored on a, networked or standalone, computer, computer system, handheld device, palm device, cell phone or any combination of the forgoing or any other device or combination of devices, invoke pre-built services 4704 to provide access to manufacturing analytical data. The pre-built services 4704 may be data integration systems 104 as described above or other infrastructure which may transfer, analyze, modify, process, transform or manipulate data or other information. The pre-built services 4704 may use, and the manufacturing analytical data 4702 may be stored on, a database which may include a data source 102, such as any of the data sources 102 described above. The user business applications 4712 may be a computer program, software or firmware running or stored on a networked or standalone computer, handheld device, palm device, cell phone or any combination of the forgoing or any other device or combination of devices for the processing or analysis of manufacturing analytical data 4702 or other information. The user business applications 4712 may be linked to a database which may include a data source 102, such as any of the data sources 102 described above.

The system 4700 may include one or more data integration systems 104, which may be any of the data integration systems 104 described above, which may extract, analyze, modify, process, transform or manipulate the manufacturing analytical 4702 or other data, in response to a user input via the business application and/or integration technologies 4708 or other user related or external event or on a periodic basis, and make the results available to the user business applications 4712 for display, storage or further processing, analysis or manipulation of the data. For example, a manager using existing business applications and integration technologies 4708 may access via a pre-built service 4704 certain manufacturing analytical data 4702. The manager may determine the numbers of a certain group of parts in inventory and the payroll costs associated with having enough employees on hand to assemble the parts. The data integration system 104 may extract, integrate and analyze the required data from the inventory, parts, payroll and human resources databases and upload the results to the manager's business application 4712. The business application 4712 may then display the results in several text and graphical formats and prompt the user (manager) for further analytical requests.

In this manner, a system 4700 may be created that allows managers and other decision-makers across the enterprise to access the data they require. This system 4700 may enable actors within the enterprise to make more informed decisions based on an integrated view of all the data available at a given point in time. In addition, this system 4700 may enable the enterprise to make faster decisions since it can rapidly integrate data from many disparate data sources 102 and obtain an enterprise-wide analysis in a short period of time. Overall, this system 4700 may allow the enterprise to optimize its operations, decision-making and other functions.

Figure 48:
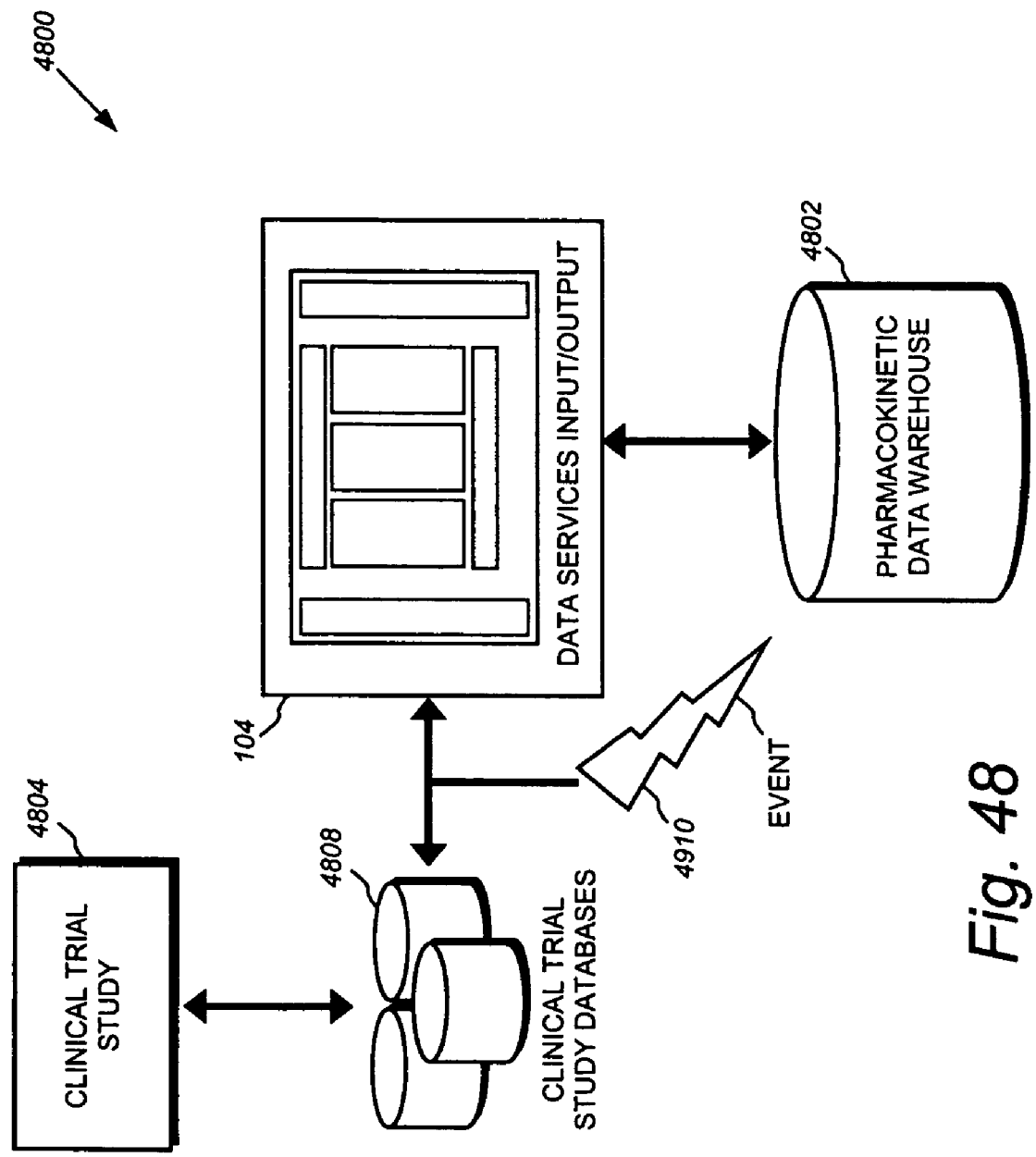
FIG. 48 shows a data integration system used to analyze clinical trial study results.

FIG. 48 depicts a data integration system 104 which may be used to analytically process clinical trial study results for loading into a pharmacokinetic data warehouse 4802 on an event-driven basis. In this example the system 4800 may include a clinical trial study 4804, clinical trial study databases 4808, an event 4810, a data integration system 104 and a pharmacokinetic data warehouse 4810.

The clinical trial study 4804 may generate data which may be stored in one or more clinical trial study databases 4808 which may each include a data source 102, such as any of the data sources 102 described above. Each clinical trial study database 4808 may contain data gathered during the clinical trial study 4804 such as patient names, addresses, medical conditions, mediations and dosages, absorption, distribution and elimination rates for a given drug, government approval and ethics committee approval information and any other data which may be associated with a clinical trial 4804. The pharmacokinetic data warehouse 4802 may include any of the data sources 102 described above, which may contain data related to clinical trial studies 4804, including data such as that housed in the clinical trial study databases 4808, as well as data and information relating to drug interactions and properties, biochemistry, chemistry, physics, biology, physiology, medical literature or other relevant information or data. The external event 4810 may be a user input or the achievement of a certain study or other result or any other specified event.

The system 4800 may include one or more data integration systems 104 as described above, which may extract, modify, transform, manipulate or analytically process the clinical trial study data 4804 or other data, in response to the external event 4810 or on a periodic basis, such as at the close of the business day or the end of a reporting cycle, and may make the results available to the pharmacokinetic data warehouse 4802. For example, the external event 4810 may be the requirement of certain information in connection with a research grant application. The grant review committee may require data on drug absorption responses in an on-going clinical trial before it will commit to allocating funds for a related clinical trial. The system 4800 may be used to extract the required data from the clinical trial study data database 4808, analytically process the data to determine, for example, the mean, median, maximum and minimum rate of drug absorption and compare these results to those of other studies and for similar drugs. All this information may then be presented to the grant review committee.

In this manner a system 4800 may be created which will allow researchers and others rapid access to complete and accurate pharmacokinetic information, including information from completed and on-going clinical trials. This system 4800 may enable researchers and others to generate preliminary results and detect adverse effects or trends before they become serious. This system 4800 may also enable researchers and others to link the on-going or final results of a given study to those of other studies, theories or established principles. In addition, the system 4800 may aid researchers and others in the design of new studies, trials and experiments.

Figure 49:
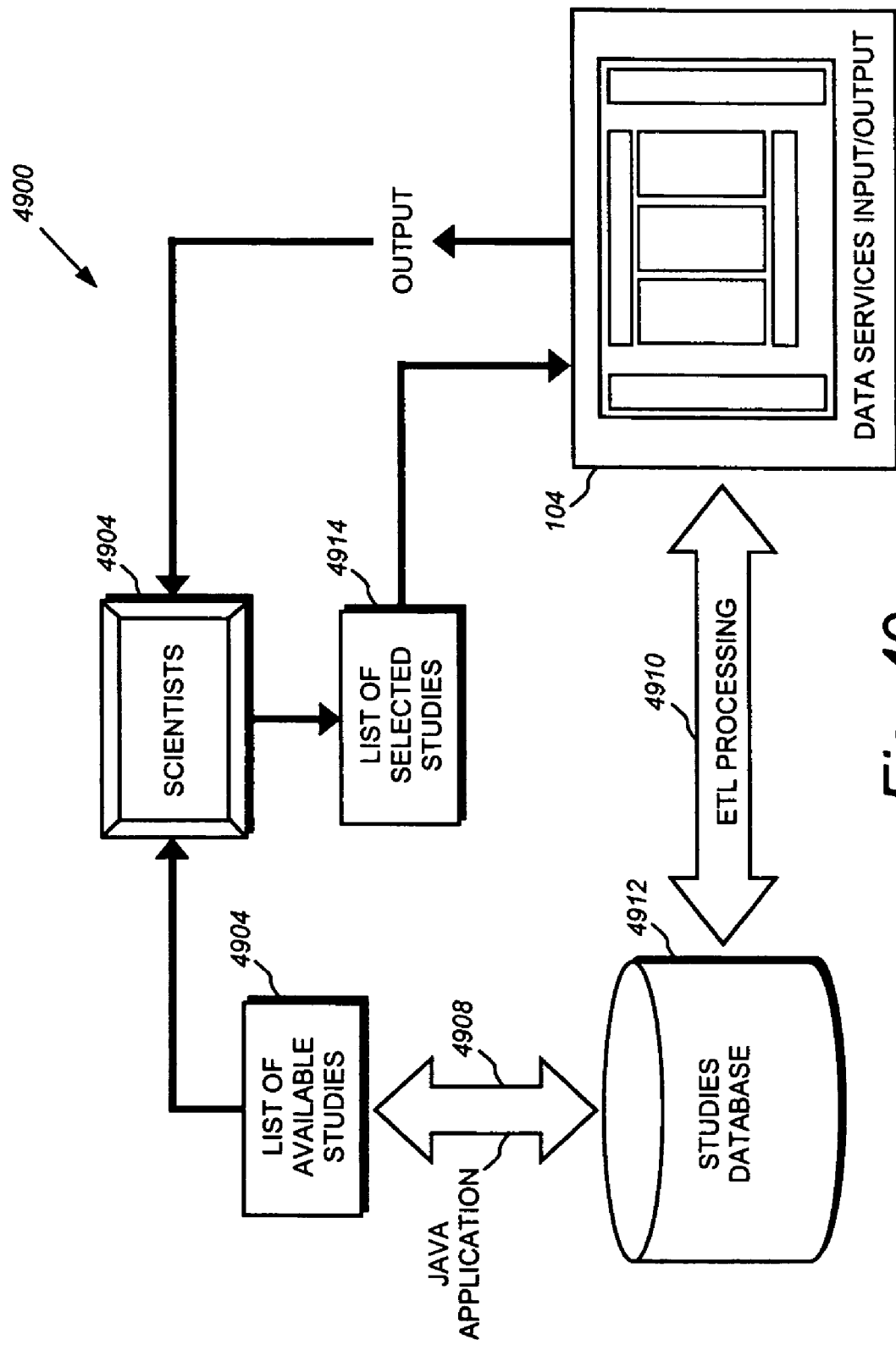
FIG. 49 shows a data integration system used for review of scientific research data.

FIG. 49 depicts a data integration system 104 which may be used to provide scientists 4902 with a list of available studies 4904 through a Java application 4908 and allow them to initiate extract, transform and load processing 4910 on selected studies. In this example the system 4800 may include a group of scientists 4902, a list of available studies 4904, a Java application 4908, a database of studies 4912, a list of selected studies 4914, extract, transform and load processing 4910 and a data integration system 104.

The studies database 4912 many include any of the data sources 102 described above, which may store the titles, abstract, full text, data and results of the studies as well as other information associated with the studies. The Java application 4908 may consist of one or more applets, running or stored on a computer, handheld device, palm device, cell phone or any combination of the forgoing or any other device or combination of devices, which may generate complete list of studies in the database or a list of studies in the database responsive to certain user defined or other characteristics. The scientists, laboratory personnel or others may select a subset of studies from this list and generate a list of selected studies 4914.

The system 4900 may include one or more data integration systems as described above, which may extract, modify, transform, manipulate, process or analyze the lists of available studies 4904 or data from the studies database. For example, the scientists 4902, laboratory personnel or others may request, using the Java application 4908 through a web browser, a list of all available studies 4904 relating to a certain specified drug or medical condition. The scientists 4902, laboratory personnel or others may then select certain studies from such list or add other studies to such list to generate a list of selected studies 4914. The scientists 4902, laboratory personnel or others may then send the list of selected studies to the data integration system 104, for extract, transform and load processing 4910. The scientists 4902, laboratory personnel or others may request as an output all the metabolic rate or other specified data from the selected studies in a particular format.

In this manner a system 4900 may be created which will allow scientists 4902, laboratory personnel or others access to a directory of relevant studies with the ability to extract or manipulate data and other information from those studies. This system 4900 may enable scientists 4902, laboratory personnel or others obtain relevant prior data or other information, to avoid unnecessary repetition of experiments or to select certain studies that conflict with their results or predictions for the purpose of repeating the studies or reconciling the results. The system 4900 may also enable scientists 4902, laboratory personnel or others to obtain, integrate and analyze the results from prior studies in order to simulate new experiments without actually performing the experiments in the laboratory.

Figure 50:
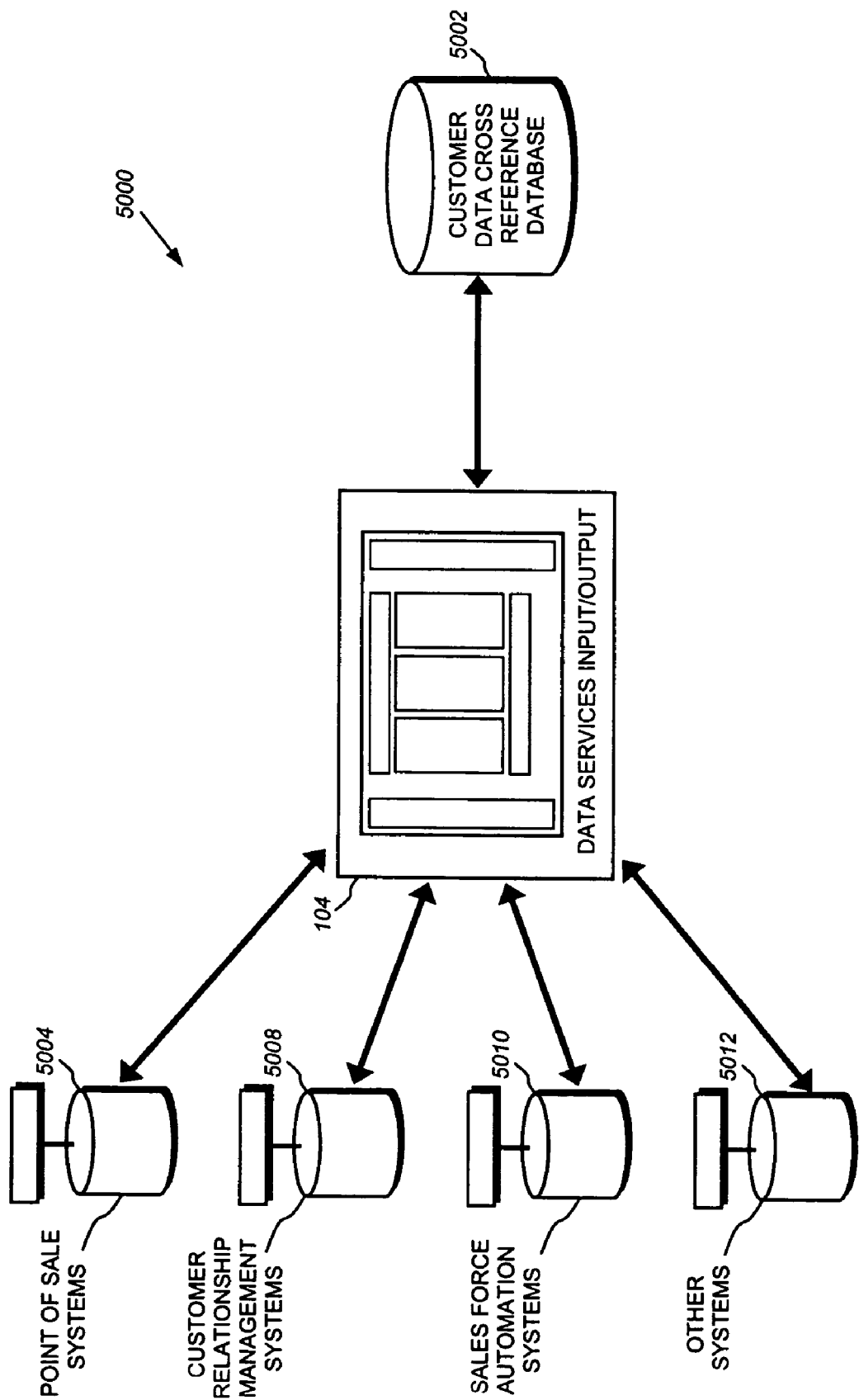
FIG. 50 shows a data integration system used to manage customer data across multiple business systems.

FIG. 50 depicts a data integration system 104 which may be used to create and maintain a cross-reference of customer data 5002 as it is entered across multiple systems, such as point of sale 5004, customer relationship management 5008 and sales force automation systems 5010, for improved customer understanding and intimacy or for other purposes. In this example the system 5000 may include point of sale 5004, customer relationship management 5008, sales force automation 5010 or other systems 5012, a data integration system 104, and a customer data cross-reference database 5002.

The point of sale 5004, customer relationship management 5008 and sales force automation systems 5010 may each consist of one or more applications and/or databases. The applications may be computer programs, software or firmware running or stored on a networked or standalone computer, handheld device, palm device, cell phone or any combination of the forgoing or any other device or combination of devices. The databases may include any of the data sources 102 described above. The point of sale application may be used for the processing or recording of a sale, exchange, return or other transaction and the point of sale database may contain data gathered during sales, exchanges, returns and/or other transactions such as price, quantity, date, time and order number data and any other data characterizing any transaction which may be processed or recorded by the system 5000. The customer relationship management application may be used for the input, storage, analysis, manipulation, viewing and/or retrieval of information about customers, other individuals and/or entities such as name, address, corporate structure, birth date, order history, credit rating and any other data characterizing or related to any customer, other individual or entity. The customer relationship management database may contain information about customers, other individuals and/or entities. The sales force automation application may be used for lead generation, contact cross-referencing, scheduling, performance tracking and other functions and the sales force automation database may contain information or data in connection with sales leads and contacts, schedules of individual members of the sales force, performance objectives and actual results as well as other data.

The system 5000 may include one or more data integration systems 104 as described above, which may extract, modify, transform, manipulate, process or analyze the data from the point of sale 5004, customer relationship management 5008, sales force automation 5010 and other systems 5012 and which may make the results available to the customer data cross reference database 5002. For example, the system 5000 may, on a periodic basis, such as at the close of the business day or the end of a reporting cycle, or in response to any external event, such as a user request, extract data from any or all of the point of sale 5004, customer relationship management 5008, sales force automation 5010 or other systems 5012. The system 5000 may then convert the data to a common format or otherwise transfer, process or manipulate the data for loading into a customer data cross reference database 5002, which is available to other applications across the enterprise. The data integration process 104 may also be configured to receive real-time updates or inputs from any data source 102 and/or be configured to generate corresponding real-time outputs to the customer data cross reference database 5002.

In this manner a system 5000 may be created which provides users with access to cross-referenced customer data 5002 across the enterprise. The system 5000 may provide the enterprise with cleansed, consistent, duplicate-free customer data for use by all systems 5000 leading to a deeper understanding of customers and stronger customer relationships.

Figure 51:
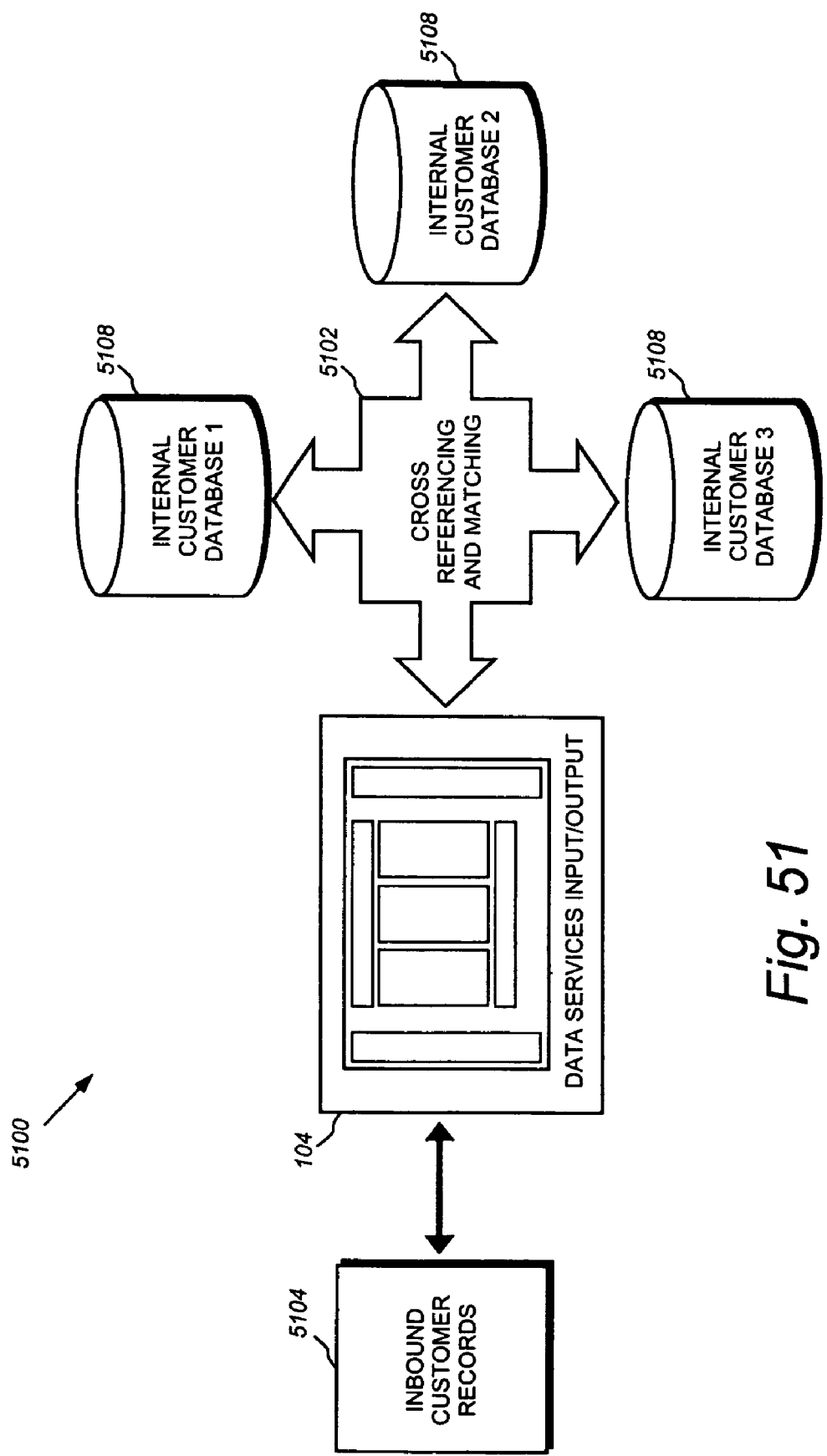
FIG. 51 shows a data integration system used to provide on-demand, automated matching of inbound customer data with existing customer records.

FIG. 51 depicts a data integration system 104 which may be used to provide on-demand automated cross-referencing and matching 5102 of inbound customer records 5104 with customer data stored across internal systems to avoid duplicates and provide a full cross-system record of data for any given customer. In this example the system 5100 may include inbound customer records 5104, a data integration system 104 and internal customer databases 5108.

The inbound customer records 5104 may include information gathered during transactions or interactions with or regarding customers such as name, address, corporate structure, birth date, products purchased, scheduled maintenance and other information. The internal databases 5108 may include any of the data sources 102 described above, and may store data gathered during transactions or interactions with or regarding customers. The internal databases 5108 may be linked to internal applications which may be computer programs, software or firmware running or stored on a, networked or standalone, computer, handheld device, palm device, cell phone or any combination of the forgoing or any other device or combination of devices.

The system 5100 may include one or more data integration systems as described above, which may extract, modify, transform, manipulate, process or analyze the inbound customer records 5104 or any data from the internal customer databases 5108. In addition the data integration system 104 may cross reference 5102 the inbound customer records 5104 against the data in the internal customer databases 5108. For example, the internal customer databases 5108 may be a database with information related to the products purchased by customers, a database with information related to the services purchased by customers, a database providing information on the size of each customer organization and a database containing credit information for customers. The system 5100 may cross reference inbound customer records 5104 against the products, service, size and credit information to reveal and correct inconsistencies and ensure the accuracy and uniqueness of the data record for each customer.

In this manner a system 5100 may be created which will allow for accurate and complete customer records. This system 5100 may provide the enterprise deeper customer knowledge allowing for better customer service. The system 5100 may enable sales people, in reliance on the data contained in the customer databases, to suggest to a customer products and services complementary to those already purchased by the customer and geared to the size of the customer's business.

Having described various data integration systems and business enterprises, the semantic identifier, translation engine and level of abstraction are now described in greater detail.

Figure 52:
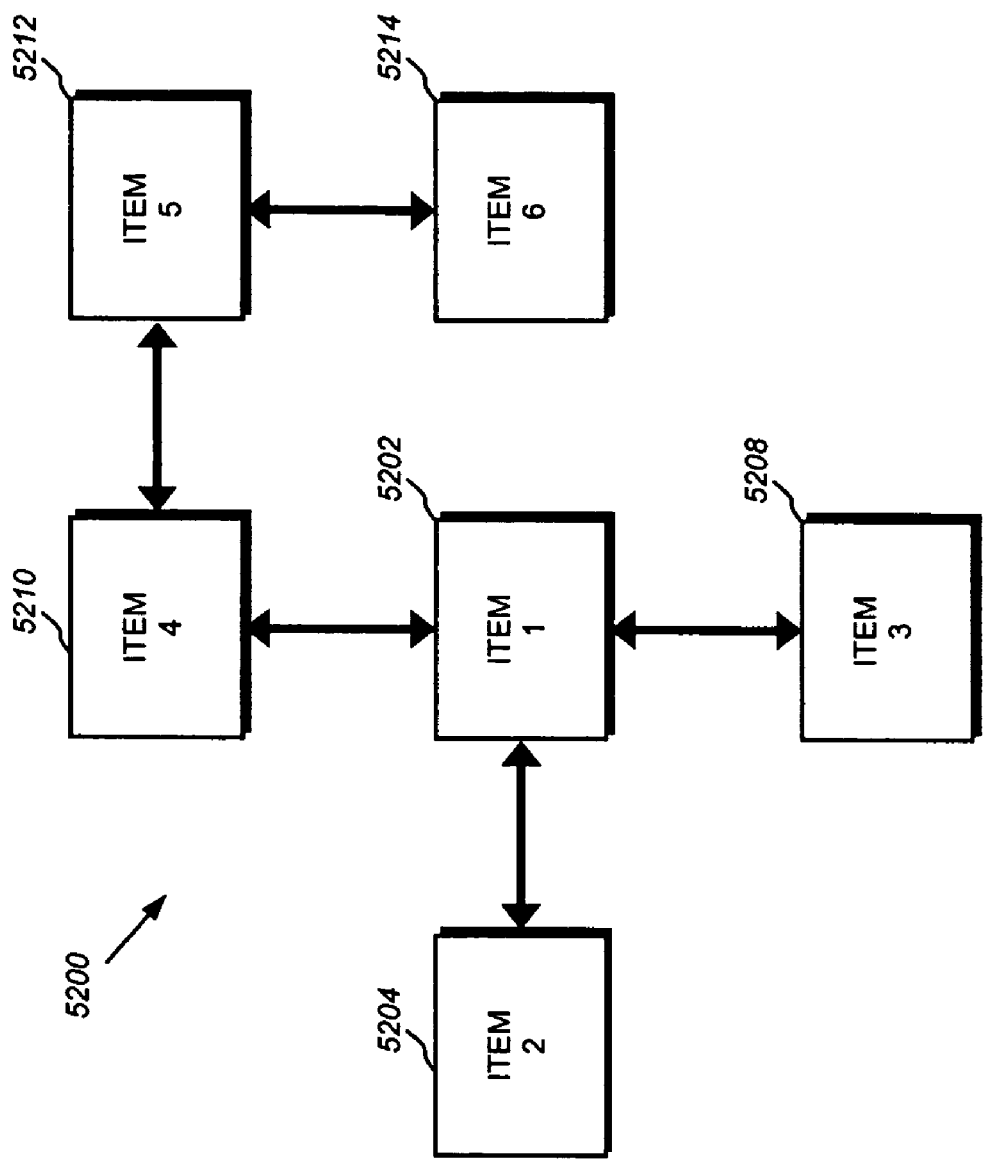
FIG. 52 shows an item in relation to other items.

Referring to FIG. 52, items that are relevant to an enterprise can be described in terms of various contexts or hierarchies, such as to capture the semantic context of the items. Thus, FIG. 52 depicts a semantic identifier for an item. The item may be an object, class, attribute, data item, data model, metadata model, model, definition, identity, structure, language, mapping, relationship, instance or other item or concept, including another semantic identifier. The semantic identifier may identify the item based on the item's attributes, the item's physical location, the relationship of the item with one or more other items, such as in a hierarchy, or the like. In some cases a relationship may be defined as the absence of some particular relationship. A relationship may be based on semantics. A relationship may involve the position of the item in a relational hierarchy. For example, in FIG. 52 item 1 5202 may be identified based on its relationship with the other items to which it is related. Item 1 5202 may be identified as being directly related to item 2 5204, item 3 5208 and item 4 5210, indirectly related to item 5 5212 and indirectly related to item 6 5214 through item 5 5212 and item 4 5210. Item I may also be identified as being directly related to item 2 5204, item 3 5208 and item 4 5210. In embodiments, the indirect relationships between item 1 5202 and item 5 5212 and item 6 5214 may be captured in the relationship of item 1 5202 to item 4 5210. This concatenation or recursive type of identification may permit dynamic, in addition to static, identifiers. For example, if the relationship between item 4 5210 and item 6 5214 changes, the semantic identifier for item 1 5202 which incorporates item 2 5204, item 3 5208 and item 4 5210 would incorporate this change through incorporation of item 4 5210 and would not need to be updated to account for the changes in item 6 5214 as it would if item 6 5214 was directly included in the semantic identifier.

Figure 53:
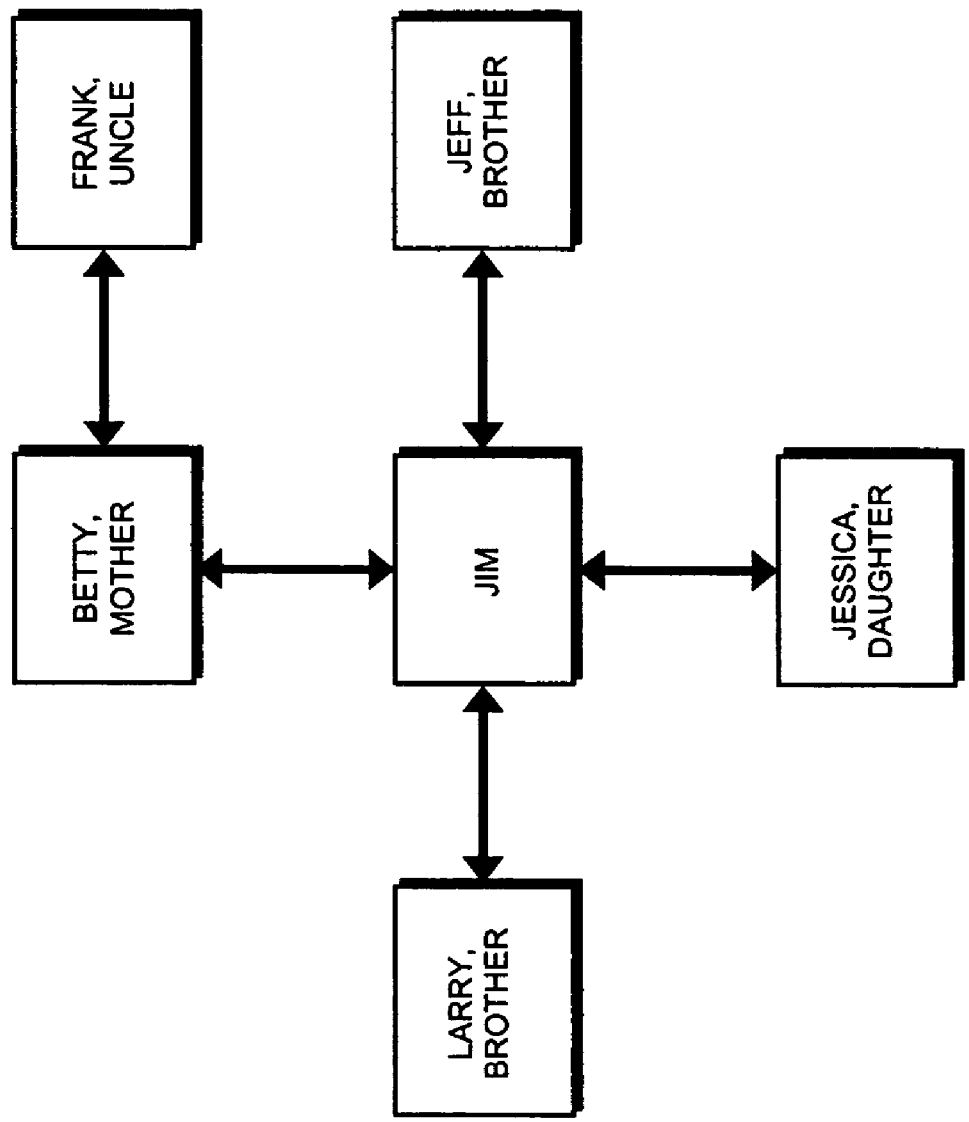
FIG. 53 shows an item in relation to other items.

FIG. 53 presents a more concrete example of a semantic identifier. Jim may be identified as Jim, residing at 111 Anyroad, Anytown, Anystate USA, with phone number 555-555-5555 and social security number 013-65-8067. Alternatively, Jim may be identified in terms of his relationships with others. As depicted in FIG. 53, Jim may be identified as the son of Betty, brother of Larry and Jeff, father of Jessica and nephew of Frank.

The semantic identifier may be a unique identifier for an item. In the example of FIG. 53, if there were only one Jim in the world who was the son of Betty, brother of Larry and Jeff, father of Jessica and nephew of Frank, this semantic identifier would be a unique identifier for Jim. It is possible that a unique semantic identifier to an item takes into account fewer than all of the relationships of that item with other items. In the example of FIG. 53, if there were only one Jim in the world who was the son of Betty, brother of Larry and father of Jessica, the existence of these relationships alone would be enough to create a unique semantic identifier. Jim's relationships with Jeff and Frank would not need to be considered. It may be advantageous to create a semantic identifier that is based on the minimum number of relationships that ensure uniqueness. For example, if the semantic identifier was to be stored in a database 112 or processed by a data integration system 104, a less complex semantic identifier would require less space and would allow for faster processing.

Figure 54A:
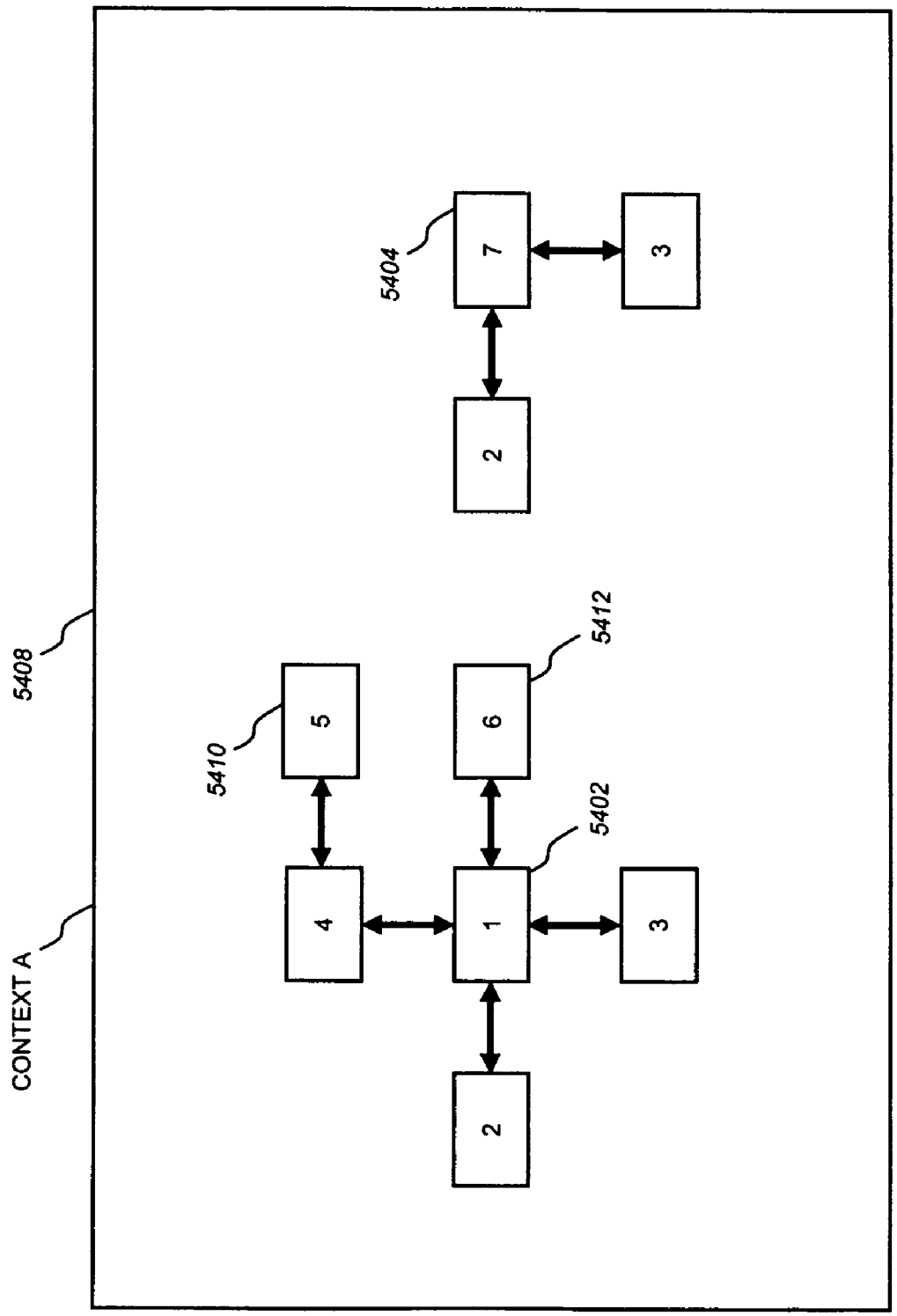
FIG. 54A shows an item in a certain context.
Figure 54B:
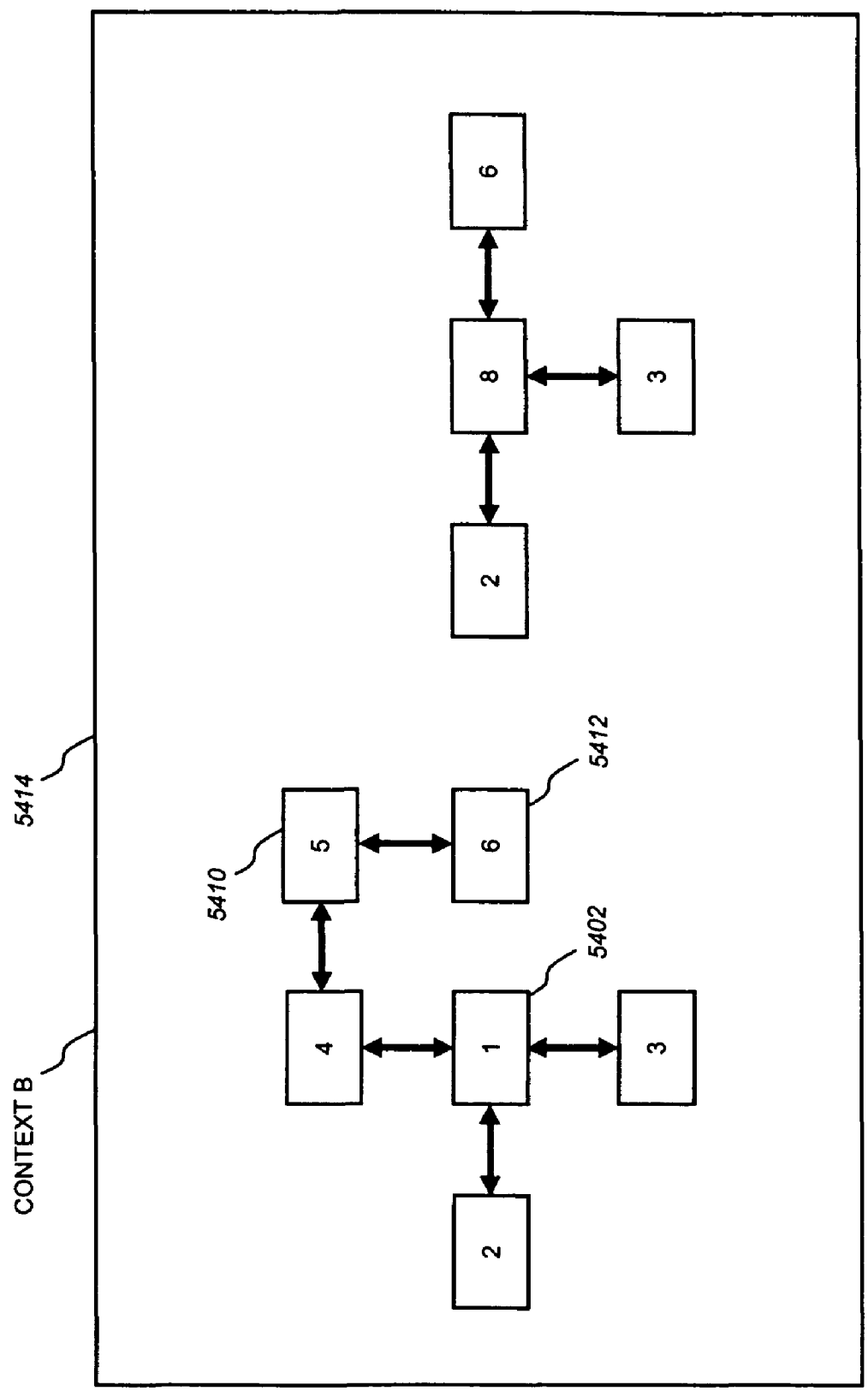
FIG. 54B shows an item in a certain context.

The number of relationships required to create a unique semantic identifier for an item may vary based on context. FIG. 54A depicts two items of interest: item 1 5402 and item 7 5404. In context A 5408, item 1 5402 may be distinguished from item 7 5404 by item 1's 5402 relationship with item 5 5410 and item 6 5412. That is, in context A, the unique semantic identifier for item 1 5402 may be that it is directly related to items 2, 3 and 4, indirectly related to item 5 5410 though item 4 and indirectly related to item 6 5412 through item 5 5410 and item 4. In context A, the unique semantic identifier for item 7 5404 may be that it is directly related to only items 2 and 3. FIG. 54B presents item 1 5402 in a different context, context B 5414. To uniquely identify item 1 5402 in context B 5414 any one or more of item 1's 5402 direct relationships with item 4, absence of a direct relationship with item 6 or indirect relationship with item 5 may be taken into account. In context B 5414 item 1 5402 may be uniquely semantically identified as directly related to items 2 and 3, but not directly related to item 6. Thus, the unique identifier for item 1 differs between context A 5408 and context B 5414. Thus, in embodiments of the data integration methods and systems described herein, a semantic identifier for an item, such as an item related to a data integration job or a data integration platform, may be provided with a context-dependent identifier for the item. In embodiments such a context-dependent identifier may be stored in an atomic format, such as in a data repository.

In other embodiments, contexts A 5408 and B 5414 may be two different imports, mappings, run versions, models, metabroker models, instances, tools, views, objects, classes, items, relationships, attributes, or any combination of any of the foregoing. A matching or comparison facility may compare the syntax of the identity of an item in different imports, run versions, models, metabroker models, instances, tools and/or items and determine or assist with the determination of what action to take or refrain from taking based on the comparison. For example, a matching engine may compare the model used by import instance A to the model used by metabroker B. Based on this comparison it may be decided that metabroker B can access the data and metadata of import instance A without transformation or modification, and the comparison facility may direct the metabroker B to proceed. In another example, tool A 5408 may be compared to tool B 5414, and it may be determined to perform a cross-tool object merge, wherein each tool can access and use the objects of the other tool. In embodiments the comparison facility may trigger a translation facility to assist the cross-tool object merge, such as establishing a bridge, metabroker, hub or the like for translating any objects that require translation, such as translation that is based on the different syntax for the handling of the identity of particular items in each respective tool, or based on other differences between the tools as determined by the comparison.

Figure 55:
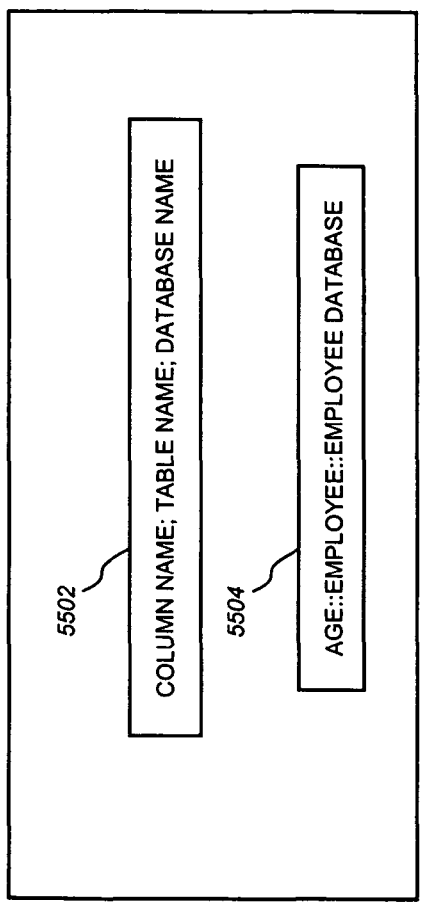
FIG. 55 shows certain strings.

In embodiments a semantic identifier may be stored, maintained, recorded, processed and/or interpreted in a syntax that may be stored, maintained, recorded, processed and/or interpreted in a string structure or format. FIG. 55 depicts an example of a syntax and a corresponding string composed in that syntax. The syntax 5502 may be column name::table name::database name. This syntax may be related, for example, to a semantic identifier that identifies a column of a table in a database. A string composed in this syntax 5504 may be age::employee::employee database. This string may be related, for example, to a semantic identifier that identifies the age of an employee in a particular employee database. In the example of FIG. 54B, the string corresponding to the semantic identifier for item 1 5402 in context B 5414 may be: direct relation to item 2::direct relation to item 3::direction relationship to item 4. The semantic identifier and corresponding string may also incorporate the lack of a direct relationship between items 1 5402 and item 6.

Figure 56:
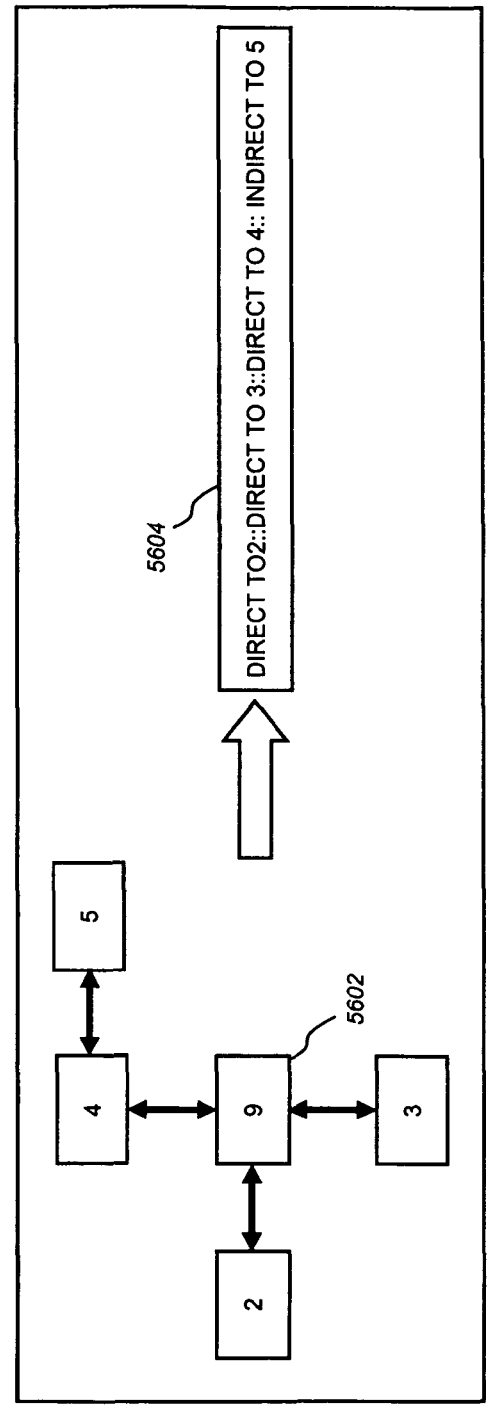
FIG. 56 shows an item and a corresponding string.
Figure 57:
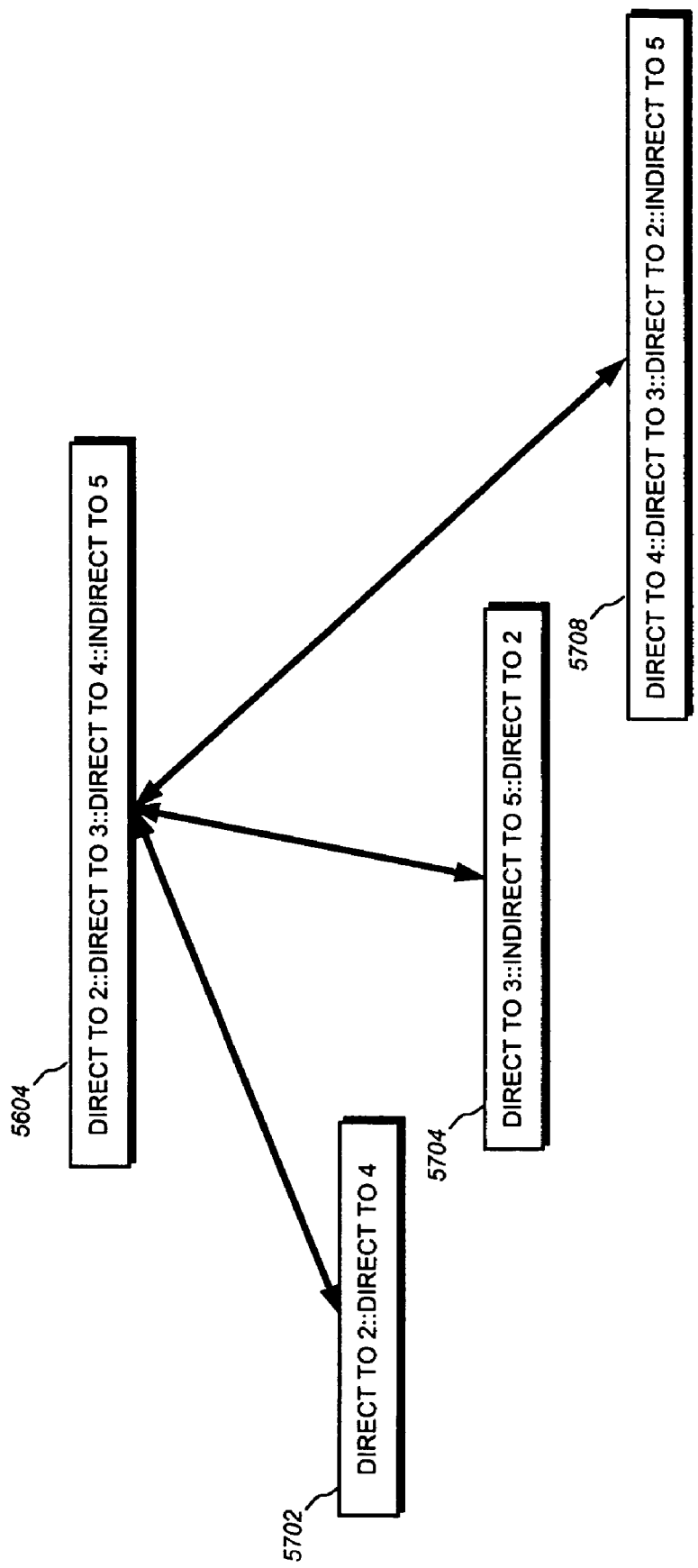
FIG. 57 shows a string and certain of its variations.

In FIG. 56 the semantic identifier in string format for item 9 5602 may be: direct to item 2::direct to item 3::direct to item 4::indirect to item 5 5604. A string may be capable of being parsed. A syntax and/or string may be truncated, modified and/or the elements of a syntax and/or string may be re-ordered. In FIG. 57 string 5702 is a truncation of string 5604, string 5704 is a truncation and modification and/or re-ordering of string 5604 and string 5708 is a modification and/or re-ordering of string 5604. The truncation, modification and/or re-ordering may be performed by a translation engine. It may be useful to truncate a syntax and/or string when all of the relationships included in the syntax and/or string are not required for the uniqueness of the semantic identifier. Suppose that in a given context for string 5604 all items were directly related to item 3; for example, item 3 was a database in which all the items were stored. String 5604 could be truncated, such as to create string 5702, omitting the relationship-involving item 3, and still remain a unique semantic identifier. Truncating a syntax and/or string may reduce storage requirements and increase processing efficiency. It may also be useful to change the order of the relationships in a syntax and/or string, for example, to reduce processing time for data integration processes 500. If the less common relationships are processed first, a system will likely need to access and process fewer relationships associated with an item in order to identify the item. For example, if very few items were related to item 3, even fewer related to item 4 and many items related to item 2, depending on the context, string 5708 may allow for the identification of item 9 in a shorter time than string 5604. It could be that only the first two elements of string 5708 are needed to uniquely identify item 9 in the context, while the first three elements of string 5604 are needed.

Figure 58:
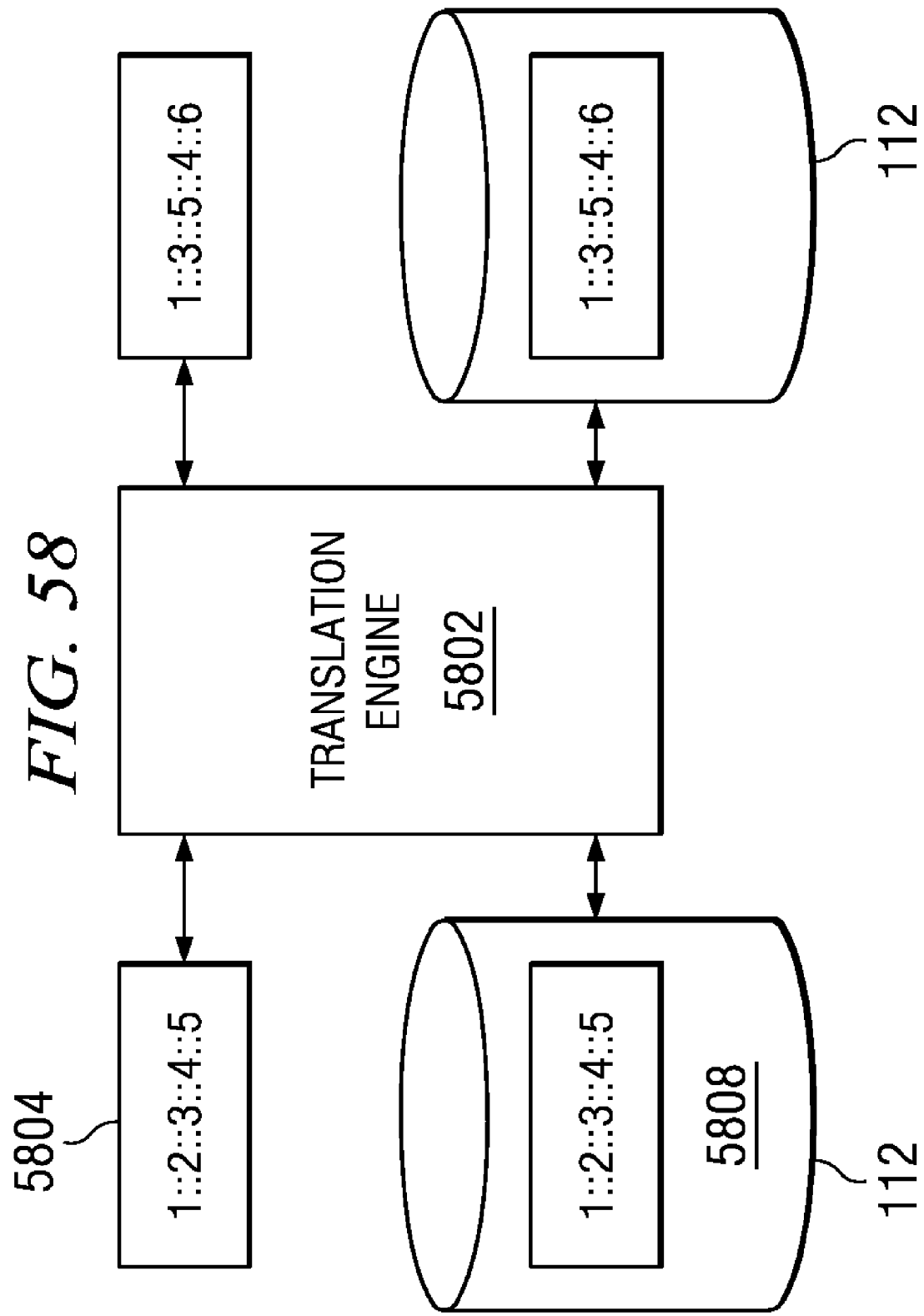
FIG. 58 shows a translation engine acting on certain strings.

A translation engine may perform translation operations with respect to one or more semantic identifiers, databases 112, databases 112 including semantic identifiers, systems of information, systems of information including semantic identifiers or other items. FIG. 58 depicts a translation engine 5802 acting on a semantic identifier embodied as a string 5804 and on a semantic identifier embodied as a string located in a database 5808. The translation operation may translate or otherwise modify the format, language and/or data model of a semantic identifier. A translation operation may involve a translation or mapping to or from one or more data tools, languages, formats and/or data models to or from at least one other data tool, language, format and/or data model. For example, a translation operation may involve a translation or mapping to, from or between known data integration tools, such as DataStage 7 from Ascential, QualityStage from Ascential, Business Objects tools, IBM—DB2 Cube Views, UML 1.1, UML 1.3, ERStudio, Ascential's ProfileStage, PowerDesigner (with added support for Packages and Extended Attributes) and/or MicroStrategy tools. A translation engine and/or translation operation may optionally be embodied in a metabroker. A translation operation may be performed, executed and/or conducted in batch, real-time and/or on a continuous basis. A translation operation may be provided or made available as a service, for example, as part of a service oriented architecture 2400.

Once a translation operation exists for a semantic identifier, database 112, database 112 including one or more semantic identifiers, system of information, system of information including one or more semantic identifiers or other item it can be translated to or from, mapped to, linked to, used with or associated with any other semantic identifier, database 112, database 112 including one or more semantic identifiers, system of information, system of information including one or more semantic identifiers or other item sharing at least one translation operation. In embodiments, such as using an atomic data repository as a hub for a translation operation, the mapping of a translation operation can, among other things, trace data that is translated in the execution of the operation backward and forward between an original semantic context and a translated semantic context. Depending on the context, the appropriate identifier for the data item may vary, such as by varying or truncating a syntax and/or string to enable more efficient storage or faster processing, or by varying the relationships used to form a unique identifier where the semantic context varies. Thus, a dynamic identifier may combine the benefits of retraceable translation with the benefits of rapid processing, efficient data processing and effective operation in various contexts in which a data item is used.

Figure 59:
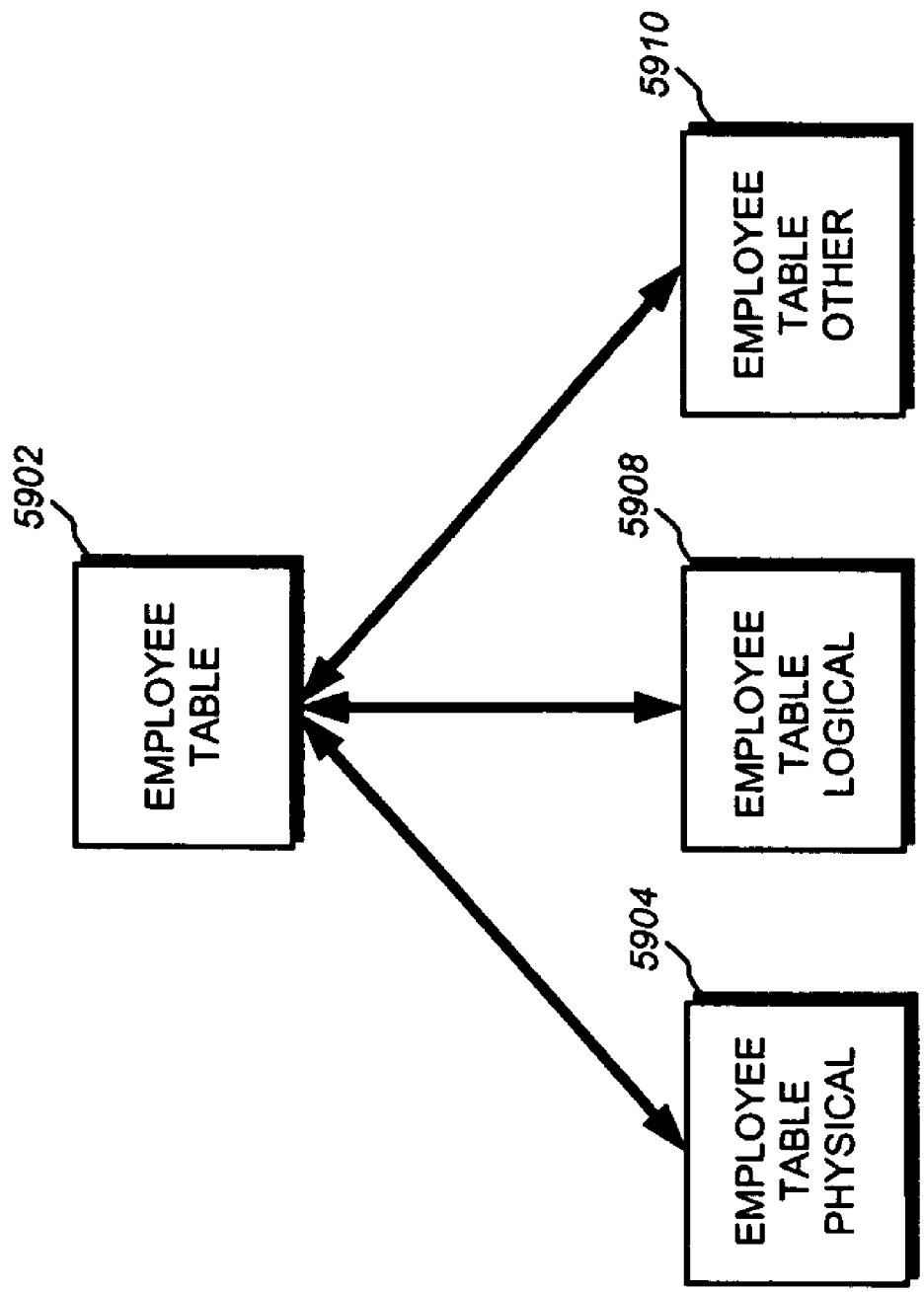
FIG. 59 shows an item that may exist in multiple forms or instances.
Figure 60:
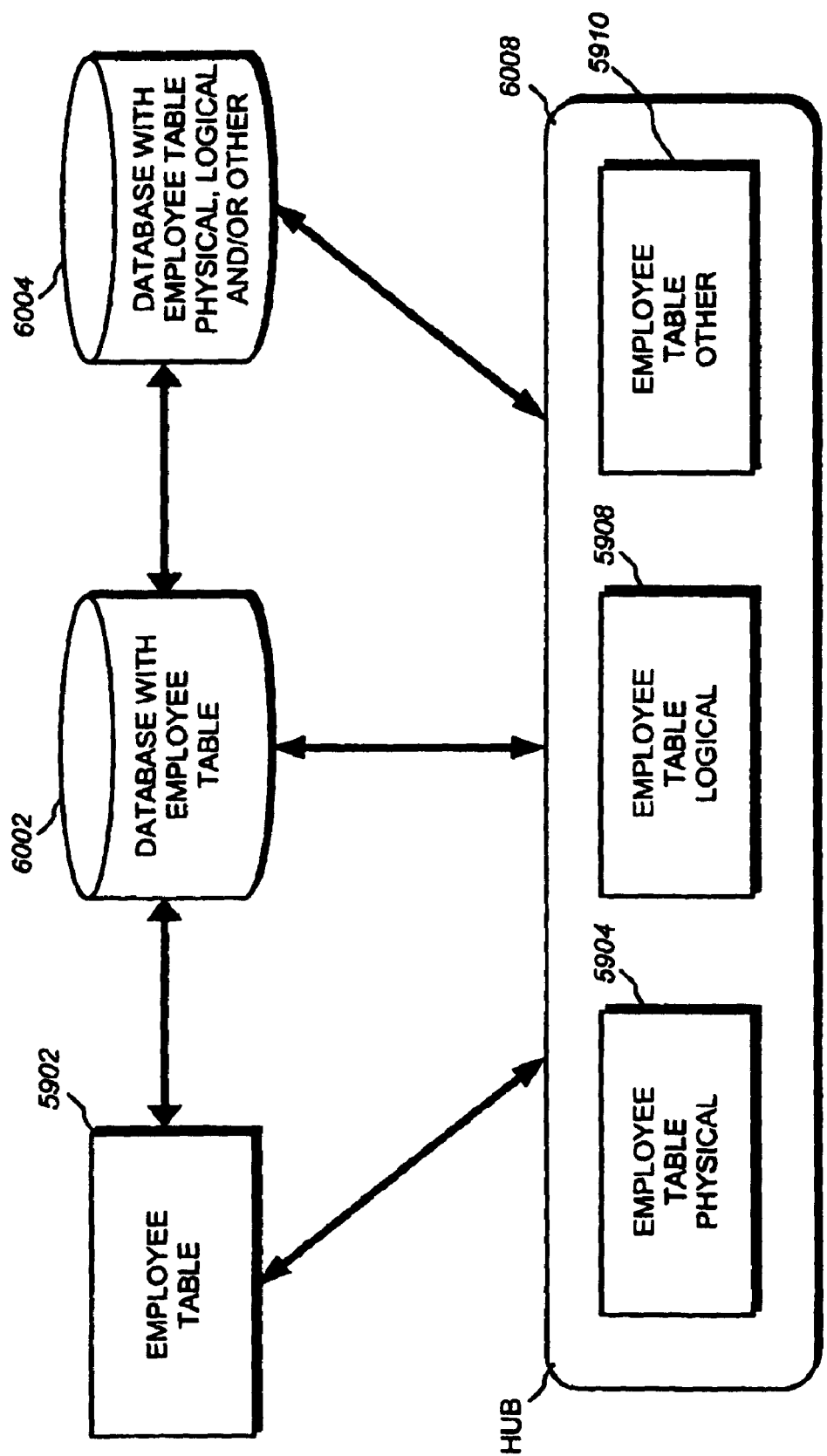
FIG. 60 shows an item that may exist in multiple forms or instances in a hub or database.
Figure 61:
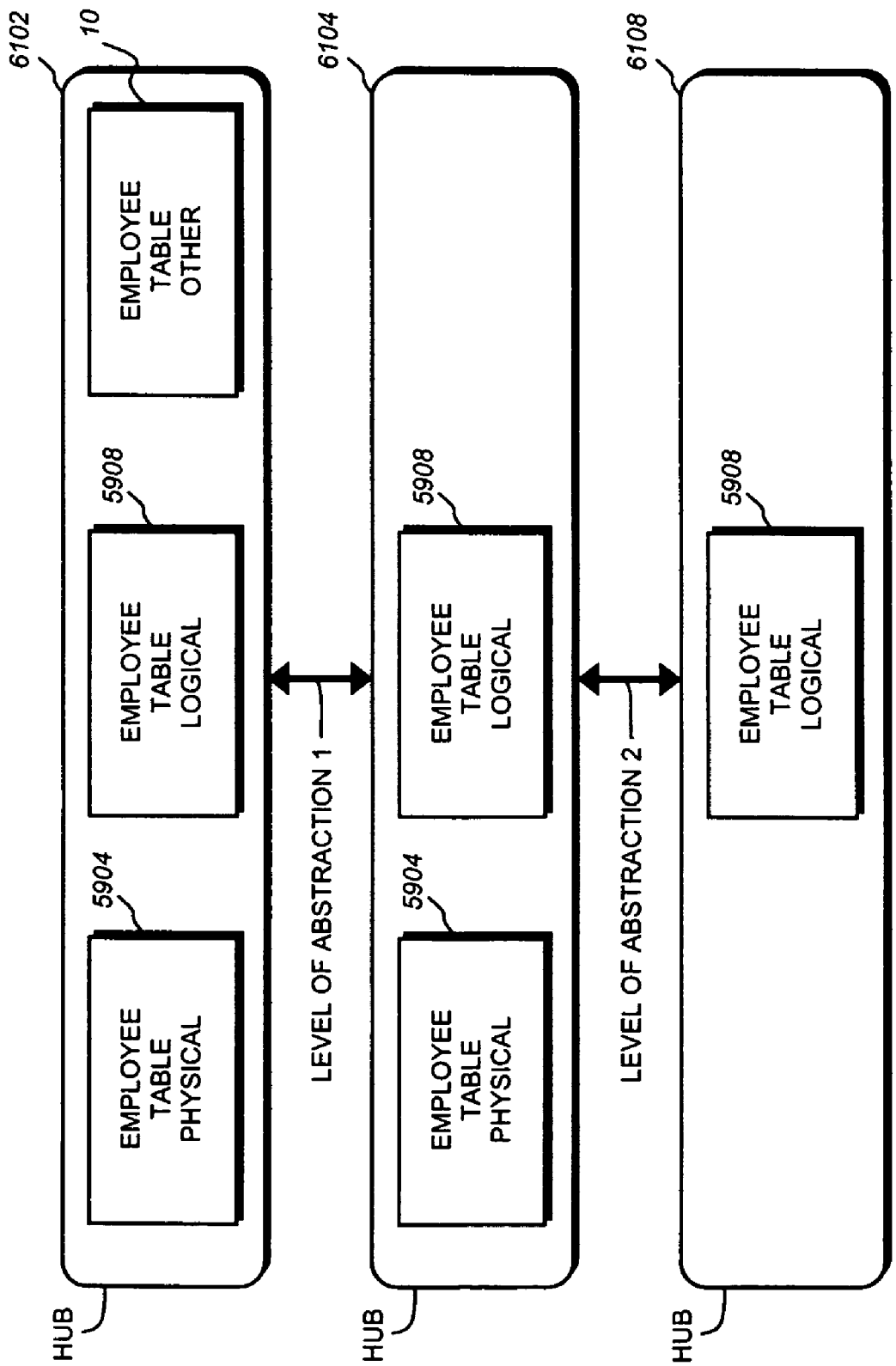
FIG. 61 shows an item in a hub at various levels of abstraction.

A given item, such as an item that has an identity in a model, may exist in multiple forms or instances, such as a physical instance and a logical modeling instance. FIG. 59 depicts an item, namely, a table of employee information 5902. However the concept or entity "employees" can exist in a number of different forms within an enterprise. For example, the employee table 5902 may exist as a physical table that stores values related to employees in a physical data storage facility. On the other hand, the entity employee may also be represented as a logical entity, such as an icon or text that represents employees in a logical modeling activity 5908, or in various other forms or instances. That is, the same item, including any associated data or metadata, may exist in multiple forms or instances across views, models, structures or a data integration environment, such as in databases, data repositories, models, hubs, or the like. FIG. 60 depicts the employee table 5902 in one form or a single instance in a database 6002 and/or more than one form or instance in a database 6004 or hub 6008.

In order to distinguish between the various forms or instances of an item, any differentiating characteristic may be used, such as a level of abstraction, a physical property of an item, a location of the item within a hierarchy, a location of an item in a database, a context in which an item is found, a syntax of an item, a relationship of an item to other items, an attribute of an item, the class of an item, or other characteristic. For example, referring back to FIG. 53, the items, or individuals in this case, may be distinguished based on age, gender, hair color, IQ, political affiliation and/or number of trips to the doctor in the past three months. For example, if age was selected as the product differentiator, it may be the case that Jessica is the only individual under ten years old, Betty is the only individual between fifty-seven and sixty-seven years old and Jim is the only individual who is thirty-seven years old. In another example, different forms or instances of the item may exist at different levels of abstraction or in different contexts. For example, the employee table may exist in multiple forms or instances in the hub 6102, such as a physical employee table 5904, such as used to store values in a database that relate to data that pertains to employees, and a logical employee model 5908, such as to be used in a view of process that relates to employees.

Distinguishing between the different instances of a particular identified item can enable a variety of other methods and processes. For example, in one embodiment, an item, such as a table named "employee," may be brought into a hub. A hub collector may have two forms or instances of "employee" in the hub; one corresponding to the physical database instance and another corresponding to the logical modeling activity. A differentiating characteristic, such as a property of the item attributed to the item in the hub allows for the differentiation between the physical instances and the logical model instances or forms. In embodiments that differentiating characteristic can be called a level of abstraction, such as to distinguish between logical and physical levels of abstraction. In other cases the hub may associate other characteristics with items, such as different forms of identifiers, relationships, classes, attributes, physical locations, logical positions, models and the like.

Figure 62:
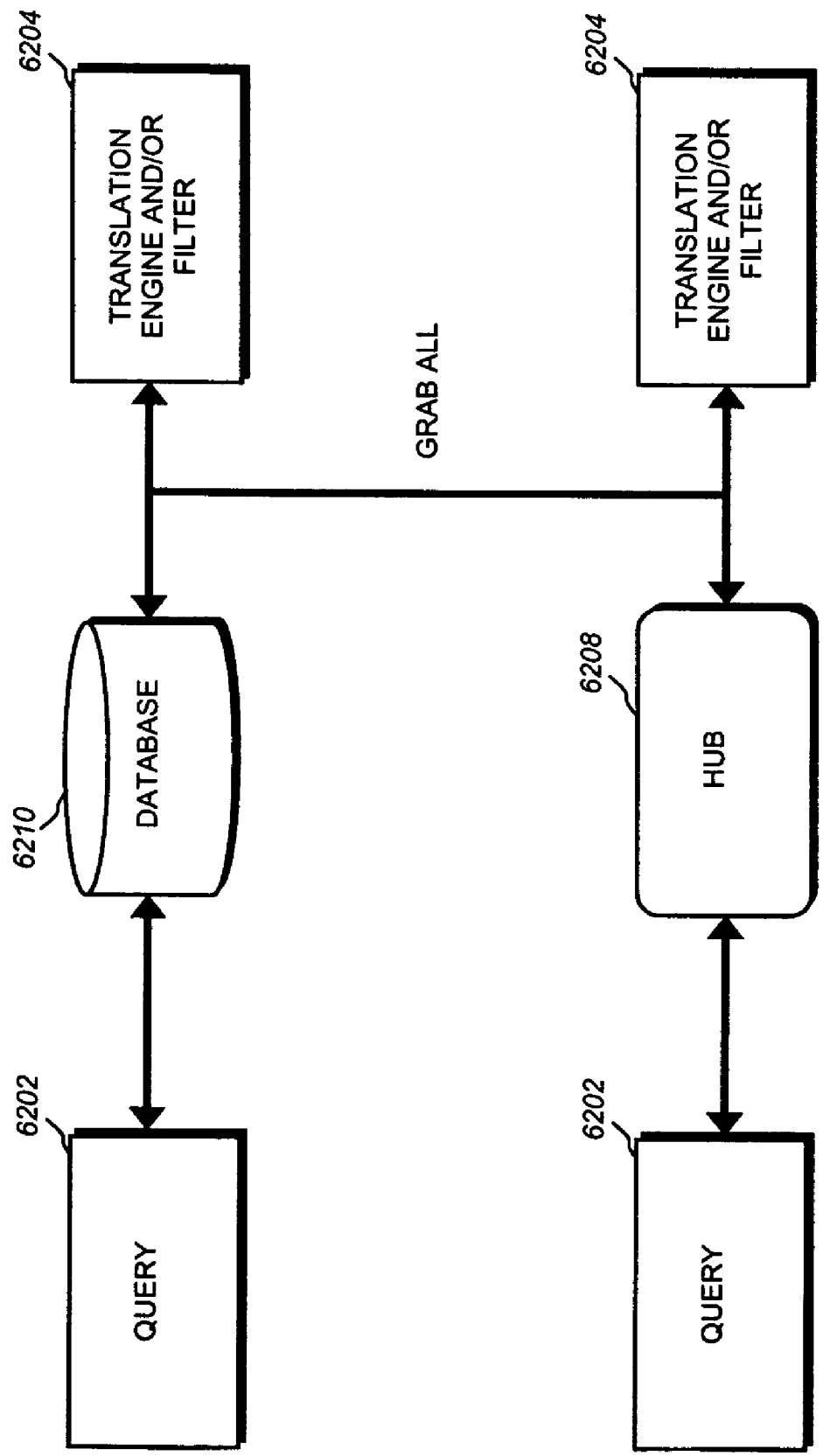
FIG. 62 shows a translation process in which all items are grabbed at the database or hub.

As depicted in FIG. 62, when performing an operation, such as selecting data to be loaded into a database, translating data, generating a query, or the like, a system, such as a translation engine 6204, may grab, load or obtain all of the items from a hub 6208 or database 6210. It may select or filter 6204 the items based on any differentiating characteristic. For example, it may select or filter out those instances or forms that have a physical level of abstraction, that have a particular relationship to other items, that have a logical level of abstraction, that are created prior to a specified date and time, or that have any other distinguishing characteristics. Thus, the methods and systems described herein provide for selective handling of instances of the same item or entity based on any differentiating characteristic.

As depicted in FIG. 63A, when performing a data integration operation, such as a translation operation, which may be in response to a query 6202, a translation engine 6204 may filter or select items, including any data and/or metadata, at the hub 6208 or database 6210 and grab, load or obtain only those items of the relevant level of abstraction. For example, it may filter or select out those instances or forms with a logical level of abstraction, keeping only those with a physical level of abstraction. The filtering or selection may be performed at runtime or design time and may be conducted in batch, real-time or on a continuous basis. In embodiments such a method of filtering or selection may be provided as an RTI service in a services oriented architecture.

The filtering or selection may be based on information, such as a mapping of a data model, a mapping of a metadata model, a differentiating characteristic, a relationship of an item to another item, an attribute of an item, or the syntax of an identifier, that is obtained by the translation engine and/or system at development-time, design-time or run-time. In embodiments the information may be updated in a dynamic fashion in real-time.

Figure 63B:
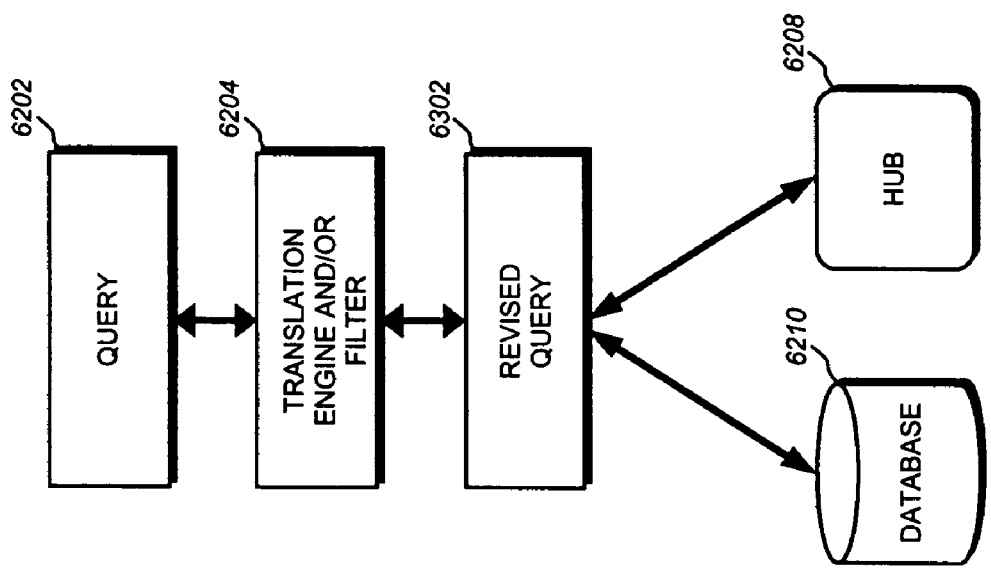
FIG. 63B shows a translation process in which the query is translated.

The closer in the overall process the filtering or selection is to the hub or database the more efficient and faster the operation. As depicted in FIG. 63B, the translation engine 6204 may perform a translation operation on the query 6202 itself, resulting in a revised query 6302, which may be sent for further processing, such as directly to the hub 6208 or database 6210. For example, the revised query 6302 may be rendered in a format that is directly compatible with the native format of the hub 6208 or database 6210. For example, by rendering the query in the native format of the database 6210, the system may increase processing efficiency for the query. Similarly, the query 6302 may be filtered or a command such as a select command may be generated to keep a logical modeling entity rather than a physical entity, in which case the query 6302 may be rendered in a format suitable for a logical modeling activity (such as a graphical user interface), rather than for the database. Of course, not only queries but other messages and operations may be filtered according to level of abstraction, enabling the same entity to be tracked across the data integration platform and handled according to the suitable operating environment of a particular data integration activity.

The methods and systems described herein can be used to capture semantic contexts and to handle data integration tasks with respect to a wide range of items related to an enterprise, such as an object, data item, datum, column, row, table, database, instance, attribute, metadata, concept, topic, subject, semantic identifier, other identifier, RFID tag, vendor, supplier, customer, person, team, organization, user, network, system, device, family, store, product, product line, product feature, product specification, product attribute, price, cost, bill of materials, shipping data, tax data, course, educational program, location, map, division, organization, organism, process, rule, law, rating system, good, service and/or service offering.

The methods and systems described herein can be used in a variety of semantic contexts, such as a step in an enterprise method, a datum in a database, a datum in a row or column, a row or column in a table, a row or column in a database, a datum in a table, a table in a database, metadata in a database, an item in a hub or repository, an item in a database, an item in a table, an item in a column, an item in a row, a person in an organization, a sender or recipient of a communication, a user on a network, a system on a network, a device on a network, a person in a family, an item in a store, a dish on a menu, a product in a product line, a product in a product offering, a course or step in an educational or training program, a location on a map, a location of an item, a division of an organization, a person on a team, a rule in a system of rules, a service in a service suite, an entity in an organizational hierarchy of an enterprise, an entity in a supply chain, a customer in a market, purchaser in a purchasing decision, a price of a good or service, a cost of a good or service, a component of a product or system, a step of a method, a member of a group, or many others.

Figure 64A:
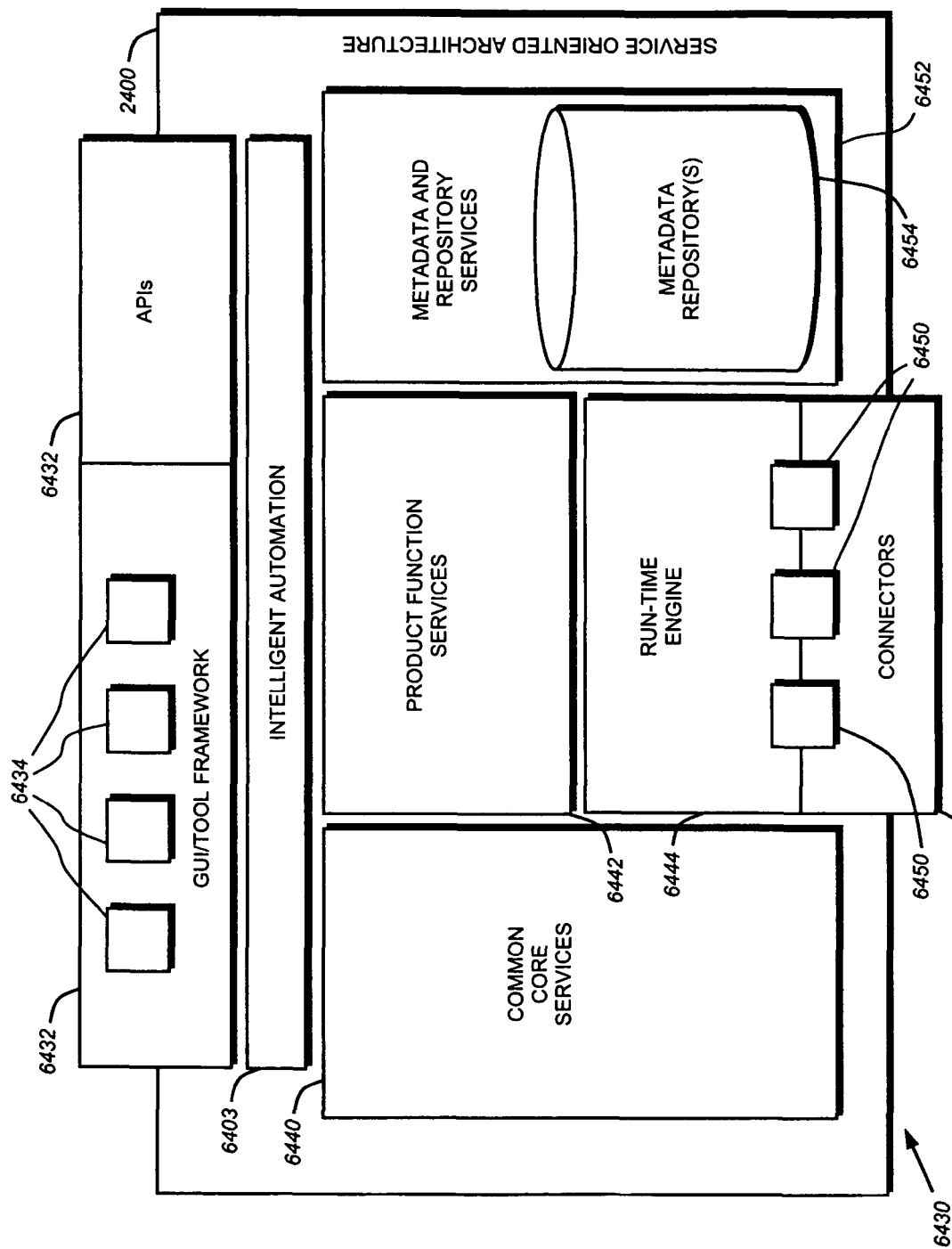
FIG. 64A shows an overview of an architecture for a data integration system that includes a services oriented architecture facility.

Referring to FIG. 64A, a high level schematic view of an architecture depicts how a plurality of services may be combined to operate as an integrated application that unifies development, deployment, operation, and life-cycle management of a data integration solution. The unification of data integration tasks into a single platform may eliminate the need for separate software products for different phases of design and deployment. Although presented in a unified view, it should be understood that the individual modules, processes, services, and functions can each be provided separately, such as by invoking each of them independently as services in a services oriented architecture 2400.

The architecture 6430 may include a GUI/tool framework 6432, an intelligent automation layer 6403, one or more clients 6434, APIs 6438, core services 6440, product function services 6442, metadata services 6452, metadata repositories 6454, one or more runtime engines 6444 with component runtimes 6450 and connectors 6448. The architecture 6430 may be deployed on a service-oriented architecture 2400, such as any of the service-oriented architectures 2400 described above.

Metadata models stored in the metadata repository 6454 provide common internal representations of data throughout the system at every step of the process from design through deployment. The common services may provide for batch processing, concurrent processing, straight through processing, pipelining, modeling, simulation, conceptualization, detail design, testing, debugging, validation, deployment, execution, monitoring, measurement, improvement, upgrade, reporting, system management, and administration. Models may be registered in a directory that is accessible to other system components. The common models may provide a common representation (common to all product function services) of numerous suite-wide items including metadata (data descriptive data including data profile information), data integration process specifications, users, machine and software configurations, etc. These common models may enable common user views of enterprise resources and integration processes no matter what product functions the user is using, and may obviate the need for model translation among integrated product functions.

The service oriented architecture (SOA) 2400 is shown as encompassing all of the services and may provide for the coordination of all the services from the GUI 6432 through the run time engine 6444 and the connections 6448 to the computing environment. The common models, which may be stored in the metadata repository 6454, may allow the SOA 2400 to seamlessly provide interaction between a plurality of services or a plurality of models. The SOA 2400 may, for example, expose the GUI 6432 to all aspects of data integration design and deployment by use of common core services 6440, production function services 6442, and metadata services 6452, and may operate through an intelligent automation layer 6403. The common models and services may allow for common representation of objects in the GUI 6432 for various actions during the design and deployment process. The GUI 6432 may have a plurality of clients 6434 interfacing with SOA 2400 coordinated services. The clients may allow users to interface with the data integration design with a plurality of skill levels enabling users to work as a team across organizationally appropriate levels. The SOA may provide access to common core services and product function services, as well as providing back end support to APIs, for functions and services in data integration designs. Services may be shared and reused by a plurality of clients and other services. For example, a GUI 6432 may be the GUI for a client application that is designed specifically to work with a particular RTI service, such as exposing a particular data integration job as a service. Alternatively, the GUI 6432 may be a GUI for a product service 6442, such as a data integration service, such as extraction, transformation, loading, cleansing, profiling, auditing, matching, or the like. In other cases the GUI 6432 may be a GUI or client for a common service 6440, such as a logging or event management service. The clients 6434 may allow users to interface with the data integration design with a plurality of skill levels enabling users to work as a team across organizationally appropriate levels.

The SOA 2400 may provide access to common core services 6440, product function services 6442, and services related to metadata. The SOA 2400 may also include one or more APIs 6438 that expose the functions and services in the data integration platform to external applications and devices. Services may be shared and reused by a plurality of clients 6434, APIs, devices, applications and other services. The intelligent automation layer 6403 may employ metadata and services within the architecture 2400 to simplify user choices within the GUI 6432, such as by showing only relevant user choices, or automating common, frequent, and/or obvious operations. The intelligent automation layer 6403 may automatically generate certain jobs, diagnose designs and design choices, and tune performance. The intelligent automation layer 6403 may also support higher-level design paradigms, such as workflow management or modeling of business context, and may more generally apply project or other contextual awareness to assist a user in more quickly and efficiently implementing data integration solutions.

The common core services 6440 may provide common function services that may be commonly used across all aspects of the design and deployment of the data integration solution, such as directory services for one or more common registries, logging and auditing services, monitoring, event management, transaction services, security, licensing (such as creation and enforcement of licensing policies and communication with external licensing services), and provisioning, and management of SOA services. The common core services 6440 may allow a common representation of functions and objects to the common GUI 6432. Any other service, such as the product function services 6442, RTI services, or other services, devices, applications or modules can access and act as a client of any particular common service 6440.

Other product specific function services 6442 may be contained in the product function services 6442 and may provide services to specific appropriate clients 6434 and services. These may include, for example, importing and browsing external metadata, as well as profiling, analyzing, and generating reports. Other functions may be more design-oriented, such as services for designing, compiling, deploying, and running data integration services through the architecture. The product function services 6442 may be accessible to the GUI 6432 when an appropriate task is used and may provide a task oriented GUI 6432. A task oriented GUI may present a user only functions that are appropriate for the actions in the data integration design.

The application program interfaces (APIs) 6438 may provide a programming interface for access to the full architecture, including any or all of the services, repositories, engines, and connectors therein. The APIs 6438 may contain a commonly used library of functions used by and/or created from various services, and may be called recursively.

FIG. 64A additionally shows metadata and repository services 6452 that may control access to the metadata repository 6454. All functions may keep metadata represented by its own function-specific models in a common repository in the metadata repository 6454. Functions may share common models, or use metadata mappings to dynamically translate semantics among their respective models. All internal metadata and data used in data integration designs may be stored in the metadata repository 6454 and access to external metadata and data may be provided by a hub (a metadata model) stored in the metadata repository 6454 and controlled by the metadata and repository services 6452. Metadata and metadata models may be stored in the metadata repository 6454 and the metadata and repository services 6452 may maintain metadata versioning, persistence, check-in and check-out of metadata and metadata models, and repository space for interim metadata created by a user before it is reconciled with other metadata. The metadata and repository services 6452 may provide access to the metadata repository 6454 to a plurality of services, GUI 6432, internal clients 6434 and external clients using a repository hub. Access by other services and clients 6434 to the metadata repository 6454 may allow metadata to be accessed, transformed, combined, cleansed, and queried by the other services in seamless transactions coordinated by the SOA 2400.

A runtime engine 6444, of which there may be several, may use adapters and connections 6448 to communicate with external sources. The engines 6444 may be exposed to designs created by a user to create compiled and deployed solutions based on the computing environment. The runtime engine 6444 may provide late binding to the computer environment and may provide the user the ability to design data integration solutions independent of computer environment considerations. The run time engine 6444 orchestration with SOA 2400 services may allow the user to design without restrictions of run time compilation issues. The runtime engine 6444 may compile the data integration solution and provide an appropriate deployed runtime for high throughput or high concurrency environments automatically. Services may be deployed as J2EE structures from a registry that provides access to interface and usage specifications for various services. The services may support multiple protocols, such as HTTP, Corba/RMI, JMS, JCA, and the like, for use with heterogeneous hardware and software environments. Bindings to these protocols may be automatically selected by the runtime engine 6444 or manually selected by the user from the GUI 6432 as part of the deployment process.

External connectors 6448 may provide access to a network or other external resources, and provide common access points for multiple execution engines and other transformation execution environments, such as Java or stored procedures, to external resources.

It will be appreciated that an additional functional layer may be provided to assist in selecting and using the various runtime engines 6444. This is particularly useful when provided in support of the high throughput or high concurrency deployments. For example, the runtime engines 6444 may include a transaction engine adapted to parse large transactions of potentially unlimited length, as well as continuous streams of real time transactions. The runtime engines 6444 may also include a parallelism (or concurrency) engine adapted to processing small independent transactions. The parallelism engine may try to break up a process into pipeline functionality or some other partitioned flow, and works well with a large volume of similar work units. The parallelism engine may be adapted to receive preprocessed input (and output) that has been divided into a pipelined or otherwise partitioned flow. A compilation and optimization layer may determine how to present processes to these various engines, such as by preprocessing output to the parallelism engine into small chunks. By centralizing connectors within the architecture, it is possible to more closely control distribution of processes between various engines, and to provide accessibility to this control at the user interface level. Also, a common intermediate representation of connectivity in a transformation process enables deployment of any automation strategies, and selection of different combinations of execution engines, as well as optimization based on, for example, metadata or profiling.

The architecture 6430 described herein provides a high-degree of flexibility and customizability to the user's working environment. This may be applied, for example, to configure user environments around existing or planned workflows and design processes. Users may be able to create specific functional services by constructing components and combining them into compositions, which may also serve in turn as components allowing recursive nesting of modularity in the design of new components. The components and compositions may be stored in the metadata repository 6454 with access provided by the metadata and repository services 6452. Metadata and repository services 6452 may provide common data definitions with a common interface with a plurality of services and may provide support for native data formats and industry standard formats. The modular nature of the architecture described herein enables packaging of any enterprise function(s) or integration process(es) into a package having components selected from the common core services 6440 and other ones of the product function services 6442, as well as other components of the overall architecture. The ability to make packages from system components may be provided as a common core service 6440. Through this packaging capability, any arbitrary function can be constructed, provided it is capable of expression as a combination of atomic services, components, and compositions already within the architecture 6430. The packaging capability of the architecture 6430 may be combined with the task orientation of the user interface to achieve a user interface specifically adapted to any workflow or design methodology that a user wishes.

Figure 64B:
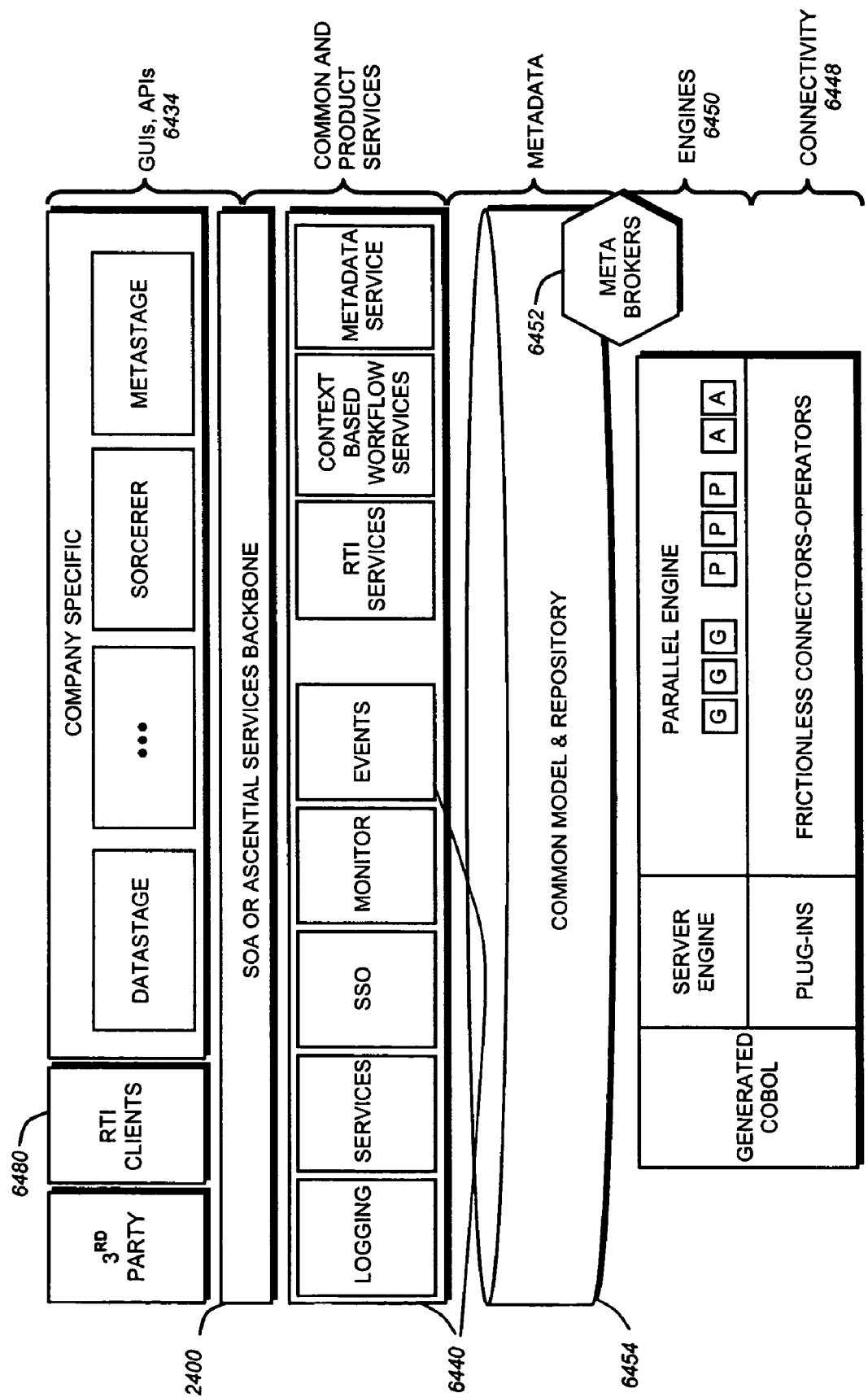
FIG. 64B shows a high level schematic view of another similar architecture for a data integration system that includes a services oriented architecture.

FIG. 64B depicts, at a high level, another architecture for a data integration system that includes an SOA 2400, which in an embodiment may be the Ascential Services Backbone from Ascential. The architecture may include components similar to those described in connection with FIG. 64A, such as one or more GUIs 6434, which may include specific clients 6480 that are designed to interact with various RTI services, such as described throughout this disclosure. The GUIs 6434 may include various other GUIs, such as GUIs for a variety for a variety of data integration tools, such as Ascential's DataStage, MetaStage, RTI, DataStage TX, and other tools, as well as tools from other vendors. Thus a specially designed GUI, such as an RTI client 6480, or a conventional GUI 6434, may facilitate interaction with the functions, processes, modules and services of the data integration platform. In embodiments the GUIs 6434 may be clients of services that are deployed in a services oriented architecture. Various types of services can be enabled in such an architecture. In addition to real time data integration services, or RTI services, as described above, the platform may include various other product services 6442, such as services that perform specific data integration functions. A wide range of product services 6442 can be exposed as services in an SOA to enable access to the functions without requiring them to be separately coded. Many embodiments of such product services 6442 are described in detail below. In addition, the architecture may include common services 6440, which include a variety of services that may be useful for a wide variety of applications, modules, processes or functions. As described below, the GUIs 6434, product services 6442, other common services 6440, and other applications can serve as clients of any of the common services 6440, invoking the common services 6440 as needed to perform common functions, such as logging, event management, monitoring, provisioning, security, and the like. Many embodiments of such common services 6440 are described below. An SOA may also interact with common model and repository data and metadata 6454, including to expose metadata related services in an SOA. The architecture may also include an API, such as to allow an external device or application to access the data integration functions of the platform. An SOA 2400 may also interact with and/or invoke metabrokers 6452, engines 6450 and connectivity applications 6448. Such as to perform data integration tasks, such as extraction, transformation, and loading of data and metadata.

Referring to FIG. 64C a schematic of the SOA 2400 environment shows how the SOA 2400 interfaces to other architecture 6400 clients and services. The core of the SOA 2400 may be the service binding 6468, SOA infrastructure 6470, and service implementation 6474. Service binding 6468 may permit binding of clients, such as GUI 6464, applications 6460, script orchestration 6458, management framework 6456, and other clients, to services that may be internal or external to the SOA 2400. The bound services may be part of the common core services 6440 and the services binding 6468 may access the service description registry 6466 to instantiate the service. The service binding 6468 may make it possible for clients to use services that may be local or external using the same or different technologies. The binding to external services may expose the external services and they may be invoked in the same manner as internal services. Communication to the services may be synchronous or asynchronous, may use different communication paths, and may be stateful or stateless. The service binding 6468 may provide support for a plurality of protocols such as, HTTP, EJB, web services protocols, CORBA/RMI, JMS, or JCA. As described herein, the service binding 6468 may determine the appropriate protocol for the service binding automatically according to the computer environment or the user may select the protocol from the GUI 6468 as part of the design solution.

The management framework 6456 client may provide facilities to install, expose, catalog, configure, monitor, and otherwise administer the SOA 2400 services. The management framework 6456 may provide access to clients, internal services, external services through connections, or metadata in internal or external metadata.

The orchestration client 6458 may make it possible to design a plurality of complex product functions and workflows by composing a plurality of SOA 2400 services into a design solution. The services may be composed from the common core services, 6440 services external to the internal services, 6484 internal processes 6484, or user defined services 6478. The orchestration of the SOA 2400 is at the core of the capability to provide a unified data integration designs in the enterprise environment. The orchestration between the clients, core services, metadata repository services, deployment engines, and external services and metadata enables designs meeting a wide range of enterprise needs. The unified approach provides an architecture to bind together the entire suite for enterprise design and may allow for a single GUI 6464 capable of the seamless presentation of entire design process through to a to deployment design solution. This architecture also enables common models to be used at design and run time, and common deployment models leveraging the same services as the design GUI 6464.

The application client 6460 may programmatically provide additional functionality to SOA 2400 coordinated services by allowing services to call common functions as needed. The functions of the application client 6460 may enhance the capability of the services of the SOA 2400 by allowing the services to call the functions and apply them as if they were part of the service. The GUI client 6464 may provide the user interface to the SOA 2400 services and resources by allowing these services and resources to be graphically displayed and manipulated.

The SOA infrastructure 6470 may be J2EE based and may provide the facility to allow services to be developed independent of the deployment environment. The SOA infrastructure 6470 may provide additional functionality in support of the deployment environment such as resource pooling, interception, serializing, load balancing, event listening, and monitoring. The SOA infrastructure 6470 may have access to the computing environment and may influence services available to the GUI 6464 and may support a context-directed GUI 6464.

The SOA infrastructure 6464 may provide resource pooling using, for example, enterprise java bean (EJB) and real time integration (RTI). The resource pooling may permit a plurality of concurrent service instances to share a small number of resources, both internal and external.

The SOA infrastructure may provide a number of useful tools and features. Interception may provide for insertion of encryption, compression, tracing, monitoring, and other management tools that may be transparent to the services and provide reporting of these services to clients and other services. Serialization and de-serialization may provide complex service request and data transfer support across a plurality of invocation protocols and across disparate technologies.

Load balancing may allow a plurality of service instances to be distributed across a plurality of servers. Load balancing may support high concurrency processing or high throughput processing accessing one or a plurality of processor on a plurality of servers. Event listening and generation may enable the invocation of a service based on observed external events. This may allow the invocation of a second service based on the function of a first service and if a specified condition may occur. Event listening may also support call back capability specifying that a service may be invoked using the same identifier as when previously invoked.

The service description registry 6466 may be a service that maintains all interface and usage specifications for all other services. The service description registry 6466 may provide query and selection services to create instances of services, bindings, and protocols to be used with a design solution. As an example, instances of services may be requested by a client or other service to the SOA 2400 where the SOA 2400 will request a query or selection of the called service. The service description registry 6466 may then return the instance of the service for binding by the service binding 6468 and then may be used in the design solution.

The common core services 6440 may contain a plurality of services that may be invoked to create design solutions and runtime deployed solutions. The common core services 6440 may contain all of the common services for design solutions therefore freeing other services from having to maintain the capabilities of these services themselves. The services themselves may call other services within the common core services 6440 as required to complete the design solution. A plurality of clients may access the common core services 6440 through the service binding 6468 SOA infrastructure 6470 and service description registry 6466. Common core services may also be accessed by external services through metadata repository services 6452 and the SOA infrastructure 6470.

Additional external services may access any of the environments supported by the SOA infrastructure 6464 through the service implementation 6474. The service implementation may provide access to external services through use of adapters and connectors 6448. Through the service implementation 6474, services 6480 may expose specific product functionality provided by other software products for developing design solutions. These services 6480 may provide investigation, design, development, testing, deployment, operation, monitoring, tuning, or other functions. As an example, the services 6480 may perform the data integration jobs and may access the SOA 2400 for metadata, meta models, or services.

The service implementation 6474 may provide access for the processes 6484 to integration processes created with other tools and exposed as services to the SOA infrastructure 6470. Users of other tools may have created these integration processes and these processes may be exposed as services to the SOA 2400 and clients.

The service implementation 6474 may also provide access to user defined services 6478 that may allow users to define or create their own custom processes and expose them as SOA services. Exposing the user-defined services 6478 as SOA services allows them to be exposed to all clients and services of the SOA 2400.

Figure 64D:
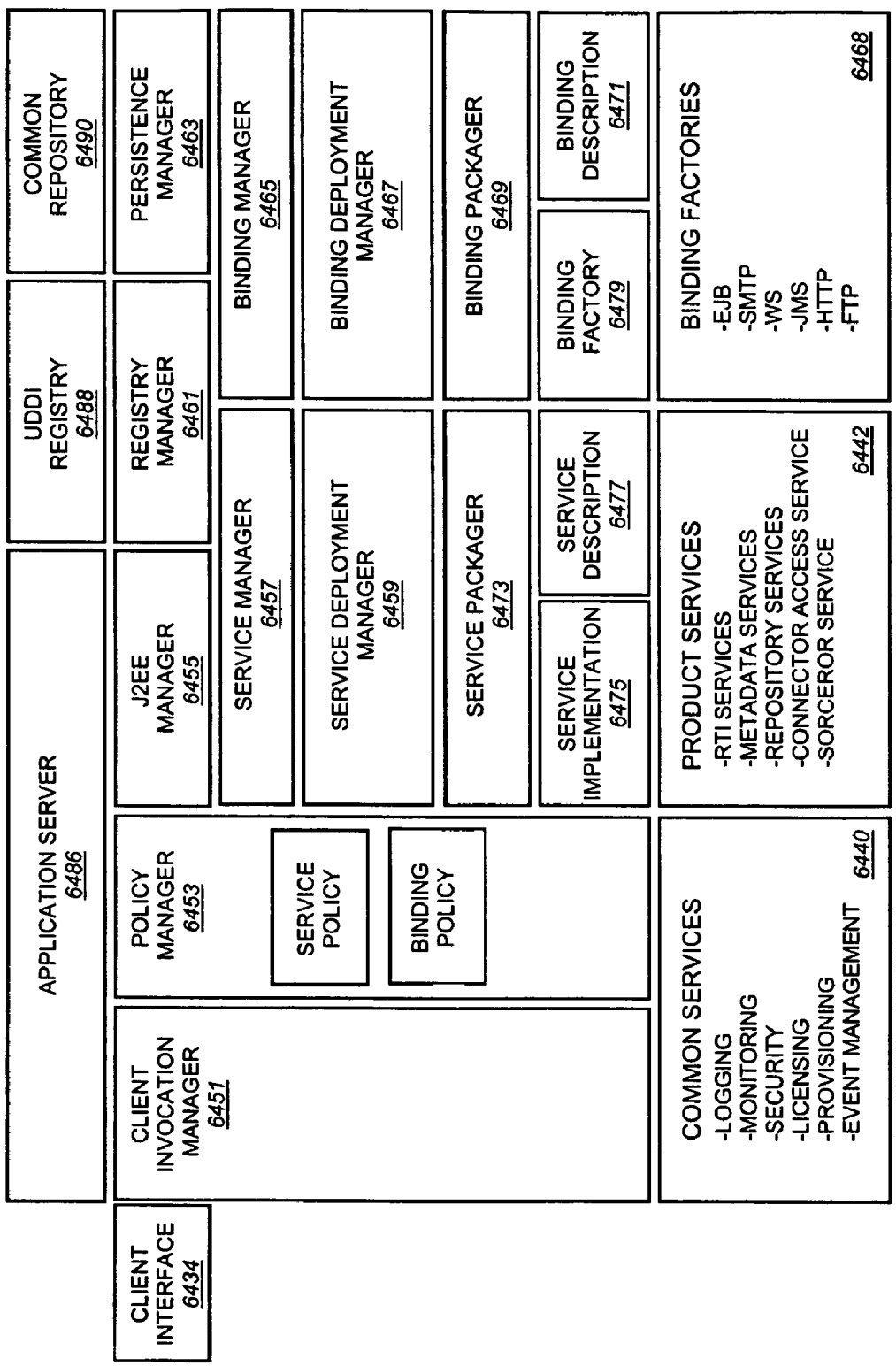
FIG. 64D shows additional modules for enabling services in a services oriented architecture.

FIG. 64D depicts the internal architecture of an SOA 2400, such as the Ascential Services Backbone. A SOA 2400, may incorporate or be composed of several different managers, such as a client invocation manager 6451 for managing the invocation of a client interface 6434, a policy manager 6453, that may manage service and binding policies, a J2EE manager 6455, a registry manager 6461, a persistence manager 6463, a service manager 6457 for managing the deployment of services, such as to add, modify or delete services, a binding manager 6465, a service deployment manager 6459 for managing deployment of services and a binding deployment manager 6467 for managing deployment of bindings for services. An application server 6486, UDDI registry 6488 and a common repository 6490 may be associated with or part of the SOA 2400. The SOA may provide common services 6440 and product services 6442. Each service may have a description 6477 associated with it. The description 6477, or the service itself, may have certain extensions associated with it. An extension may be used to link a service to other services. An example of an extension would be to attach a "monitoring service extension" to a service. In the case of the monitoring service, this extension can consist, for example, of an m-bean that the service uses to track some values related to the service behavior. When this extension is found, the m-bean can automatically be registered with the monitoring service. In embodiments of the invention an administrator can define "metrics" that are calculated values created on top of the raw attribute values of the m-bean and can also define "monitors" that are monitoring the m-bean to react to changes to the m-bean attribute values or to changes to the calculated values of the metrics. An example of a behavior associated to a monitoring service can be to generate an event (managed by the event management service). In turn that event may call another service, or send an email or an alert to some specific users or administrators. An m-bean associated with a service description can capture values of attributes of the service, such as the number of times a service was invoked, or the like. In embodiments common services 6440, such as a monitoring service, can monitor the m-bean and calculate various metrics, such as averages, weighted averages, or the like, based on the values and attributes captured in the m-beans. The architecture can also include a service packager 6473 and a binding packager 6469. A binding factory 6479 can be used to build bindings 6468, such as bindings that are appropriate for various services. A service may have multiple bindings, which, as described below, may facilitate a variety of types of coupling between the service and various clients of the service.

Figure 64E:
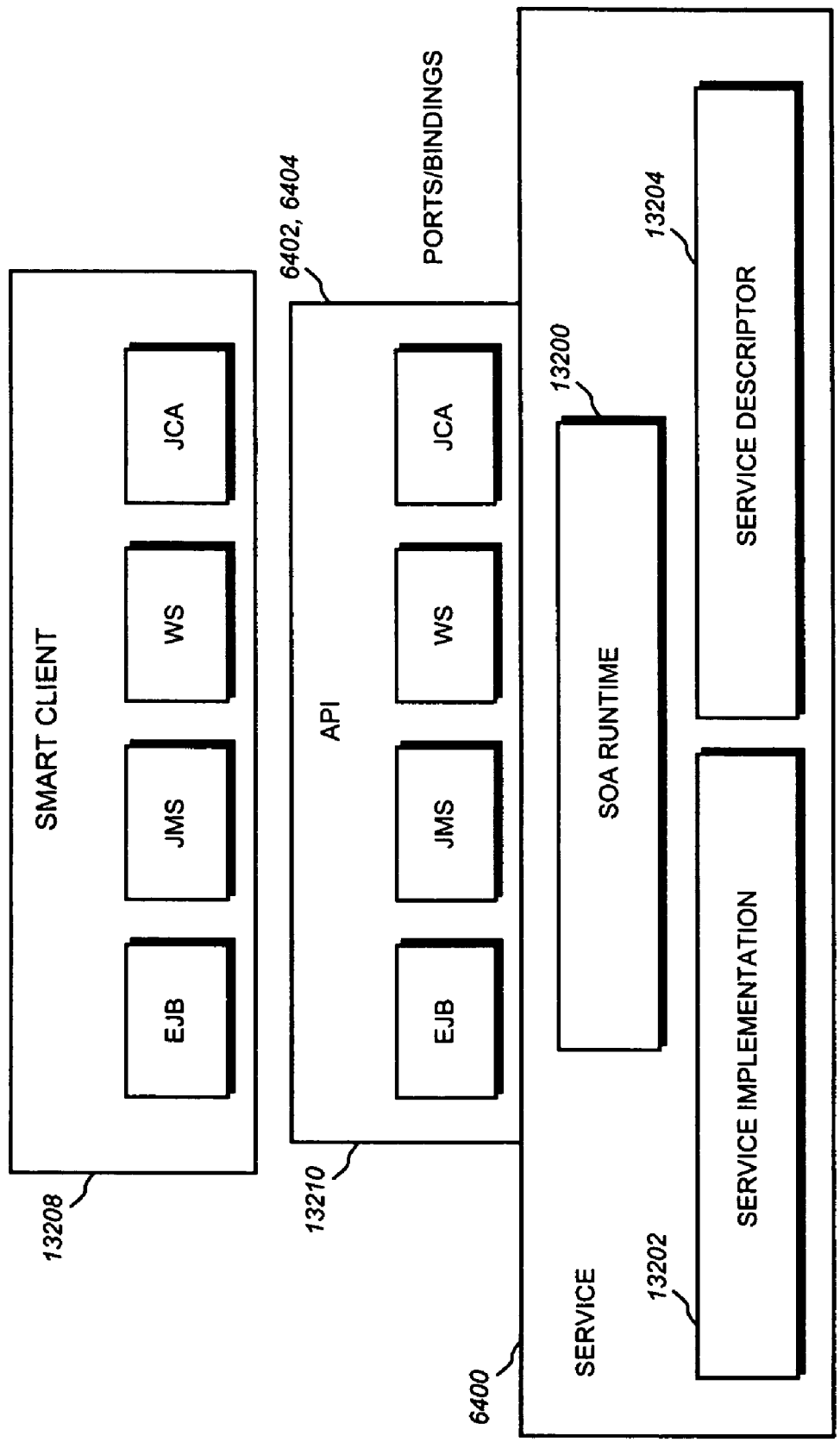
FIG. 64E shows a services oriented architecture with a smart client.

Referring to FIG. 64E, in services oriented architectures one attaches bindings 6404 that allow the service to be accessed, such as through ports 6402. As described herein, various bindings, such as EJB, JMS, web services and JCA bindings can be used to invoke services in the various embodiments of services oriented architectures described herein. In embodiments, an API 13210 may be provided for assisting access to a service 6400. The API may be provide various functions, such as selecting a particular binding for a service, where the selection is based on a condition or event, such as selecting a binding that is appropriate for a particular application. For example, bindings may vary in their flexibility, and an API 13210 may apply a tight or loose binding based on the conditions of the application or device that accesses the service. In embodiments the API 13210 may be a Java API or similar facility. In embodiments the same Java API 13210 may be used for different kinds of bindings. In embodiments, a smart client 13208 may be supplied for a service 6400. The smart client 13208 may be another layer on top of the API 13210 or may substitute for the API 13210. The smart client 13208 may be stored and accessed through a registry associated with a service. For example, an application may download the appropriate smart client 13208 based on the device using the application, the context of the application, or the like. For example, a smart client 13208 may be used to buffer certain information that is used by a service and send the information to the service in a package, rather than having an application access the service constantly. For example, when accessing a logging service, a user may wish to log only errors, rather than all events. By holding events until predetermined time periods, the user can reduce the number of calls to the server while still capturing all of the necessary events. The smart client 13208 can thus execute various rules that optimize the use of a service by a device or application. In embodiments the smart client 13208 can select a binding, either alone or by interaction with an API 13210, that optimizes the binding of the client-side device or application to the service 6400 based on the conditions of access, the capabilities of the device, the context of the access, or the like. The smart client 13208 or API 13210 can be used to store various access rules. For example, the rules might indicate that if a device or application is inside a firewall, then it can access a service using EJB bindings, while if the device or application is outside the firewall then it will access a service using a web service binding. Any such rules can be embodied in the API 13210 or may be included in a smart client 13208, which may optionally be listed in a registry with the service and downloaded by a client device or application that will access the service.

One of the benefits of a services oriented architecture is that it facilitates loose coupling between a client device or application that accesses a service and the code for the service itself, that is, a client device or application can invoke and use the service without knowing very much about the code for the service, needing to satisfy only certain predetermined inputs, such as what to input to the service (e.g., a file, an answer to a query, or the like). However, the absence of a tight coupling can result in performance problems, as context-dependent optimizing routines are omitted from the service description in order to make it more generically useful. An API 13210 and/or smart client 13208 can make up for diminished performance by ensuring that a service is accessed optimally, such as by selecting a correct binding, caching data into batches, to avoid constantly invoking services for small jobs, or the like. Thus, a smart client 13208 provides effective performance in a loose coupling environment. The smart client 13208 thus bridges the gap between a tight coupling environment and a loose coupling environment and allows the user, application or device that accesses a service to choose a type of binding along the spectrum between loose coupling and tight coupling (such as EJB) according to the performance expectation or requirements. For example, EJB coupling may perform better than web services, because EJB couplings are by nature more tightly coupled between client applications and the server side. The smart client 13208 improves performance of both EJBs and web services by caching or buffering and sending things in appropriate batches. In situations where it is impossible or not desirable to cache or buffer items, a system can use a tight EJB binding to achieve good performance. In embodiments the API 13210 may hide the binding that the client device or application is using. With a smart client 13208, a user can tune the performance of the system by tuning the level of coupling between the client and the server.

In embodiments the runtime 13200 of a service in a services oriented architecture may be a client itself of another service, such one or more of the common services described in connection with FIGS. 124 through 131 above. In embodiments the foregoing can be accomplished using AOP. In AOP, entities known as interceptors can associate a policy to a service. Inside the policy of the service, interceptors can be plugged into the policies, and the interceptors can be clients of the common services. For example, a policy in a service can include a plug-in that invokes the monitoring service 12500 of FIG. 125. Thus, AOP techniques can be used to insert code of interceptors into the code of various services described herein. In AOP, a user can create a piece of code and associate an "aspect"—a list of things to insert at runtime to the code as it is being executed. At that point in the code, the runtime program calls another piece of code, such as invoking a service, rather than doing what the code would normally do. At that point, the code calls another function that is compiled independently. Thus, when programmer looks at the source code for a runtime program, the programmer doesn't see the source code for the piece that is invoked by the interceptor. For example, in Java, the program can compile the source code to create the byte code, which is the runtime of Java, and a Java virtual machine reads the byte code. The program has the Java code and the aspect. The AOP compiler does byte code manipulation and calls other types of code, such as the services in the services oriented architecture. Thus, the methods and systems described herein include using common services either explicitly from an application or another service, or from an interceptor inserted in a service policy. That allows the same common service to be used by any service implementer and by the services oriented architecture framework transparently through the AOP sub-system.

Figure 64F:
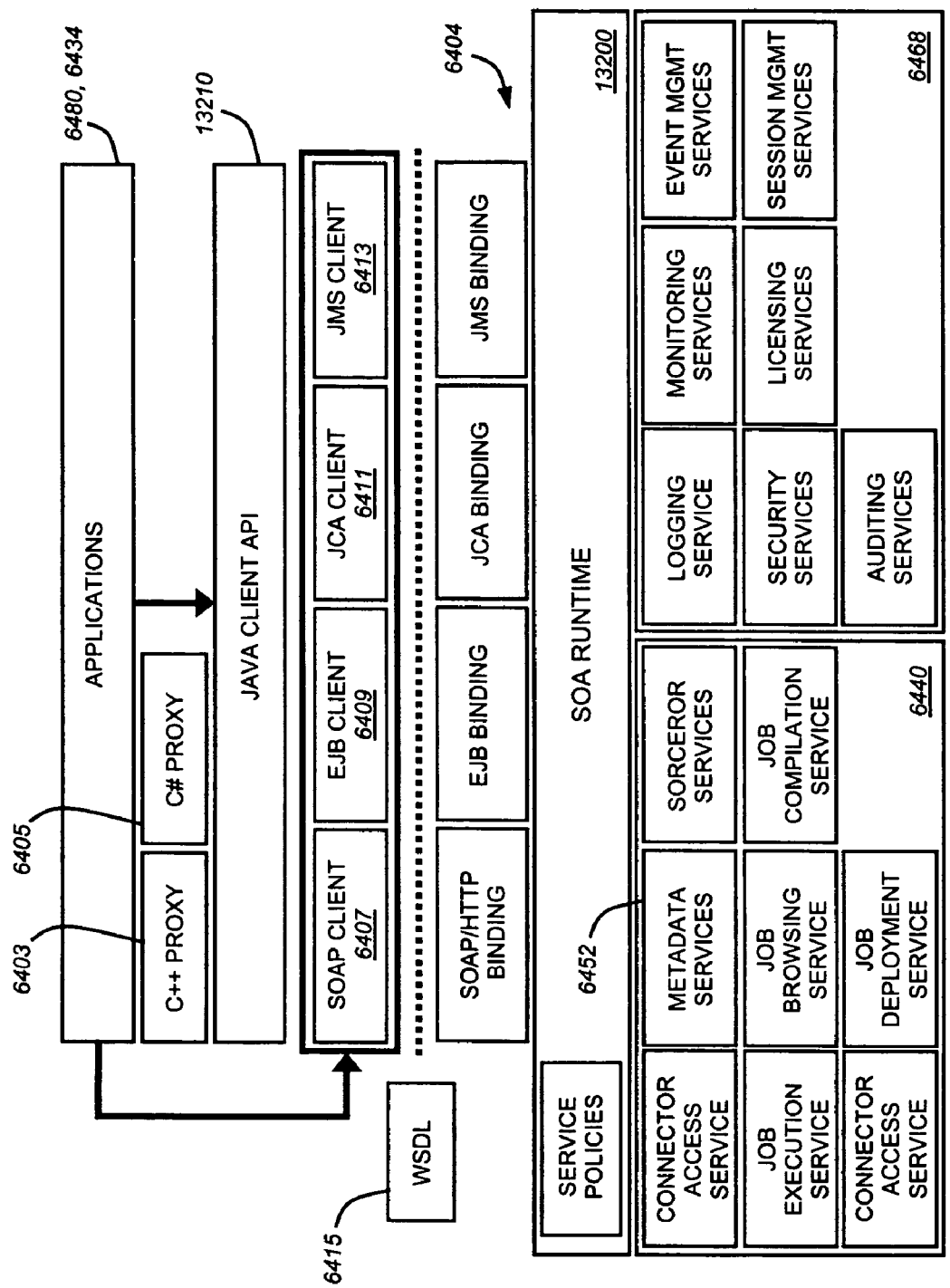
FIG. 64F shows a particular embodiment of a services oriented architecture.

FIG. 64F depicts a particular embodiment of an architecture for deploying a service in an SOA 2400. As depicted in FIG. 64F, a variety of client-side and system-side components can be provided to enable the SOA. On the client side, various client-side applications 6480 or GUIs 6434, such as clients for RTI services, common services 6440 or product services 6442, can be developed and configured to access specific services. The client applications 6480 or GUIs 6434 can access the services directly through code that is designed to interact with various bindings, such as SOAP, EJB, JMS and web services bindings. Thus, depending on the capabilities, context and needs of the client application 6480, 6434 or device, a proper binding may be selected and enabled in the client application 6480, 6434, such as a tight EJB binding or a loosely coupled web services binding. The architecture may also include the API 13210, which may be designed to provide an interface to a particular service that is suitable for a particular type of client application, device, communication protocol, or the like. In embodiments a client invocation framework can automatically generate proxy, such as a C# or a C++ proxy, for either the generated client API 13210 or for a registered smart/rich client application. The benefits of such a proxy are that: (i) a service through the client API 13210 can use any of the defined bindings transparently, according to business rules, without requiring special coding to interface with the bindings; (ii) additional smart/rich clients can be created on top of the generated API 13210 to optimize the use of the particular service, and (iii) proxies, such as C# or C++ proxies, can be generated to provide access to these generated clients or rich/smart clients in environments different from that of the API 13210, such as a non java environment in the case of a Java API. The system may include specific clients, such as SOAP clients 6407, EJB clients 6409, JCA clients 6411 and JMS clients 6413. The architecture may also include a WSDL layer 6415. Thus, multiple clients can exist to access a given service through various bindings, with a particular application or device being able to select the appropriate client, API 13210 or binding to access the service. The system also includes various ports 6402 with appropriate bindings 6404, which perform the functions described above. Referring still to FIG. 64F, the SOA runtime 13200 can enable many services, such as the various common services 6440

(such as logging, monitoring, provisioning, security, event management, administration, auditing and the like), product services 6442 (including metadata services 6452, RTI services, user-defined services, and the like). Services may also include connector access services, job execution services, metadata services, job browsing services, job deployment services, services related to workflow, job compilation services, logging services, security services, auditing services, monitoring services, licensing services, event management services and session management services.

Figure 64G:
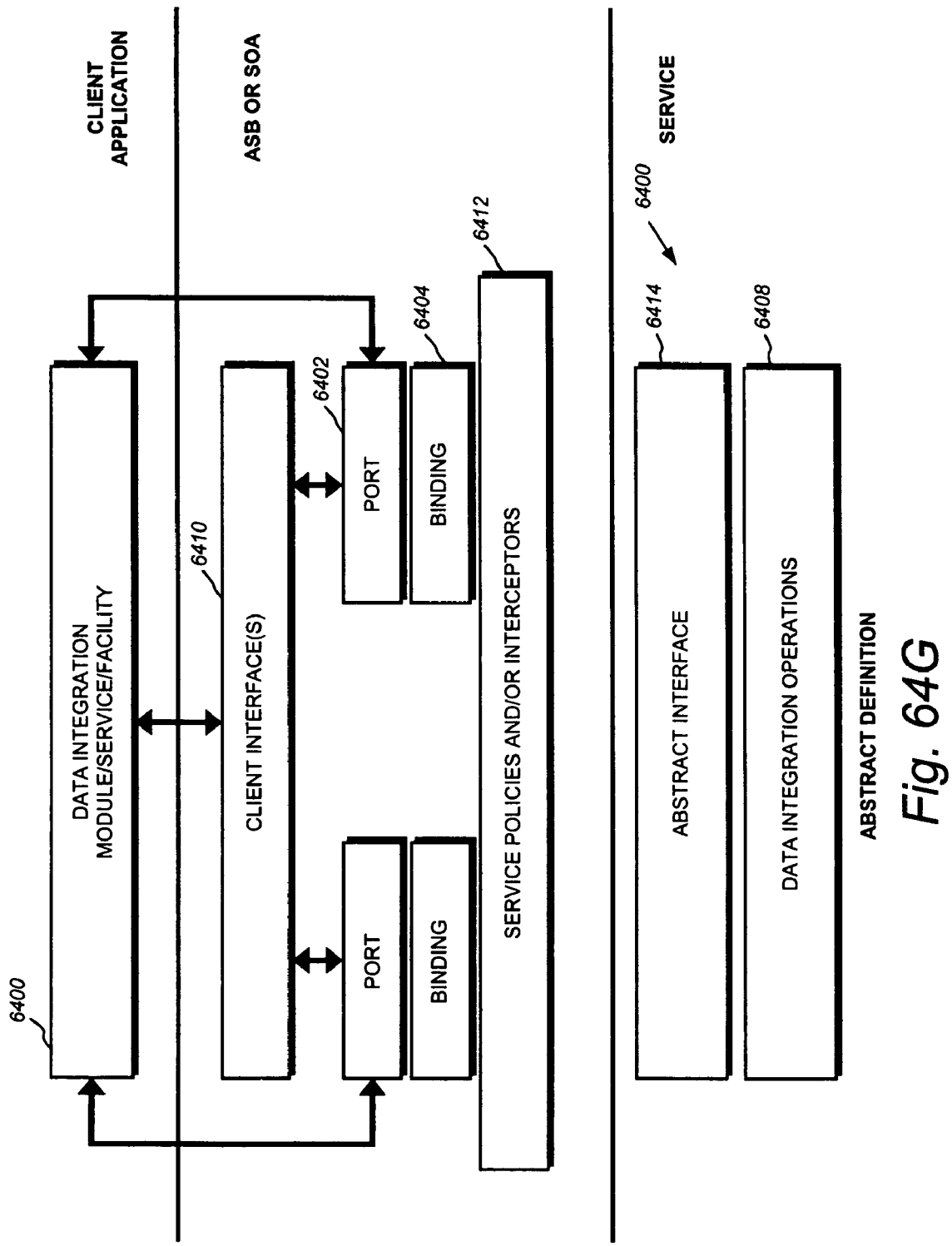
FIG. 64G shows the development and deployment of a module, service and/or facility as services in a services oriented architecture.

Referring to FIG. 64G, the methods and systems described herein may include methods and systems for developing and deploying a wide range of data integration modules, tools, facilities, functions, services, jobs and processes, or combinations of these, as services in a services oriented architecture for data integration. Services oriented architectures can take various forms, such as those disclosed in connection with FIGS. 23 through 26 of this disclosure and with respect to FIGS. 64A through 64F. Referring still to FIG. 64G, a data integration module 6400, which could be any module, tool, facility, function, service, process, client application or other item that can be accessed by one or more pre-defined ports 6402 such as ports accessible through a computer network, a programming interface, or any other hardware or software connection or interface. Each port can have an associated binding 6404, which allows a user to access the module 6400 through the port 6402, as described above in connection with various embodiments of SOA. The module 6400 may include various operations 6408, which can be performed by the module 6400 when accessed through the bindings 6404 and ports 6402. A client interface 6410 may invoke or interact with services. One or more client interfaces 6410 may be invoked by or interact with the data integration service, module or facility 6400. The client interface 6410 may be a C++, C#, Java or any other application. Each module 6400 may include an interface 6414, such as for incoming and outgoing messages and other interactions with the service. The module 6400, possibly through one or more bindings 6404 may invoke or interact with service policies and/or interceptors 6412. The service policy 6412 may be a logging service, event management service, installation service, provisioning service, licensing service, monitoring service or auditing service. An interceptor 6412 may associate a policy to a service. Any one or more of a client interface 6410, port 6402, binding 6404, service policy or interceptor 6412 may form or be part of a services oriented architecture, such as the Ascential Services Backbone, common Services 6440 or product services 6442. Messages can have various parts, corresponding to the requirements of the definition of the module 6400, such as those described above in connection with various embodiments of services oriented architectures. For example, an incoming message can be in a format suitable for a given binding and can include input triggers for triggering operations of the particular module 6400. The module 6400 may include various operations 6408, connected to or creating an abstract interface 6414, which can be performed by the module 6400 when accessed through the bindings 6404 and ports 6402.

Once a module 6400 is defined, including a definition of the appropriate port type, binding, and interface 6414, the module 6400 can be published in a registry, as described in connection with FIG. 23 for web services, to be identified and accessed by one or more users to accomplish the functions or operations defined in the definition of the module 6400. The code for those operations may be any conventional code for data integration platform functions, or any other code useful in data integration platforms of various vendors, such as Ascential and others.

Many examples of modules 6400 are contemplated by this disclosure. For example, the modules 6400 can include product services 6442 for providing a wide range of functions, such as an extraction function, a data transformation, a loading function, a metadata management function, a data profiling function, a mapping function, a data auditing function, a data quality function, a data cleansing function, a matching function, a probabilistic matching function, a metabroker function, a data migration function, an atomic data repository function, a semantic identification function, a filtering function, a refinement and selection function, a design interface function, or many others.

Figure 65:
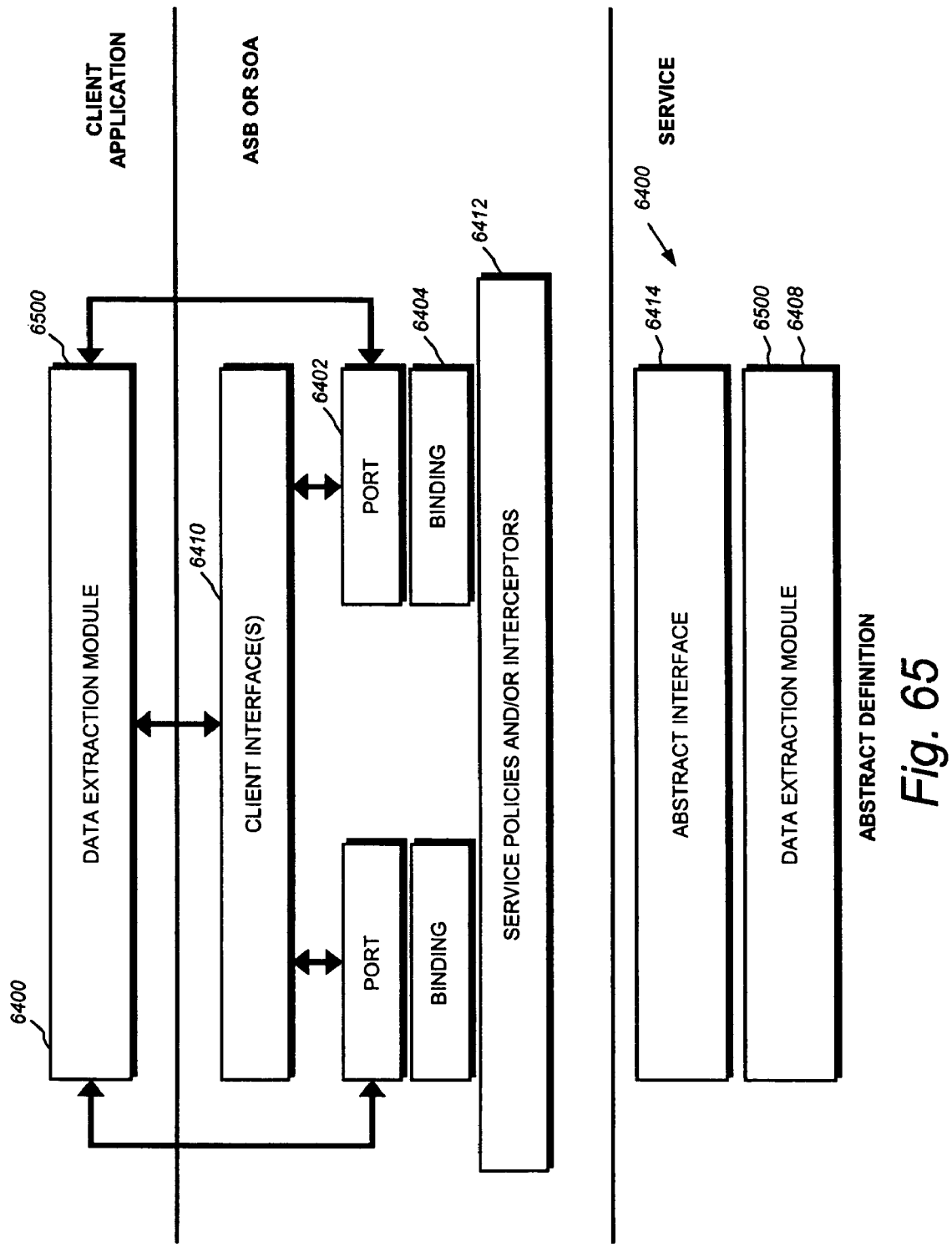
FIG. 65 shows the deployment of a module as a service in a services oriented architecture.

Referring to FIG. 65, the module 6400 can be a data extraction module 6500. The data extraction module 6500 may extract data or metadata from a database 112 or other data facility 112 for use in a hub, in a data facility, or by a tool 1302 or other application. For example, the data extraction module 6500 may extract data from a customer database to a hub for use by a metabroker. Thus, the methods and systems described herein include providing a module for a data extraction function, providing a registry of services, providing one or more client interfaces 6410, service policies and/or interceptors 6412, and identifying the module in the registry, wherein the module can be accessed as a service in a services oriented architecture.

Figure 66:
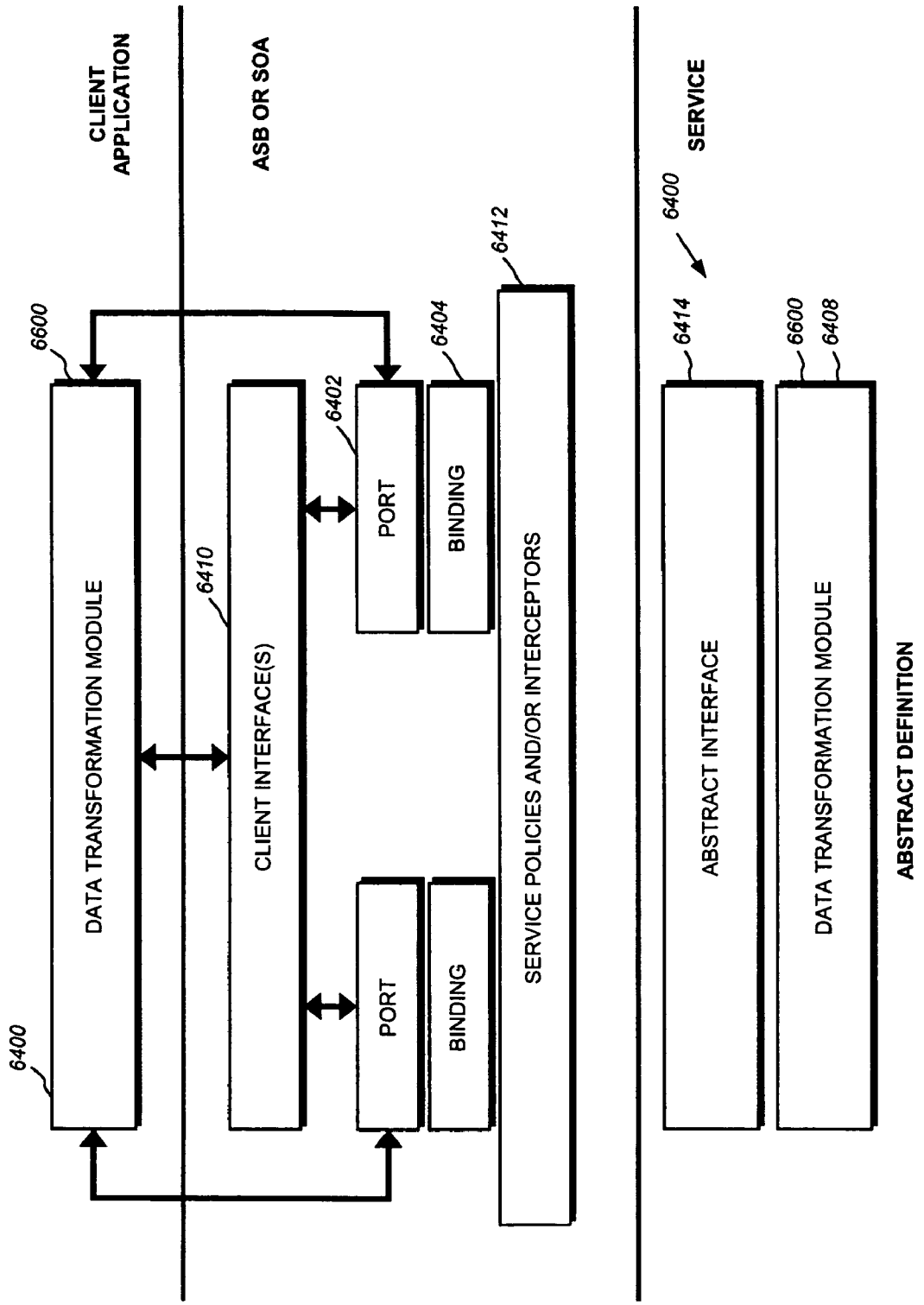
FIG. 66 shows the development and deployment of a data transformation module as a service in a services oriented architecture.

Referring to FIG. 66, the module 6400 can be a data transformation module 6600. The data transformation module 6600 may transform data from a form provided from a data facility 112 into a form for storage in a data target, such as any database, data facility, or process, or combinations of these. The data transformation module 6600 may take the form of any of those described herein and may include, for example, one or more hubs or atomic data repositories, bridges, parallel execution engines, metabrokers, pipelining facilities or other facilities for moving data in batch or real-time transformations. For example, the transformation module 6600 may transform data from an XML or similar data format into the native format for a database or process, such as a supply chain database using SAP or Oracle. It will also be appreciated that, while a data transformation may be understood to include certain specific data integration operations, the data transformation module 6600 may perform additional operations incidental to a data transformation, such as extracting, loading, or cleansing. Thus, the methods and systems described herein include providing a module for a data transformation function, providing a registry of services, providing one or more client interfaces 6410, service policies and/or interceptors 6412, and identifying the module in the registry, wherein the module can be accessed as a service in a services oriented architecture.

Figure 67:
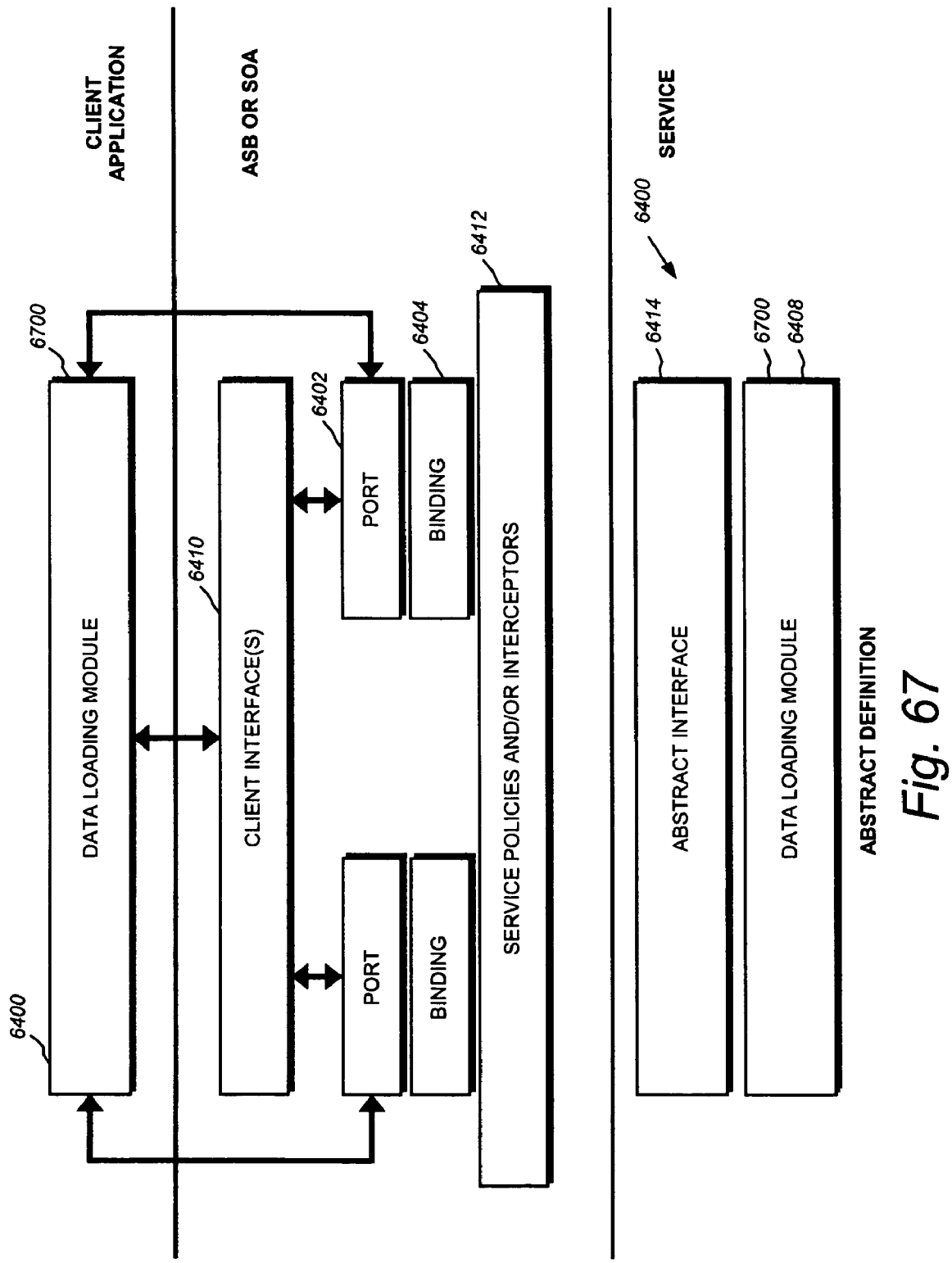
FIG. 67 shows the development and deployment of a data loading module as a service in a services oriented architecture.

Referring to FIG. 67, the module 6400 can be a data loading module 6700. The data loading module 6700 may load data into one or more databases, processes, or other targets. A loading module 6700 may be a batch loading facility or a real-time loading facility, such as a loading facility that uses pipelining or similar functionality. The loading module 6700 may be used to load data in parallel to more than one data integration process, module, system, data facility or other element. For example, a loading facility may load data that is stored on or associated with a product tracking system simultaneously into a database for tracking the physical location of goods and into a database for tracking metadata associated with the goods, such as metadata entered by users at the time of collection of the physical location data, such as data indicating that the order was received at a given time in acceptable condition. Thus, the methods and systems described herein also include providing a module for a data loading function, providing a registry of services, providing one or more client interfaces 6410, service policies and/or interceptors 6412, and identifying the module in the registry, wherein the module can be accessed as a service in a services oriented architecture.

Figure 68:
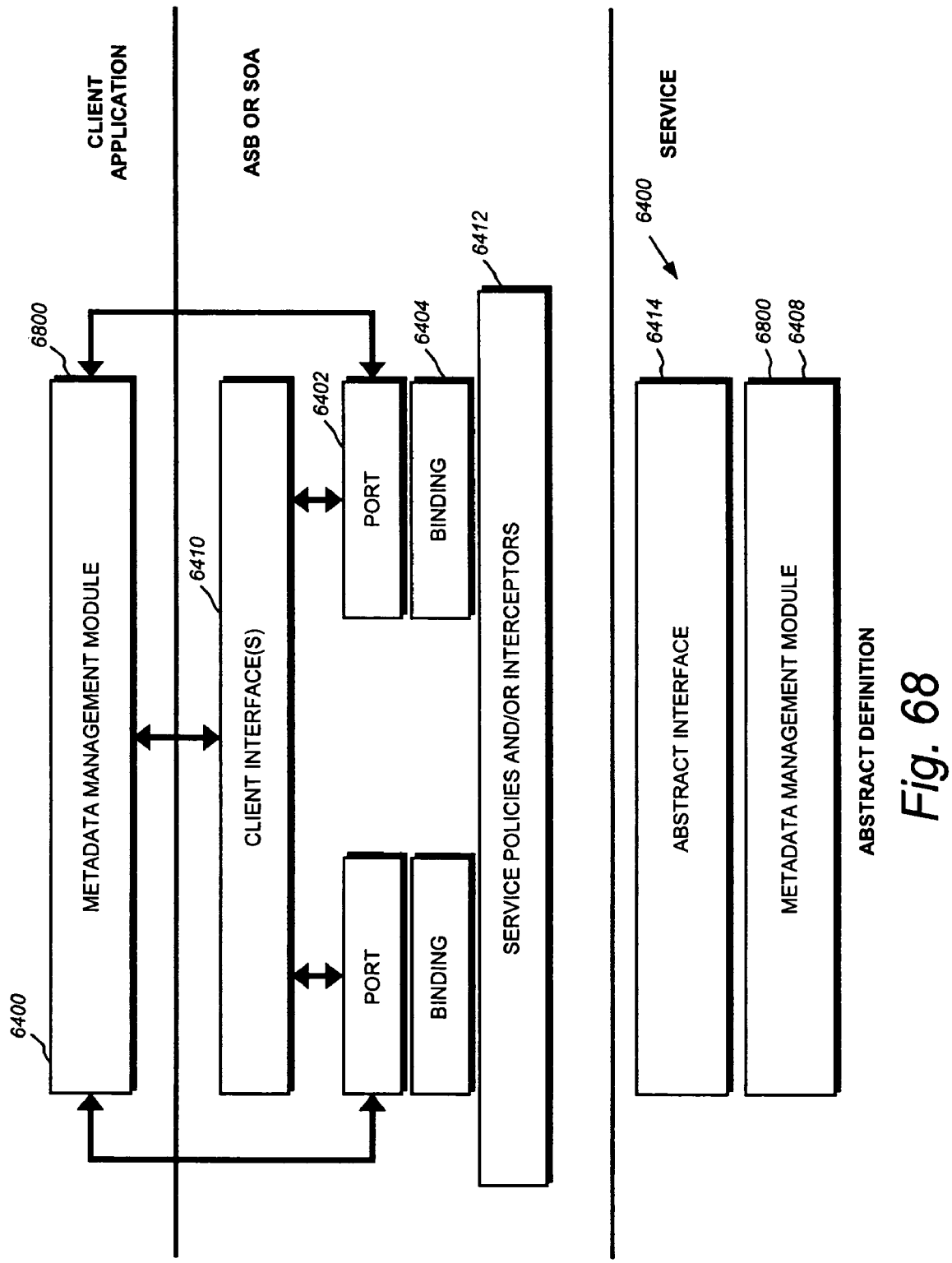
FIG. 68 shows the development and deployment of a metadata management module as a service in a services oriented architecture.

Referring to FIG. 68, the module 6400 can be a metadata management module 6800. The metadata management module 6800 may allow for storage and manipulation of metadata associated. The metadata management module 6800 may take the form of any metadata facility described herein or in the documents incorporated herein by reference. For example, the metadata management module 6800 may include a metabroker, an atomic data repository, a migration engine and/or other metadata facility. The metadata management module 6800 may be constructed to provide a variety of metadata functions that can be specified when the module 6800 is invoked as a service, or the metadata management module 6800 might perform a single, dedicated metadata management function. The metadata management module 6800 may allow a user to store, add, annotate and otherwise manipulate metadata. For example, a marketing manager may modify the metadata associated with a particular product to account for the fact that the product is currently the subject of a marketing campaign in a particular region. As another example, an engineer may modify the metadata associated with a part to reflect a change from metric units to English units, or vice versa, or to add a new characteristic for existing inventory such as RFID or UPC identification codes. Thus, the methods and systems described herein also include providing a module for a metadata management function, providing a registry of services, providing one or more client interfaces 6410, service policies and/or interceptors 6412, and identifying the module in the registry, wherein the module can be accessed as a service in a services oriented architecture.

Figure 69:
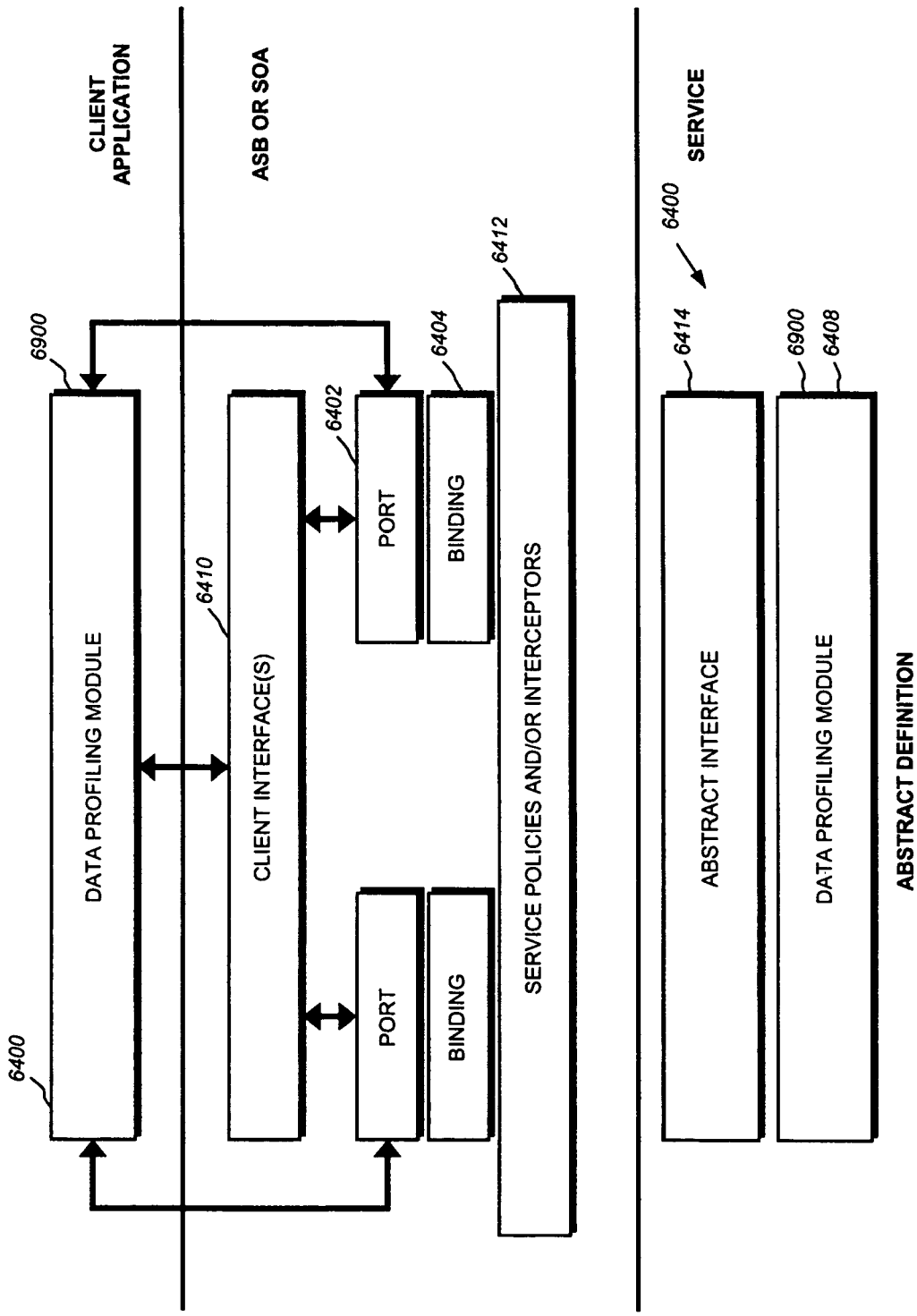
FIG. 69 shows the development and deployment of a data profiling module as a service in a services oriented architecture.

Referring to FIG. 69, the module 6400 can be a data profiling module 6900. The data profiling module 6900 may be used to profile data that is stored in a data facility or associated with a system. For example, the data profiling module 6900 may determine the content of columns or tables of data or metadata or assess the quality of the data or metadata. The data profiling module 6900 may generate a metadata model for one or more data sources to facilitate automation of subsequent data integration tasks. The data profiling module 6900 may also provide recommendations for constructing a target database from a source being profiled, such as keys and table normalizations. Thus, the methods and systems described herein also include providing a module for a data profiling function, providing a registry of services, providing one or more client interfaces 6410, service policies and/or interceptors 6412, and identifying the module in the registry, wherein the module can be accessed as a service in a services oriented architecture.

Figure 70:
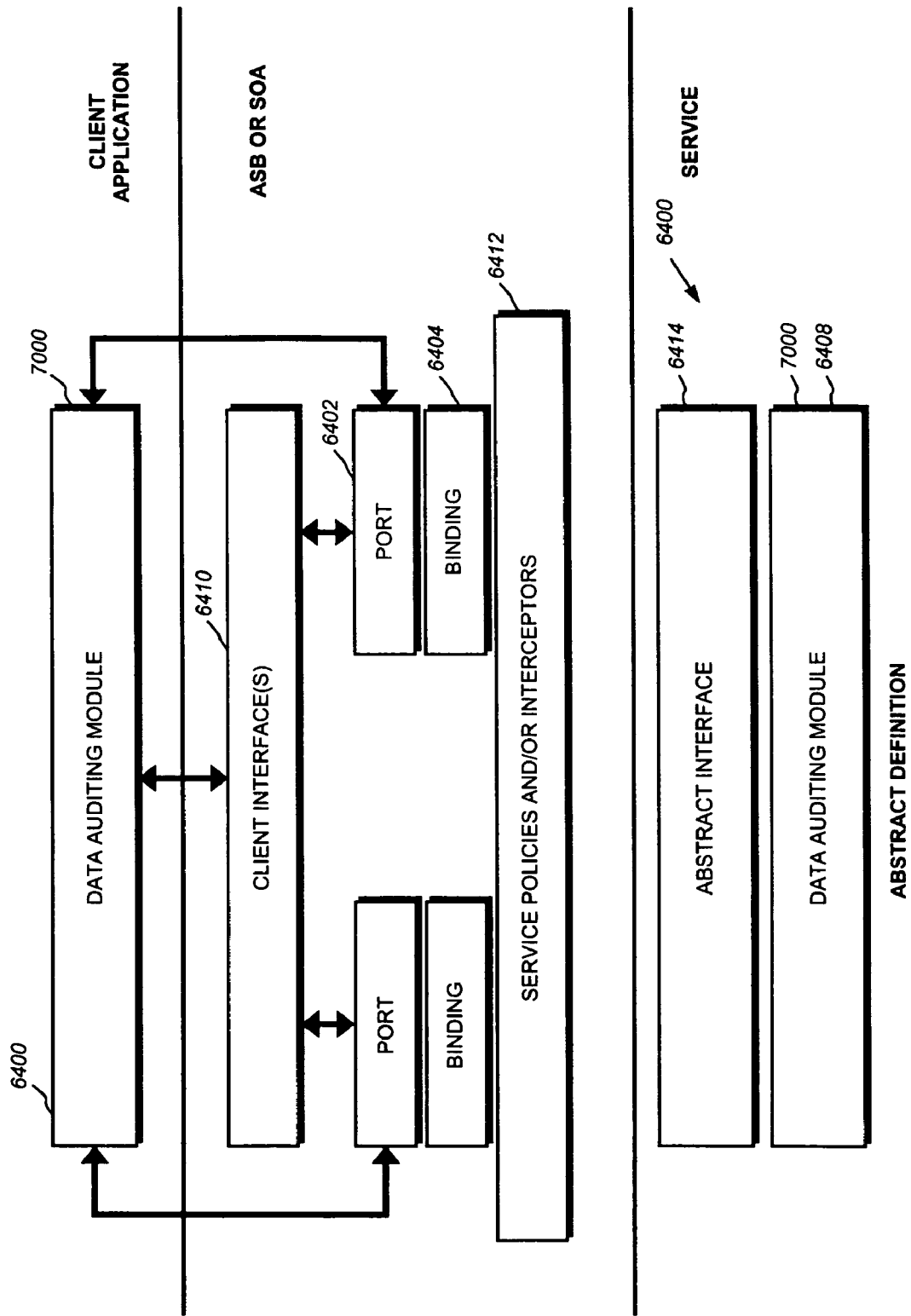
FIG. 70 shows the development and deployment of a data auditing module as a service in a services oriented architecture.

Referring to FIG. 70, the module 6400 can be a data auditing module 7000. The data auditing module 7000 may be used to audit data that is stored in a data facility or associated with a system. For example, the data auditing module 7000 may determine the origin of a column of a table and track the job function of each user who modified the data. The data auditing module 7000 may also perform tasks such as validation of data ranges, calculations, value combinations, and so on. Thus, the methods and systems described herein also include providing a module for a data auditing function, providing a registry of services, providing one or more client interfaces 6410, service policies and/or interceptors 6412, and identifying the module in the registry, wherein the module can be accessed as a service in a services oriented architecture.

Figure 71:
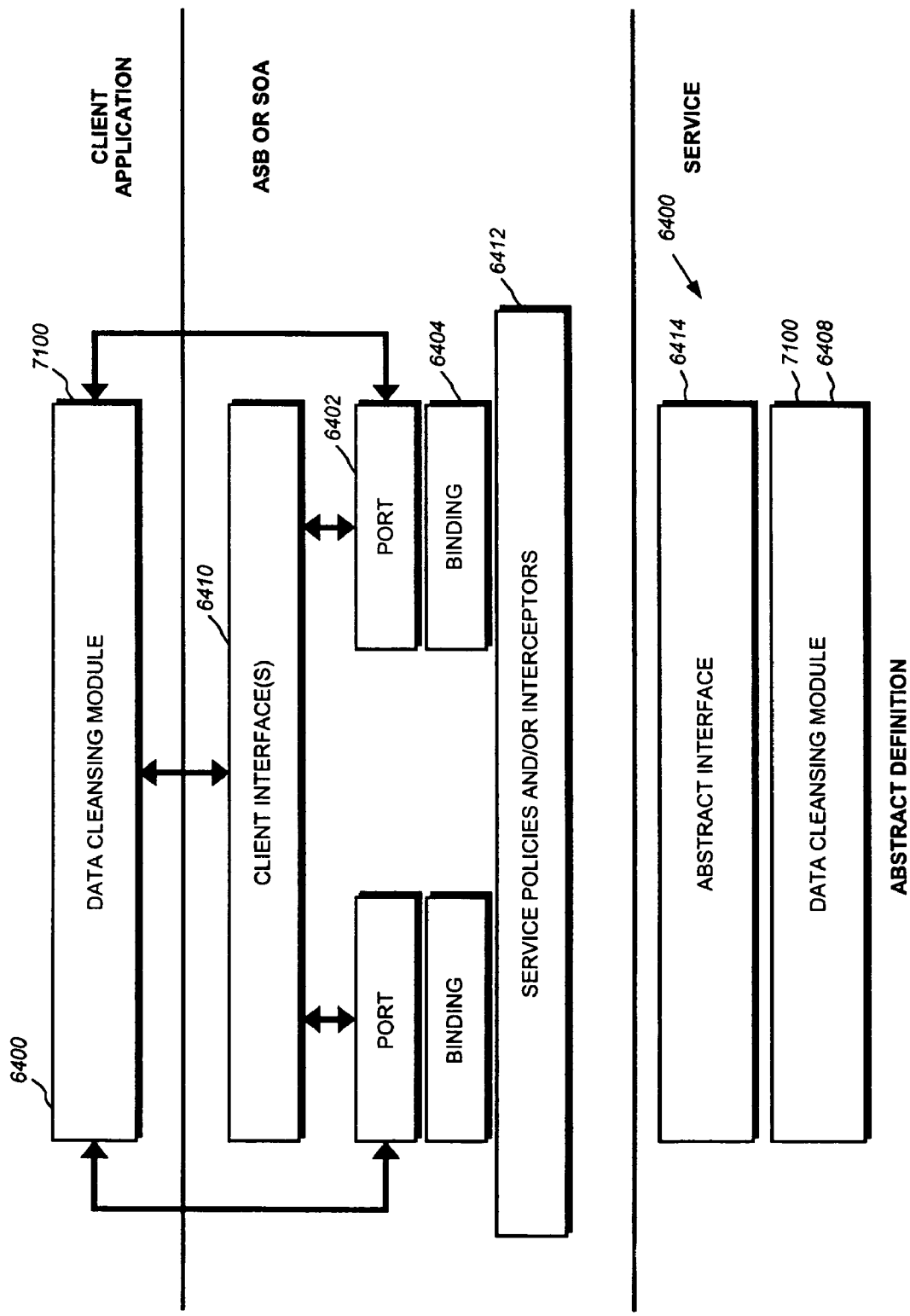
FIG. 71 shows the development and deployment of a data cleansing module as a service in a services oriented architecture.

Referring to FIG. 71, the module 6400 can be a data cleansing module 7100. The data cleansing module 7100 may cleanse data or metadata that is received from a database or system. The data cleansing module 7100 may take the form of any data cleansing facility, and may provide any data cleansing operations, such as any of those provided by the QualityStage product from Ascential. The data cleansing module 7100 may rapidly perform cleansing operations, such as de-duplicating records, so that any processes, systems, functions, modules, or the like that depend on the data have good data, rather than, for example, duplicate or erroneous data. Thus, the methods and systems described herein also include providing a module for a data cleansing function, providing a registry of services, providing one or more client interfaces 6410, service policies and/or interceptors 6412, and identifying the module in the registry, wherein the module can be accessed as a service in a services oriented architecture.

Figure 72:
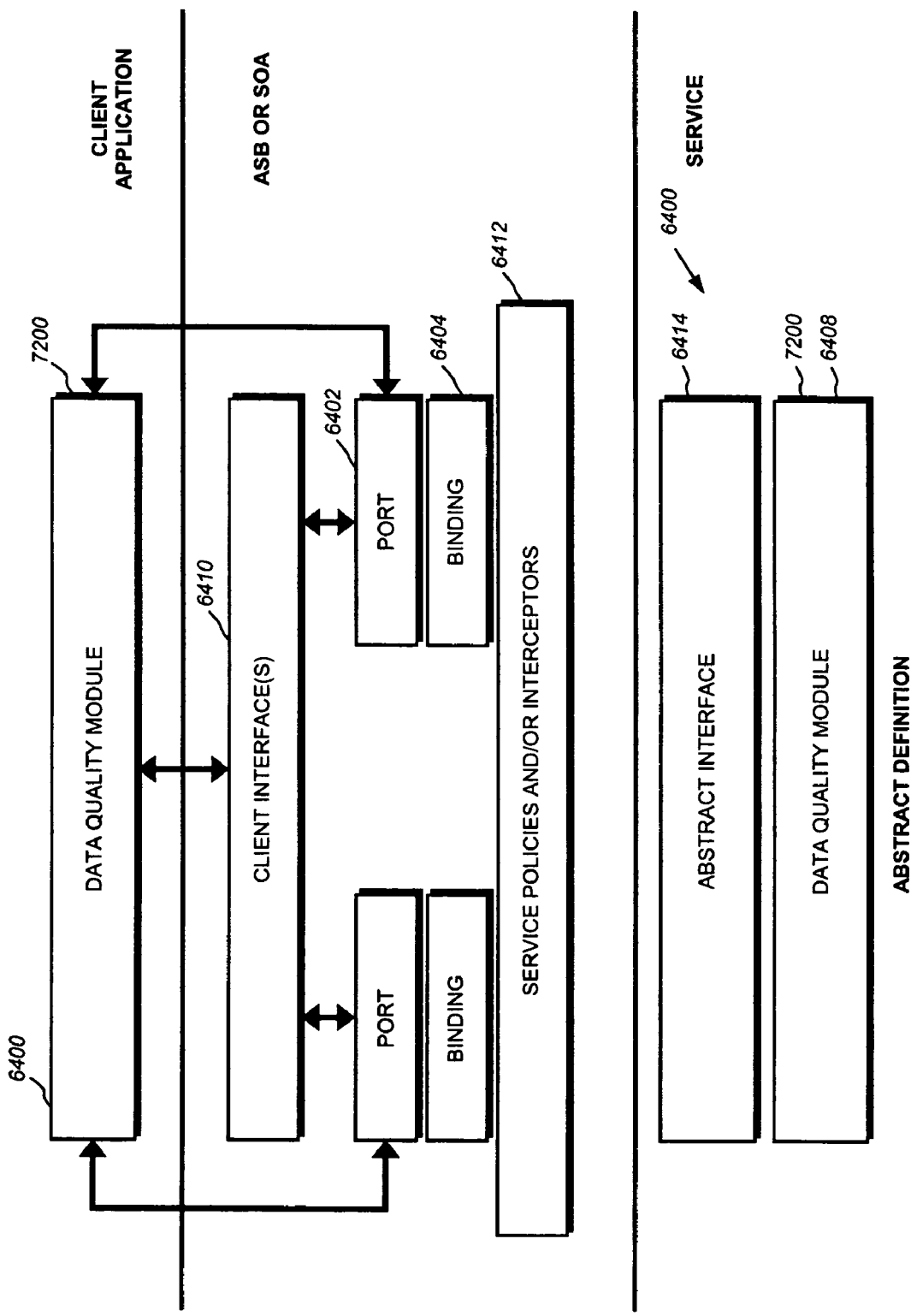
FIG. 72 shows the development and deployment of a data quality module as a service in a services oriented architecture.

Referring to FIG. 72, the module 6400 can be a data quality module 7200. The data quality module 7200 may assess the quality of data or metadata. The data quality module 7200 may provide any data quality functionality, such as functions provided by the QualityStage product from Ascential. The data quality module 7200 may determine the extent of duplication and erroneous data and may correct such errors. Thus, the methods and systems described herein also include providing a module for a data quality function, providing a registry of services, providing one or more client interfaces 6410, service policies and/or interceptors 6412, and identifying the module in the registry, wherein the module can be accessed as a service in a services oriented architecture.

Figure 73:
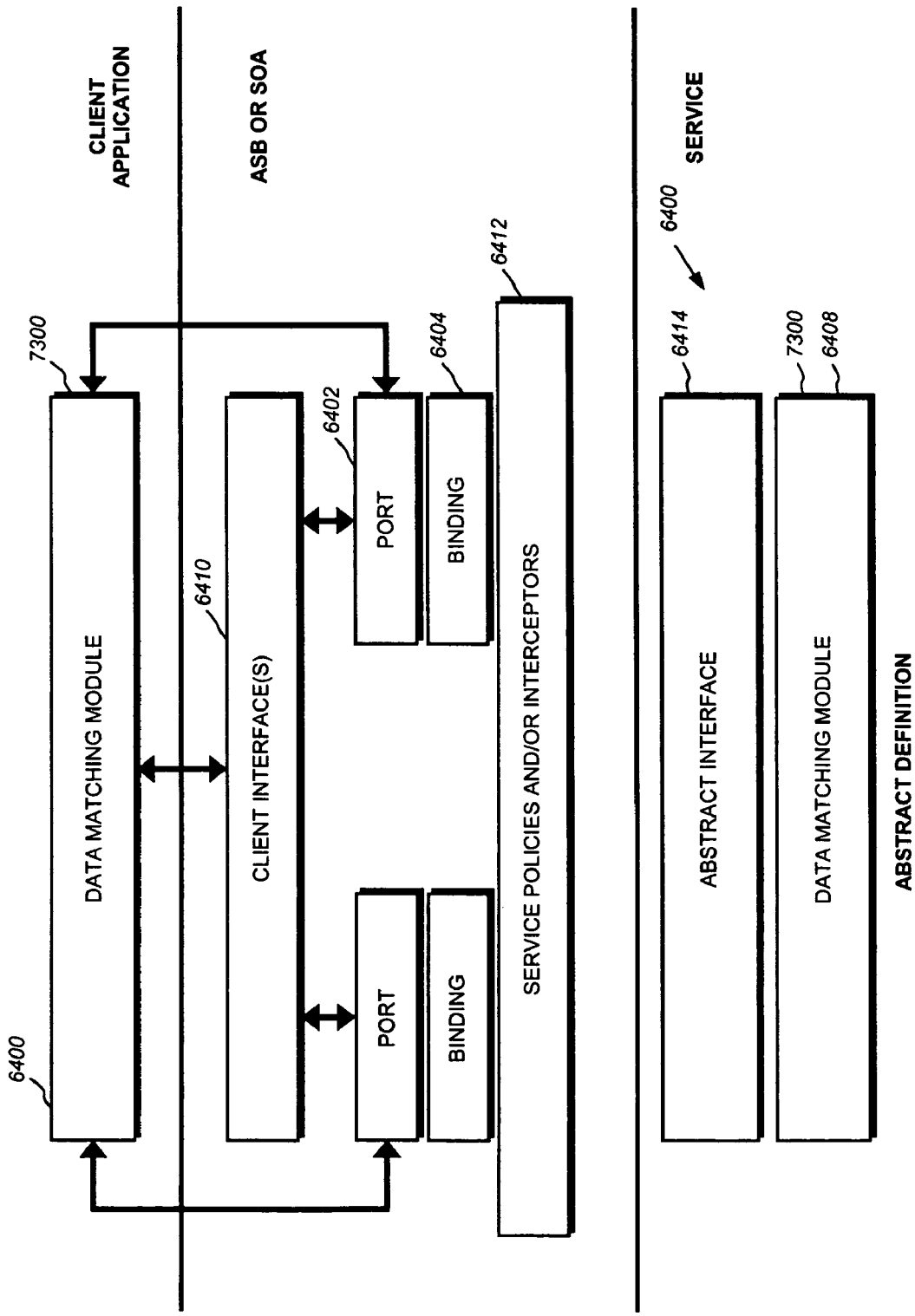
FIG. 73 shows the development and deployment of a data matching module as a service in a services oriented architecture.

Referring to FIG. 73, the module 6400 can be a data matching module 7300. The data matching module 7300 may match data or metadata associated with an item to another item, such as a process, identifier, element, business process, business object, subject, data facility, rule, system or the like. For example, a matching module 7300 may match product data with a particular process, so that the product data or metadata is stored in the correct process. Thus, the methods and systems described herein also include providing a module for a data matching function, providing a registry of services, providing one or more client interfaces 6410, service policies and/or interceptors 6412, and identifying the module in the registry, wherein the module can be accessed as a service in a services oriented architecture. In embodiments the data matching function may be a probabilistic matching function.

Figure 74:
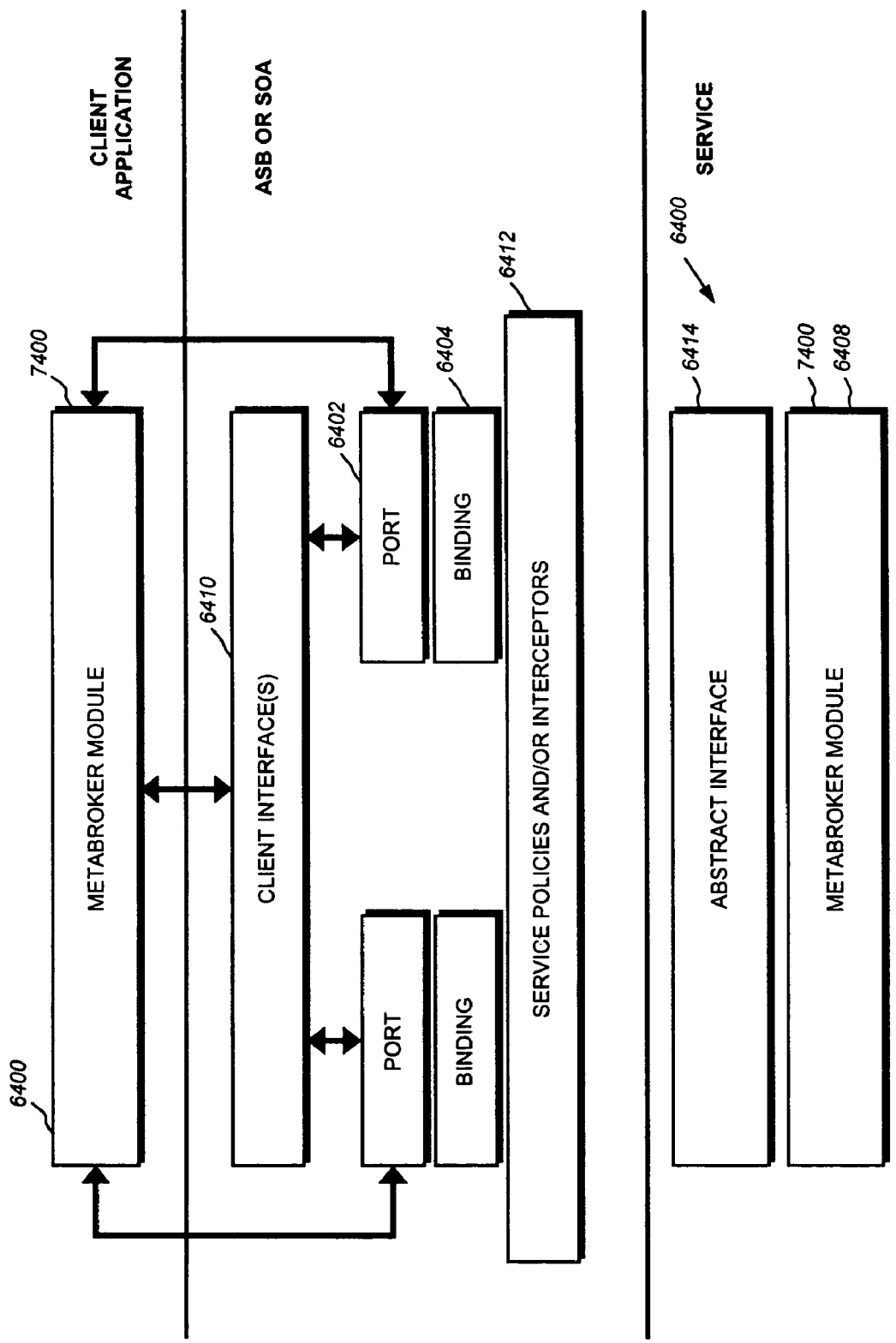
FIG. 74 shows the development and deployment of a metabroker module as a service in a services oriented architecture.

Referring to FIG. 74, the module 6400 can be a metabroker module 7400. A metabroker module 7400 may convert or transform metadata from one format or language to another, or between metadata models even if they use the same database technology. For example, a metabroker module 7400 may convert metadata associated with a particular line of products from SAP format to a format that can be used with an Oracle database. As another example, a company using its own metadata model for inventory may acquire another company that uses a different metadata model for inventory. The metabroker module 7400 may be used as a translator for combining or sharing data between inventory databases of the two companies. Thus, the methods and systems described herein also include providing a module for a metabroker function, providing a registry of services, providing one or more client interfaces 6410, service policies and/or interceptors 6412, and identifying the module in the registry, wherein the module can be accessed as a service in a services oriented architecture. In embodiments the metabroker function maintains the semantics of a data integration function across multiple data integration platforms.

Figure 75:
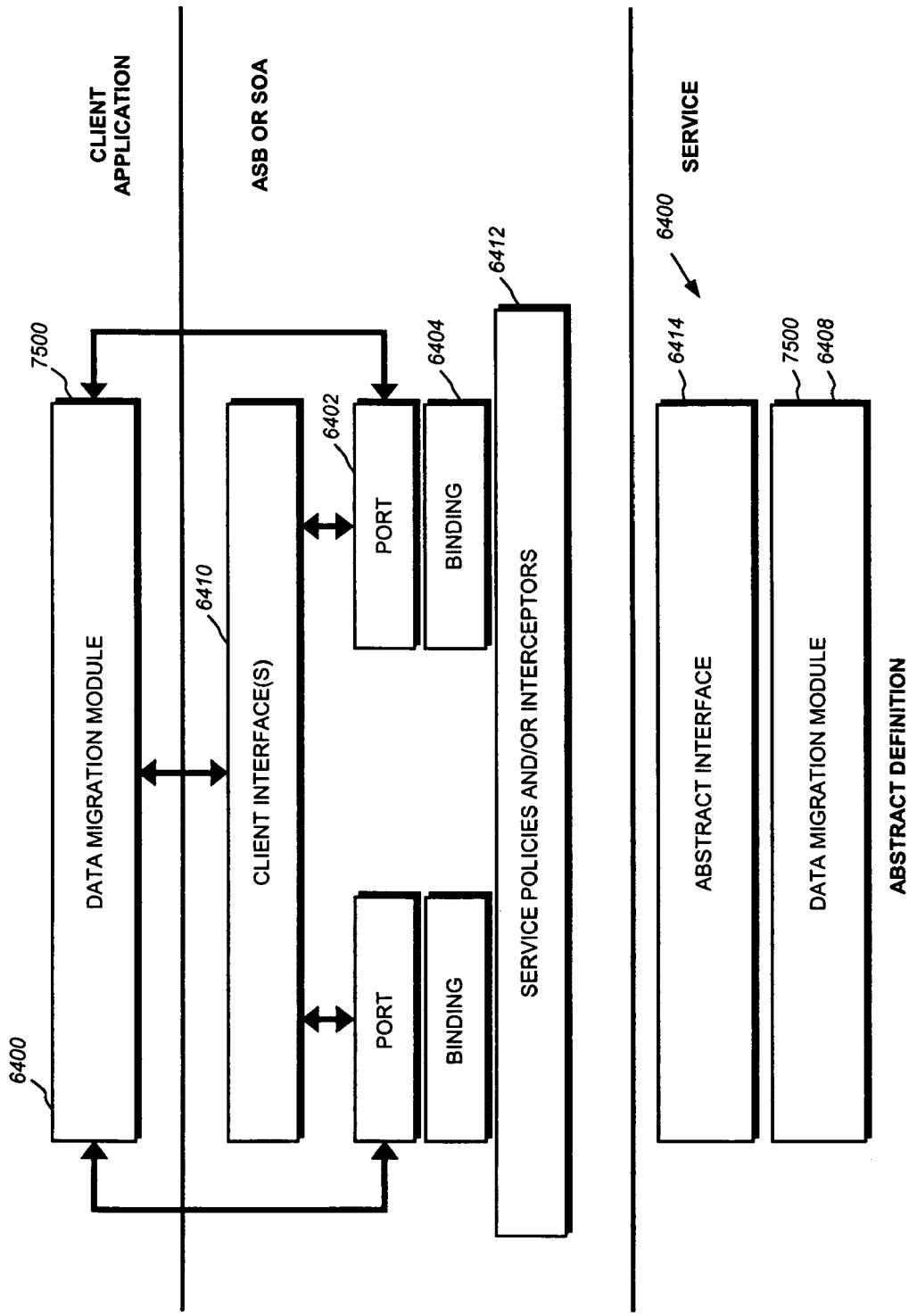
FIG. 75 shows the development and deployment of a data migration module as a service in a services oriented architecture.

Referring to FIG. 75, the module 6400 can be a data migration module 7500. A data migration module 7500 may move data from one data facility 112 to another data facility 112 or hub. For example, a data migration module 7500 may move data from a customer database to a hub, where it may be acted upon by a metabroker module 7400, and then migrated or otherwise transferred to a finance database. Thus, the methods and systems described herein also include providing a module for a data migration function, providing a registry of services, providing one or more client interfaces 6410, service policies and/or interceptors 6412, and identifying the module in the registry, wherein the module can be accessed as a service in a services oriented architecture.

Figure 76:
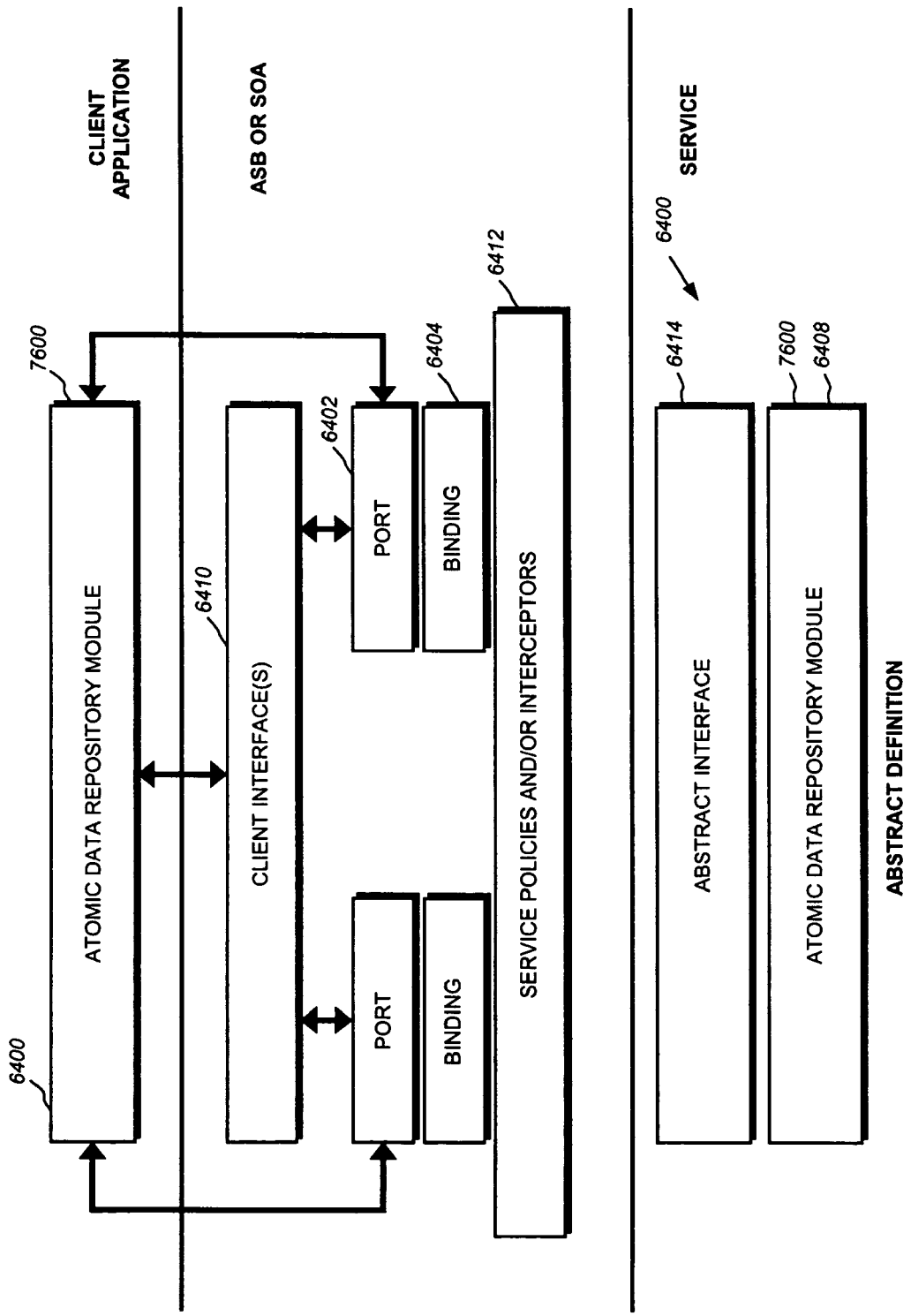
FIG. 76 shows the development and deployment of an atomic data repository module as a service in a services oriented architecture.

Referring to FIG. 76, the module 6400 can be an atomic data repository module 7600. An atomic data repository module 6400 may provide one or more fundamental data operations, such as read or write, for communicating with a repository using atomic data structures of the repository. The atomic data repository module 7600 may be employed for simple data transactions with a metadata model or other item stored in a repository, or may be combined with other modules 7600 to provide core repository services such as querying metadata models and the like. The methods and systems described herein also include providing a module for an atomic data repository, providing a registry of services, providing one or more client interfaces 6410, service policies and/or interceptors 6412, and identifying the module in the registry, wherein the module can be accessed as a service in a services oriented architecture.

Figure 77:
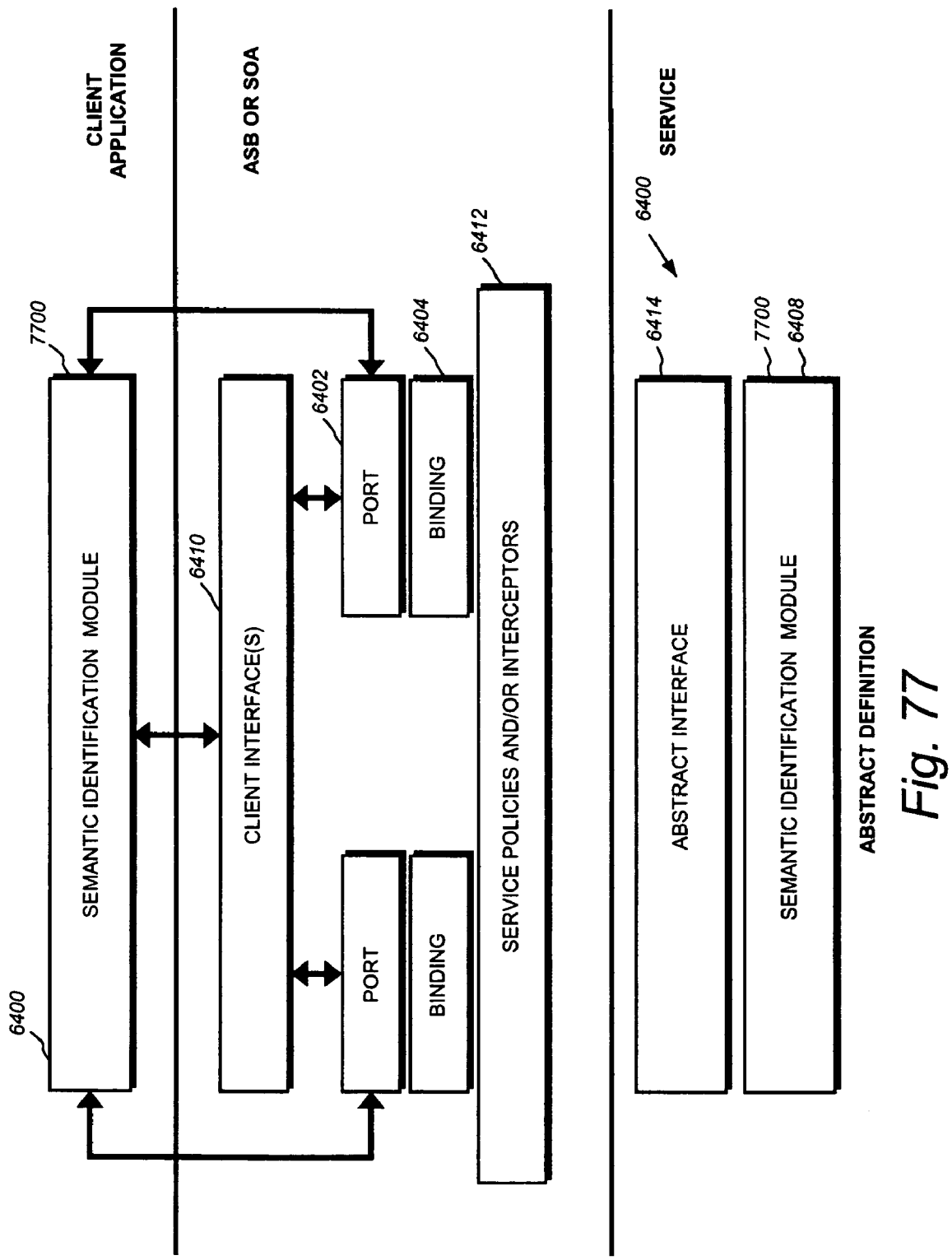
FIG. 77 shows the development and deployment of a semantic identification module as a service in a services oriented architecture.

Referring to FIG. 77, the module 6400 can be a semantic identification module 7700. A semantic identification module 7700 may identify an object, table, column or other item based on its relationship with other objects, tables, columns and other items. For example, a semantic identification module 7700 may create a string that may be acted upon by a data transformation module 6600. Thus, the methods and systems described herein also include providing a module for a semantic identification function, providing a registry of services, providing one or more client interfaces 6410, service policies and/or interceptors 6412, and identifying the module in the registry, wherein the module can be accessed as a service in a services oriented architecture.

Figure 78:
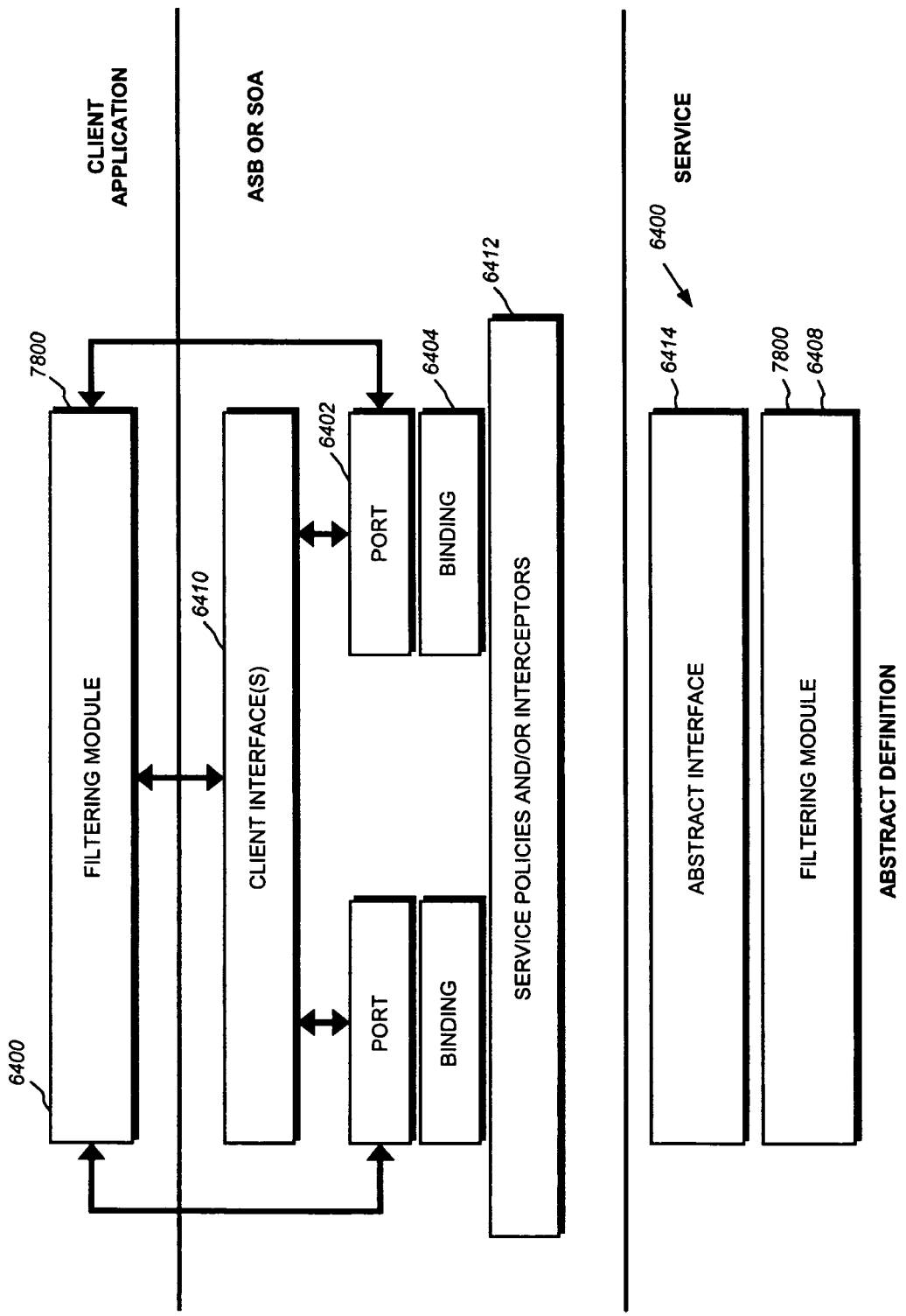
FIG. 78 shows the development and deployment of a filtering module as a service in a services oriented architecture.

Referring to FIG. 78, the module 6400 can be a filtering module 7800. A filtering module 7800 may filter data, metadata, objects, items or instances of an item based on the associated level of abstraction or other properties. For example, a filtering module 7800 may filter the physical instances of the columns of a table in a hub from the logical instances based on the level of abstraction associated with each instance. Thus, the methods and systems described herein also include providing a module for a filtering function, providing a registry of services, providing one or more client interfaces 6410, service policies and/or interceptors 6412, and identifying the module in the registry, wherein the module can be accessed as a service in a services oriented architecture. In embodiments the filtering is based on a level of abstraction. In embodiments the level of abstraction can be at least one of a physical level of abstraction and a logical level of abstraction.

Figure 79:
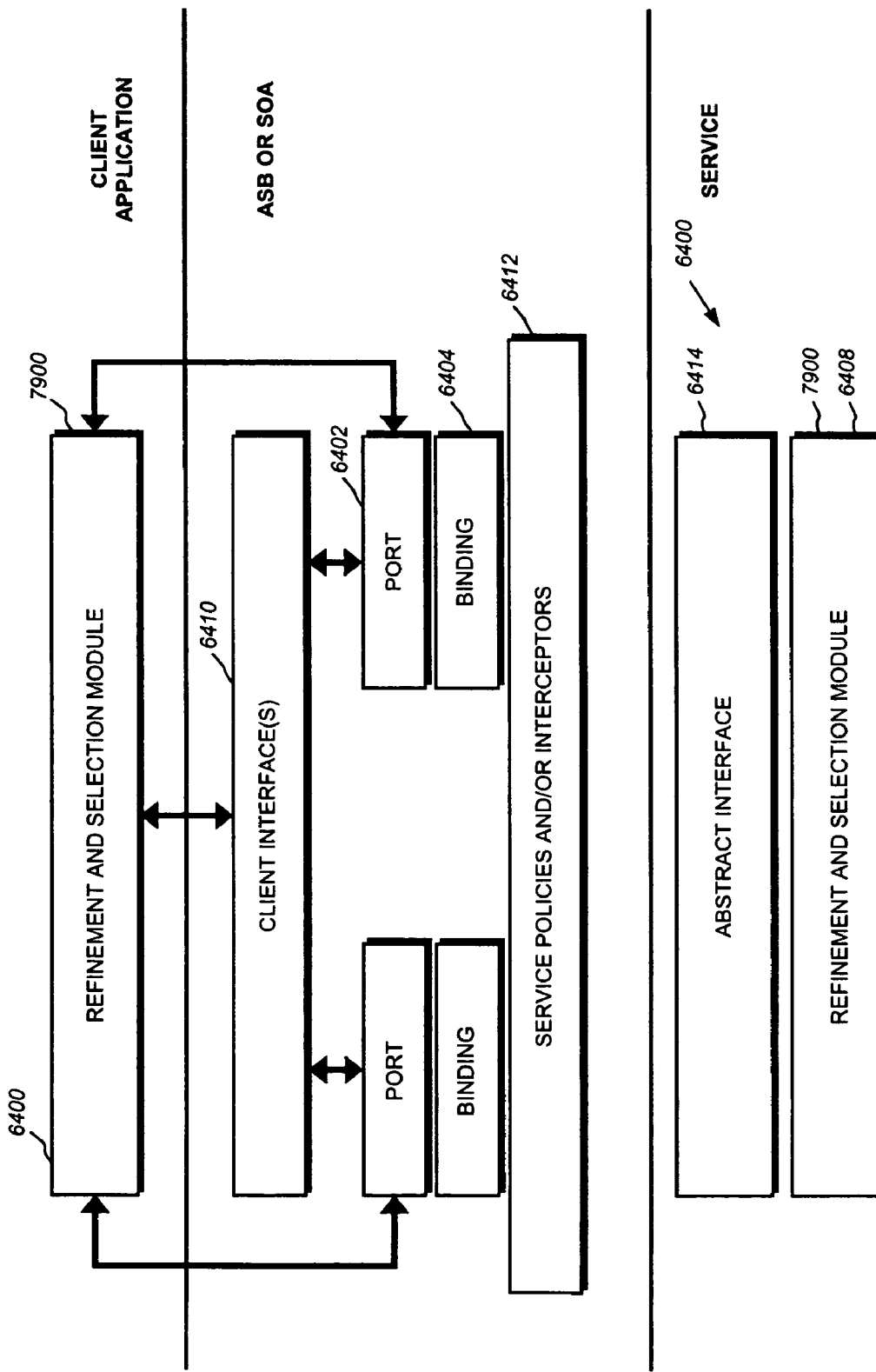
FIG. 79 shows the development and deployment of a refinement and selection module as a service in a services oriented architecture.

Referring to FIG. 79, the module 6400 can be a refinement and selection module 7900. A refinement and selection module 7900 may filter data, metadata, instances or other items at the database, hub, query or other levels or stages of a process. For example, a refinement and selection module 7900 may allow a transformation operation to be performed on a query before it is sent to the relevant database. Thus, the methods and systems described herein also include providing a module for a refinement and selection facility, providing a registry of services, and identifying the facility in the registry, wherein the facility can be accessed as a service in a services oriented architecture. In embodiments the refinement and selection facility allows the system to distinguish between a logical level of abstraction and a physical level of abstraction.

Figure 80:
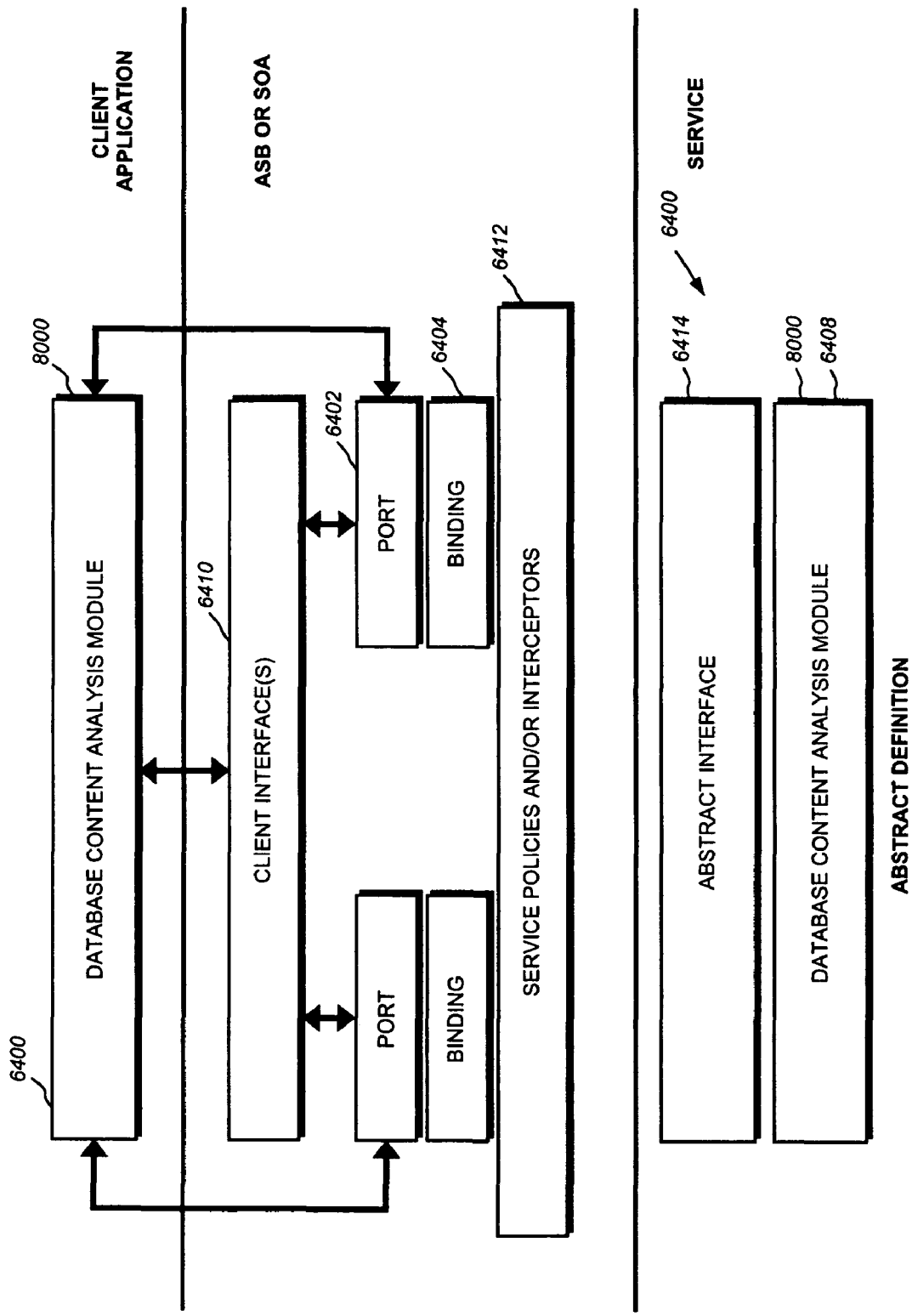
FIG. 80 shows the development and deployment of a database content analysis module as a service in a services oriented architecture.

Referring to FIG. 80, the module 6400 can be a database content analysis module 8000. A database content analysis module 8000 may analyze and summarize the content of a database and suggest possible related databases. For example, a database content analysis module may analyze a customer database and summarize salient information regarding the top twenty-five customers. As another example, the database content analysis module 8000 may provide a statistical analysis of numerical data in columns of a database, or report on the frequency of empty records, or report the number and size of tables, and so on. The database content analysis module 8000 may also characterize database structure, and provide metadata relating to, for example, keys, column names, table names, and hierarchical or other relationships among the foregoing. More generally, the database content analysis module 8000 may provide any quantitative or qualitative analysis of a database than can be expressed in program code, and may provide corresponding reports or metrics that may be used by other modules 6400 or designers to characterize and apply the database contents. The database content analysis module may also, or instead, combine functions of modules described below for analyzing tables, columns and rows of databases, or employ those modules in analysis a database. Thus, the methods and systems described herein also include providing a module for analyzing the contents of a database, providing a registry of services, providing one or more client interfaces 6410, service policies and/or interceptors 6412, and identifying the module in the registry, wherein the module can be accessed as a service in a services oriented architecture.

Figure 81:
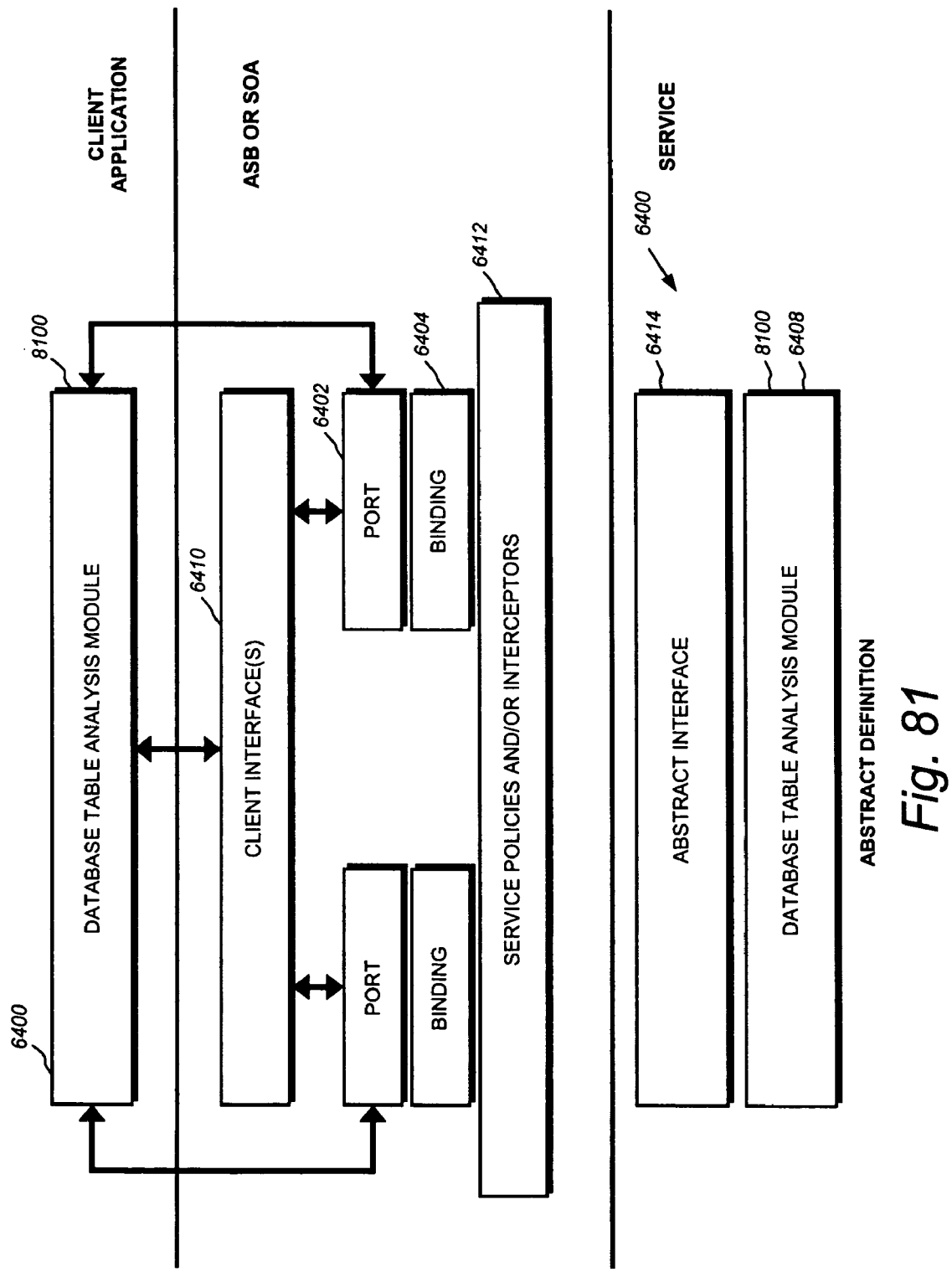
FIG. 81 shows the development and deployment of a database table analysis module as a service in a services oriented architecture.

Referring to FIG. 81, the module 6400 can be a database table analysis module 8100. A database table analysis module 8100 may analyze and summarize the content of a table. For example, a database table analysis module 8100 may provide the hierarchical position of one table of a database with respect to other tables of the database. Thus, the methods and systems described herein also include providing a module for analyzing a table of a database, providing a registry of services, providing one or more client interfaces 6410, service policies and/or interceptors 6412, and identifying the module in the registry, wherein the module can be accessed as a service in a services oriented architecture.

Figure 82:
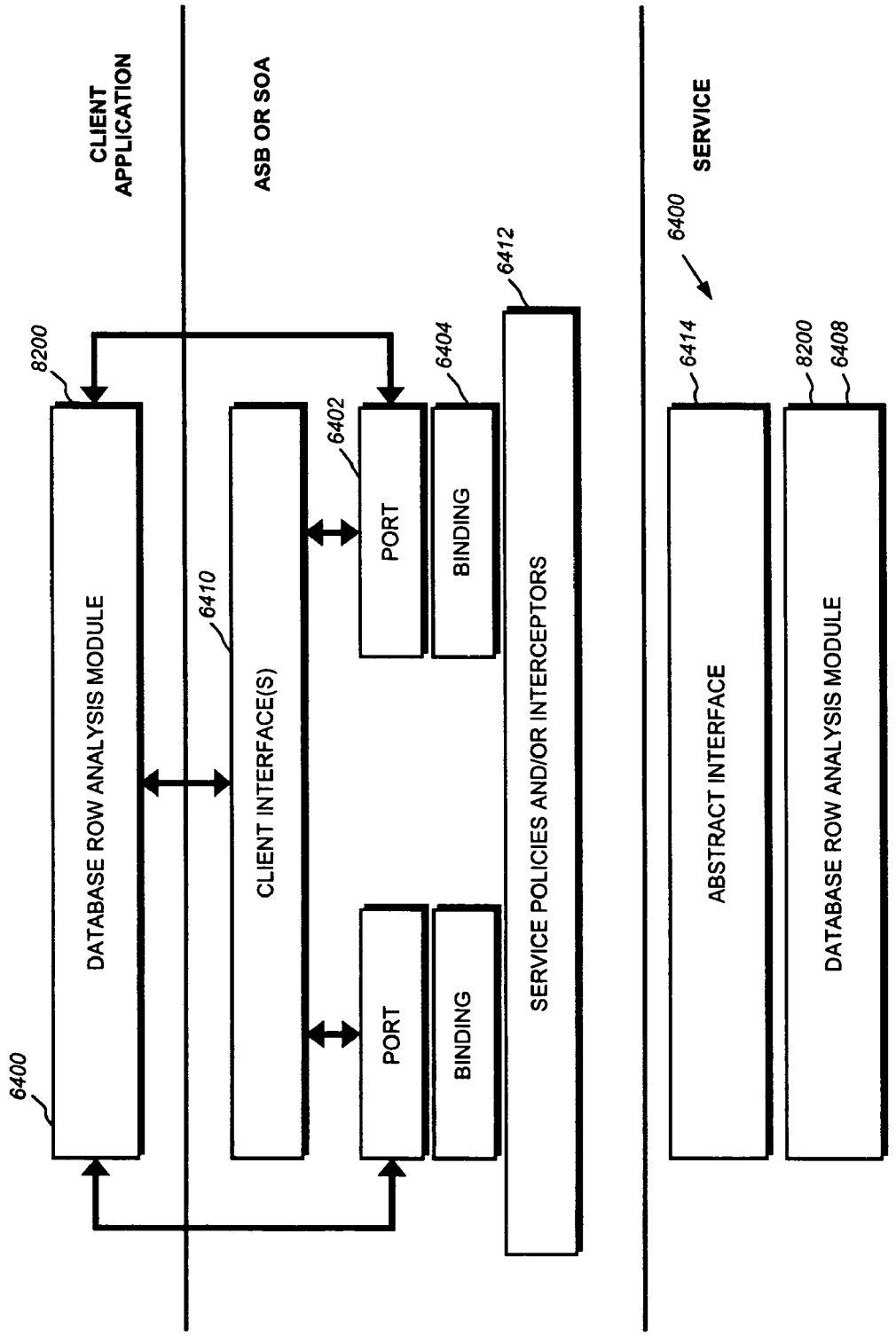
FIG. 82 shows the development and deployment of a database row analysis module as a service in a services oriented architecture.

Referring to FIG. 82, the module 6400 can be a database row analysis module 8200. A database row analysis module 8200 may analyze and summarize the content of a row of a table. For example, a database row analysis module may suggest other rows and/or tables that may be related to a row of interest. The database row analysis module 8200 may also, or instead, evaluate the validity of records within a row according to information about database structure. Thus, the methods and systems described herein also include providing a module for analyzing a row of a database, providing a registry of services, providing one or more client interfaces 6410, service policies and/or interceptors 6412, and identifying the module in the registry, wherein the module can be accessed as a service in a services oriented architecture.

Figure 83:
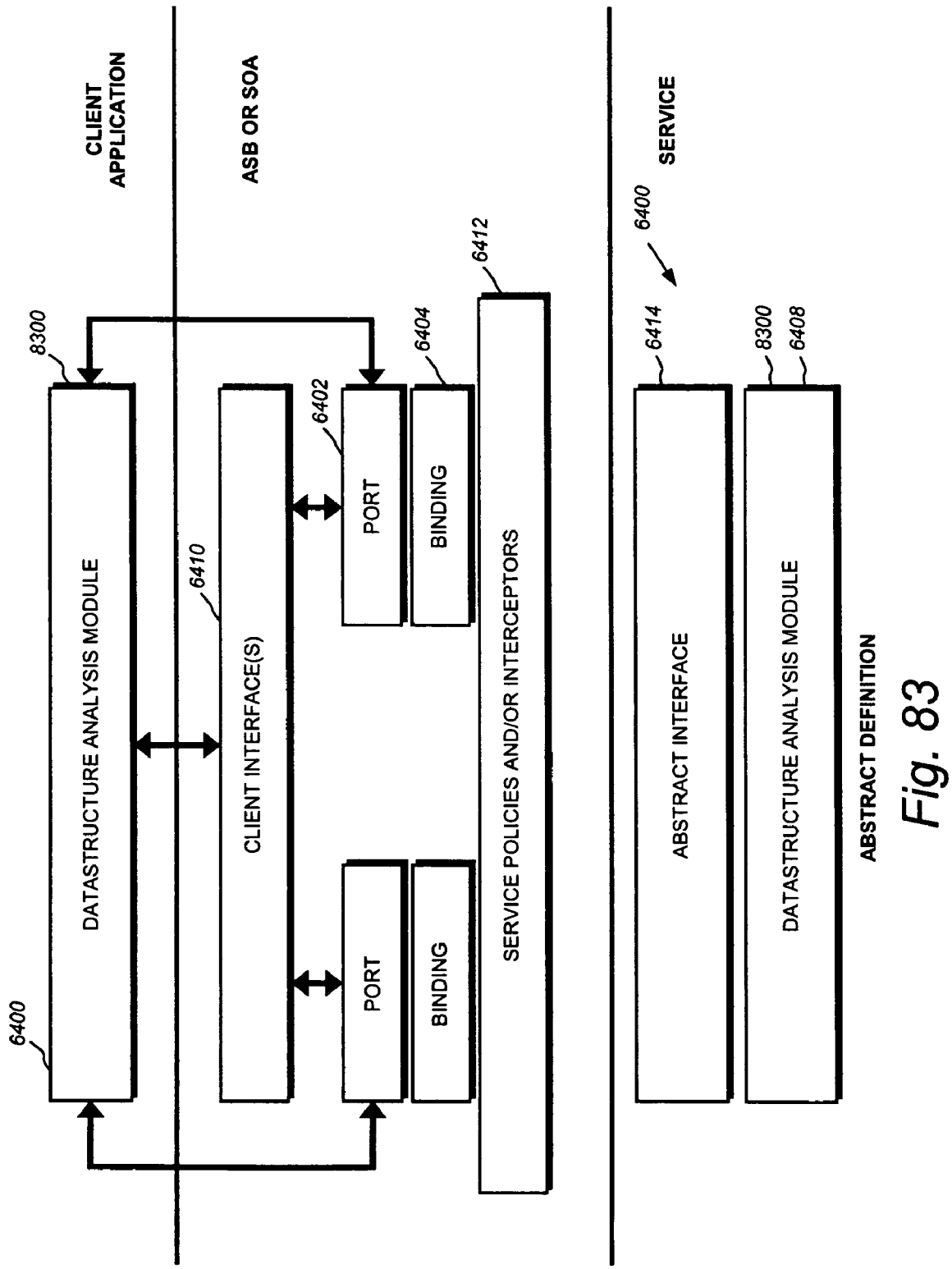
FIG. 83 shows the development and deployment of a database structure analysis module as a service in a services oriented architecture.

Referring to FIG. 83, the module 6400 can be a data structure analysis module 8300. A data structure analysis module

8300 may analyze the overall structure of the data or metadata associated with the data relating to a row, column, table or data facility 112, or any combination of these. For example, a data structure analysis module 8300 may generate a report summarizing the number and hierarchical relationship of the rows, columns and tables composing a particular database 112. Thus, the methods and systems described herein also include providing a module for analyzing a data structure, providing a registry of services, providing one or more client interfaces 6410, service policies and/or interceptors 6412, and identifying the module in the registry, wherein the module can be accessed as a service in a services oriented architecture.

Figure 84:
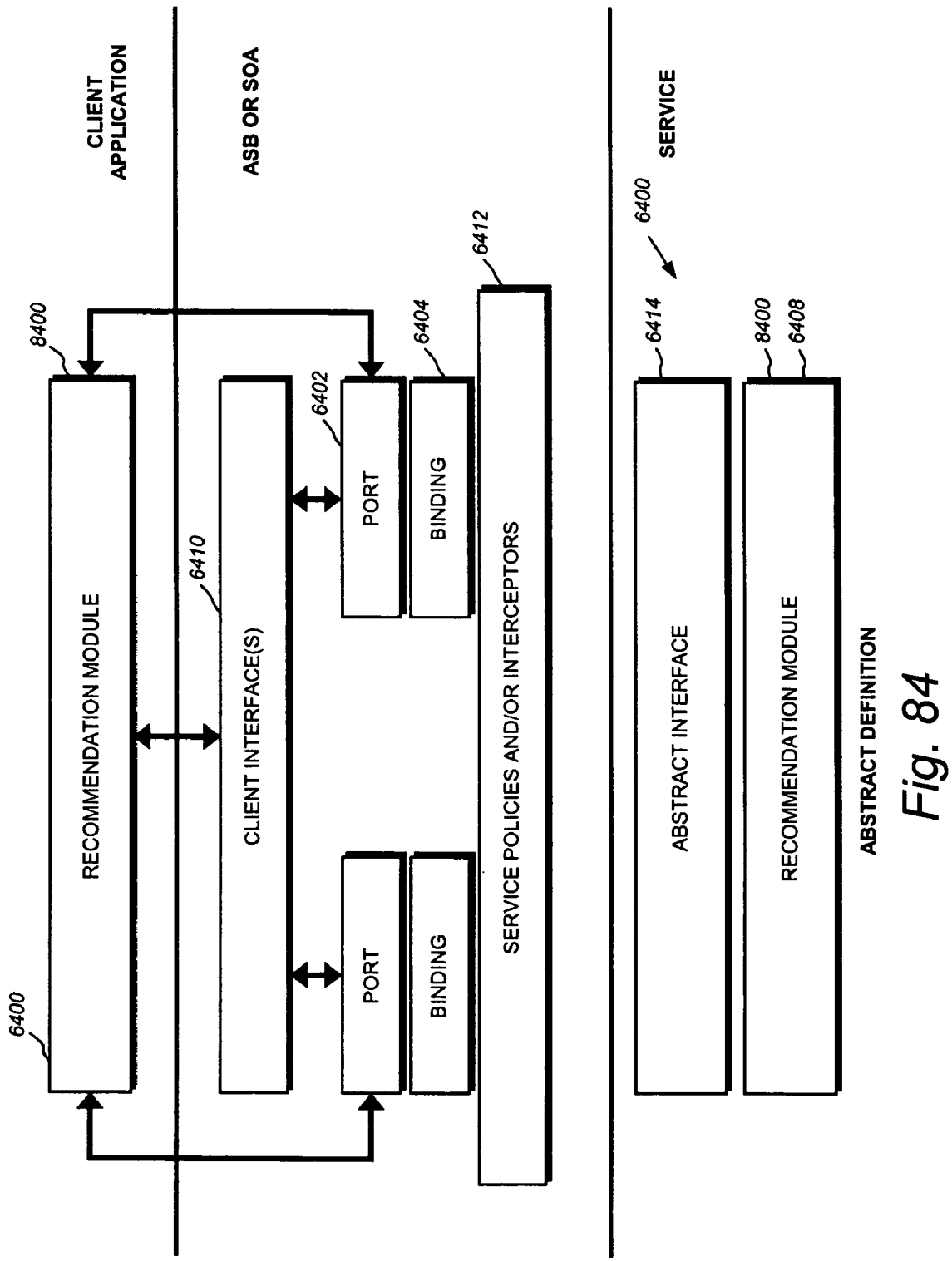
FIG. 84 shows the development and deployment of a recommendation module as a service in a services oriented architecture.

Referring to FIG. 84, the module 6400 can be a recommendation module 8400. A recommendation module 8400 may recommend a target data facility for an operation or process. For example, a recommendation module 8400 may locate and recommend an unused hub for a process involving a metabroker module 7400. As another example, the recommendation module 8400 may recommend a target database for an ETL operation based upon known characteristics of potential target databases such as access time, fault tolerance, capacity, and so on. The recommendation module 8400 may also, or instead, provide a number of different recommendations for the structure of a target database using techniques analogous to those employed by Ascential ProfileStage and AuditStage products. Thus, the methods and systems described herein also include providing a module for recommending a target data facility, providing a registry of services, providing one or more client interfaces 6410, service policies and/or interceptors 6412, and identifying the module in the registry, wherein the module can be accessed as a service in a services oriented architecture.

Figure 85:
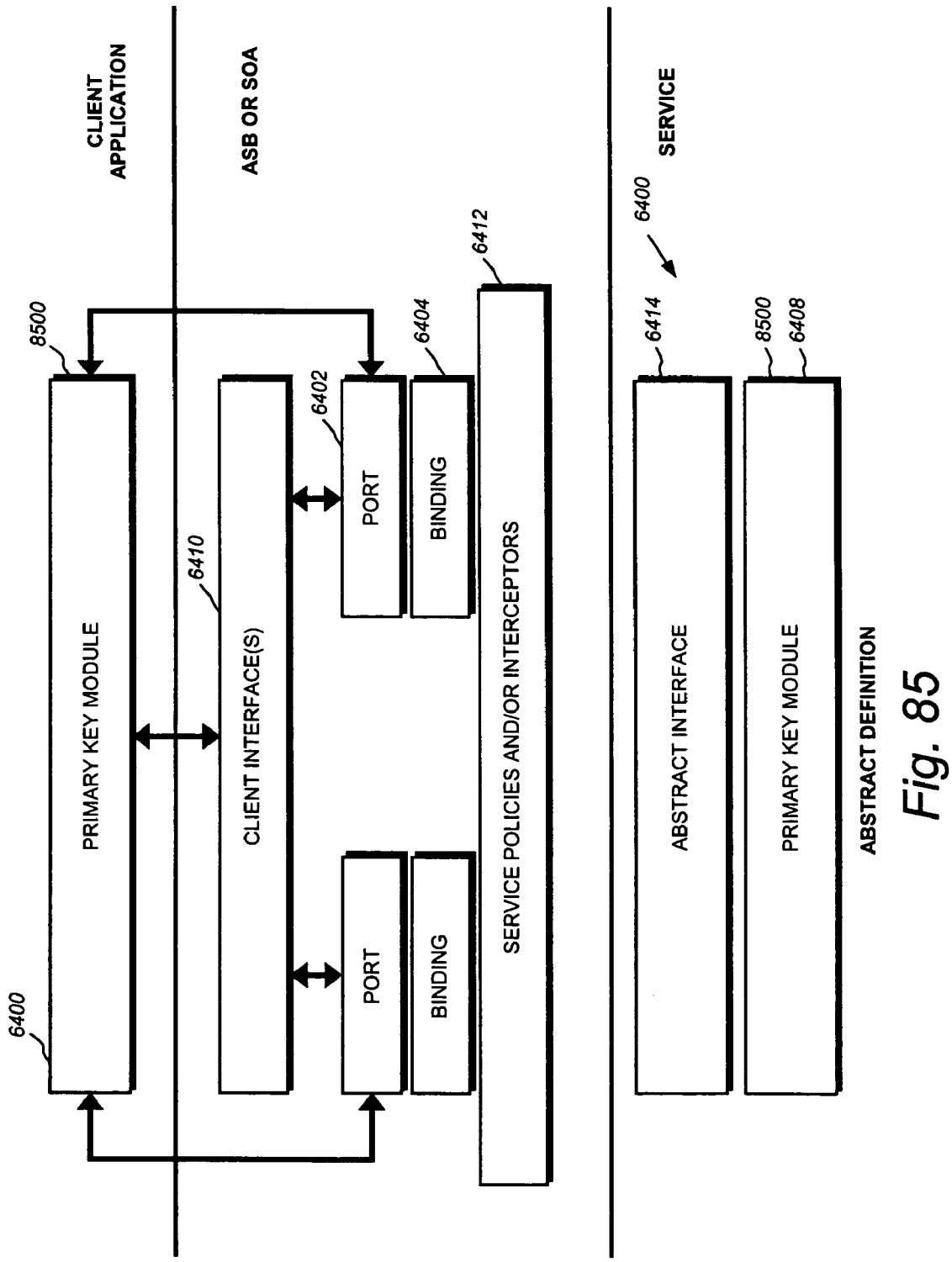
FIG. 85 shows the development and deployment of a primary key module as a service in a services oriented architecture.

Referring to FIG. 85, the module 6400 can be a primary key module 8500. A primary key module 8500 may use dependency information from table analysis to identify primary key candidates for a table under analysis. For example, the primary key module 8500 may determine that the customer name column should be a primary key for a customer information table. This information may be used to assist in designing a target database for an ETL operation or other data integration process requiring a data target. Thus, the methods and systems described herein also include providing a module for providing a primary key for a data integration function, providing a registry of services, providing one or more client interfaces 6410, service policies and/or interceptors 6412, and identifying the module in the registry, wherein the module can be accessed as a service in a services oriented architecture.

Figure 86:
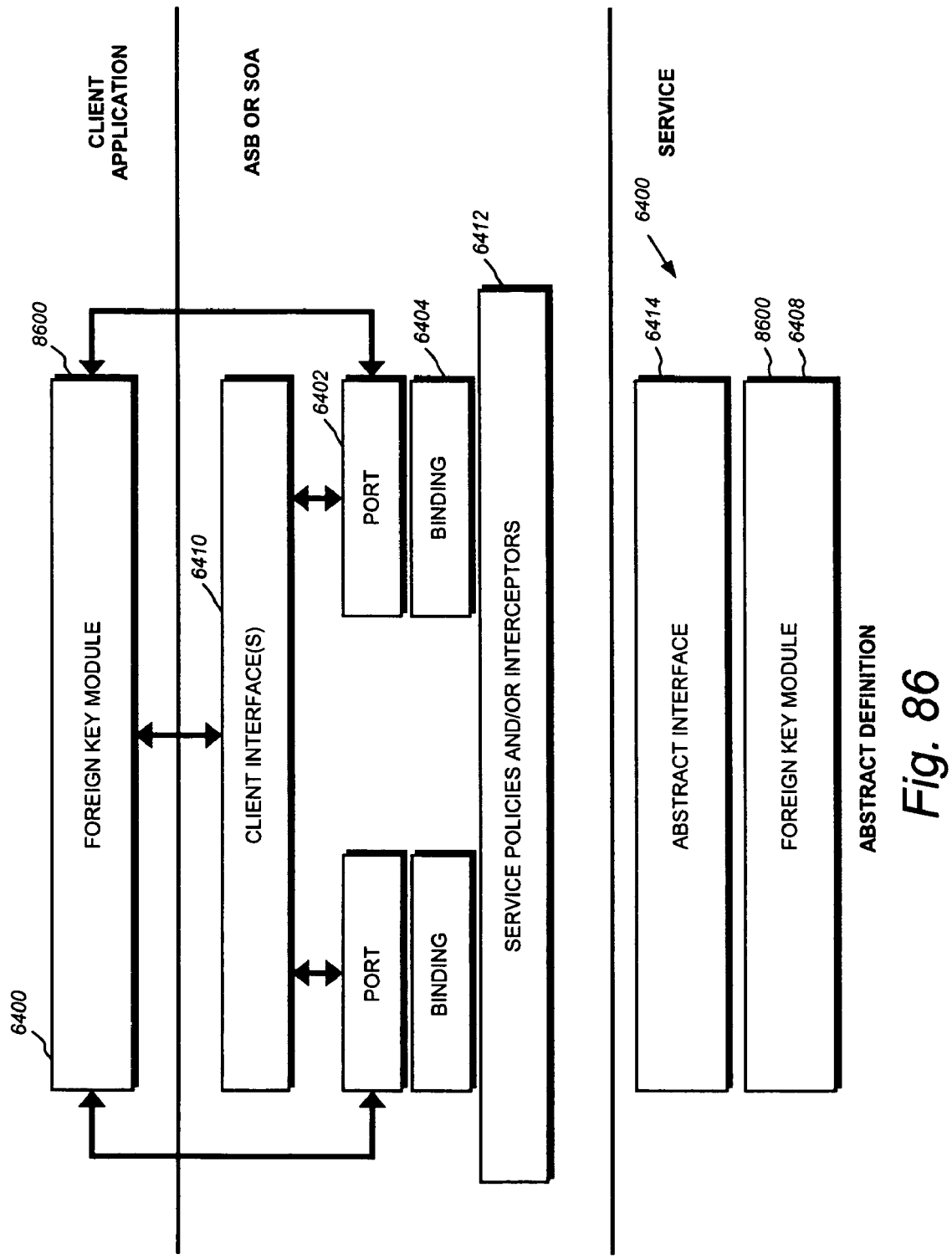
FIG. 86 shows the development and deployment of a foreign key module as a service in a services oriented architecture.

Referring to FIG. 86, the module 6400 can be a foreign key module 8600. A foreign key module 8600 may analysis a data structure to identify foreign keys. This information may be useful in, for example, preserving the integrity of relationships between tables, and in locating a primary key table with a data structure. Thus, the methods and systems described herein also include providing a module for providing a foreign key for a data integration function, providing a registry of services, providing one or more client interfaces 6410, service policies and/or interceptors 6412, and identifying the module in the registry, wherein the module can be accessed as a service in a services oriented architecture.

Figure 87:
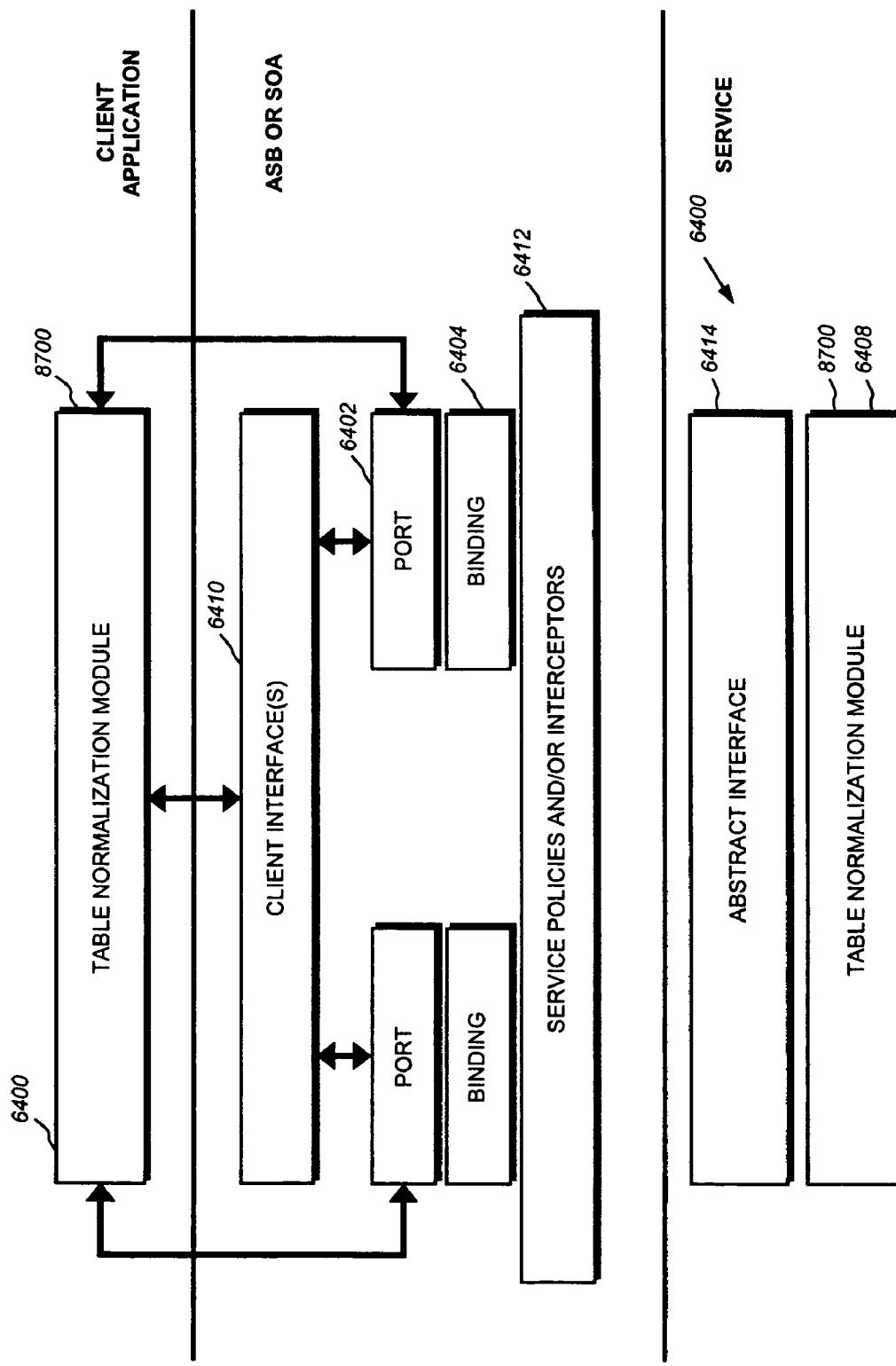
FIG. 87 shows the development and deployment of a table normalization module as a service in a services oriented architecture.

Referring to FIG. 87, the module 6400 can be a table normalization module 8700. A table normalization module 8700 for a data integration function may transform or a split a table to eliminate dependencies and/or remove redundant data and anomalies. Normalization may provide significant performance improvements in a database including faster queries and improved data integrity. Thus, the methods and systems described herein also include providing a module for providing a table normalization for a data integration function, providing a registry of services, providing one or more client interfaces 6410, service policies and/or interceptors 6412, and identifying the module in the registry, wherein the module can be accessed as a service in a services oriented architecture.

Figure 88:
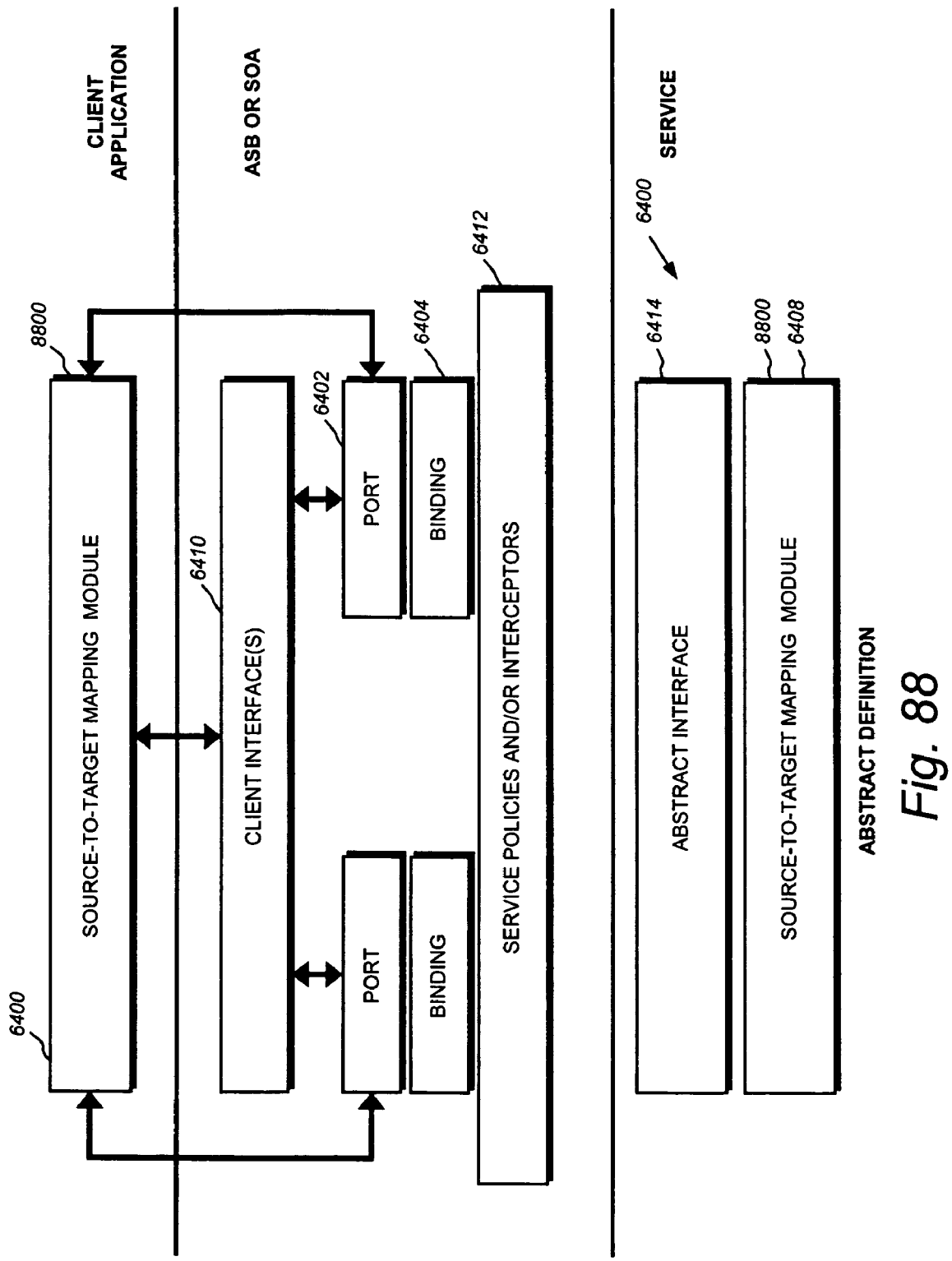
FIG. 88 shows the development and deployment of a source-to-target mapping module as a service in a services oriented architecture.

Referring to FIG. 88, the module 6400 can be a source-to-target mapping module 8800. A source-to-target mapping module 8800 for a data integration function may create a data transformation mapping for mapping data or metadata from the source system to one or more target data facilities. For example, a mapping facility may map product location data collected by a sensor to a new database combining all information about products. Or a mapping may be between a supply chain database and an inventory database, or more generally from any source to any target. While mapping typically connotes literal transfer between two locations, the source-to-target mapping module may also specify transformations with a mapping, such as combinations, filters, or other conversions or transformations. For example, the mapping may specify a coincident transformation from minutes to hours or days. Thus, the methods and systems described herein also include providing source-to-target mapping for a data integration function, providing a registry of services, providing one or more client interfaces 6410, service policies and/or interceptors 6412, and identifying the module in the registry, wherein the module can be accessed as a service in a services oriented architecture.

Figure 89:
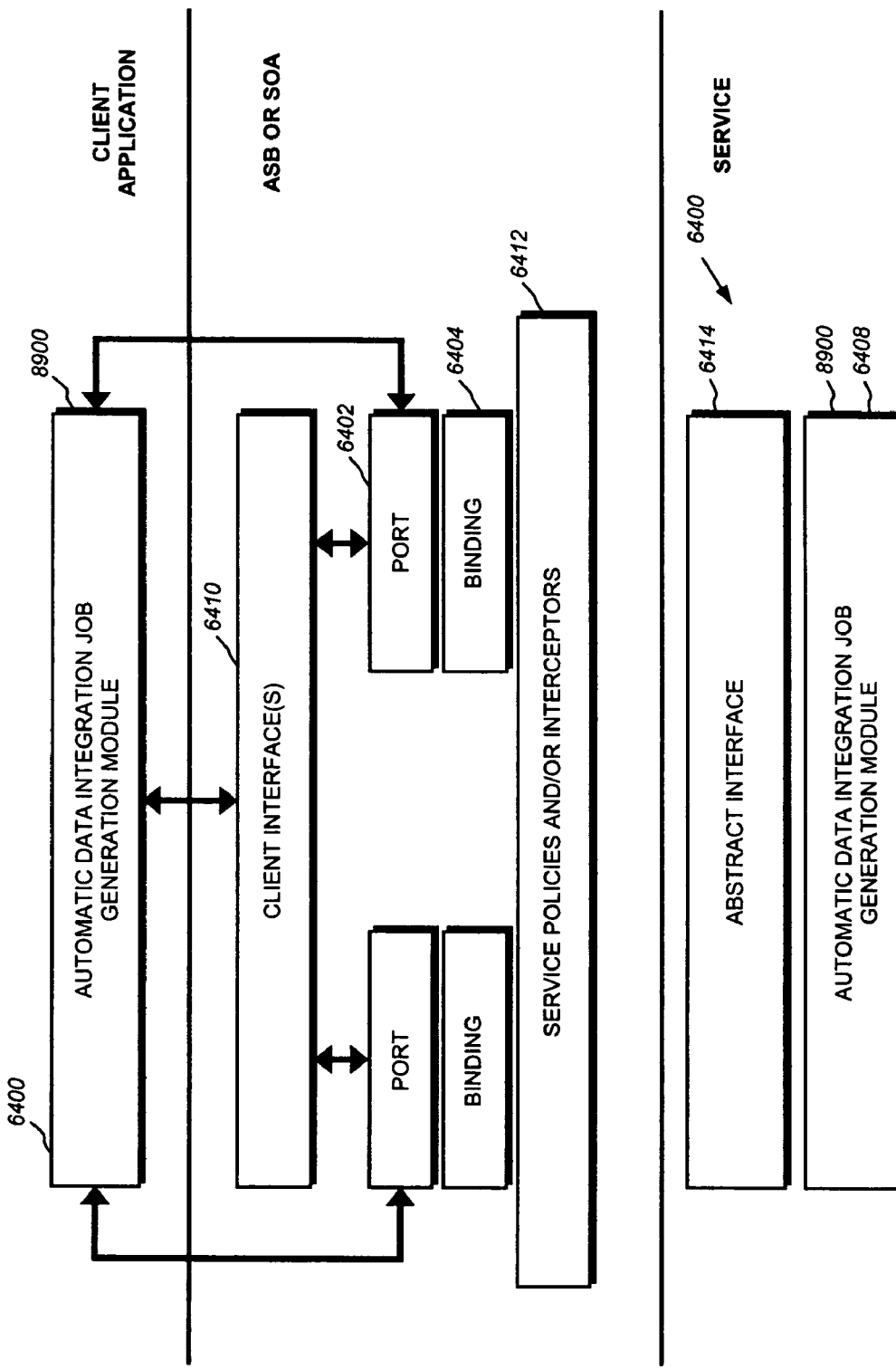
FIG. 89 shows the development and deployment of an automatic data integration job generation module as a service in a services oriented architecture.

Referring to FIG. 89, the module 6400 can be an automatic data integration job generation module 8900. An automatic data integration job module 8900 may automate the creation of a data integration job by generating a data integration job using a profile or specification provided to the module 8900. The data integration job may be provided as another module 6400 that may be registered for subsequent use throughout an enterprise, and the automatic data integration job generation module 8900 may return a specification of where and how to access the newly created job module. For example, an automatic data integration module 8900 may generate a commonly used data integration job for a stored profile for that type of data integration job. The commonly used data integration job may be the integration of customer credit information with information regarding the customer's business. This job may need to be performed for each new customer. Thus, the methods and systems described herein also include providing a module for automatically generating a data integration job from a profile for a data integration job, providing a registry of services, providing one or more client interfaces 6410, service policies and/or interceptors 6412, and identifying the module in the registry, wherein the module can be accessed as a service in a services oriented architecture.

Figure 90:
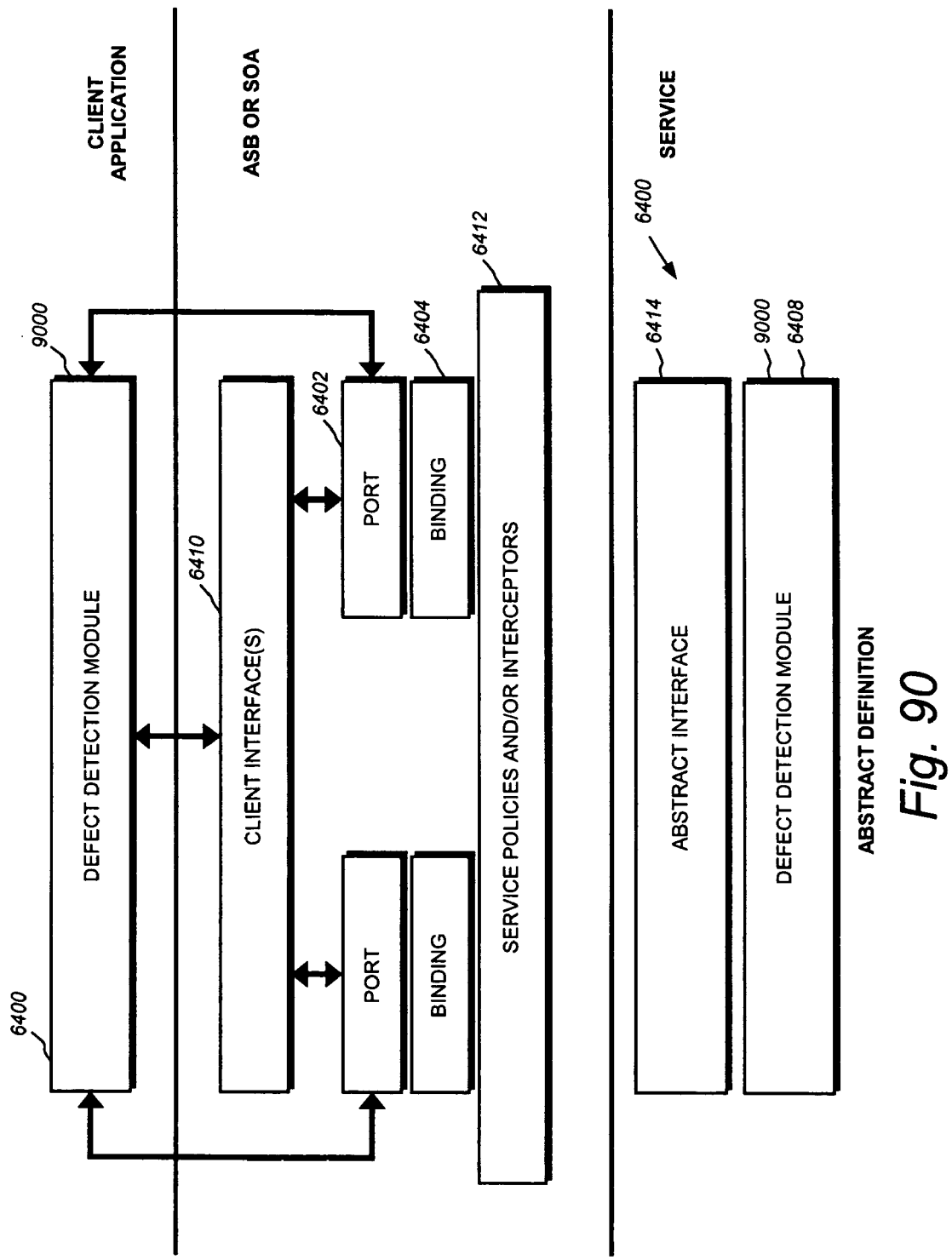
FIG. 90 shows the development and deployment of a defect detection module as a service in a services oriented architecture.

Referring to FIG. 90, the module 6400 can be a defect detection module 9000. A defect detection module 9000 may detect defects in a data facility, process or other operation. For example, a defect detection module 9000 may determine that a data integration process was performed incorrectly resulting in a table with mismatched entries. Thus, the methods and systems described herein also include providing a module for defect detection, providing a registry of services, providing one or more client interfaces 6410, service policies and/or interceptors 6412, and identifying the module in the registry, wherein the module can be accessed as a service in a services oriented architecture.

Figure 91:
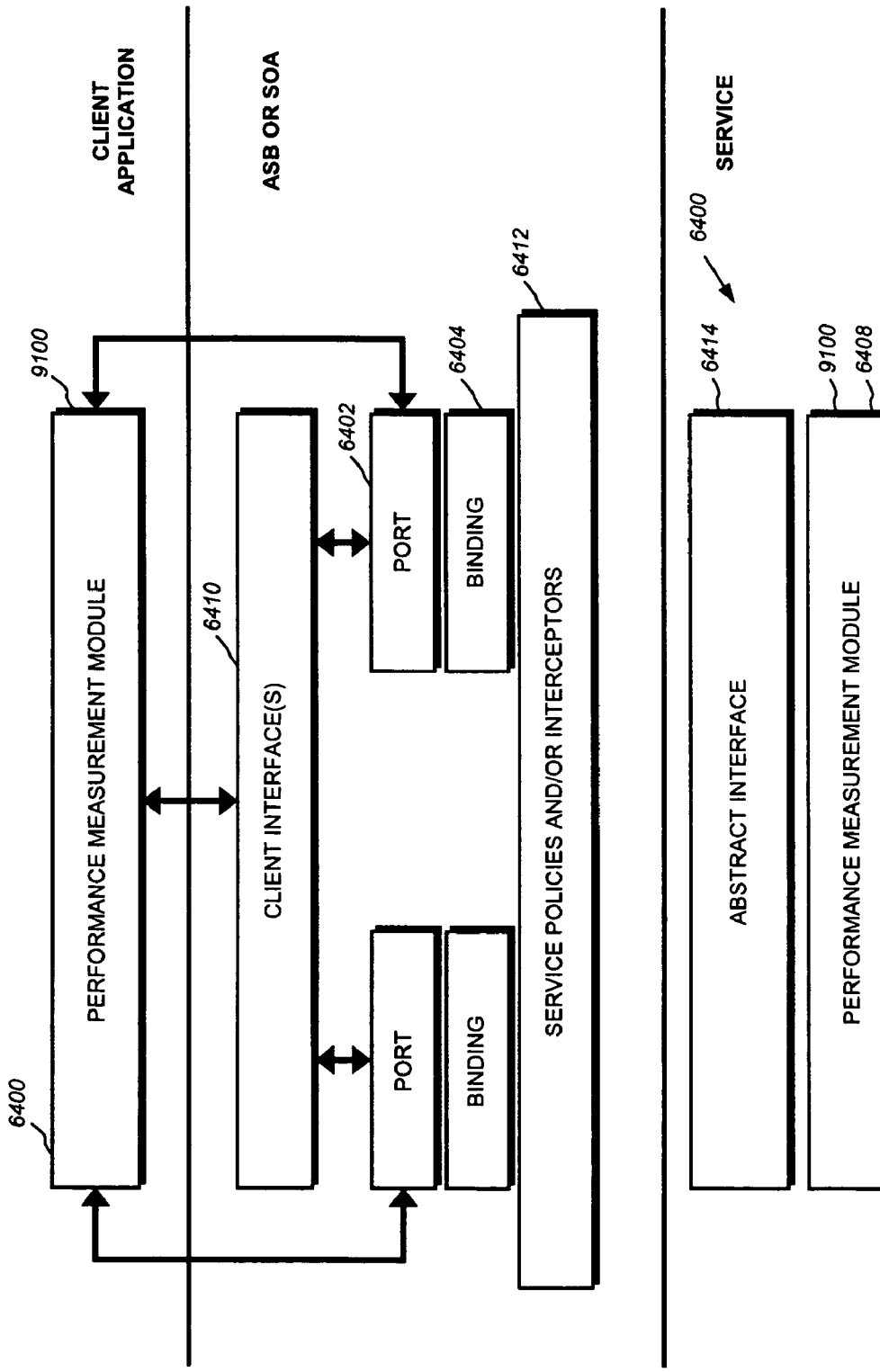
FIG. 91 shows the development and deployment of a performance measurement module as a service in a services oriented architecture.

Referring to FIG. 91, the module 6400 can be a performance measurement module 9100. A performance measurement module 9100 may measure the performance of a data integration process. For example, a performance measurement module 9100 may record the time and processor load for a given data integration operation. The performance measurement module 9100 may also assist with the optimization or modification of data integration processes. Thus, the methods and systems described herein also include providing a module for measuring the performance of a data integration function, providing a registry of services, providing one or more client interfaces 6410, service policies and/or interceptors 6412, and identifying the module in the registry, wherein the module can be accessed as a service in a services oriented architecture.

Figure 92:
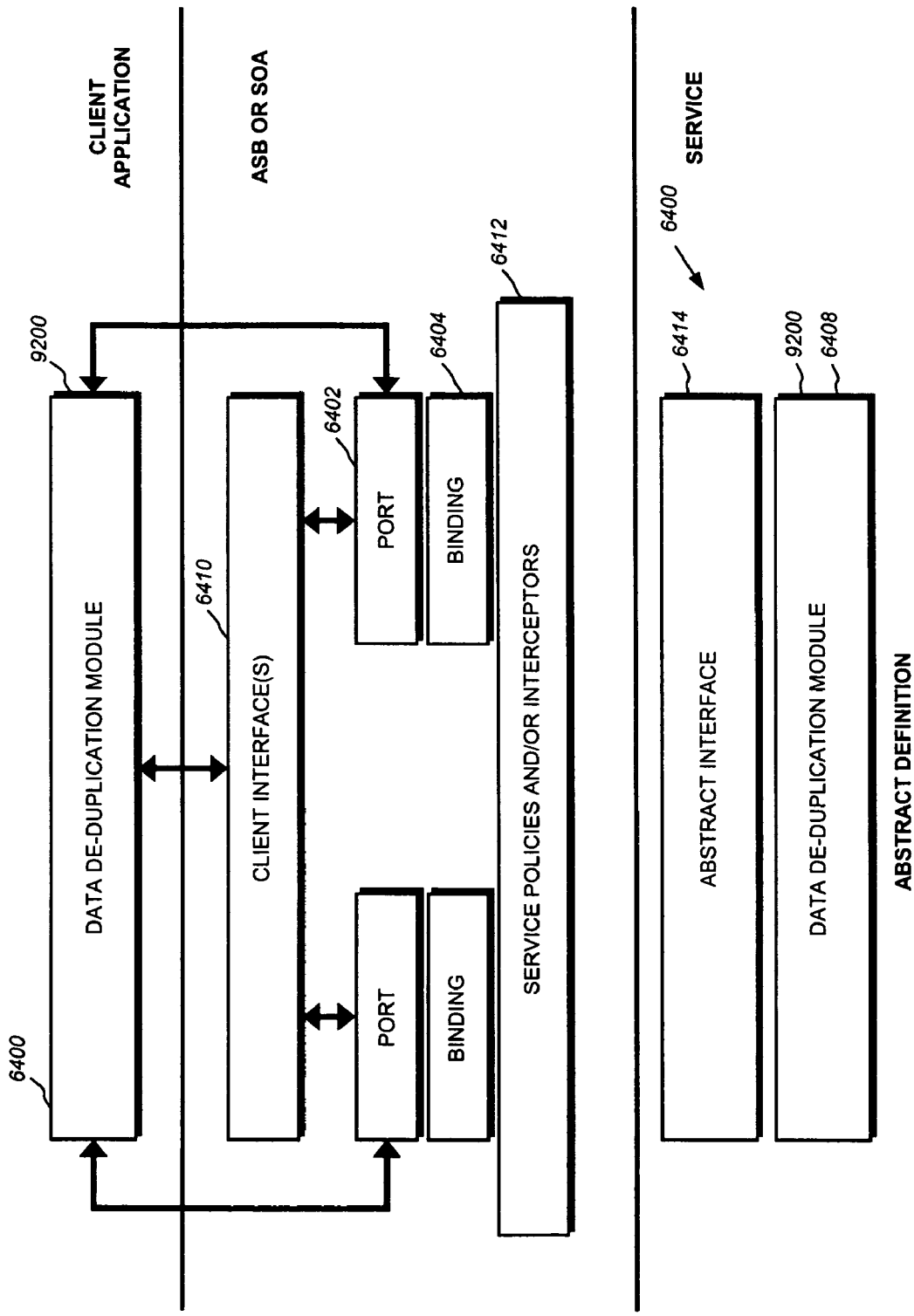
FIG. 92 shows the development and deployment of a data de-duplication module as a service in a services oriented architecture.

Referring to FIG. 92, the module 6400 can be a data de-duplication module 9200. A data de-duplication module 9200 may remove duplicate entries, rows, columns, tables, and databases from a data facility 112 or subset of a data facility 112. For example, a data de-duplication module 9200 may remove two identical address entries for Bob Smith. While de-duplication of identical records is straightforward, more subtle forms of de-duplication may also be employed using, for example, information about names (e.g., "Bill"="William" or "GE"="General Electric") and abbreviations, as well probabilistic matching or other techniques that may catch minor variations due to spelling errors or data entry errors. Thus, a data de-duplication module 9200 may also determine that the entry for Robert A. Smith at 55 Any Road, is the same as the entry for Bob Smith at 55 Any Rd., and remove the duplicate information. De-duplication may be an important preliminary quality enhancement step in an ETL operation, or any other data integration process involving an extraction of data from a database. Thus, the methods and systems described herein also include providing a module for data de-duplication, providing a registry of services, providing one or more client interfaces 6410, service policies and/or interceptors 6412, and identifying the module in the registry, wherein the module can be accessed as a service in a services oriented architecture. In embodiments the de-duplication module matches data items based on a probability. In embodiments the de-duplication module discards duplicate items.

Figure 93:
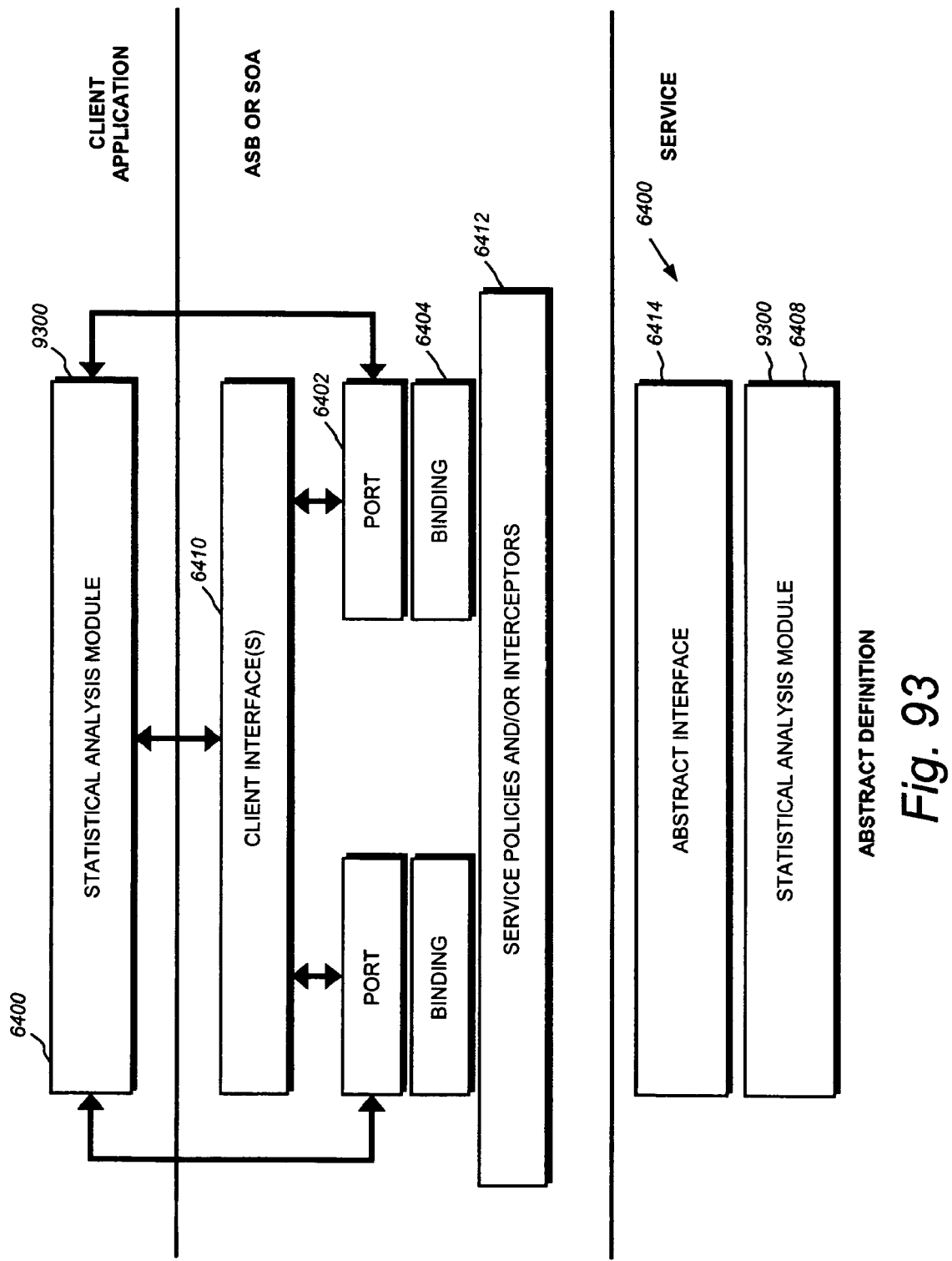
FIG. 93 shows the development and deployment of a statistical analysis module as a service in a services oriented architecture.

Referring to FIG. 93, the module 6400 can be a statistical analysis module 9300. A statistical analysis module 9300 may perform tests and gather statistics relating to data, metadata or the processes and operations being performed on the data and metadata. For example, a statistical analysis module 9300 may generate a relationship function describing the relationship between the number of units of a product sold and the age of the customer. A statistical analysis module 9300 may also provide process metrics, such as determining the average time it takes to perform a certain data integration operation with a certain processor configuration. More generally, the statistical analysis module 9300 may perform any statistical analysis on data within a data source, metadata for one or more data sources, or processes operating on data or metadata. Thus, the methods and systems described herein also include providing a module for statistical analysis of a plurality of data items, providing a registry of services, providing one or more client interfaces 6410, service policies and/or interceptors 6412, and identifying the module in the registry, wherein the module can be accessed as a service in a services oriented architecture.

Figure 94:
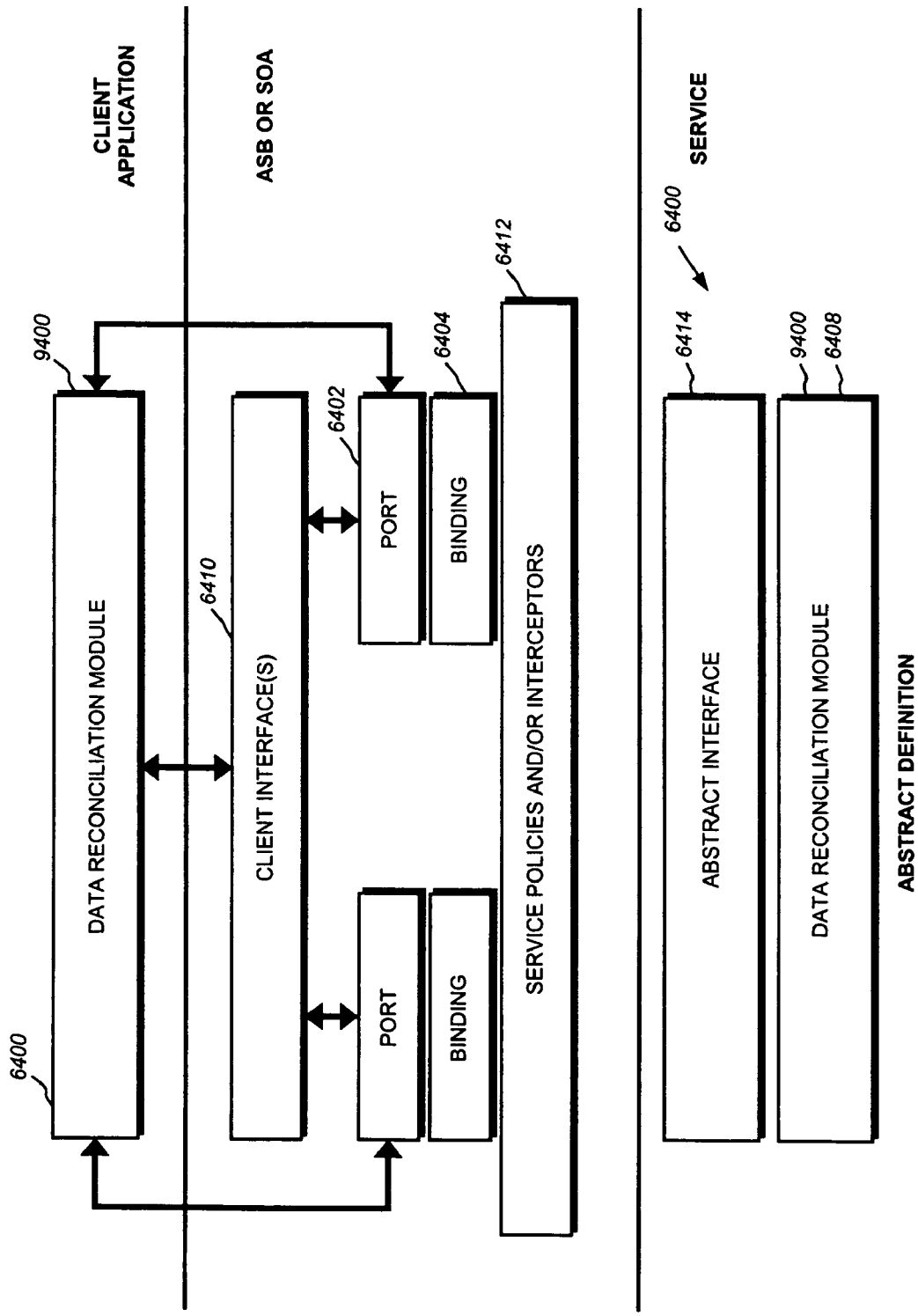
FIG. 94 shows the development and deployment of a data reconciliation module as a service in a services oriented architecture.

Referring to FIG. 94, the module 6400 can be a data reconciliation module 9400. A data reconciliation module may reconcile data and metadata from disparate data facilities 112. For example, a data reconciliation module 9400 may join similar product entries from a company's product databases corresponding to two different geographic regions allowing for the creation of master records. In another aspect, a data reconciliation module 9400 may reconcile multiple instances of an identical or nearly identical record. For example, a customer may have two different records with different addresses. These records may be reconciled, such as by using a creation date or a most recent transaction date, into a single record. Other reconciliations may be useful in a data integration system, such as a reconciliation of database backups or a reconciliation of versions of a metadata model, and may be performed using a data reconciliation module 9400. Thus, the methods and systems described herein also include providing a module for reconciling data from a plurality of data facilities, providing a registry of services, providing one or more client interfaces 6410, service policies and/or interceptors 6412, and identifying the module in the registry, wherein the module can be accessed as a service in a services oriented architecture.

Figure 95:
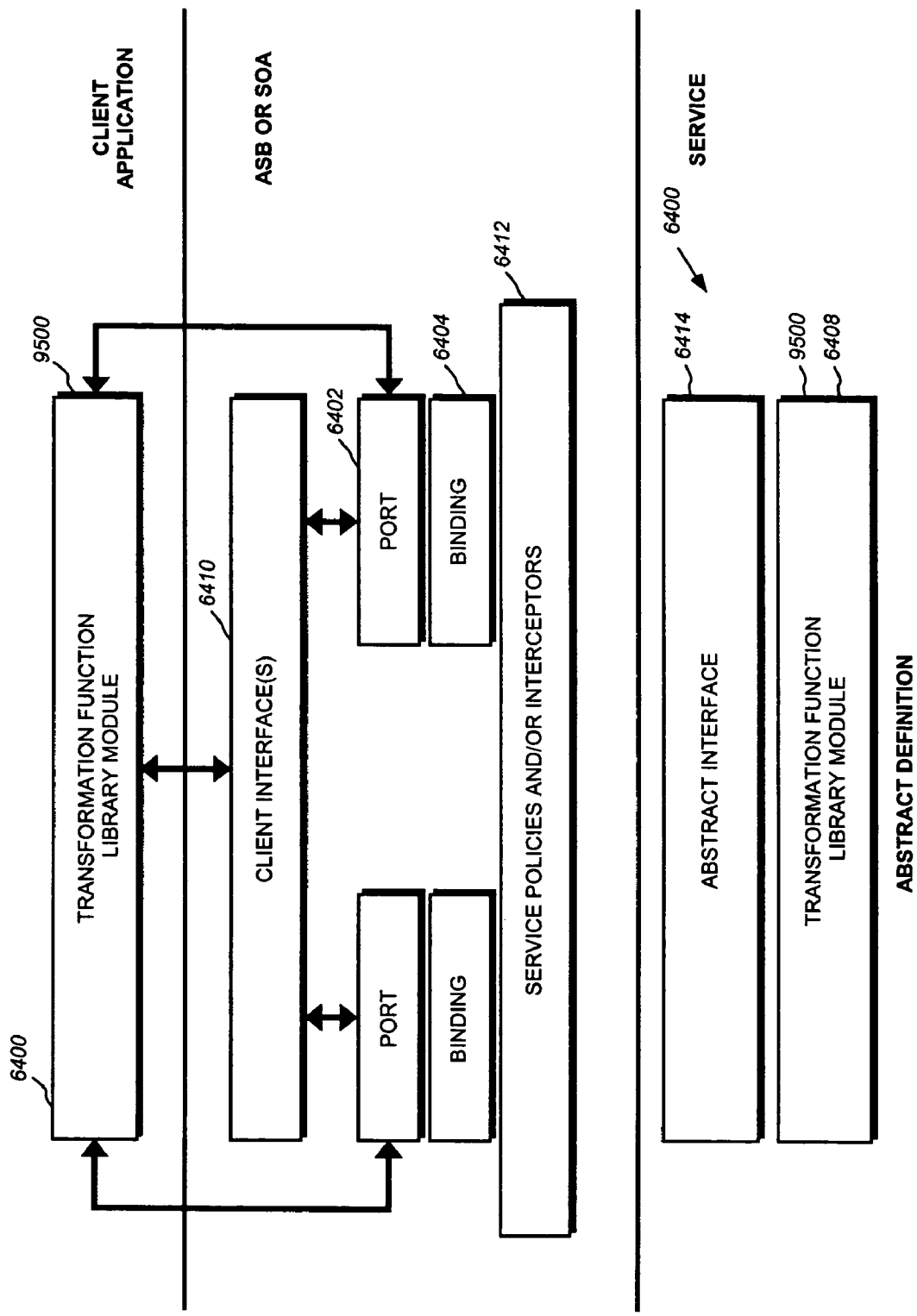
FIG. 95 shows the development and deployment of a transformation function library module as a service in a services oriented architecture.

Referring to FIG. 95, the module 6400 can be a transformation function library module 9500. A transformation function library module 9500 may provide access to a library of transformation functions. For example, common transformation functions, such as integration of customer credit and purchasing information, or transformation of data between units (e.g., Celsius to Fahrenheit or quarts to liters), or revision of exchanges for telephone numbers, may be maintained in a library so that a user does not need to create the operation from scratch each time the user wished to perform the operation. Other more fundamental transformations may also be used, such as character strings to numerical values or vice versa, or change of numerical value types (e.g. byte, word, long word). Thus, the methods and systems described herein also include providing a module for accessing library of transformation functions, providing a registry of services, providing one or more client interfaces 6410, service policies and/or interceptors 6412, and identifying the module in the registry, wherein the module can be accessed as a service in a services oriented architecture.

Figure 96:
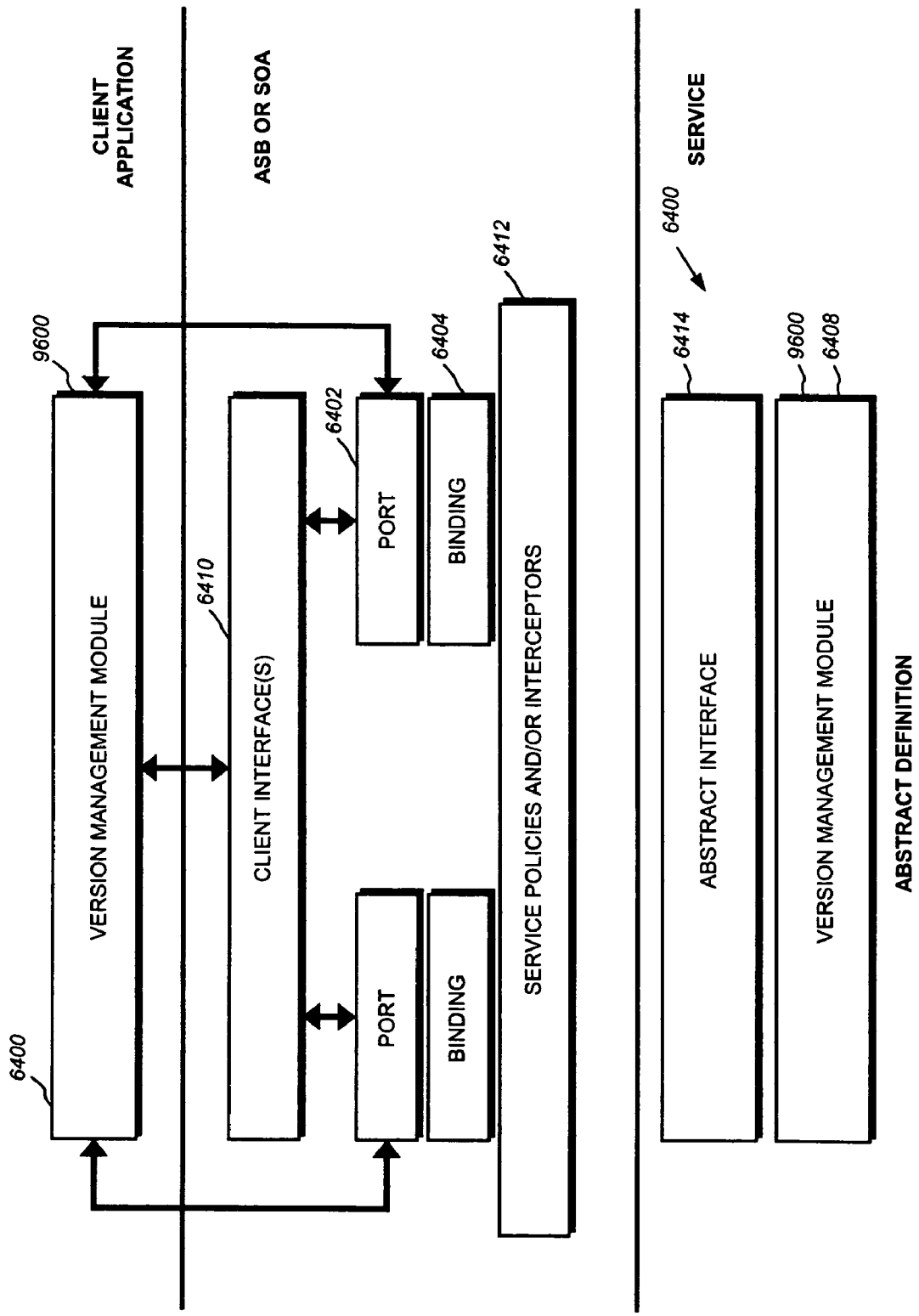
FIG. 96 shows the development and deployment of a version management module as a service in a services oriented architecture.

Referring to FIG. 96, the module 6400 can be a version management module 9600. A version management module 9600 may assist in the management of different data integration jobs stored in a library or may assist in the creation and execution of data integration jobs. For example, a version management module may allow a user to maintain multiple versions of the customer credit and purchasing data integration job described above. It may be the case that customers often have two or three accounts that require integration, so a separate version of the data integration job may be maintained for jobs dealing with two or three transactions. Similarly, the version management module 9600 may be used to select a version of a metadata model, metabroker, or other repository object, or to query a registry or repository about what versions of these objects exist. The module 9600 may also support version-related functions, such as branching and reconciliation of multiple versions. Thus, the methods and systems described herein also include providing a module for managing versions of a data integration job, providing a registry of services, providing one or more client interfaces 6410, service policies and/or interceptors 6412, and identifying the module in the registry, wherein the module can be accessed as a service in a services oriented architecture.

Figure 97:
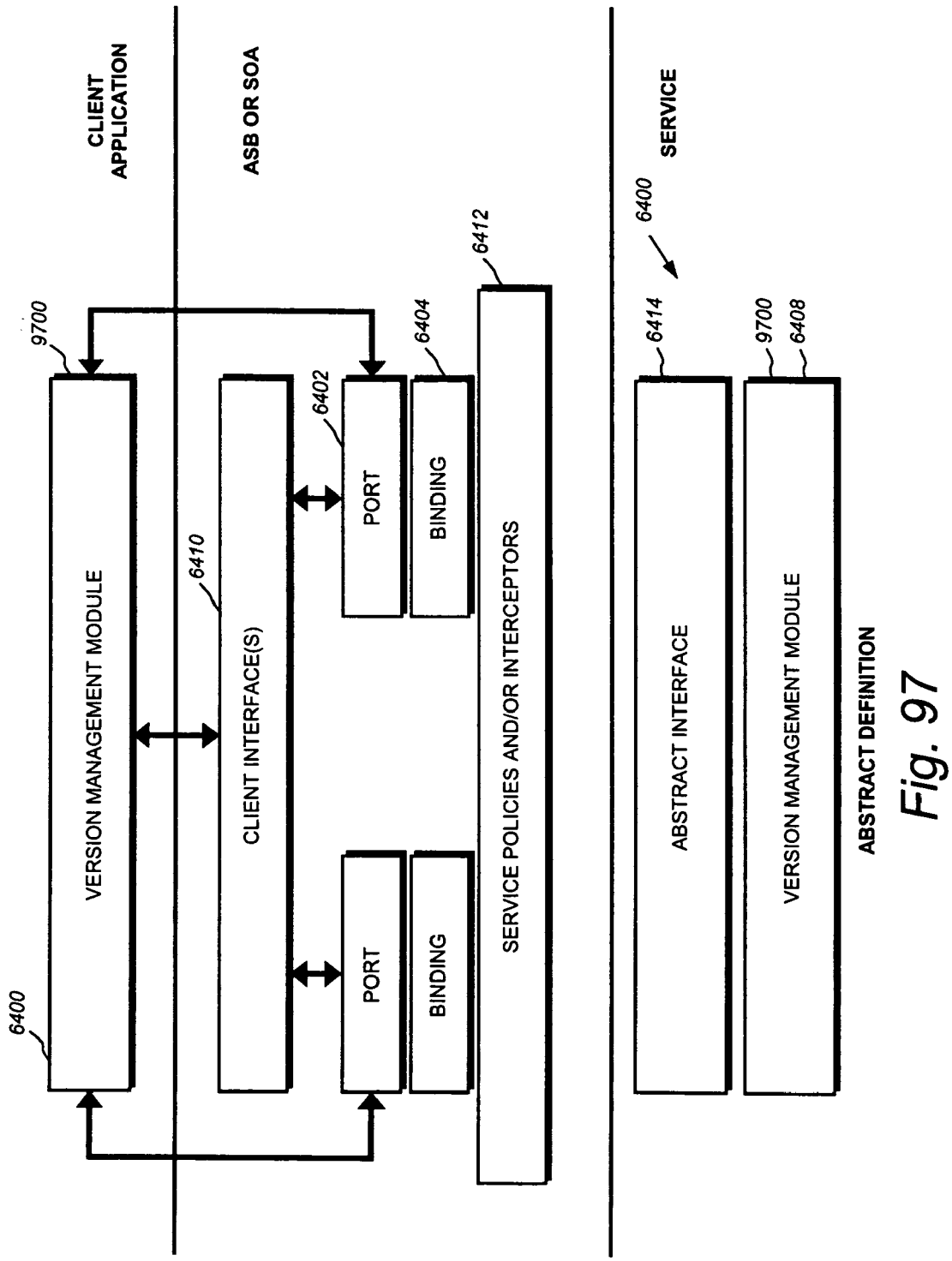
FIG. 97 shows the development and deployment of a version management module as a service in a services oriented architecture.

Referring to FIG. 97, the module 6400 can be a version management module 9700 of a different type. The version management module 9700 of FIG. 97 may control versions of data or metadata used in a data integration process. Thus while the module 9600 of FIG. 96 may control versions of tools and processes, the module 9700 of FIG. 9700 may control versions of data or metadata that the tools are applied to. Thus, the methods and systems described herein also include providing a module for managing versions of a data integration job, providing a registry of services, providing one or more client interfaces 6410, service policies and/or interceptors 6412, and identifying the module in the registry, wherein the module can be accessed as a service in a services oriented architecture. In embodiments the module allows a user to share a version with another user. In embodiments the module allows a user to check in and check out a version of a data integration job in order to use the data integration job.

Figure 98:
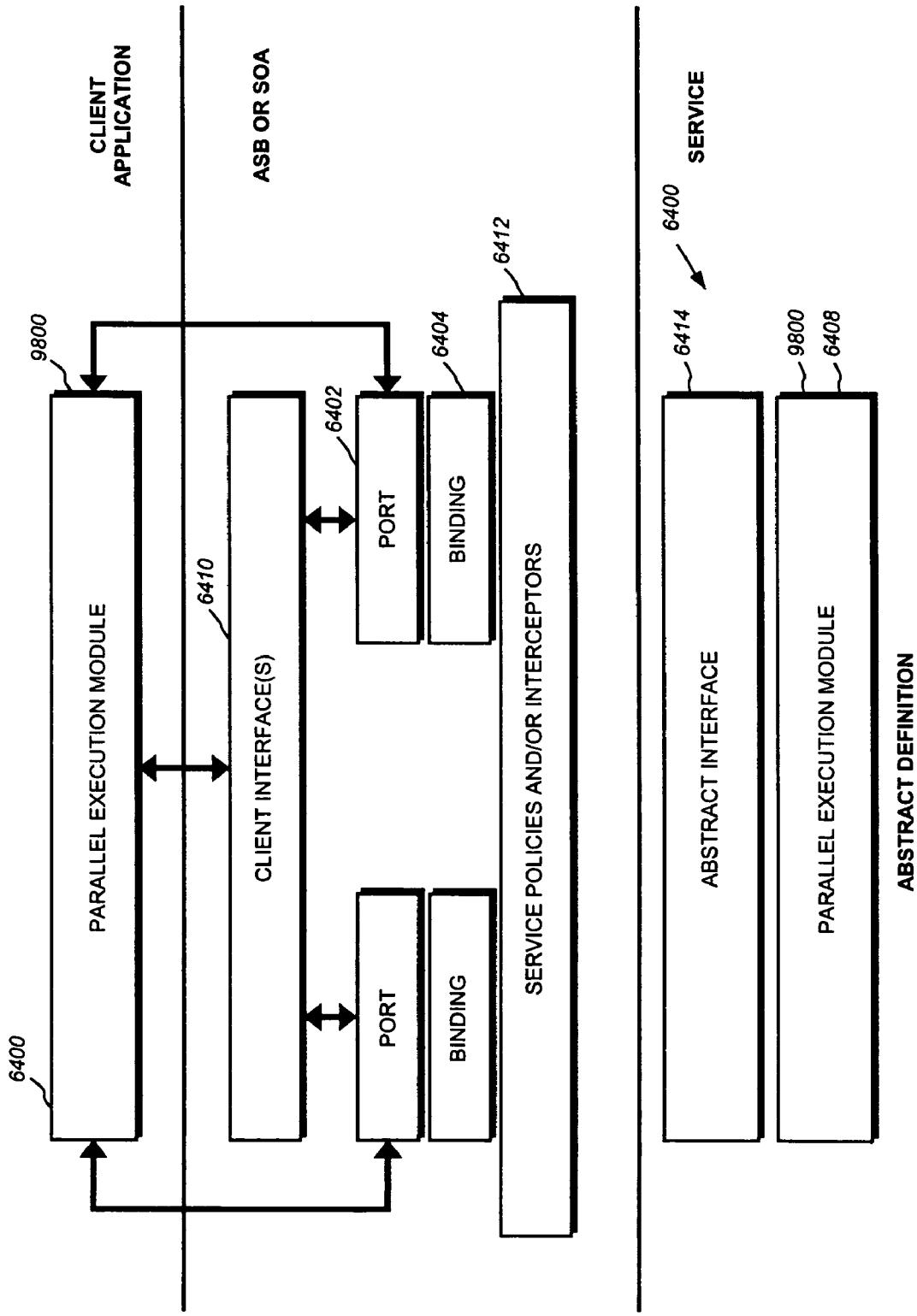
FIG. 98 shows the development and deployment of a parallel execution module as a service in a services oriented architecture.

Referring to FIG. 98, the module 6400 can be a parallel execution module 9800. A parallel execution module 9800 may allow for the dynamic execution of data integration jobs in parallel. The parallel execution module 9800 may analyze processing and data dependencies of portions of an execution task to generate an appropriate parallel execution order, or may receive explicit parallelism instructions along with the identification of a task for execution. Thus, the methods and systems described herein also include providing a module for parallel execution of a data integration function, providing a registry of services, providing one or more client interfaces 6410, service policies and/or interceptors 6412, and identifying the module in the registry, wherein the module can be accessed as a service in a services oriented architecture.

Figure 99:
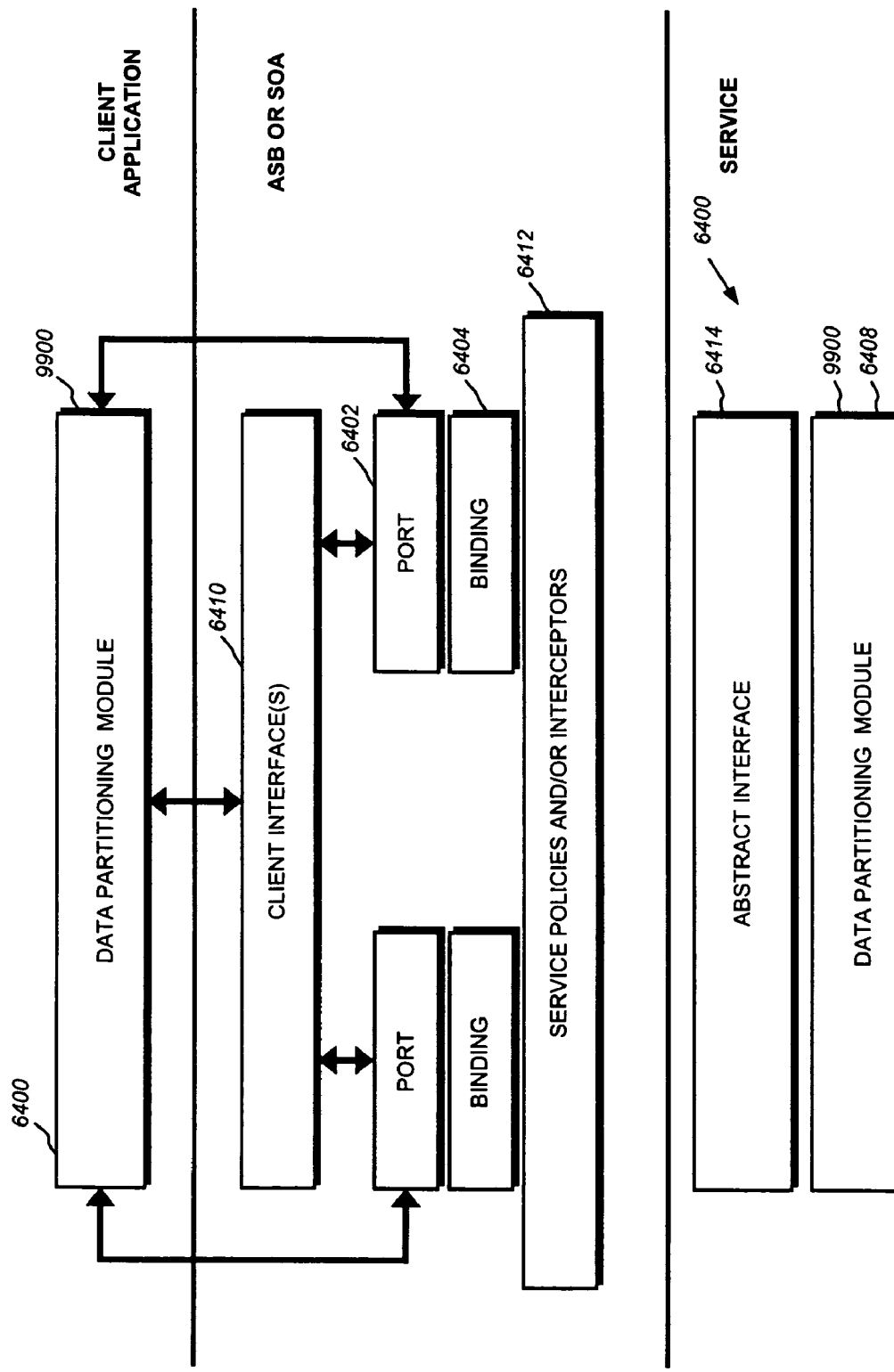
FIG. 99 shows the development and deployment of a data partitioning module as a service in a services oriented architecture.

Referring to FIG. 99, the module 6400 can be a data partitioning module 9900. A data partitioning module 9900 may break up a source record set into several sub-sets. For example, for a data integration job involving a table, the table may be broken into several sub-tables, each having its own data, index, and so forth, and the data integration job performed on each sub-table simultaneously. This process may result in shorter processing times. Thus, the methods and systems described herein also include providing a module for partitioning data, providing a registry of services, providing one or more client interfaces 6410, service policies and/or interceptors 6412, and identifying the module in the registry, wherein the module can be accessed as a service in a services oriented architecture.

Figure 100:
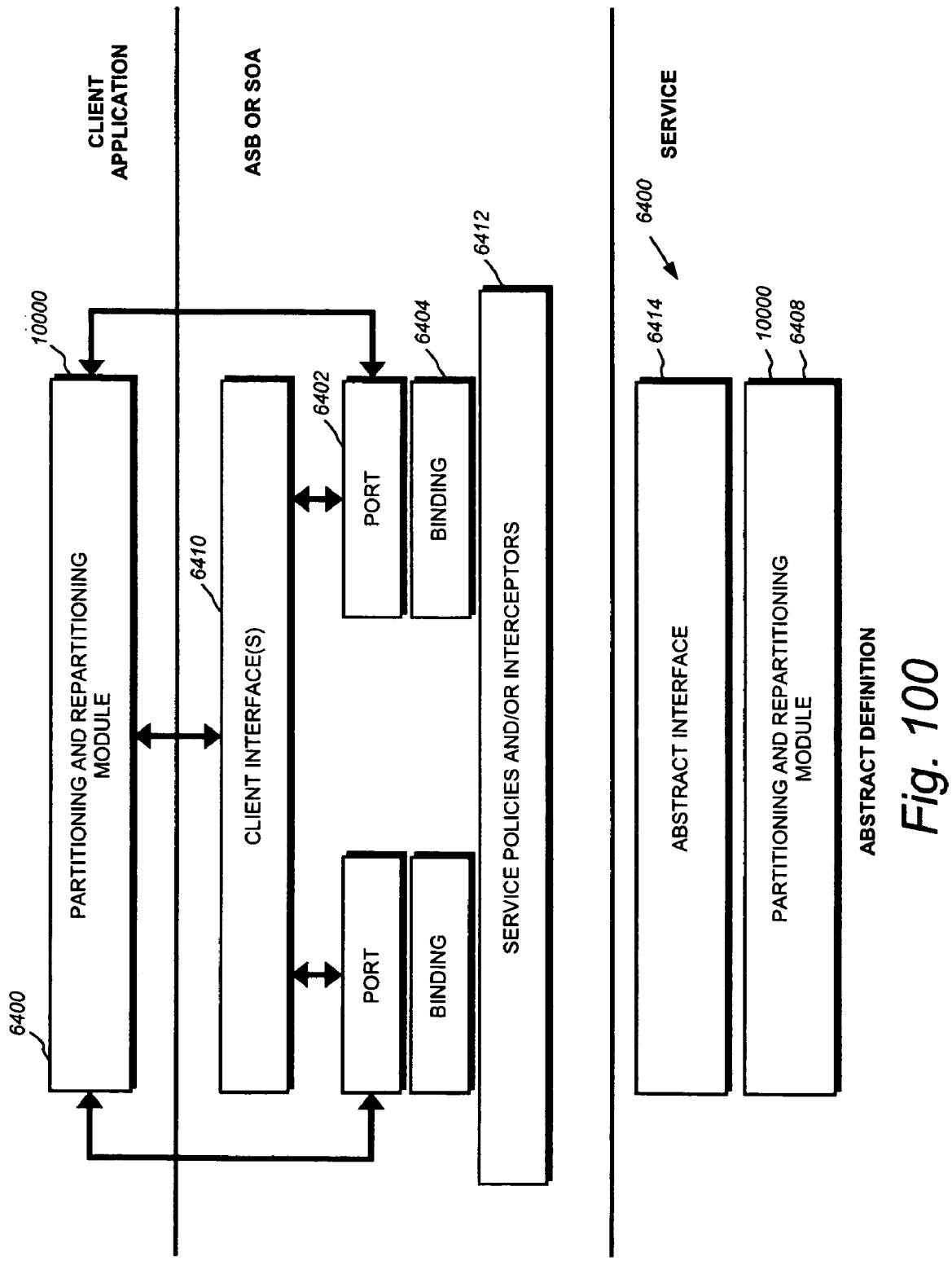
FIG. 100 shows the development and deployment of a partitioning and repartitioning module as a service in a services oriented architecture.

Referring to FIG. 100, the module 6400 can be a partitioning and repartitioning module 10000. A partitioning and repartitioning module 10000 may function as a portioning module 9900 with the added functionality of being able to recombine the original or transformed subsets. For example, after the data integration job described in the example of FIG. 99 has been performed a partitioning and repartitioning module 10000 may join the sub-tables to create a transformed table resembling the source table. Thus, the methods and systems described herein also include providing a module for partitioning and repartitioning data, providing a registry of services, providing one or more client interfaces 6410, service policies and/or interceptors 6412, and identifying the module in the registry, wherein the module can be accessed as a service in a services oriented architecture.

Figure 101:
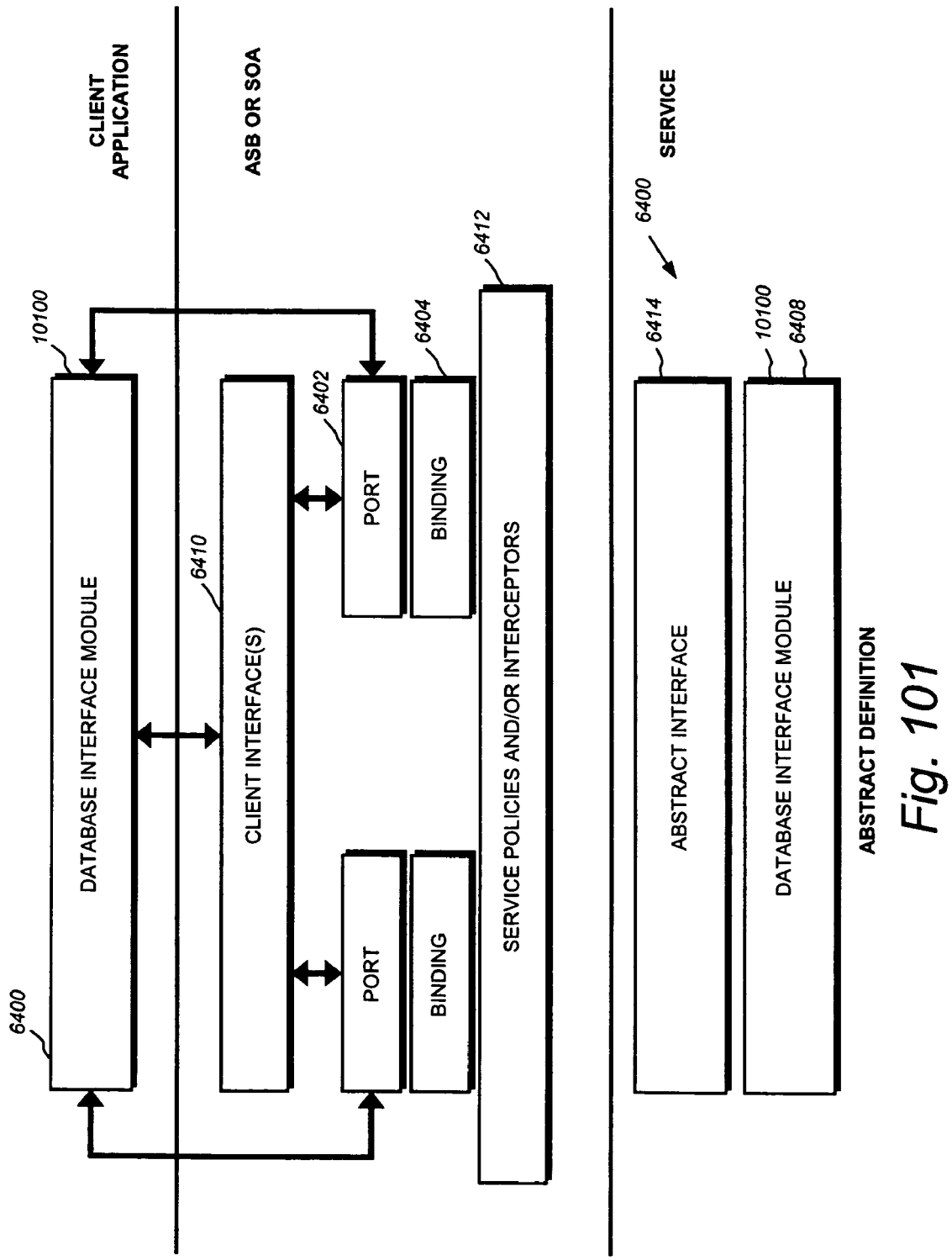
FIG. 101 shows the development and deployment of a database interface module as a service in a services oriented architecture.

Referring to FIG. 101, the module 6400 can be a database interface module 10100. A database interface module 10100 may allow a user to interact with a database and/or perform data integration jobs. For example, a database interface module 10100 may allow a user to view certain entries in a database, such as the sales performance history for a certain employee. The database interface module 10100 may provide atomic user interaction, such as an individual query, read, write, or other transaction. The database interface module 10100 may also, or instead, provide more general database connectivity through which a data integration job or other process may operate continuously on a database. Thus, the methods and systems described herein also include providing a database interface module, providing a registry of services, providing one or more client interfaces 6410, service policies and/or interceptors 6412, and identifying the module in the registry, wherein the module can be accessed as a service in a services oriented architecture. In embodiments the interface module facilities an interface to databases of a plurality of database vendors.

Figure 102:
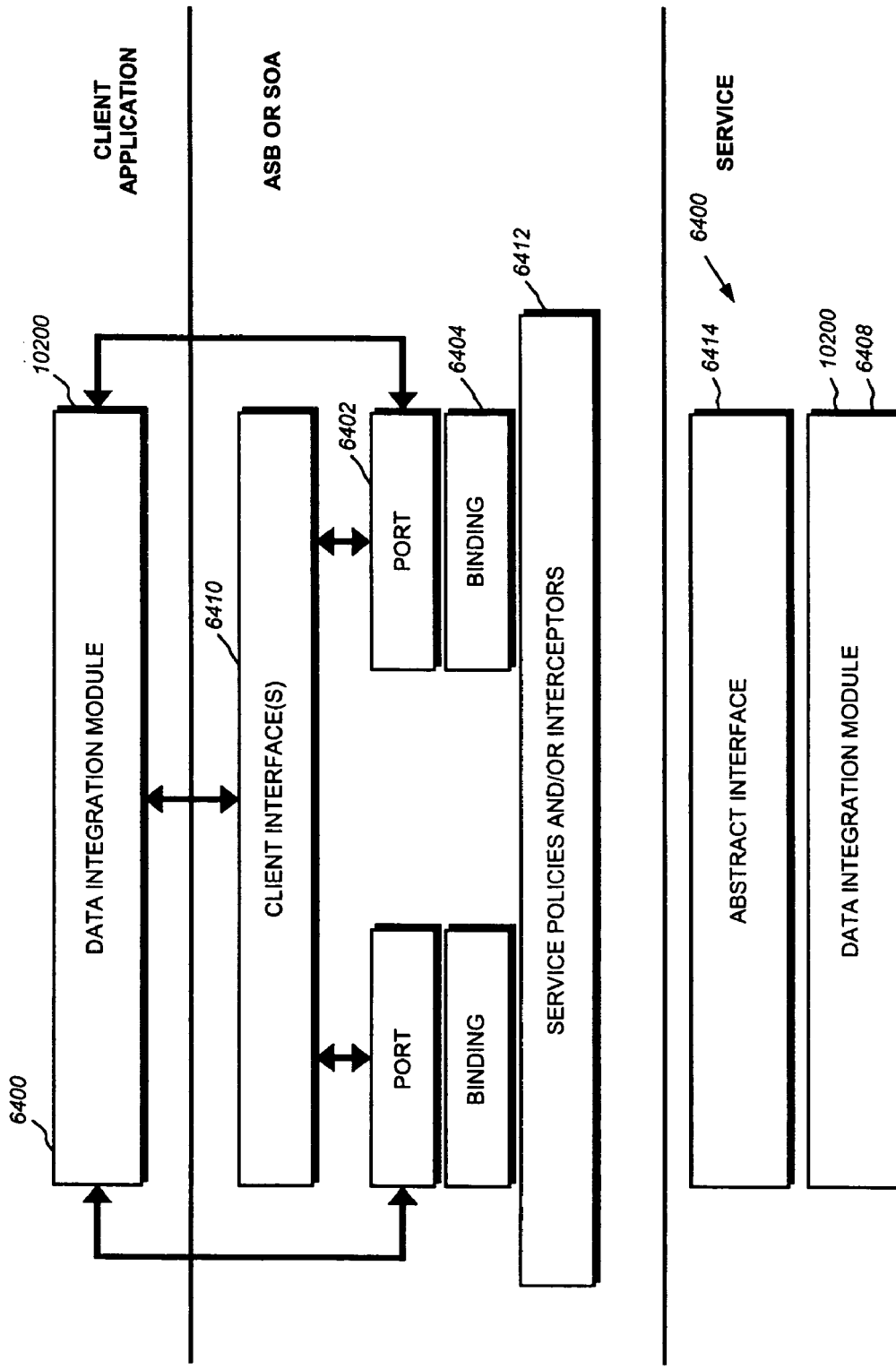
FIG. 102 shows the development and deployment of a data integration module as a service in a services oriented architecture.

Referring to FIG. 102, the module 6400 can be a data integration module 10200. A data integration module 10200 may allow for the creation or execution of data integration jobs. For example, a user may create and schedule certain transformation jobs using the data integration module 10200, or investigate what data integration processes are available in modules 6400 using the data integration module 10200. Thus, the methods and systems described herein also include providing a module for a data integration function, providing a registry of services, providing one or more client interfaces 6410, service policies and/or interceptors 6412, and identifying the module in the registry, wherein the module can be accessed as a service in a services oriented architecture.

Figure 103:
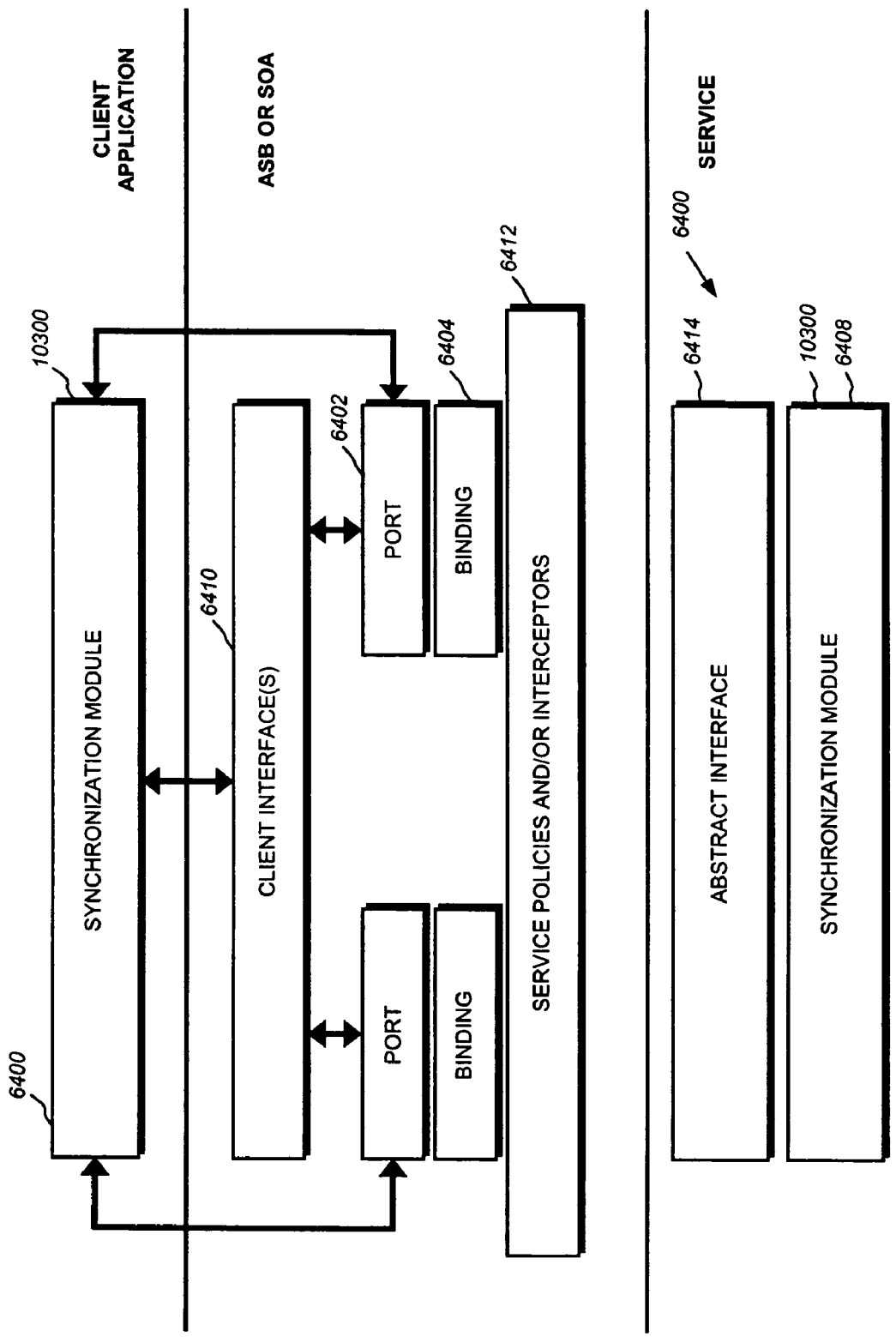
FIG. 103 shows the development and deployment of a synchronization module as a service in a services oriented architecture.

Referring to FIG. 103, the module 6400 can be a synchronization module 10300. A data synchronization module 10300 may synchronize data from disparate sources. For example, a data synchronization module 10300 may align similar entries in different databases, perform cross-linking analysis and remove any duplicative or erroneous records. Thus, the methods and systems described herein also include providing a module for synchronizing data, providing a registry of services, providing one or more client interfaces 6410, service policies and/or interceptors 6412, and identifying the module in the registry, wherein the module can be accessed as a service in a services oriented architecture. In embodiments the module facilitates synchronization of data across a plurality of hierarchical data formats. In embodiments the module facilitates synchronization of data across a plurality of transactional formats. In embodiments the module facilitates synchronization of data across a plurality of operating environments. In embodiments the module facilitates synchronization of Electronic Data Interchange format data. In embodiments the module facilitates synchronization of HIPAA data. In embodiments the module facilitates synchronization of SWIFT format data.

Figure 104:
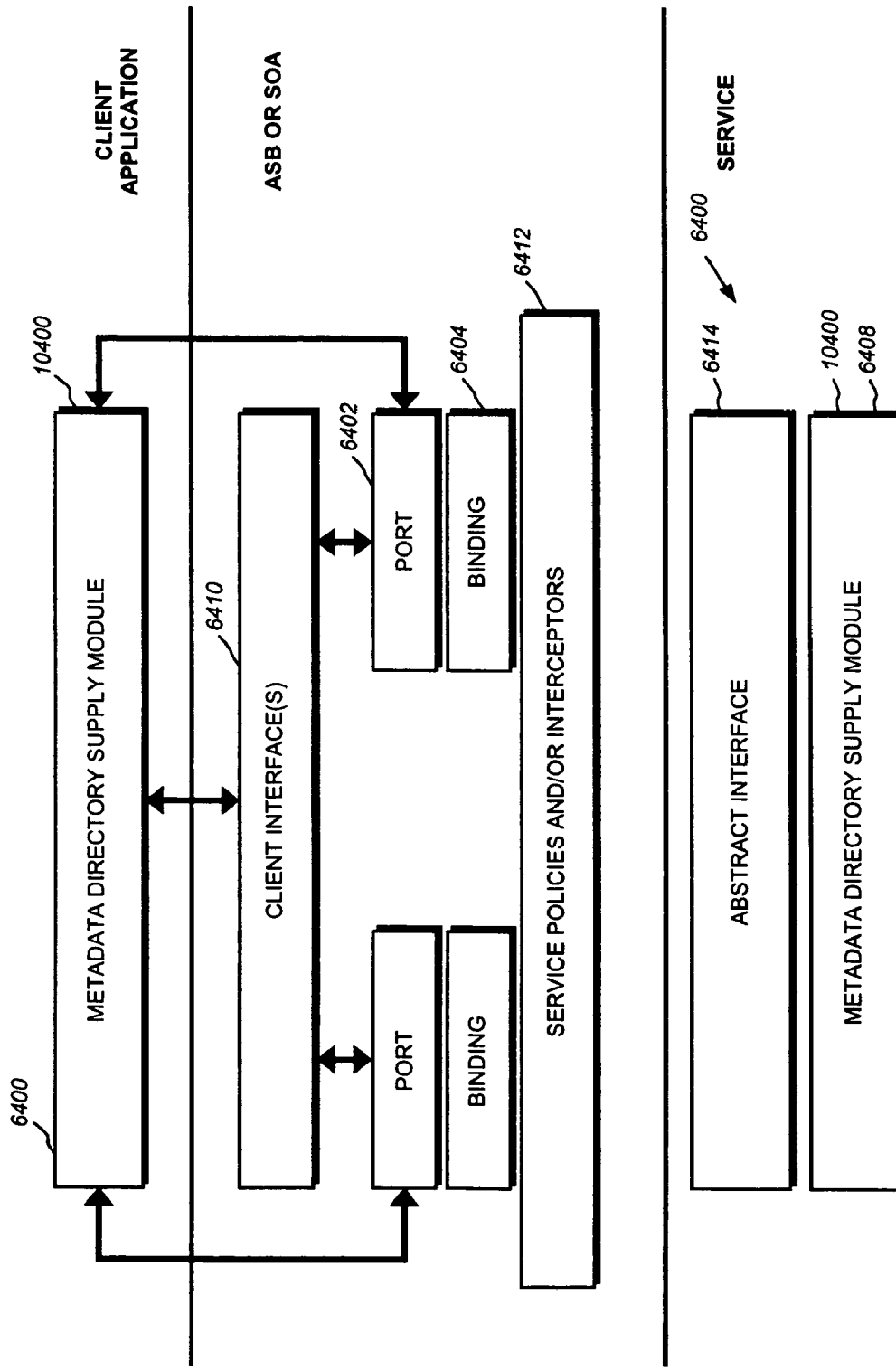
FIG. 104 shows the development and deployment of a metadata directory supply module as a service in a services oriented architecture.

Referring to FIG. 104, the module 6400 can be a metadata directory supply module 10400. A metadata directory supply module 10400 may serve as a glossary or definitional database that provides insight into the types of information recorded by an enterprise. For example, user in the sales department can access a metadata directory using the metadata directory supply module 10400 to learn about the types of data recorded by the production department. The user may learn that the production department defines units in lots, while the sales department defines units in hundred-lots. As a result, the user can adjust her supply forecasts accordingly. Thus, the methods and systems described herein also include providing a module for supplying a metadata directory, providing a registry of services, providing one or more client interfaces 6410, service policies and/or interceptors 6412, and identifying the module in the registry, wherein the module can be accessed as a service in a services oriented architecture.

Figure 105:
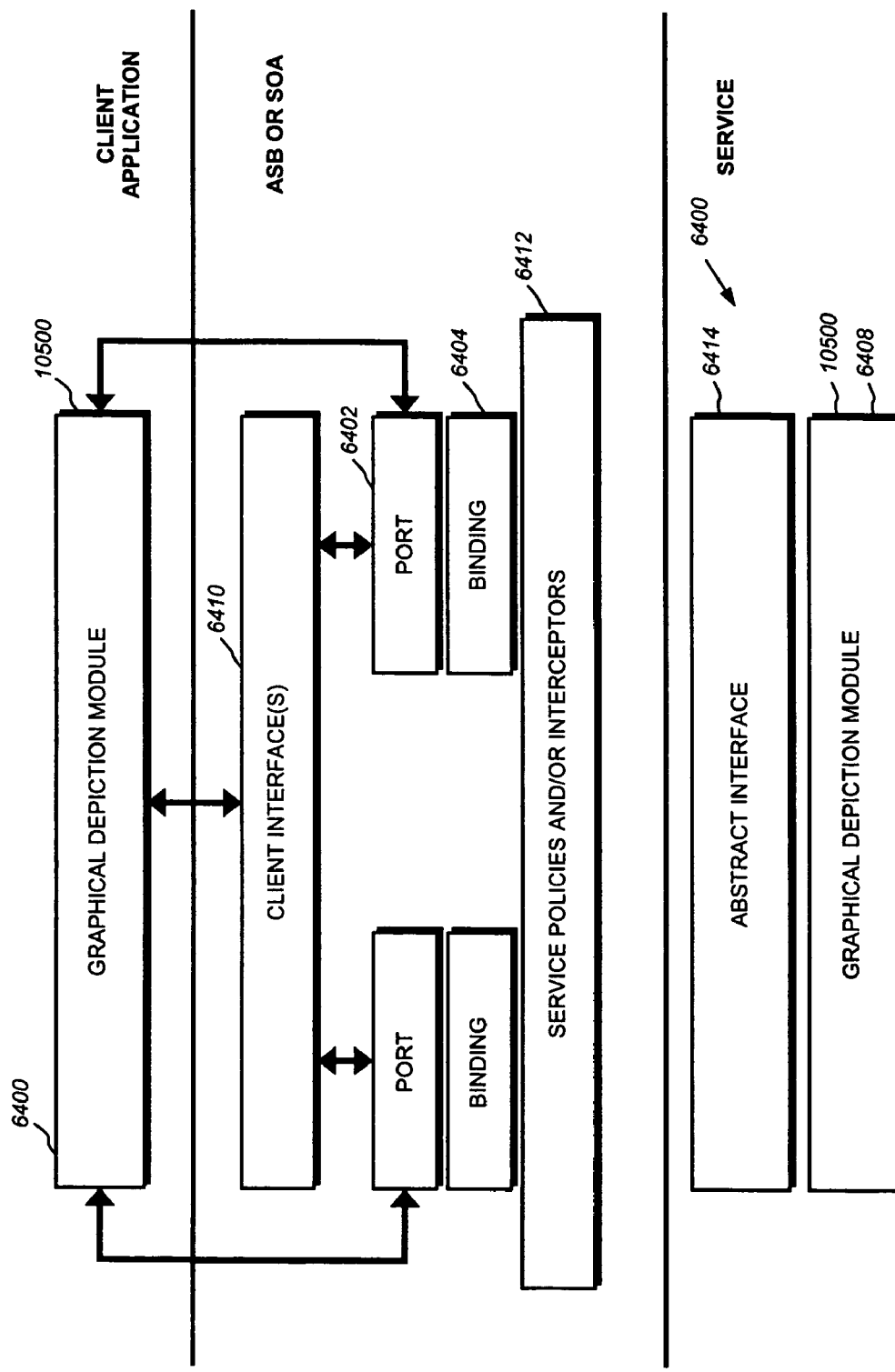
FIG. 105 shows the development and deployment of a graphical depiction module as a service in a services oriented architecture.

Referring to FIG. 105, the module 6400 can be a graphical depiction module 10500. A graphical depiction module 10500 may depict in graphical format the effects of a modification to a data integration job. For example, a graphical depiction module 10500 may show a user the larger table that may result if the data normalization step is skipped in a data integration process. The graphical depiction module 10500 may be particularly useful, for example, to support a strongly separated user interface for interacting with a data integration system. Thus, the methods and systems described herein also include providing a module for graphical depiction of the impact of a change to a data integration function, providing a registry of services, providing one or more client interfaces 6410, service policies and/or interceptors 6412, and identifying the module in the registry, wherein the module can be accessed as a service in a services oriented architecture.

Figure 106:
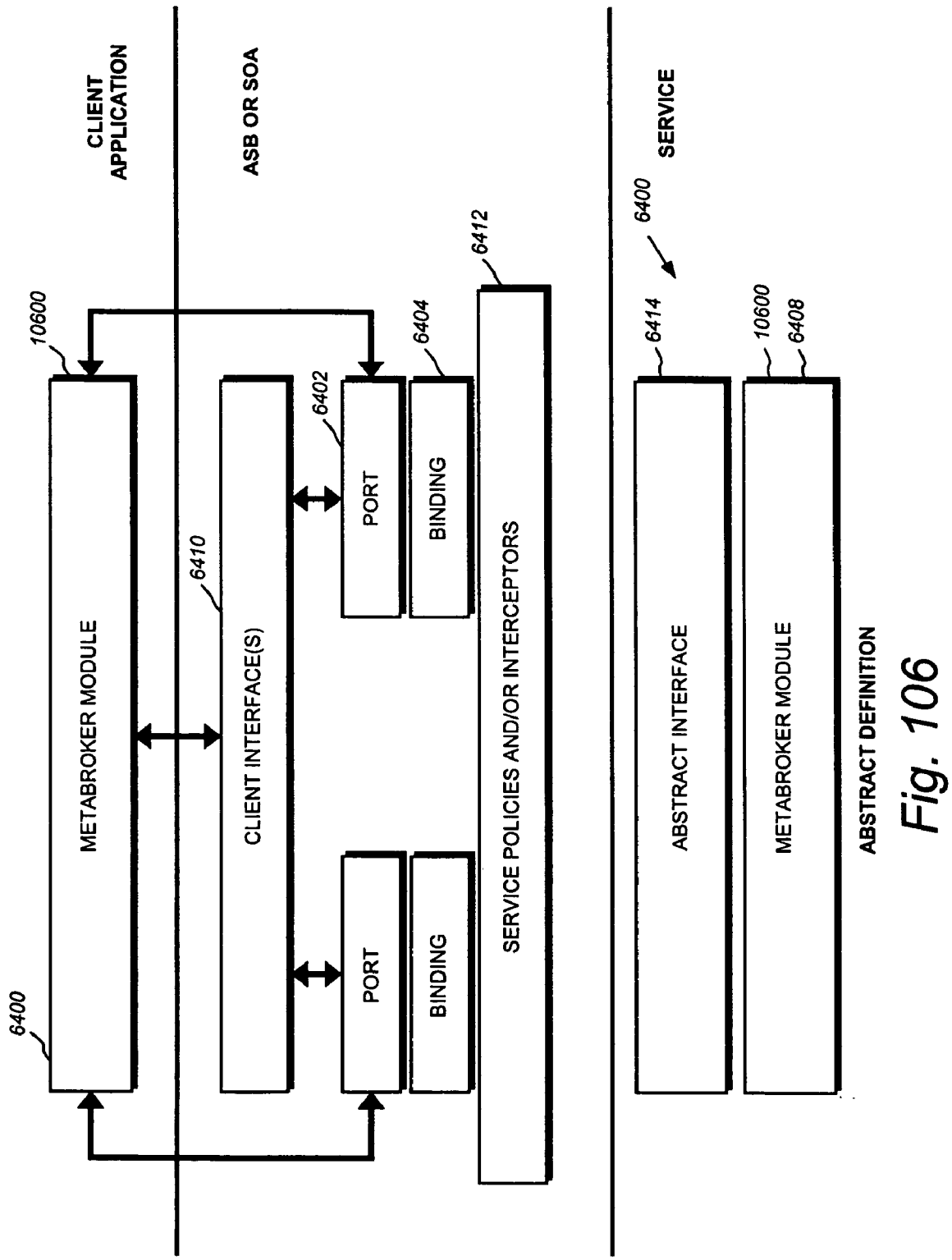
FIG. 106 shows the development and deployment of a metabroker module as a service in a services oriented architecture.

Referring to FIG. 106, the module 6400 can be a metabroker module 10600. A metabroker module 10600 may provide metadata concerning metabrokers registered in a system. For example, the metabroker module 10600 may permit queries over available metabrokers to assist in a manual or automated selection of metabrokers for design of a data integration process. Thus, the methods and systems described herein also include providing a module for creating a metabroker, providing a registry of services, providing one or more client interfaces 6410, service policies and/or interceptors 6412, and identifying the module in the registry, wherein the module can be accessed as a service in a services oriented architecture.

Figure 107:
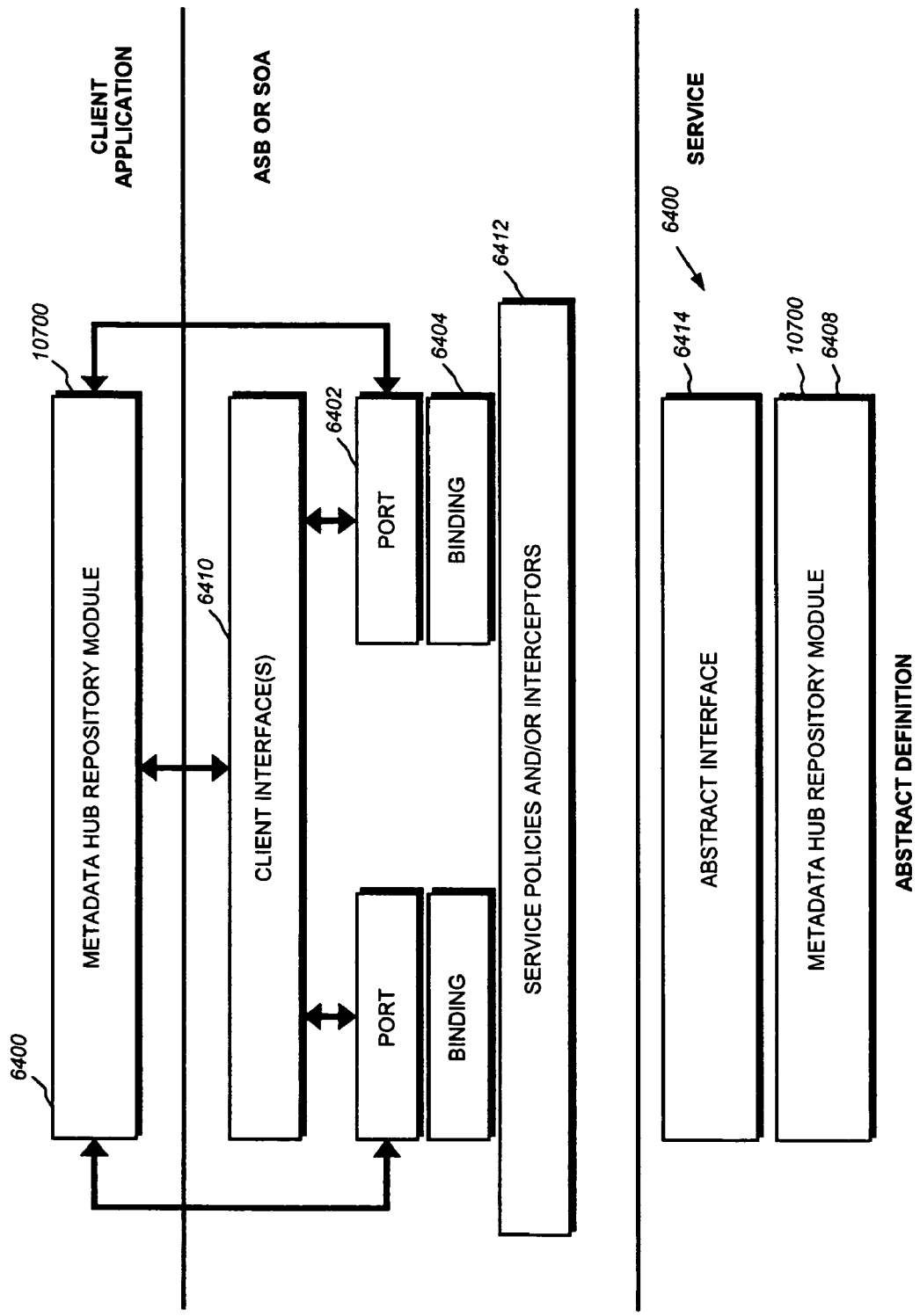
FIG. 107 shows the development and deployment of a metadata hub repository module as a service in a services oriented architecture.

Referring to FIG. 107, the module 6400 can be a metadata hub repository module 10700. A metadata hub repository module 10700 may allow for the transient storage of metadata so that operations may be performed on the metadata. For example, the metadata hub repository module 10700 may allow metadata to occupy a hub in such a way as to allow a metabroker to convert the metadata to an SAP compatible format. Thus, the methods and systems described herein also include providing a module for a hub repository of metadata, providing a registry of services, providing one or more client interfaces 6410, service policies and/or interceptors 6412, and identifying the module in the registry, wherein the module can be accessed as a service in a services oriented architecture. In embodiments the hub stores semantic models for a plurality of data integration platforms.

Figure 108:
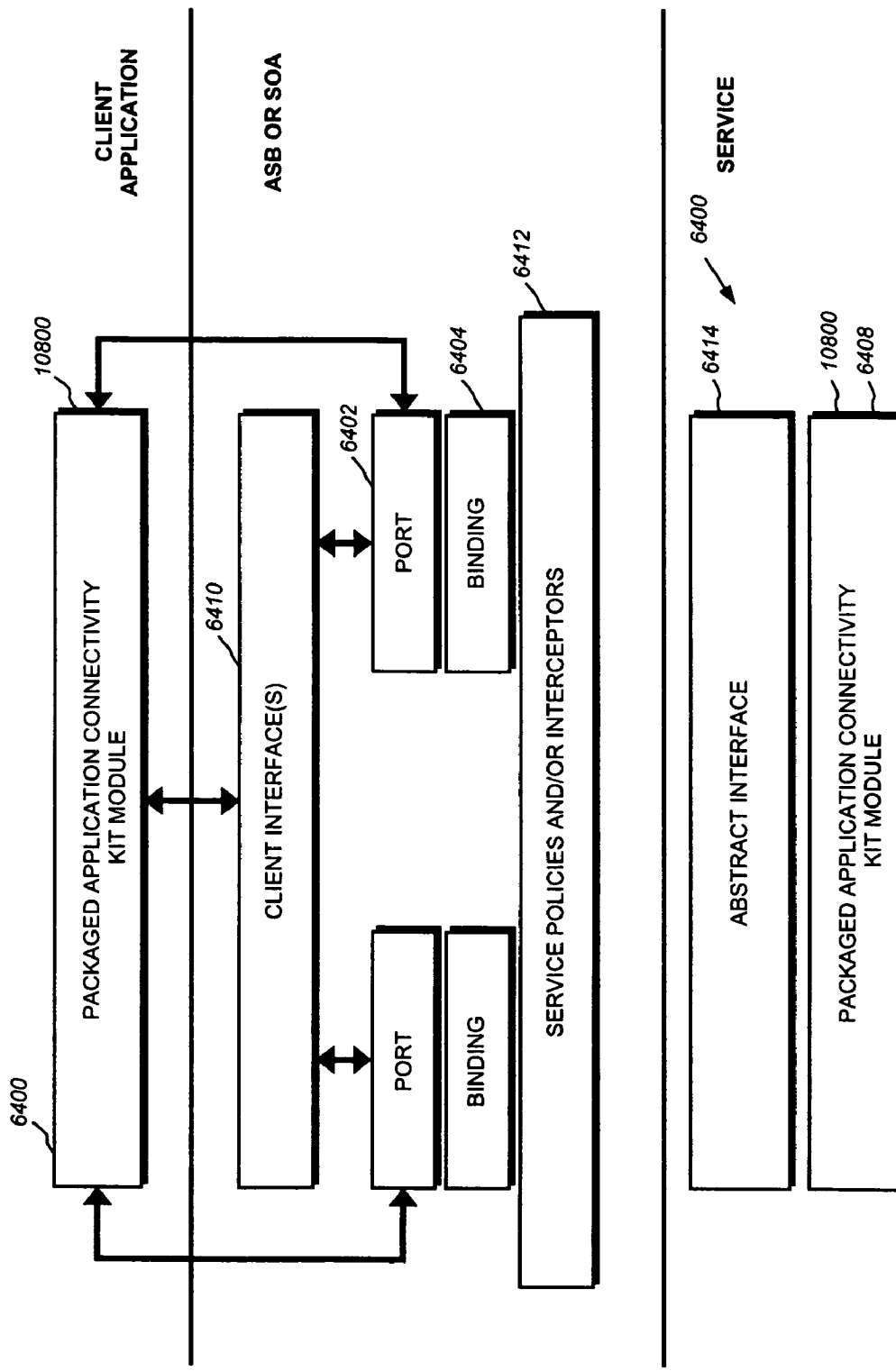
FIG. 108 shows the development and deployment of a packaged application connectivity kit module as a service in a services oriented architecture.

Referring to FIG. 108, the module 6400 can be a packaged application connectivity kit (PACK) module 10800. A PACK module 10800 may allow for the interchange of data and metadata between disparate applications. For example, a PACK module 10800 may allow data and metadata generated and/or stored using Informatica PowerCenter to be accessed and used by SAP BW. More generally, a PACK may enable connectivity to or between any database, application, or enterprise running on any operating system and/or hardware. The PACK module 10800 may be particularly useful, for example, when integrating legacy data systems into an enterprise, or when integrating data across previously separated divisions of a business that use different database management technologies. Thus, the methods and systems described herein also include providing a PACK, providing a registry of services, providing one or more client interfaces 6410, service policies and/or interceptors 6412 for the PACK, and identifying the PACK in the registry, wherein the PACK can be accessed as a service in a services oriented architecture.

Figure 109:
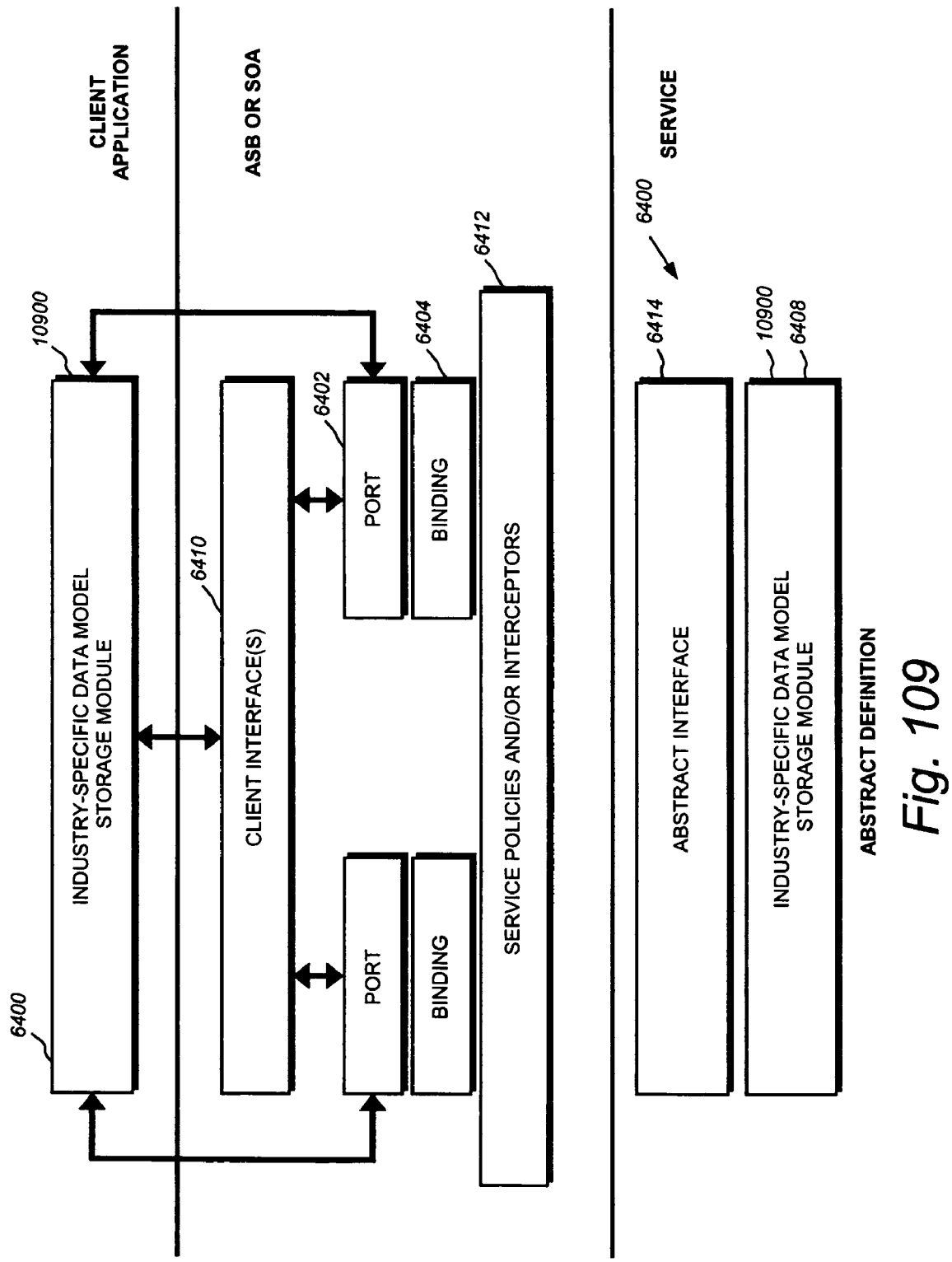
FIG. 109 shows the development and deployment of an industry-specific data model storage module as a service in a services oriented architecture.

Referring to FIG. 109, the module 6400 can be an industry-specific data model storage module 10900. An industry-specific data model storage module 10900 may allow for the storage of industry-specific data models. For example, companies in the trucking industry may record certain characteristics about shipments. An industry-specific data model storage module 10900 may allow for the storage of a template that can be used by trucking companies. Certain industries employ widely adopted or legally required standards for data storage and communication. For example, HIPAA mandates certain transaction types and privacy standards that must be used by health care providers. SWIFT is commonly used for transactions in financial industries. These and other similar standards may be managed and deployed within a data integration system using the industry-specific data model storage module 10900. Thus, the methods and systems described herein also include providing a module for storing an industry-specific data model, providing a registry of services, providing one or more client interfaces 6410, service policies and/or interceptors 6412, and identifying the module in the registry, wherein the module can be accessed as a service in a services oriented architecture. The model may be a manufacturing industry model, a retail industry model, a telecommunications industry model, a healthcare industry model, a financial services industry model or a model from any other industry.

Figure 110:
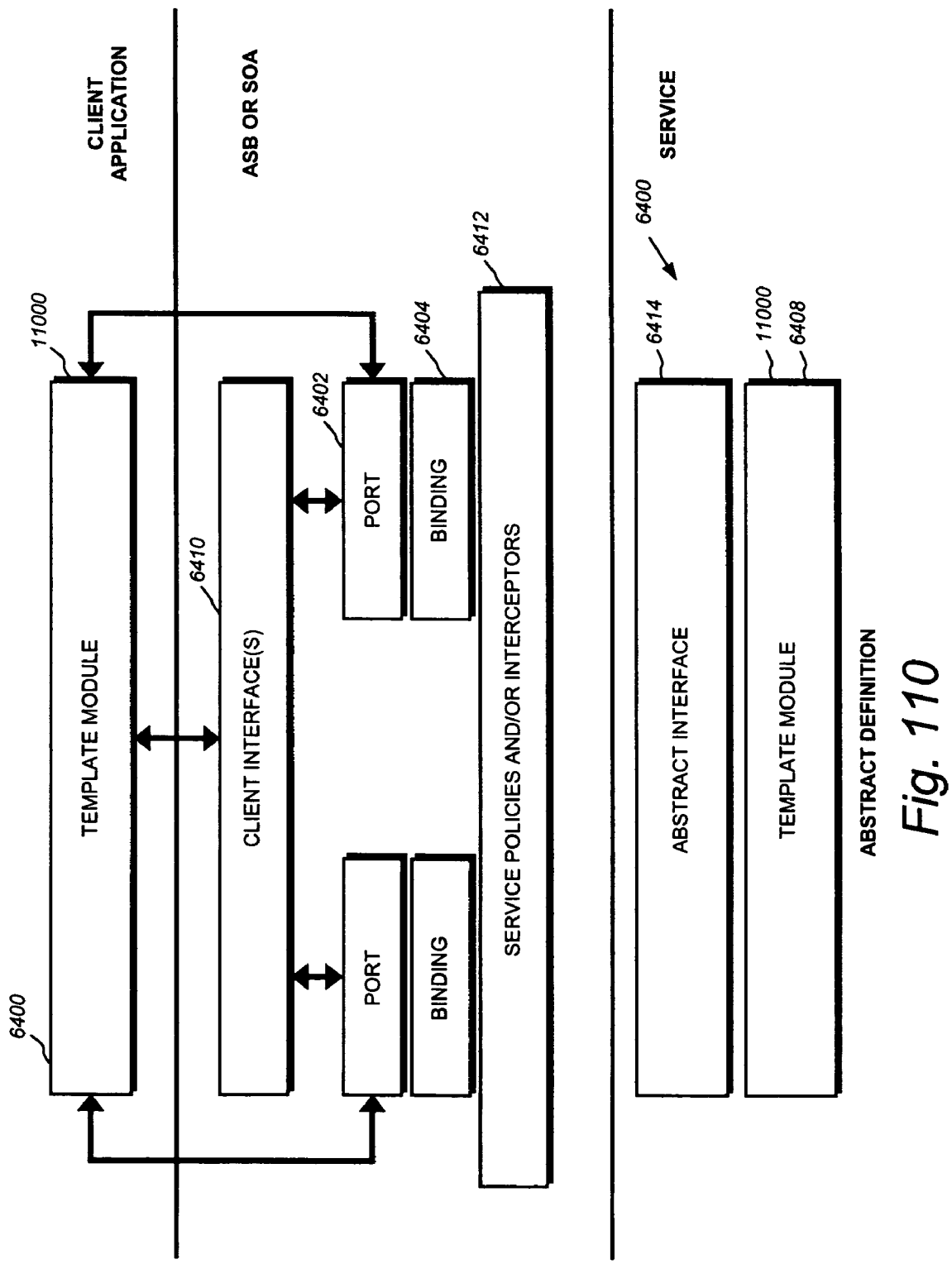
FIG. 110 shows the development and deployment of a template module as a service in a services oriented architecture.

Referring to FIG. 110, the module 6400 can be a template module 11000. A template module 11000 may allow a user to build and store templates for certain type of data integration jobs. A template may combine tasks and functions of other modules 6400 described herein, or any other tasks and functions suitable for a data integration system, to capture a particular design solution for use, reuse, and refinement. For example, a user may build and store a template that integrates customer credit and order information. The user may make this template available to other users through the transformation function library module 9500. Thus, the methods and systems described herein also include providing a template for building a data integration function, providing a registry of services, providing one or more client interfaces 6410, service policies and/or interceptors 6412 for the template, and identifying the template in the registry, wherein the template can be accessed as a service in a services oriented architecture.

Figure 111:
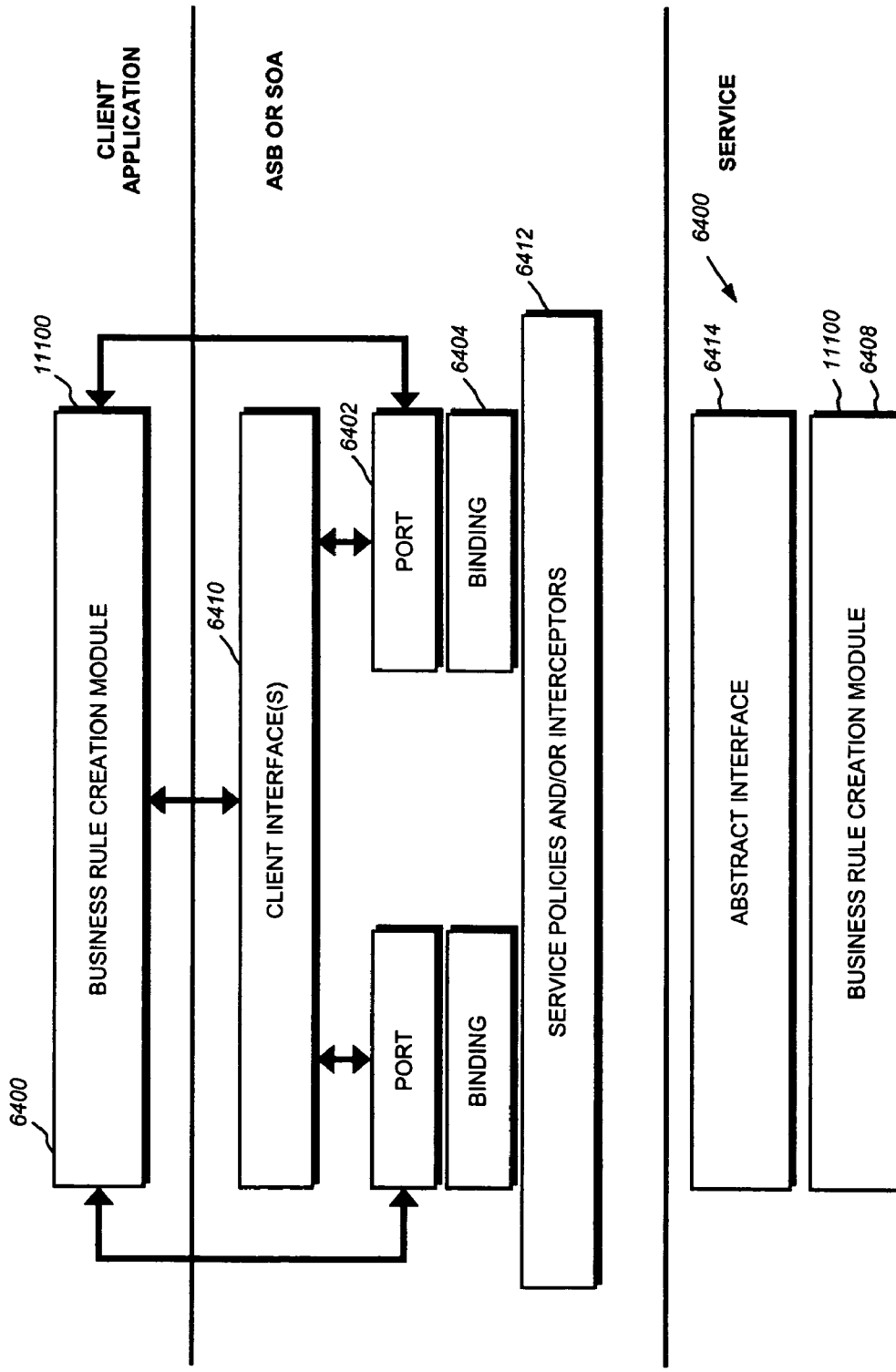
FIG. 111 shows the development and deployment of a business rule creation module as a service in a services oriented architecture.

Referring to FIG. 111, the module 6400 can be a business rule creation module 11100. A business rule creation module 11100 may provide any business rule or business logic capable of formal expression, and may include comparisons, conditional evaluations, mathematical evaluations, statistical analyses, Boolean operations, and any other operations that may be performed in the context of providing a business rule. For example, a company may require a minimum credit score before issuing credit to a customer, and this may be formalized as a business rule. A company may have predetermined programs for salaries and pensions that may be applied to payroll calculations in a human resources department, or a company may maintain different hiring criteria for different departments, or a company may be required to report sales to a local government agency. The scope and complexity of possible business rules is unlimited. Any such rule that can be programmatically expressed may be created using the business rule creation module 11100 and subsequently applied in data integration processes. Thus, the methods and systems described herein also include providing a module for creating a business rule, providing a registry of services, providing one or more client interfaces 6410, service policies and/or interceptors 6412, and identifying the module in the registry, wherein the module can be accessed as a service in a services oriented architecture.

Figure 112:
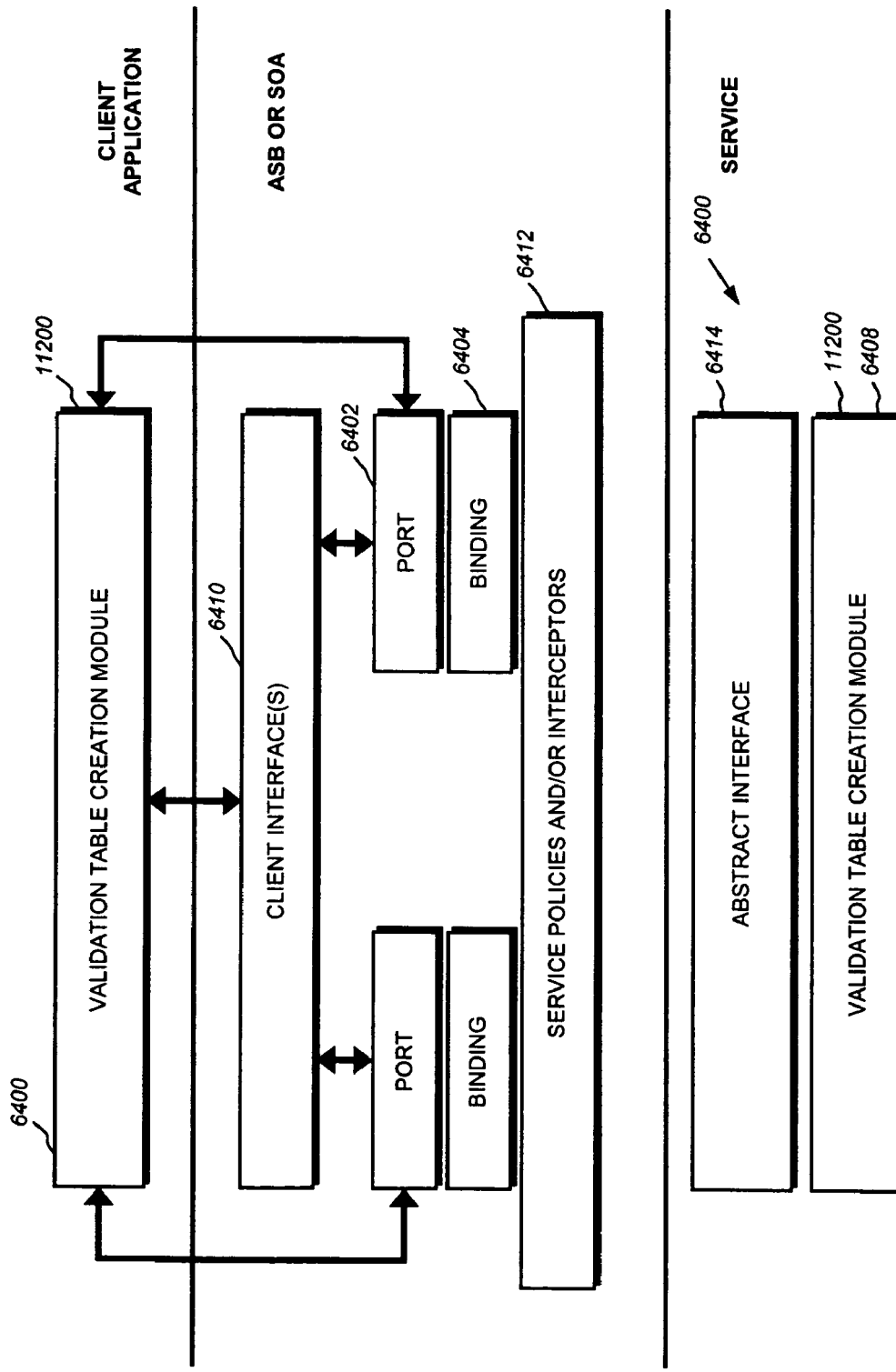
FIG. 112 shows the development and deployment of a validation table creation module as a service in a services oriented architecture.

Referring to FIG. 112, the module 6400 can be a validation table creation module 11200. A validation table creation module 11200 may allow for the creation of a validation table for other data integration functions. Thus, the methods and systems described herein also include providing a module for creating a validation table, providing a registry of services, providing one or more client interfaces 6410, service policies and/or interceptors 6412, and identifying the module in the registry, wherein the module can be accessed as a service in a services oriented architecture.

Figure 113:
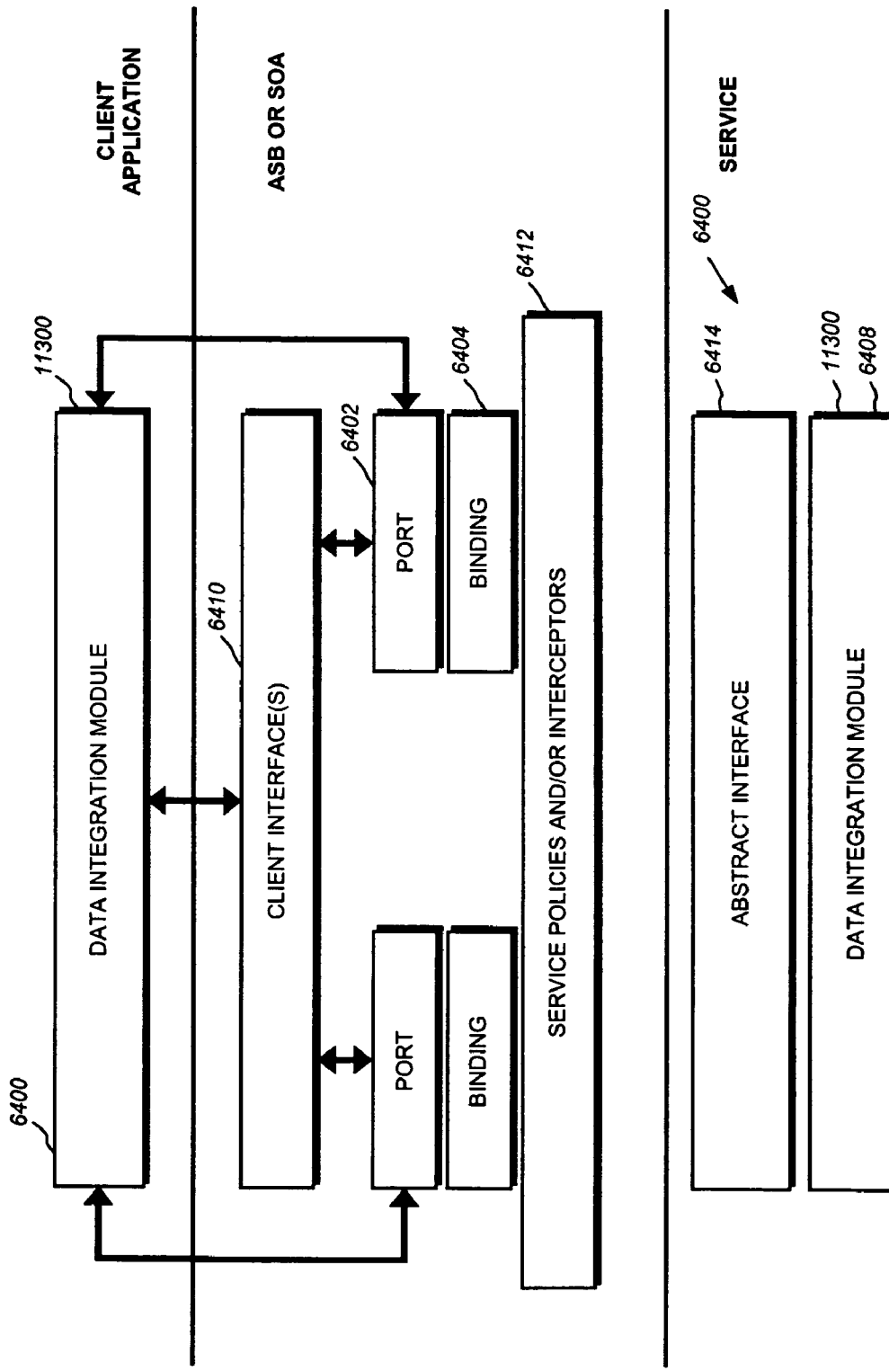
FIG. 113 shows the development and deployment of a data integration module as a service in a services oriented architecture.

Referring to FIG. 113, the module 6400 can be a data integration module 11300. It will be noted that a data integration module 10200 has been described in reference to FIG. 102. That data integration module 10200 related to the creation and/or execution of prepackaged data integration jobs. The module 11300 described here relates instead to a module that executes a specific data integration job, task, or function. Thus, a data integration job created with the data integration module 10200 may be executed as a prepackaged job in the data integration module 11300 described here. The data integration module 11300 may perform any data integration job, task, or process. The data integration module 10200 may also be associated with a control in a graphical user interface labeled to indicate the nature of the data integration function. In this manner, a strongly separated user interface may have access to any user-defined data integration function through a button, drop-down menu item, or other control, which may be conveniently labeled for user identification. Thus, the methods and systems described herein also include providing a module for a data integration function, providing a registry of services, providing one or more client interfaces 6410, service policies and/or interceptors 6412, and identifying the module in the registry, wherein the module can be accessed as a service in a services oriented architecture.

Figure 114:
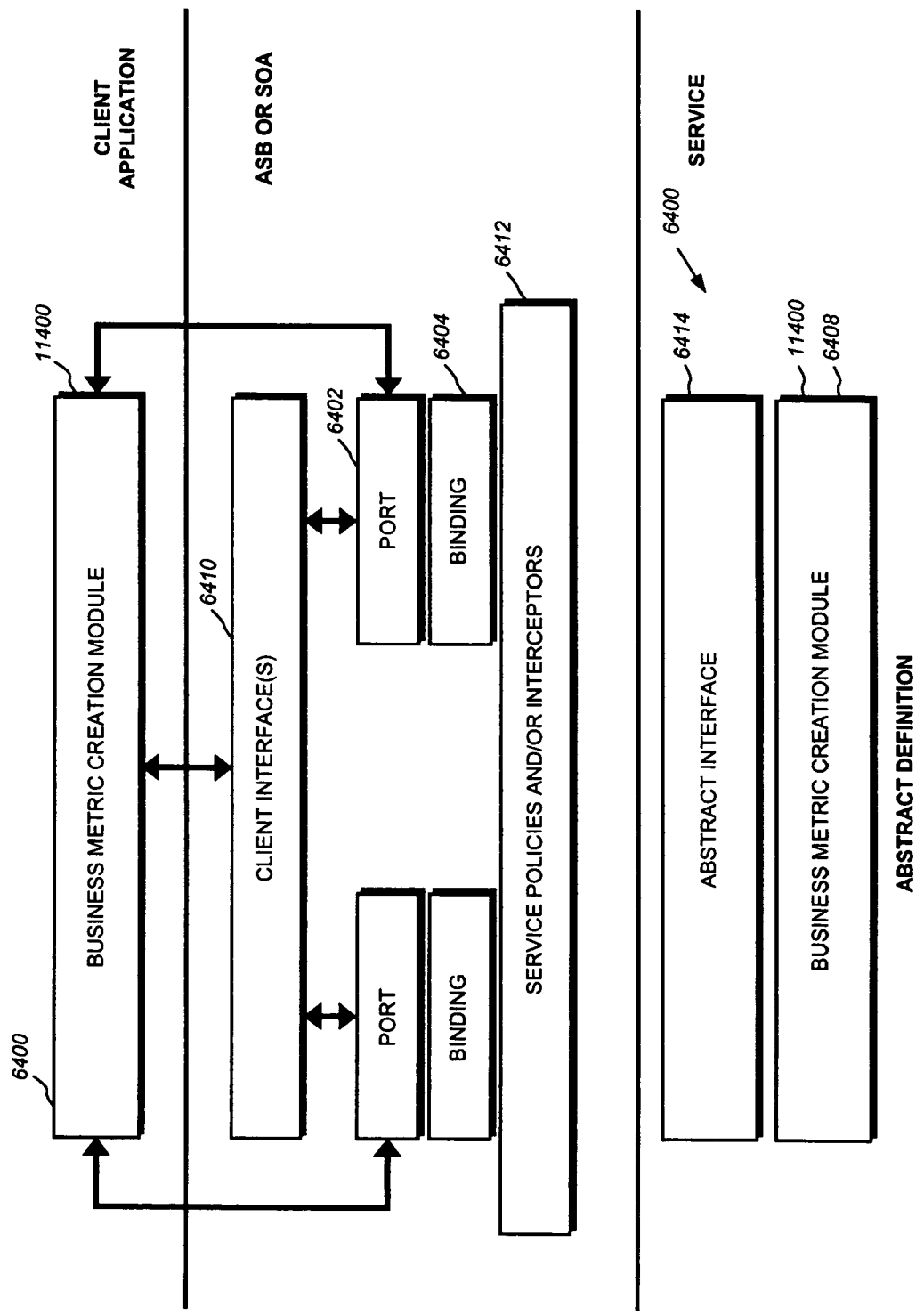
FIG. 114 shows the development and deployment of a business metric creation module as a service in a services oriented architecture.

Referring to FIG. 114, the module 6400 can be a business metric creation module 11400. A business metric creation module 11400 may allow for the creation of certain business metrics to be associated with a business or subset of a business. For example, the business may be a consumer products business and the business metric creation module 11400 may help to create a metric measuring increased sales per dollar of advertising. The business metric creation module 11400 may also collect the necessary data for computation of the metrics or work with other modules and systems to this end. The module 11400 may enable creation of a metric using any mathematical, logical, conditional, or other function, or combinations thereof. Thus, the methods and systems described herein also include providing a module for creating a business metric, providing a registry of services, providing one or more client interfaces 6410, service policies and/or interceptors 6412, and identifying the module in the registry, wherein the module can be accessed as a service in a services oriented architecture.

Figure 115:
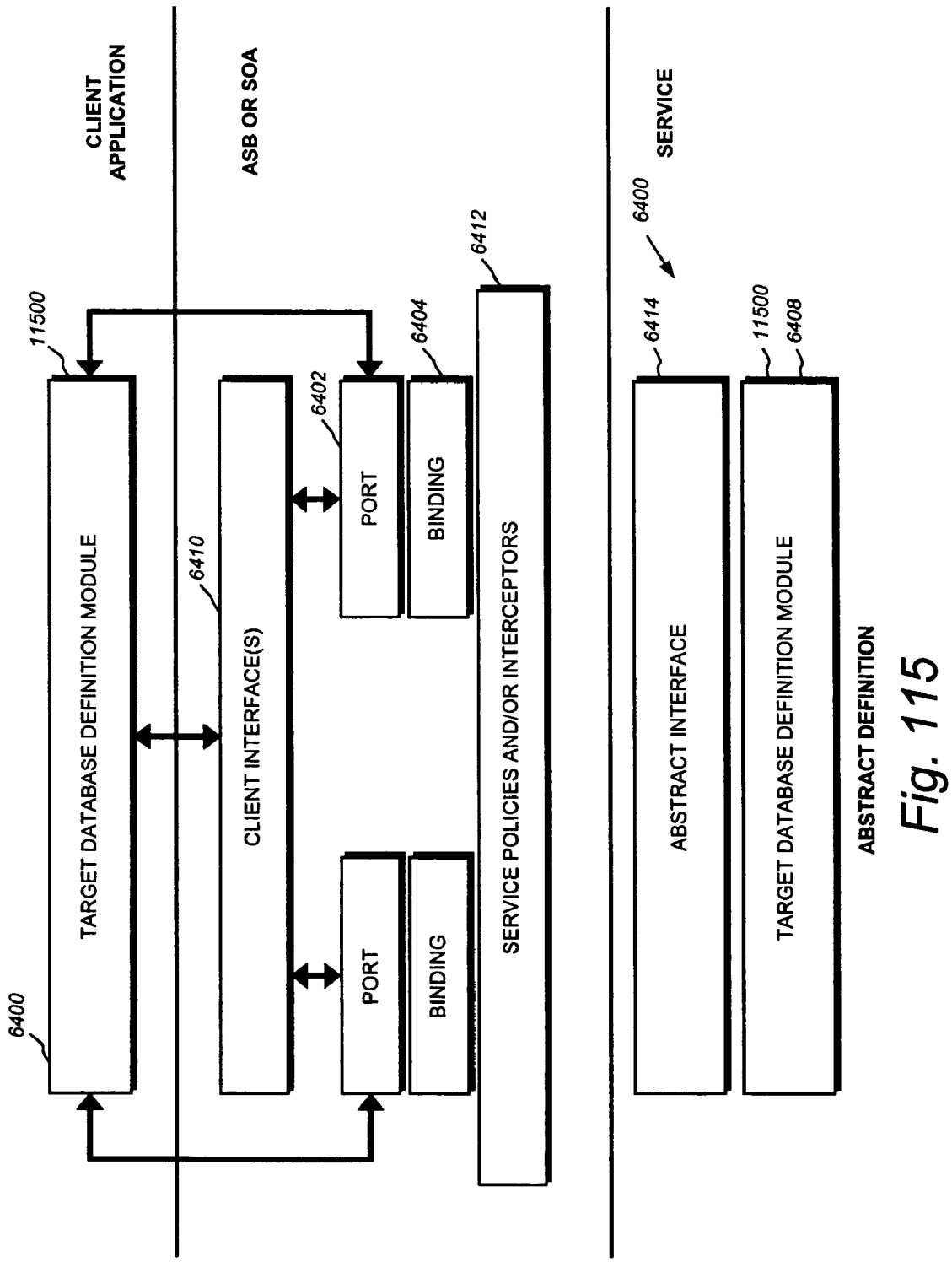

Referring to FIG. 115, the module 6400 can be a target database definition module 11500. A target database definition module 11500 may assist in the definition of a target database, including the type and structure of the database. For example, the target database definition module 11500 may receive recommendations from profiling and auditing modules, and prepare a database definition for a target database suitable for a particular data source and transformation. The module 11500 may allow for interactive control at various decision points, or may function deterministically without user intervention. Thus, the methods and systems described herein also include providing a module for defining a target database, providing a registry of services, providing one or more client interfaces 6410, service policies and/or interceptors 6412, and identifying the module in the registry, wherein the module can be accessed as a service in a services oriented architecture.

Figure 116:
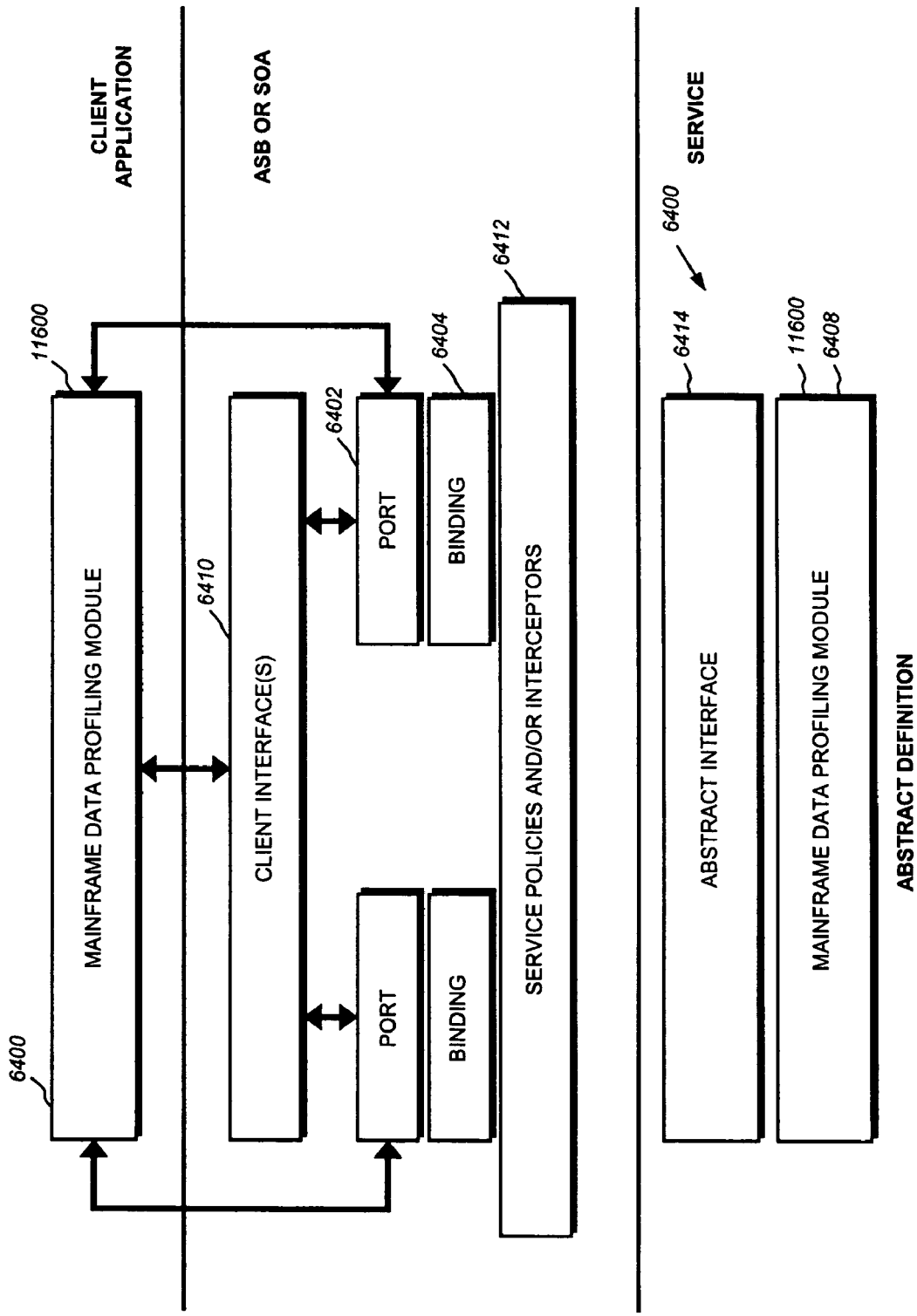

Referring to FIG. 116, the module 6400 can be a mainframe data profiling module 11600. A mainframe data profiling module 11600 may allow for the profiling of mainframe data. A computer mainframe may have particular data formats, connectivity requirements, security layers, and so on. The mainframe data profiling module 11600 may be designed to address all of these issues for a particular mainframe or type of mainframe to accelerate design of data integration systems using such a mainframe. Thus, the methods and systems described herein also include providing a module for profiling mainframe data, providing a registry of services, providing one or more client interfaces 6410, service policies and/or interceptors 6412, and identifying the module in the registry, wherein the module can be accessed as a service in a services oriented architecture.

Figure 117:
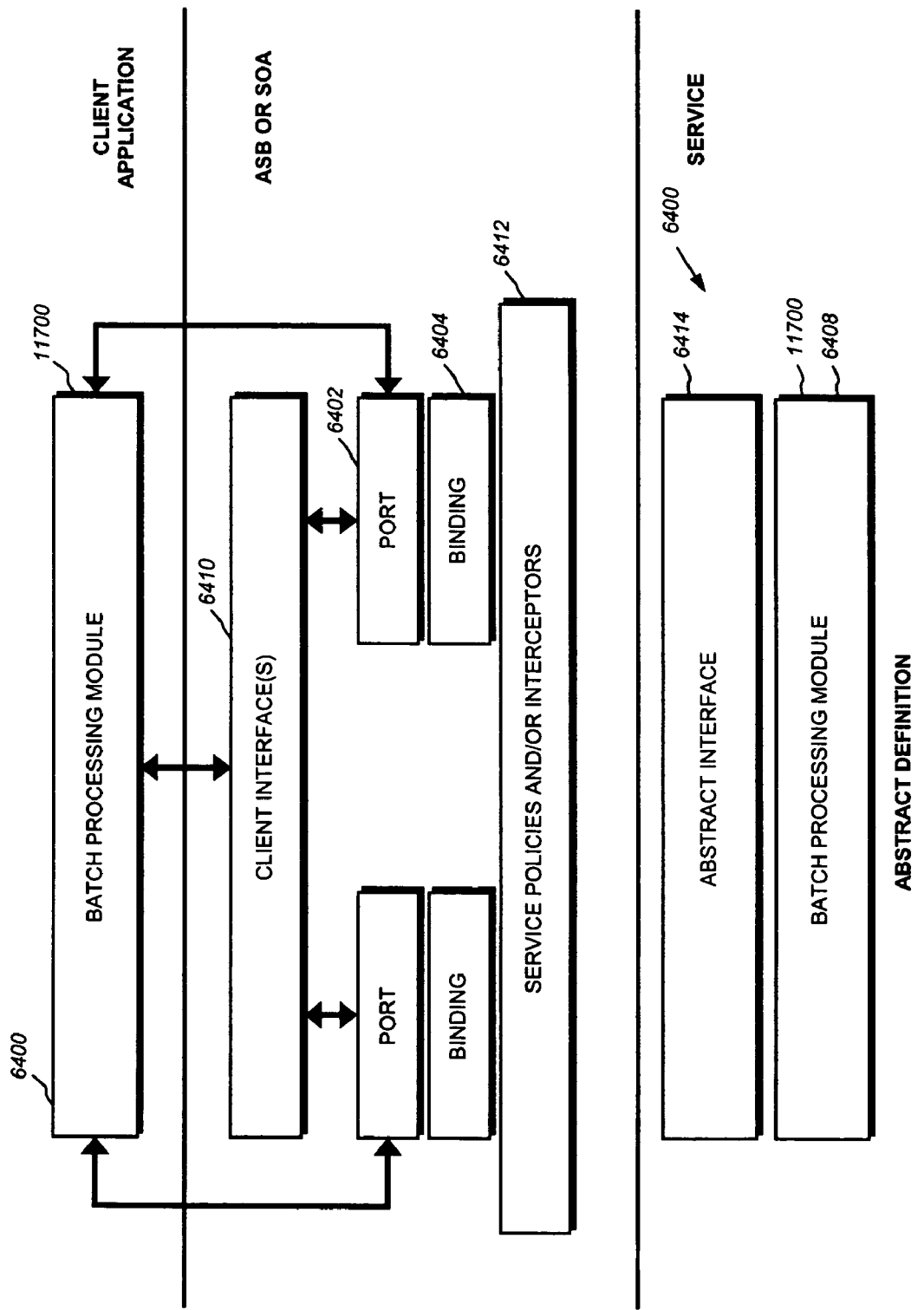

Referring to FIG. 117, the module 6400 can be a batch processing module 11700. A batch processing module 11700 may allow for the processing of data integration jobs in batch. For example, with certain processor configurations it may be desirable to process transactions in batch. As another example, it may be desirable to concentrate processing away from peak computer-use times, such as from 1:00 a.m. to 3:00 a.m. Batch processing may facilitate the execution of large data integration jobs and processes at user-programmable times, or on user-selectable machines. The batch processing module 11700 may aid facilitate processing in this manner, or any other controlled manner. Thus, the methods and systems described herein also include providing a module for batch processing a batch of data, providing a registry of services, providing one or more client interfaces 6410, service policies and/or interceptors 6412, and identifying the module in the registry, wherein the module can be accessed as a service in a services oriented architecture.

Figure 118:
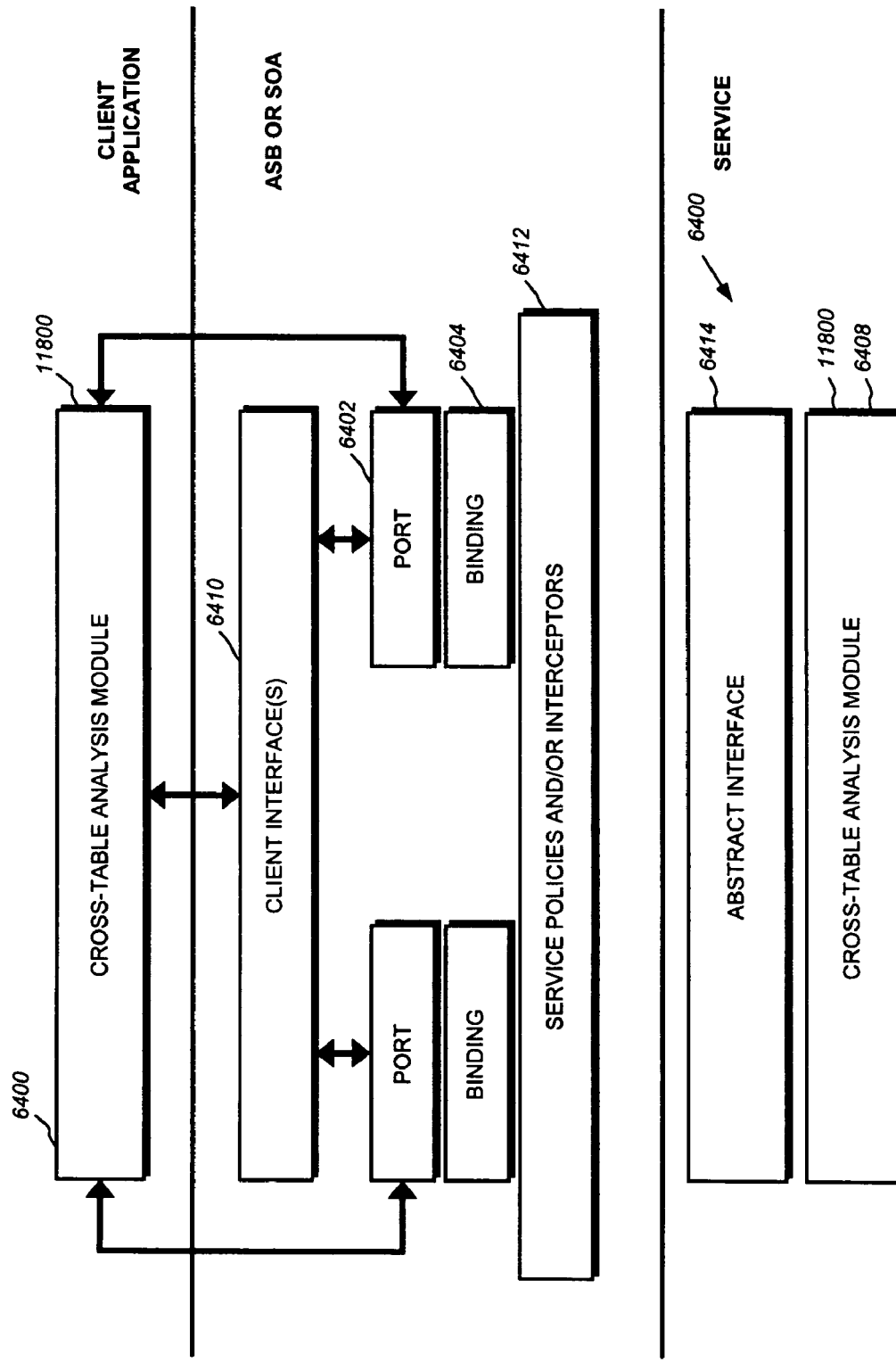

Referring to FIG. 118, the module 6400 can be a cross-table analysis module 11800. A cross-table analysis module 11800 may allow for the analysis of relationships and linkage between tables, which may yield significant benefits in the construction of target databases. For example, a cross-table analysis module 11800 may allow a user to determine the degree of relatedness between two customer data tables. Based on this information a user may decide to integrate the information in the tables. Thus, the methods and systems described herein also include providing a module for cross-table analysis, providing a registry of services, providing one or more client interfaces 6410, service policies and/or interceptors 6412, and identifying the module in the registry, wherein the module can be accessed as a service in a services oriented architecture.

Figure 119:
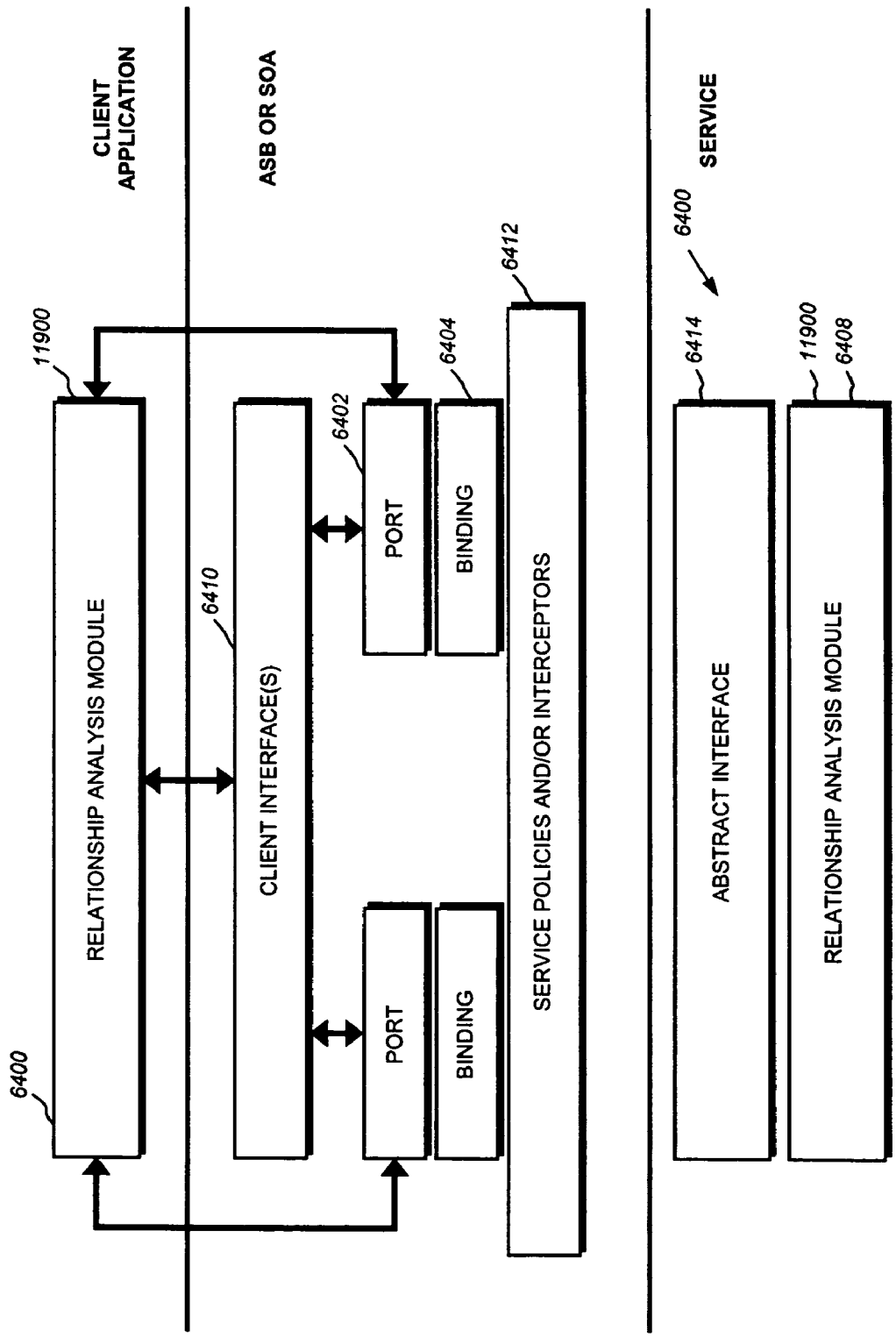

Referring to FIG. 119, the module 6400 can be a relationship analysis module 11900. A relationship analysis module 11900 may analyze the relationship between any two or more rows, columns, tables, databases, or combinations of these and other data source items. For example, a relationship analysis module 11900 may determine the relationship between a column and a table. This information may be used to validate other data in the database, or identify keys or other structural information for a database that has not yet been fully characterized. Based on the relationship analysis a user may decide to take responsive steps in designing a data integration process or a target database, such as joining tables, partitioning tables, eliminating columns, and so on. Thus, the methods and systems described herein also include providing a module for relationship analysis, providing a registry of services, providing one or more client interfaces 6410, service policies and/or interceptors 6412, and identifying the module in the registry, wherein the module can be accessed as a service in a services oriented architecture.

Figure 120:
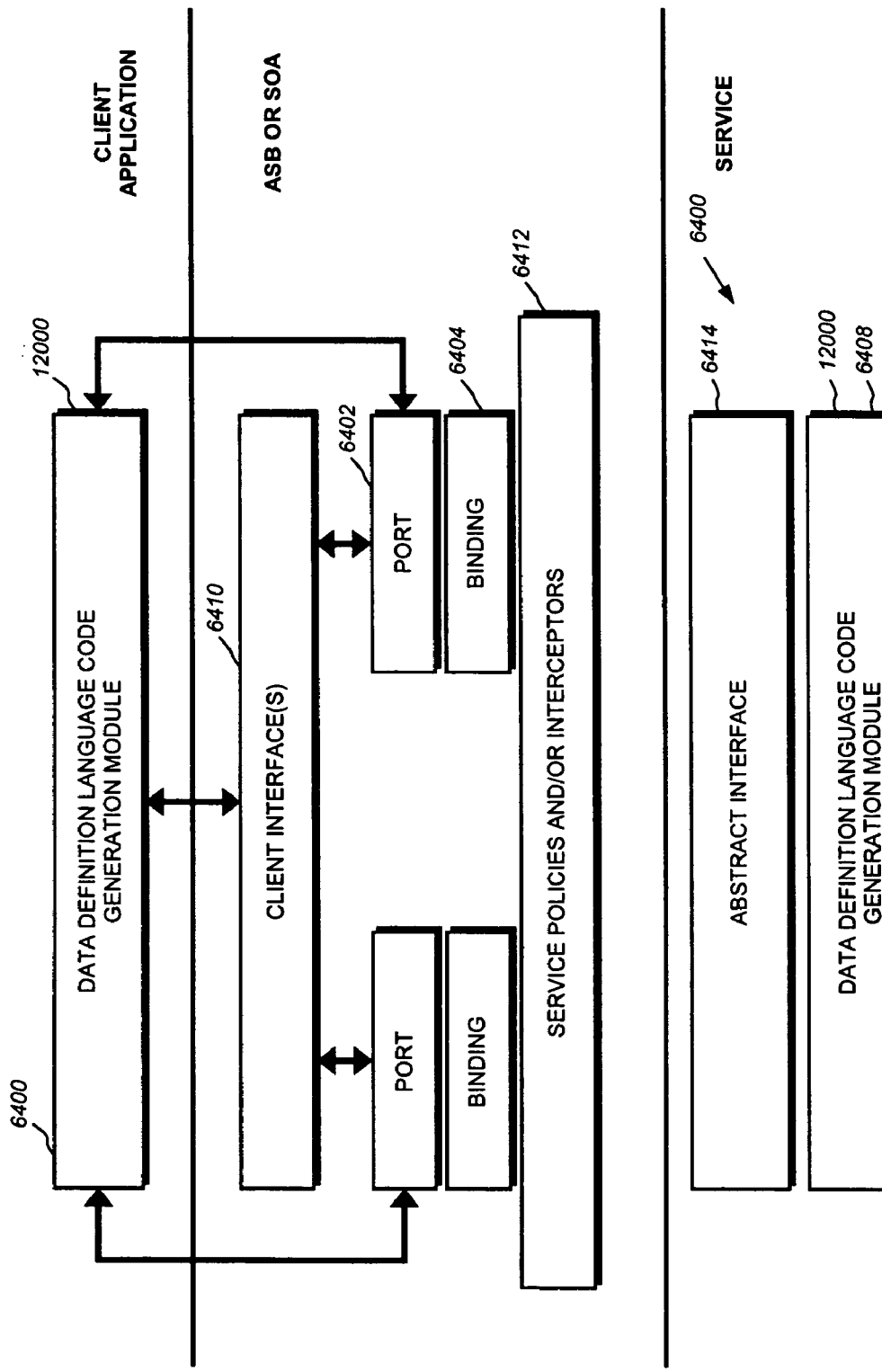

Referring to FIG. 120, the module 6400 can be a data definition language code generation module 12000. A data definition language (DDL) code generation module 12000 may generate DDL code for a database, either to create a new target database, or modify a source or target database. The data definition language code generation module 12000 may generate DDL code in response to other structural database descriptions provided to the module, or as a parameter accompanying some other data integration process. DDL code may be applied directly to a database, such as an SQL database, to affect structural changes therein. Thus, the methods and systems described herein also include providing a module for DDL code, providing a registry of services, providing one or more client interfaces 6410, service policies and/or interceptors 6412, and identifying the module in the registry, wherein the module can be accessed as a service in a services oriented architecture. In embodiments the methods and systems may further include using the module to create a mapping between source and target data facilities.

Figure 121:
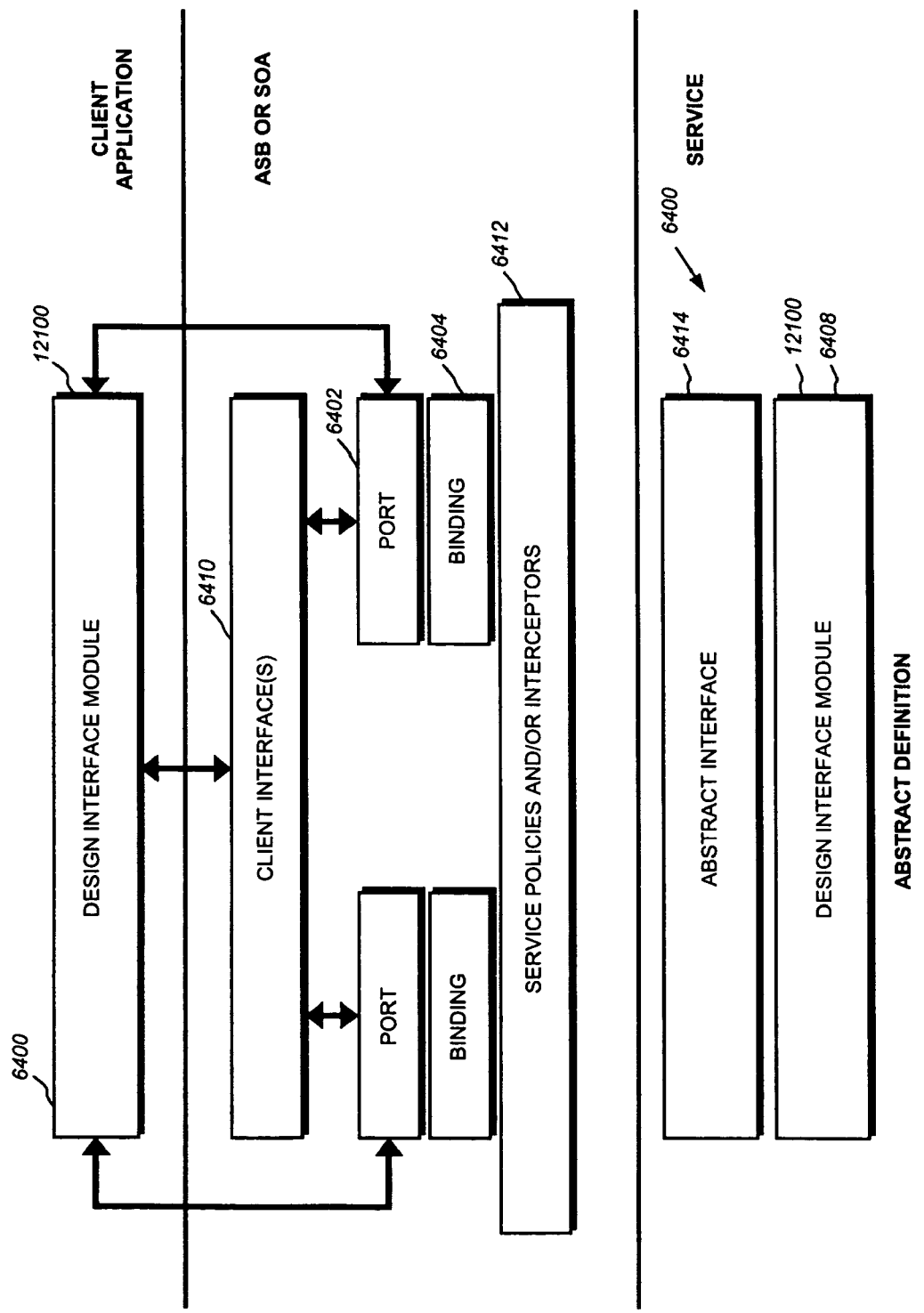

Referring to FIG. 121, the module 6400 can be a design interface module 12100. A design interface module 12100 may provide a user interface for the creation and design of data integration jobs. A design interface module 12100 may include a graphical user interface. The design interface module 12100 may be strongly separated, providing only the low-level controls and layout for an interface, while being associated with other modules 6400 or code that performs functions within a data integration system. As an example of operations that can be performed through the design interface module 12100, a design interface module 12100 may allow a user to link various operations on a screen to create a data integration job. In another embodiment, the design interface module 12100 may provide only functional access to a design, such as a metadata model or data integration job, by providing suitable programmatic control over storage, retrieval, and modification of the design. The design interface module 12100 may in turn connect the programmatic control to a client such as a program or a graphical user interface. Thus, the methods and systems described herein also include providing a design interface module for designing a data integration job, providing a registry of services, providing one or more client interfaces 6410, service policies and/or interceptors 6412, and identifying the module in the registry, wherein the module can be accessed as a service in a services oriented architecture.

Figure 122:
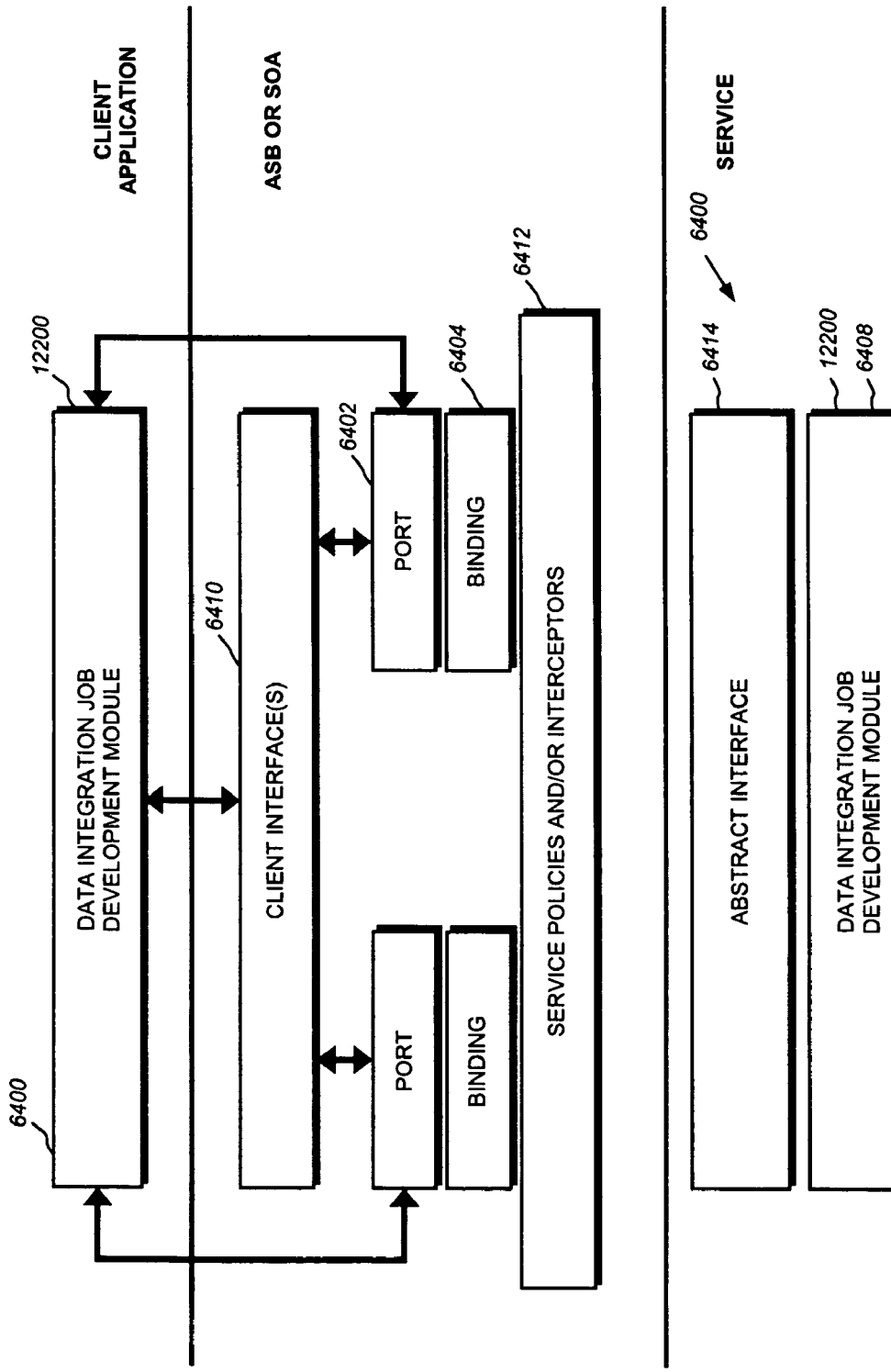

Referring to FIG. 122, the module 6400 can be a data integration job development module 12200. A data integration job development module 12200 may allow for the development of a data integration job. For example, a user may use the data integration job development module 12200 to build upon pre-existing data integration jobs. The data integration job development module 12200 may provide functional support for development features of a strongly separated graphical user interface. Thus, the methods and systems described herein also include providing a module for developing a data integration job, providing a registry of services, providing one or more client interfaces 6410, service policies and/or interceptors 6412, and identifying the module in the registry, wherein the module can be accessed as a service in a services oriented architecture.

Figure 123:
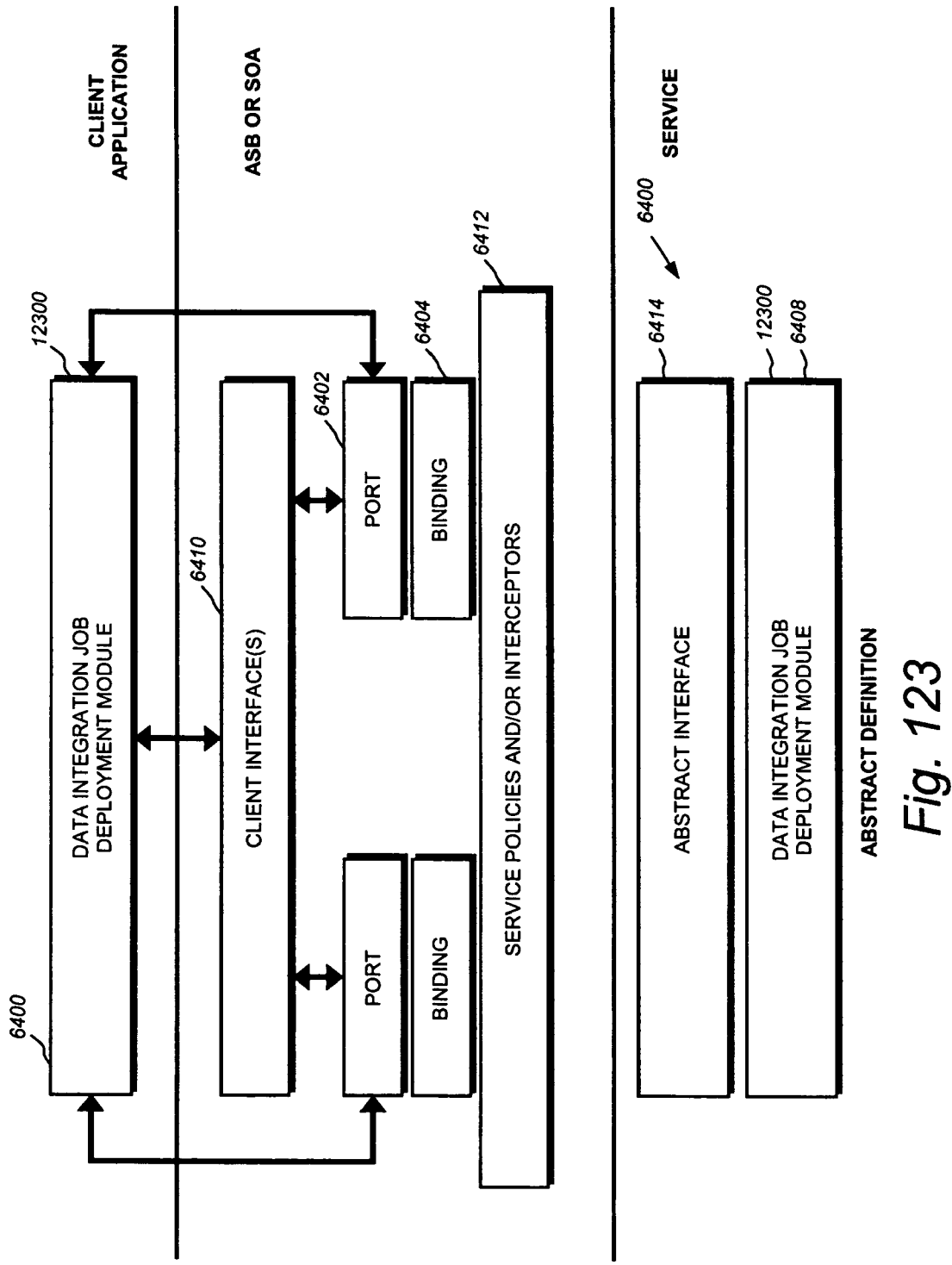

Referring to FIG. 123, the module 6400 can be a data integration job deployment module 12300. A data integration job deployment module 12300 may facilitate the deployment of data integration jobs, and address any implementation issues arising at run time. The data integration job deployment module 12300 may deploy data integration jobs on a scheduled basis, or under control of a client of the module 12300. The module 12300 may also suggest the scheduling of additional data integration jobs. The data integration job deployment module 12300 may deploy multiple data integration jobs simultaneously across disparate data facilities 112. Thus, the methods and systems described herein also include providing a module for deploying a data integration job, providing a registry of services, providing one or more client interfaces 6410, service policies and/or interceptors 6412, and identifying the module in the registry, wherein the module can be accessed as a service in a services oriented architecture.

In various embodiments the modules, facilities, tools, jobs, services, processes and functions described herein may be accessed through various input and output facilities, including bindings and similar facilities, such as EJBs, JMS, web services, SOAP and other bindings. In embodiments the methods and systems described herein may include a client-side facility for optimizing access of a module, facility, job, service, process, function or the like by a client device. In embodiments the methods and systems described herein may include a server-side facility for optimizing access of a module, facility, job, service, process, function or the like by a client device.

Figure 124:
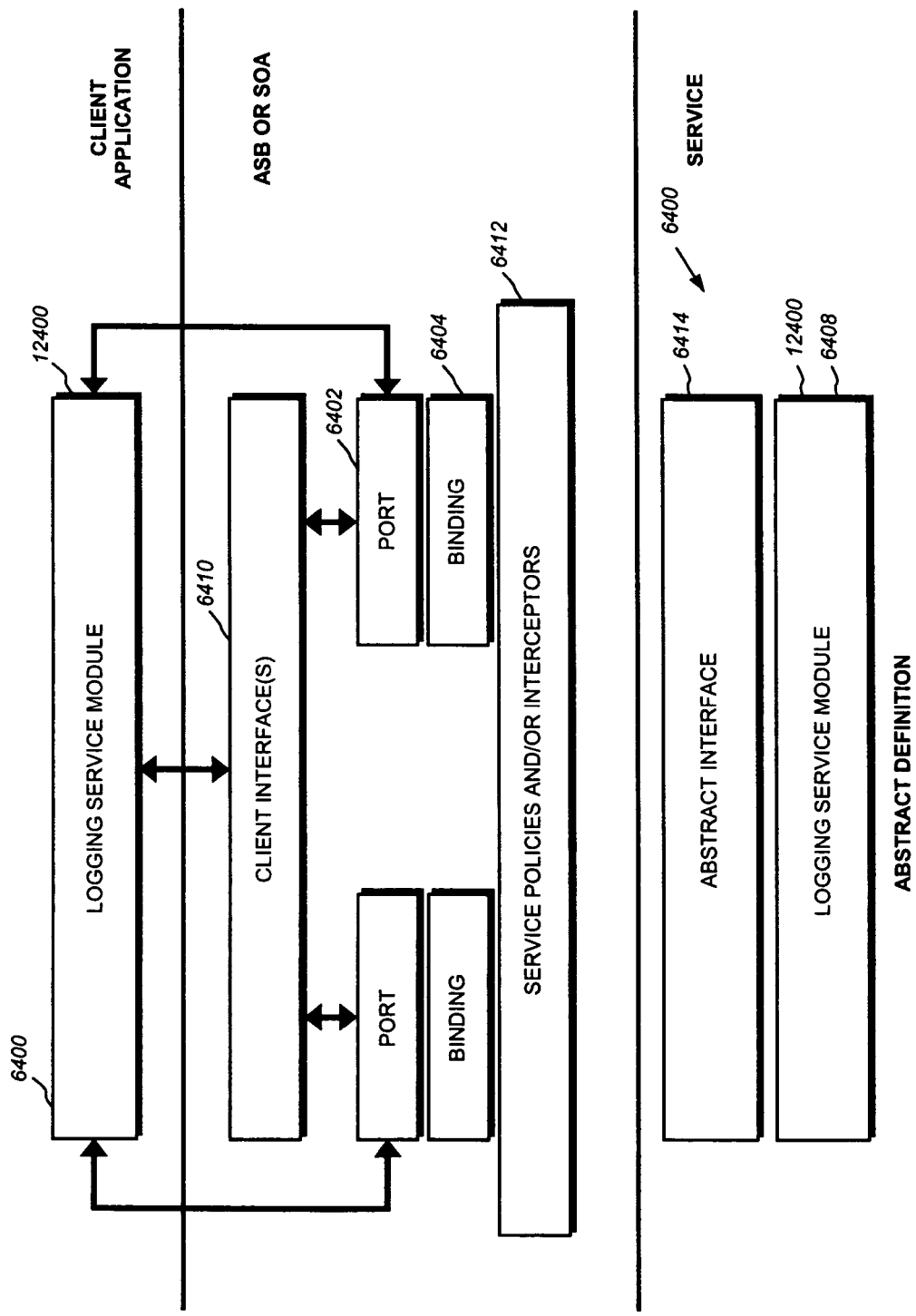

Referring to FIG. 124, in embodiments the services in a services oriented architecture for a data integration platform or process may be services that are useful for a wide range of integration and computing tasks, including modules that perform functions that are required or beneficial for many common tasks. Thus, for example, a logging service 12400 may be deployed, such as for logging events. A user who wishes to log events (for any reason related to any task, such as in connection with data integration job or task) may invoke the logging service by accessing it through a services registry in a services oriented architecture. Thus, a programmer need not create a new logging service for logging events, but instead may invoke a pre-coded logging service through the services registry.

Figure 125:
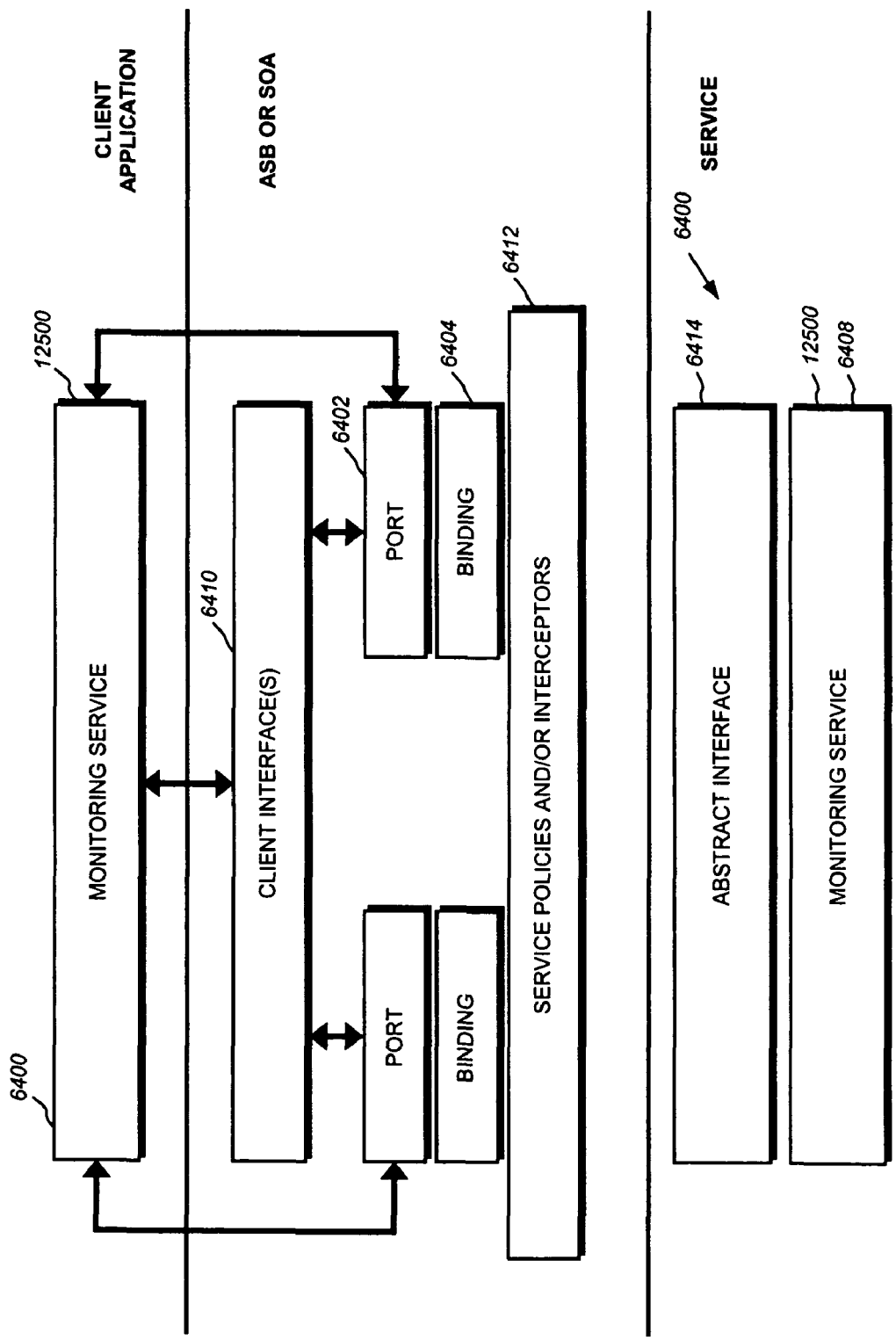

Referring to FIG. 125, a monitoring service 12500 may be deployed as a service in a services oriented architecture. For example, the monitoring service 12500 may be invoked by a user to monitor some aspect of the performance of a data integration job or task, or to monitor an event or process. A monitoring service 12500 may allow for the generation of specific events and metrics, such as counters, averages and sums, for monitoring purposes. For example, a data integration system may have a service called a job execution service, the purpose of which is to run a job, such as a batch job. Using a monitoring service 12500, a user can monitor how many times the job execution service has been run, how long it took to run, the minimum execution time, maximum execution time, average execution time and other statistics. The user can accomplish all of those functions without seeing the code of the underlying job execution service. The fact that all monitoring services are deployed as services means that inside the execution of the job a user can ask, for example, how many databases have been touched or other monitoring items that are specific to the semantics of the job execution service. Thus, the job execution service can itself be a client of the monitoring service. Thus, through a monitoring service 12500, the system can tell what is happening inside the implementation of another service. In embodiments, each common service, such as the monitoring service 12500 and the other services described in connection with FIGS. 124 through 131, various areas can be established for each service, such as what to monitor, the runtime of the service, and an administration part. To invoke the monitoring service 12500, the user may be queried as to what to monitor. Thus, the monitoring service 12500 can be used by services in a services oriented architecture to monitor what the services do or may be used to conduct domain-specific monitoring for other events and conditions.

Figure 126:
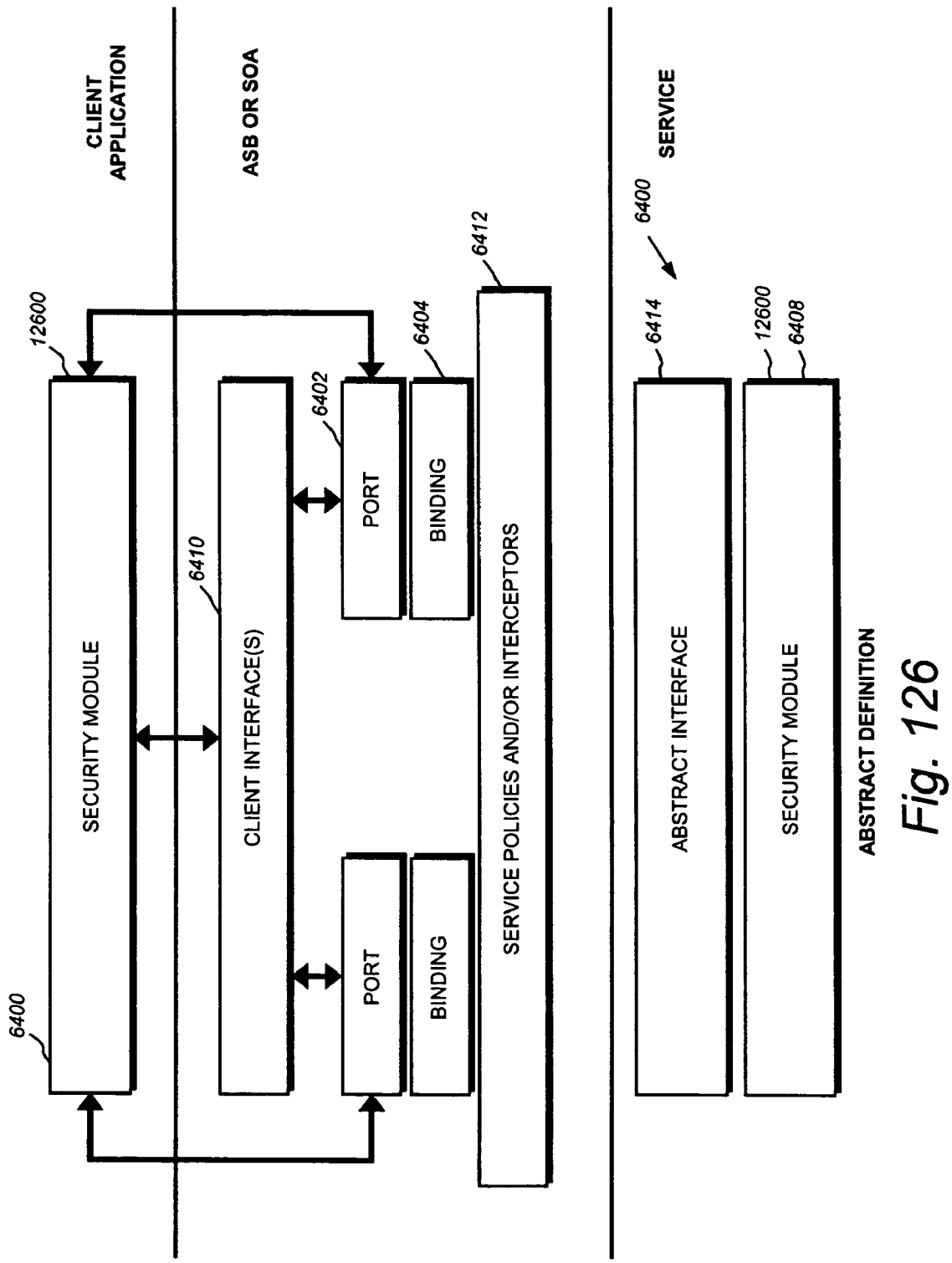

Referring to FIG. 126, a security module 12600 or service may be deployed as a service in a services oriented architecture for providing a security capability, such as in connection with a data integration job or task. When a user requires a security facility, such as password protection, encryption, tracking access, restricting access, or the like, the user can invoke a security module 12600 as a service in a services oriented architecture, so that the user does not have to create a separate security facility for each data integration job or task.

Referring to FIG. 127, a licensing module 12700 may be deployed in a services oriented architecture, for enabling licensing functions when invoked by a user. For example, a job designer may cause a data integration job to invoke the licensing service to determine whether a particular task to be executed at runtime does or does not comply with license restrictions, such as license restrictions related to the number of machines, number of users, or the like. The user avoids the need to prepare separate licensing code for each data integration job or task the user creates. A licensing module may be used in connection with an installation and/or provisioning service.

Referring to FIG. 128, an event management module 12800 may be deployed in a services oriented architecture for tracking and managing events when invoked by a user through a services registry. The user may access the event management module 12800 for any event management required for a data integration job or task, such as tracking events in order to determine when to execute a process or function. The user avoids the need to create separate event management code for each different data integration task or job. An event management module 12800 may allow for event subscription by application and may incorporate a callback mechanism.

Referring to FIG. 129, a provisioning module 12900 may be deployed in a services oriented architecture, allowing a user to enable provisioning functions by accessing the provisioning module 12900 through a services registry. A provisioning module 12900 may allow for the provision of components to multiple machines, may maintain a history of the components and version installed on different machines, push or distribute software or patches, may trigger the installation of a security service, may assist with or allow for authorization and/or authentication, may maintain internal and external user directories and may assist with or allow for single sign-on functionality.

Referring to FIG. 130, a transaction module 13000 may be deployed in a services oriented architecture that allows a user to access the transaction module 13000 through a services registry, avoiding the need to create separate transaction management code for each application created by the user, such as for a data integration job or task. Referring to FIG. 131, an auditing module 13100 can be deployed in a services oriented architecture that allows a user to access the auditing module 13100 through a services registry, avoiding the need to create separate auditing code for each application created by the user, such as for a data integration job or task. Thus, by accessing the auditing module 13100 by invoking the service, the user can audit events, such as auditing what users have accessed a particular database or process, what events have taken place, and the like. An auditing module 13100 can allow a user to conveniently audit past events without having to generate separate code.

Thus, a wide variety of common tasks that are necessary or beneficial for data integration jobs or platforms can be created as modules and deployed as services in a services oriented architecture. In the various embodiments of modules and services that are described herein, techniques of AOP can be used to implement services in a services oriented architecture. For example, various metadata functions and modules can be implemented as services with AOP. In embodiments, bindings for services, such as EJBs (such as EJB 3.0) may use AOP.

While the invention has been described in connection with certain preferred embodiments, it should be understood that other embodiments would be recognized by one of ordinary skill in the art, and are incorporated by reference herein.

What is claimed is:

1. A computer-implemented method executed in a facility, the method comprising:
   providing a module, the module being a data loading module containing a plurality of instructions to cause a processor of a computer to load a plurality of data from an application into a target database that is associated with a data integration platform;
   providing a registry of services in the data integration platform;
   providing an interface for the data loading module; and
   identifying the data loading module for the target database in the registry;
   loading the plurality of data from the application into the target data base using the data loading module;
   wherein the data loading module is accessed by the interface as a service in a services oriented architecture, the service forming part of an infrastructure of a business enterprise and configured to be a building block for development of a plurality of applications and deployment of the plurality of applications, and to avoid redundant code, while embodying a set of business logic bound to the target database; and
   wherein when the computing environment of the application changes, the plurality of data is loaded into the target database using a different data loading module identified in the registry that is appropriate for the new computing environment.

2. The computer-implemented method of claim 1 further comprising providing an identified data extraction module in the registry.

3. The computer-implemented method of claim 1 further comprising providing an identified data transformation module in the registry.

4. The computer-implemented method of claim 1 further comprising providing an identified target mapping module in the registry.

5. The computer-implemented method of claim 1 further comprising providing an identified metadata management module in the registry.

6. The computer-implemented method of claim 1 further comprising providing an identified data profiling module in the registry.

7. The computer-implemented method of claim 1 further comprising providing an identified mapping module in the registry.

8. The computer-implemented method of claim 1 further comprising providing an identified data quality module in the registry.

9. The computer-implemented method of claim 1 further comprising providing an identified data cleansing module in the registry.

10. The computer-implemented method of claim 1 further comprising providing an identified atomic data repository module in the registry.

11. A system comprising:
   a plurality of computers connected by a network to a target database associated with a data integration platform, a data integration platform, and a registry of services;

a data loading module, stored in a memory connected to a computer, configured for an interface and to cause a processor of the computer to load a plurality of data from an application into the target database, wherein the memory is in a facility;

wherein the registry of services and the interface are in the facility; and wherein the data loading module is identified in the registry of services; and wherein the plurality of data is loaded from the application into the target database using the data loading module;

wherein the data loading module is accessed by the interface as a service in a services oriented architecture, the service forming part of an infrastructure of a business enterprise, the service configured for a development of a plurality of applications, for a deployment of the plurality of applications, and for avoiding redundant code, while embodying a set of business logic bound to the target database; and wherein when the computing environment of the application changes, the plurality of data is loaded into the target database using a different data loading module identified in the registry that is appropriate for the new computing environment.

12. The system of claim 11 further comprising an identified data extraction module in the registry.

13. The system of claim 11 further comprising an identified data transformation module in the registry.

14. The system of claim 11 further comprising an identified target mapping module in the registry.

15. The system of claim 11 further comprising an identified metadata management module in the registry.

16. The system of claim 11 further comprising an identified data profiling module in the registry.

17. The system of claim 11 further comprising an identified mapping module in the registry.

18. The system of claim 11 further comprising an identified data quality module in the registry.

19. The system of claim 11 further comprising an identified data cleansing module in the registry.

20. The system of claim 11 further comprising an identified atomic data repository module in the registry.

* * * * *